US010942641B2

(12) United States Patent
Monte

(10) Patent No.: US 10,942,641 B2
(45) Date of Patent: Mar. 9, 2021

(54) SYNCHRONIZED CALENDAR AND TIMELINE ADAPTIVE USER INTERFACE

(71) Applicant: SAP SE, Walldorf (DE)

(72) Inventor: Charles Monte, San Rafael, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/518,347

(22) Filed: Jul. 22, 2019

(65) Prior Publication Data
US 2020/0019292 A1    Jan. 16, 2020

Related U.S. Application Data

(62) Division of application No. 15/282,381, filed on Sep. 30, 2016, now abandoned.

(51) Int. Cl.
*G06F 3/0488* (2013.01)
*G06Q 10/10* (2012.01)
*G06F 3/0484* (2013.01)

(52) U.S. Cl.
CPC .......... *G06F 3/0488* (2013.01); *G06F 3/0484* (2013.01); *G06Q 10/109* (2013.01)

(58) Field of Classification Search
CPC .. G06F 17/211; G06F 17/2241; G06F 3/0482; G06F 3/0485; G06F 3/04883; G06F 3/0488; G06F 3/0484; G06Q 10/109
USPC ......................................... 715/201, 203, 209
See application file for complete search history.

(56) References Cited

U.S. PATENT DOCUMENTS

| | | | | |
|---|---|---|---|---|
| 5,874,953 | A * | 2/1999 | Webster | G06F 16/345 715/733 |
| 5,898,431 | A * | 4/1999 | Webster | G06F 16/345 715/841 |
| 6,061,062 | A * | 5/2000 | Venolia | G06F 3/0481 715/856 |
| 6,804,330 | B1 * | 10/2004 | Jones | H04M 3/4938 379/88.01 |
| 6,889,220 | B2 * | 5/2005 | Wolff | G06F 16/30 |
| 7,149,810 | B1 * | 12/2006 | Miller | G06Q 10/109 709/246 |
| 7,296,232 | B1 * | 11/2007 | Burdick | G06Q 10/109 715/738 |

(Continued)

OTHER PUBLICATIONS

Peter G. Aitken; Microsoft Outlook 2007 Bible; Apr. 30, 2007; John Wiley & Sons; pp. 207-240 and 535-539.*

(Continued)

*Primary Examiner* — Andrew R Dyer
(74) *Attorney, Agent, or Firm* — Buckley, Maschoff & Talwalkar LLC

(57) ABSTRACT

A system, computer-readable medium, and computer-implemented method, including receiving first temporal information relating to one or more calendar events, the calendar events each having a duration equal to a day or less; receiving second temporal information relating to one or more timeline events, the timeline events each having a duration equal to or greater than a day; generating a user interface including user interface representations of an integrated calendar and timeline visualization to, in response to user input, navigate and control aspects of both the calendar events and the timeline events; and presenting, in response to user input via the user interface, a synchronized navigation and control of both the calendar events and the timeline events.

20 Claims, 93 Drawing Sheets

(56) References Cited

U.S. PATENT DOCUMENTS

| | | | | |
|---|---|---|---|---|
| 7,370,282 | B2* | 5/2008 | Cary | G06Q 10/109 |
| | | | | 715/772 |
| 8,261,196 | B2* | 9/2012 | Oral | G06F 16/338 |
| | | | | 715/745 |
| 9,208,821 | B2* | 12/2015 | Evans | G10H 1/0025 |
| 9,317,172 | B2* | 4/2016 | Lyons | G11B 27/034 |
| 9,319,506 | B2* | 4/2016 | Funabashi | G06F 3/04815 |
| 2004/0177149 | A1* | 9/2004 | Zullo | G06Q 30/02 |
| | | | | 709/228 |
| 2005/0091604 | A1* | 4/2005 | Davis | G06F 3/0482 |
| | | | | 715/772 |
| 2005/0108233 | A1* | 5/2005 | Metsatahti | G06F 16/94 |
| 2005/0108253 | A1* | 5/2005 | Metsatahti | G06F 16/54 |
| 2005/0165795 | A1* | 7/2005 | Myka | H04L 65/60 |
| 2005/0228677 | A1* | 10/2005 | McCabe | G06Q 10/109 |
| | | | | 705/5 |
| 2005/0246119 | A1* | 11/2005 | Koodali | H04N 17/04 |
| | | | | 702/79 |
| 2007/0146337 | A1* | 6/2007 | Ording | G06F 3/04883 |
| | | | | 345/173 |
| 2007/0245238 | A1* | 10/2007 | Fugitt | G06F 3/0481 |
| | | | | 715/700 |
| 2008/0109718 | A1* | 5/2008 | Narayanaswami | G06Q 10/109 |
| | | | | 715/262 |
| 2008/0294994 | A1* | 11/2008 | Kruger | G06Q 30/02 |
| | | | | 715/733 |
| 2009/0241048 | A1* | 9/2009 | Augustine | G06Q 10/10 |
| | | | | 715/769 |
| 2010/0097319 | A1* | 4/2010 | Billard | G06F 3/0482 |
| | | | | 345/167 |
| 2010/0102982 | A1* | 4/2010 | Hoveida | G08B 21/187 |
| | | | | 340/691.3 |
| 2010/0312754 | A1* | 12/2010 | Bear | G06F 16/134 |
| | | | | 707/685 |
| 2011/0029420 | A1* | 2/2011 | Bianco | G06Q 10/06 |
| | | | | 705/32 |
| 2011/0310041 | A1* | 12/2011 | Williams | G06F 11/3696 |
| | | | | 345/173 |
| 2012/0035925 | A1* | 2/2012 | Friend | G06F 3/167 |
| | | | | 704/235 |
| 2012/0051644 | A1* | 3/2012 | Das | G06F 16/58 |
| | | | | 382/190 |
| 2012/0271867 | A1* | 10/2012 | Grossman | G06F 40/197 |
| | | | | 707/821 |
| 2012/0272151 | A1* | 10/2012 | Grossman | G06F 40/197 |
| | | | | 715/719 |
| 2012/0272153 | A1* | 10/2012 | Grossman | G06Q 10/103 |
| | | | | 715/720 |
| 2012/0272173 | A1* | 10/2012 | Grossman | G06Q 10/103 |
| | | | | 715/772 |
| 2012/0272192 | A1* | 10/2012 | Grossman | G06F 3/0484 |
| | | | | 715/854 |
| 2013/0159886 | A1* | 6/2013 | Baek | H04L 51/08 |
| | | | | 715/753 |
| 2013/0212491 | A1* | 8/2013 | Yerli | G06Q 10/00 |
| | | | | 715/753 |
| 2014/0055400 | A1* | 2/2014 | Reuschel | G06F 3/011 |
| | | | | 345/173 |
| 2014/0067548 | A1* | 3/2014 | Liang | G06Q 10/10 |
| | | | | 705/14.68 |
| 2014/0068459 | A1* | 3/2014 | Graham | G06F 16/9535 |
| | | | | 715/753 |
| 2014/0195951 | A1* | 7/2014 | Lee | G01C 21/3682 |
| | | | | 715/771 |
| 2014/0325329 | A1* | 10/2014 | Hao | G06F 40/18 |
| | | | | 715/215 |
| 2014/0343990 | A1* | 11/2014 | Photowat | G06Q 30/0252 |
| | | | | 705/7.17 |
| 2015/0039566 | A1* | 2/2015 | Baumann | G06F 11/1446 |
| | | | | 707/684 |
| 2015/0052209 | A1* | 2/2015 | Vorotyntsev | H04L 51/32 |
| | | | | 709/206 |
| 2015/0121216 | A1* | 4/2015 | Brown | G06N 3/008 |
| | | | | 715/707 |
| 2015/0177952 | A1* | 6/2015 | Meyer | G06F 3/04842 |
| | | | | 715/739 |
| 2015/0178690 | A1* | 6/2015 | May | G06Q 10/1095 |
| | | | | 705/7.19 |
| 2015/0309675 | A1* | 10/2015 | Blinov | G06F 3/0481 |
| | | | | 715/834 |
| 2015/0370462 | A1* | 12/2015 | Joshi | G06F 3/0486 |
| | | | | 715/765 |
| 2016/0055444 | A1* | 2/2016 | Chetan | G06Q 10/063112 |
| | | | | 705/7.14 |
| 2016/0092883 | A1* | 3/2016 | Weber | G06Q 30/016 |
| | | | | 705/304 |
| 2016/0110608 | A1* | 4/2016 | Deng | G06K 9/00718 |
| | | | | 382/224 |
| 2016/0124756 | A1* | 5/2016 | Sadler | G06F 3/0482 |
| | | | | 715/708 |
| 2017/0357413 | A1* | 12/2017 | Green | G06F 3/04883 |
| 2018/0091728 | A1* | 3/2018 | Brown | G06F 3/04883 |

OTHER PUBLICATIONS

Ryan Anderson, Introducing the Timeline View—Available Today in Team Calendars 3; Dec. 11, 2012; Atlassian.com; 5 pages.*

* cited by examiner

200

RECEIVE FIRST TEMPORAL INFORMATION RELATING TO ONE OR MORE CALENDAR EVENTS, THE CALENDAR EVENTS HAVING A DURATION EQUAL TO A DAY OR LESS 205

↓

RECEIVING SECOND TEMPORAL INFORMATION RELATING TO ONE OR MORE TIMELINE EVENTS, THE TIMELINE EVENTS HAVING A DURATION EQUAL TO GREATER THAN A DAY 210

↓

GENERATING A USER INTERFACE INCLUDING USER INTERFACE REPRESENTATIONS FOR AN INTEGRATED CALENDAR AND TIMELINE VISUALIZATION TO INTERACTIVELY NAVIGATE AND CONTROL ASPECTS OF BOTH THE CALENDAR EVENTS AND THE TIMELINE EVENTS 215

↓

SAVING, AUTOMATICALLY, A RECORD OF A LOCATION FOR A CURRENT VIEW AND A PAST LOCATION OF A MOST RECENT LAST VIEW IN THE USER INTERFACE FOR AT LEAST ONE OF THE CALENDAR AND THE TIMELINE 220

*FIG. 2A*

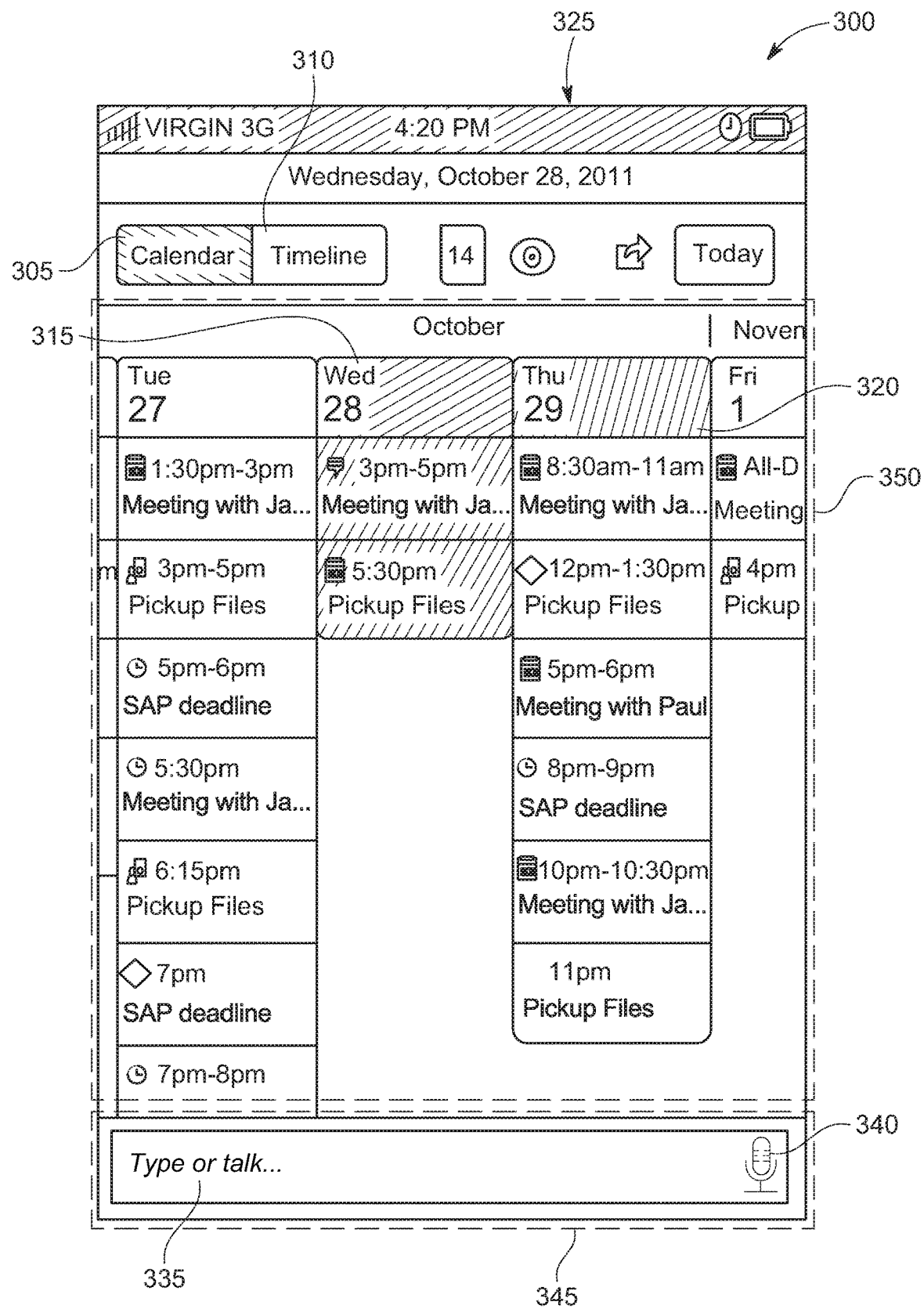
FIG. 3(Continue)

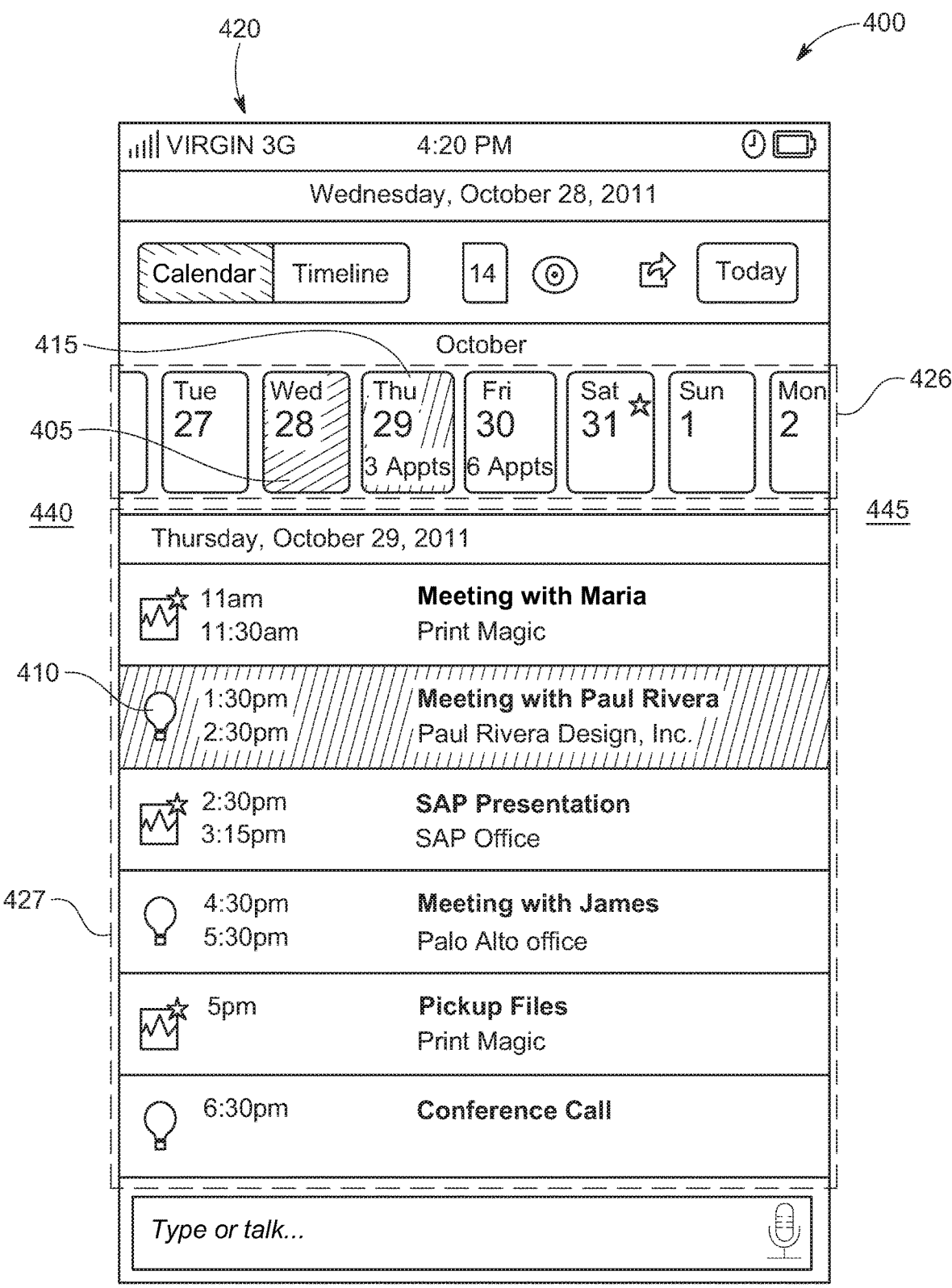
FIG. 4A(Continue)

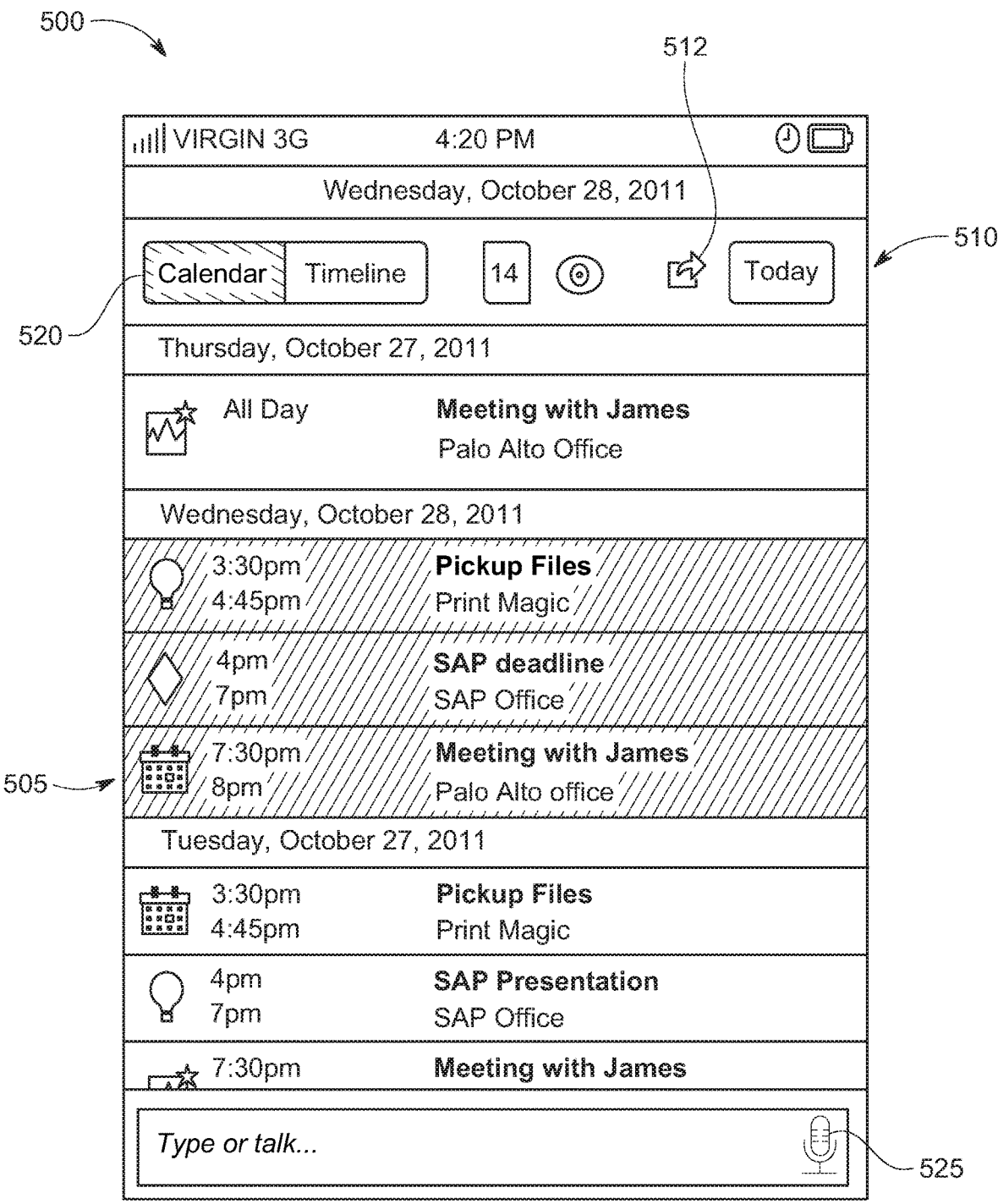
FIG. 5A(Continue)

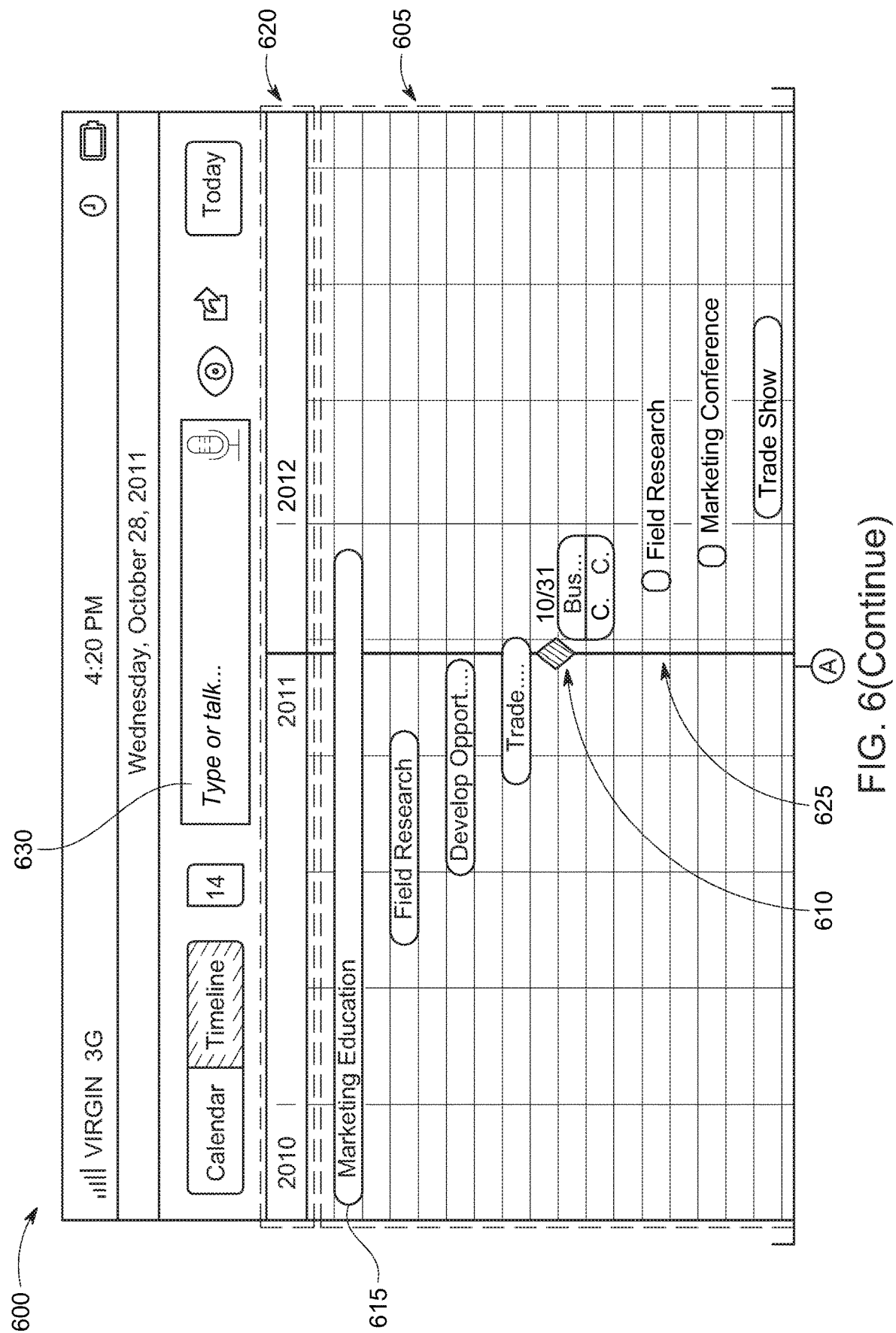
FIG. 6 (Continue)

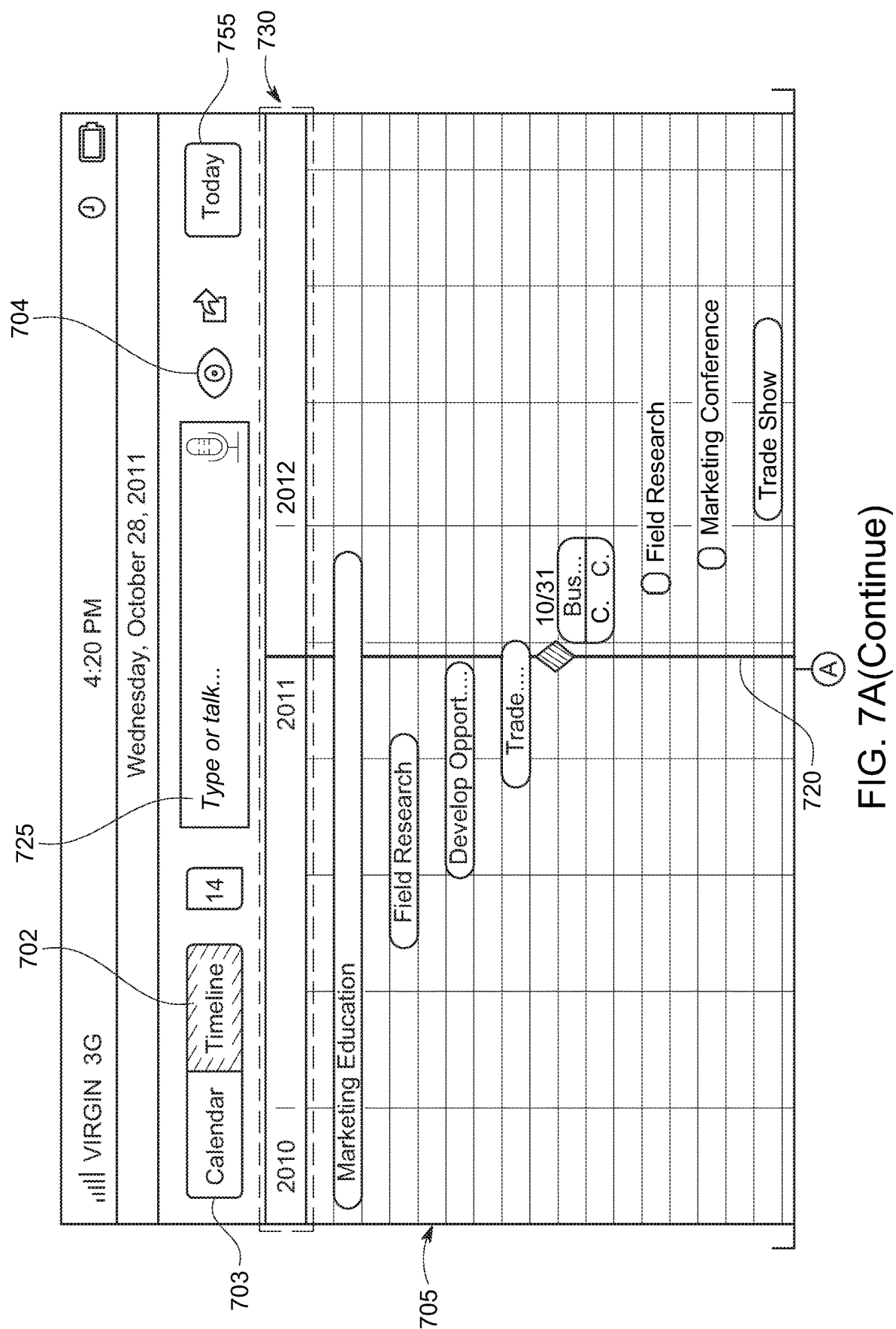
FIG. 7A(Continue)

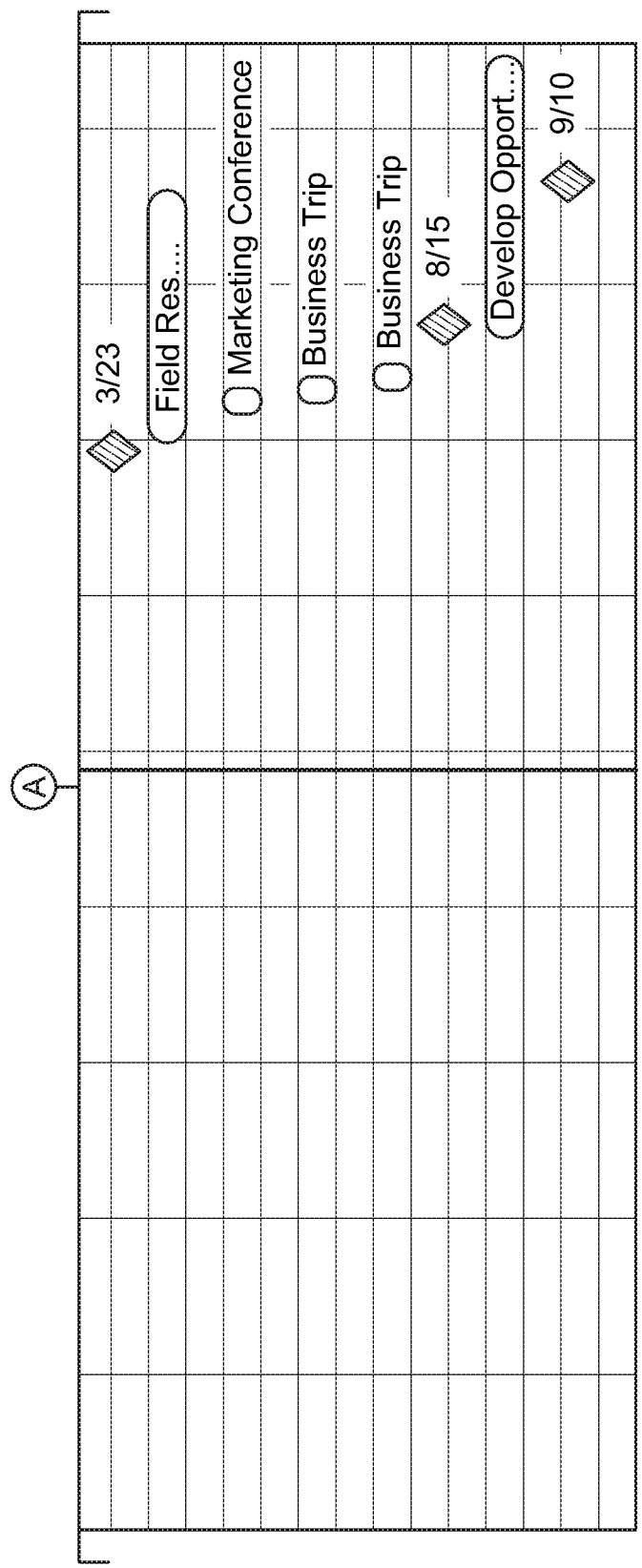
FIG. 7A(Continue)

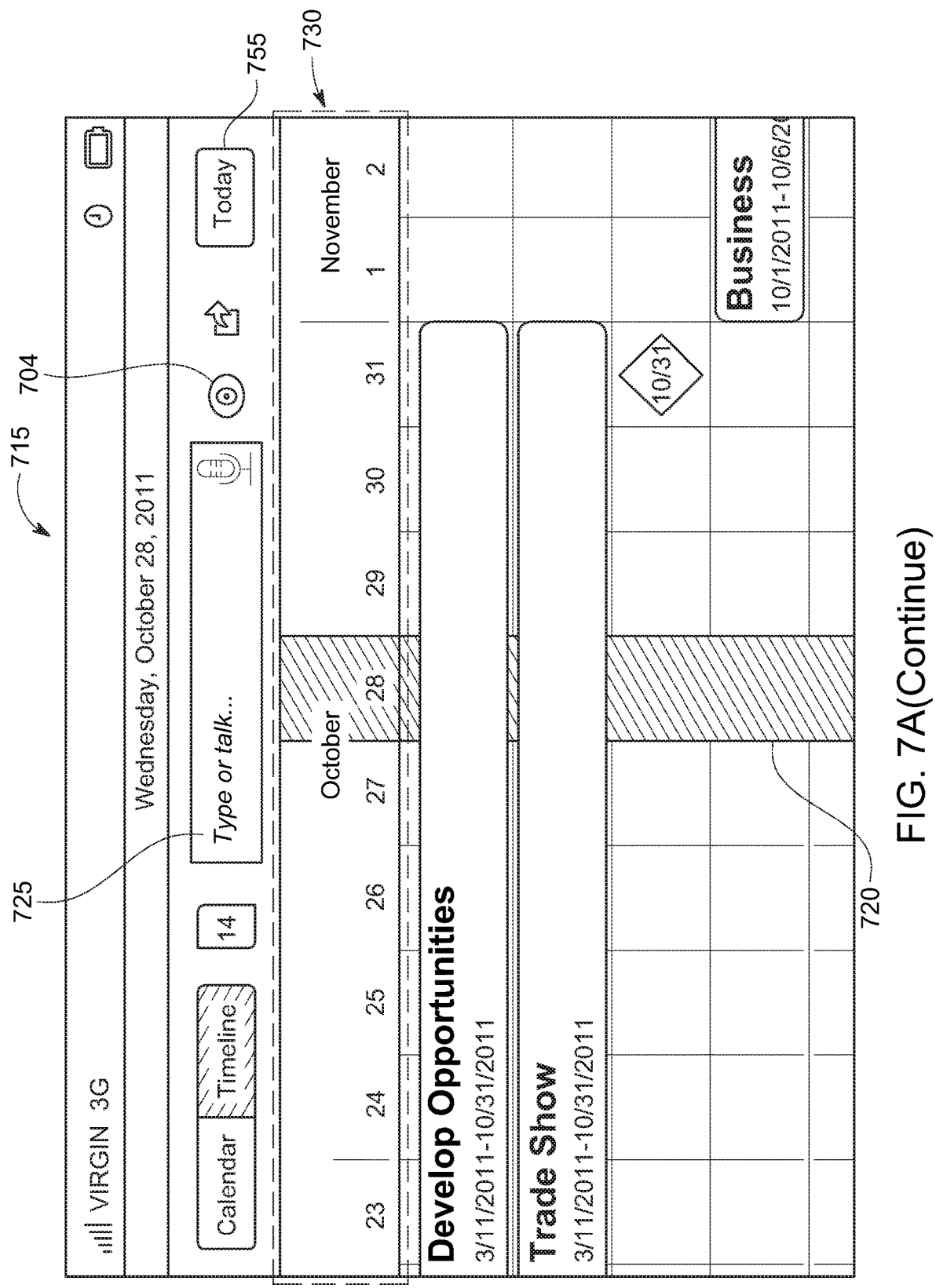
FIG. 7A(Continue)

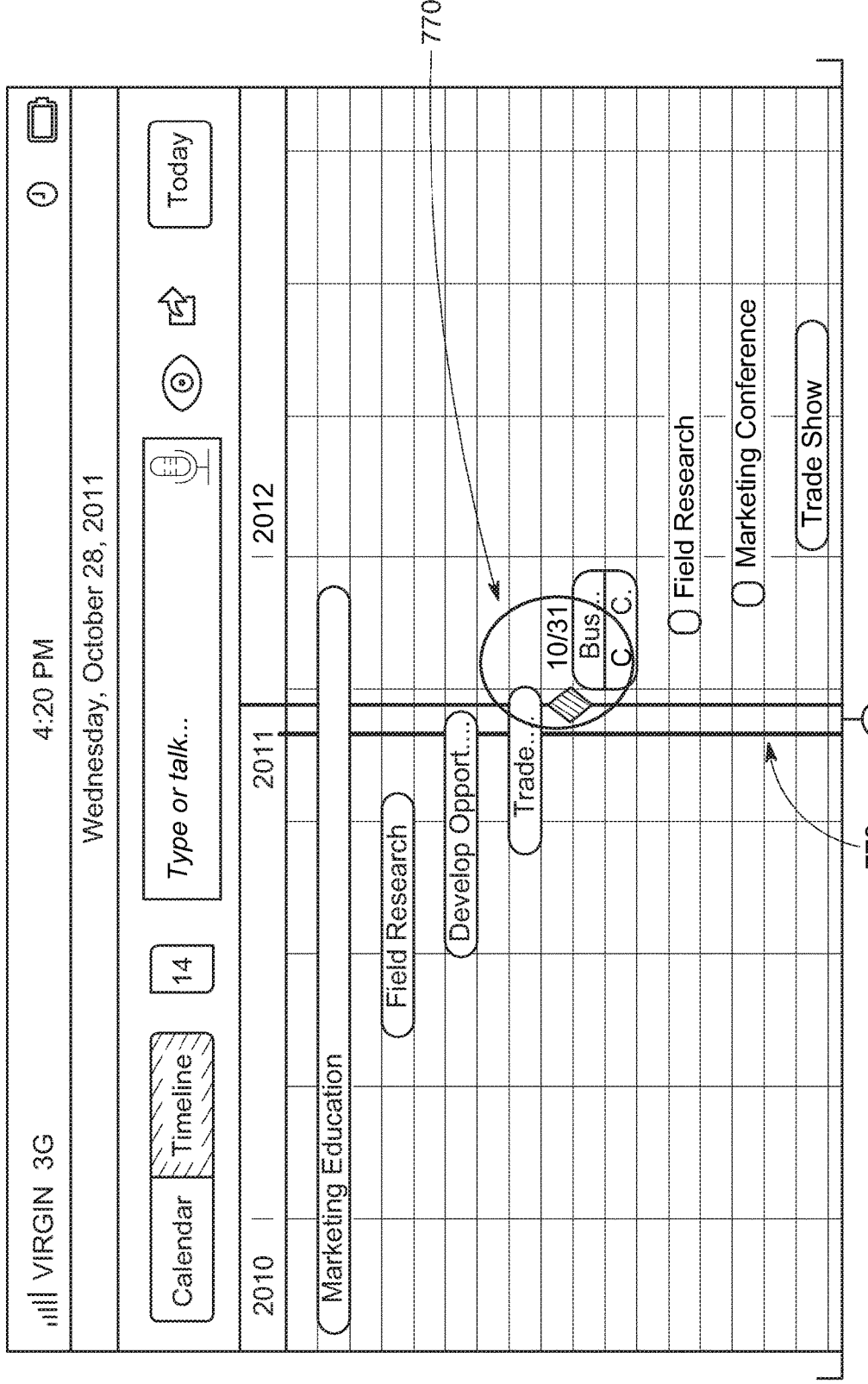
FIG. 7B(Continue)

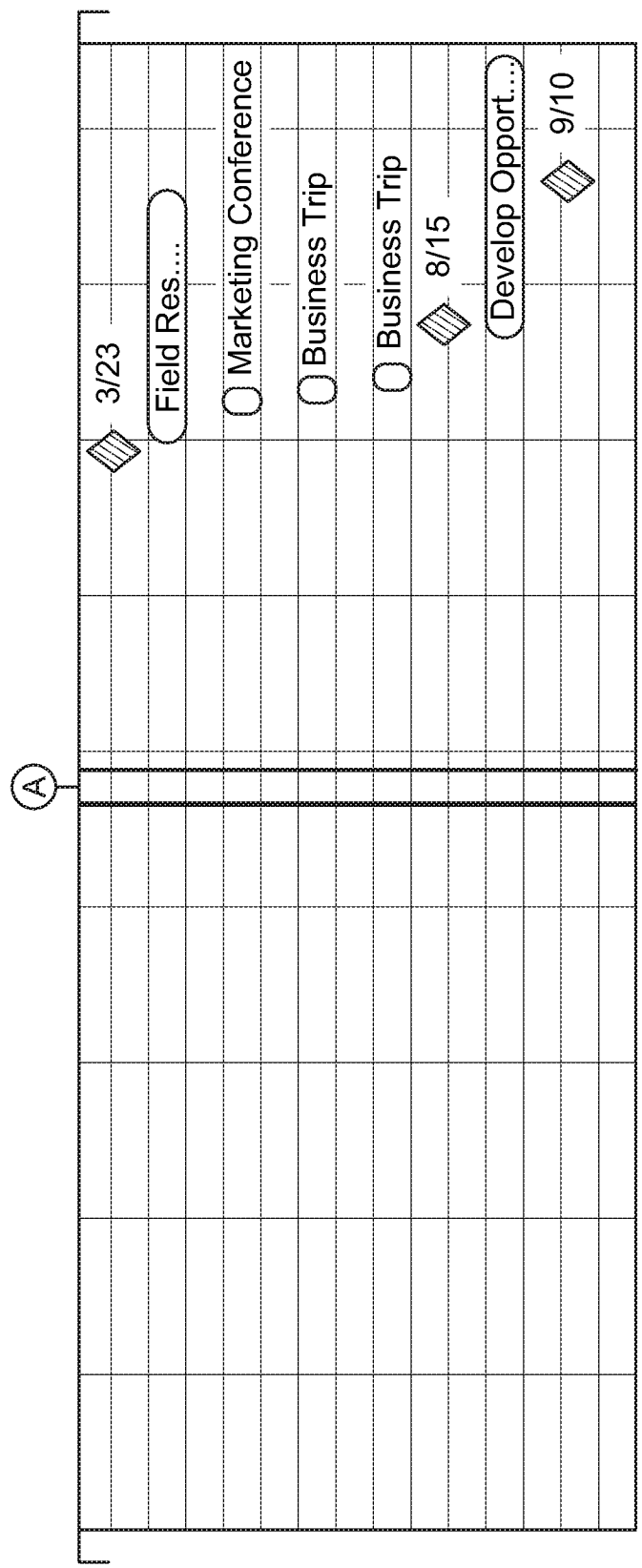
FIG. 7B(Continue)

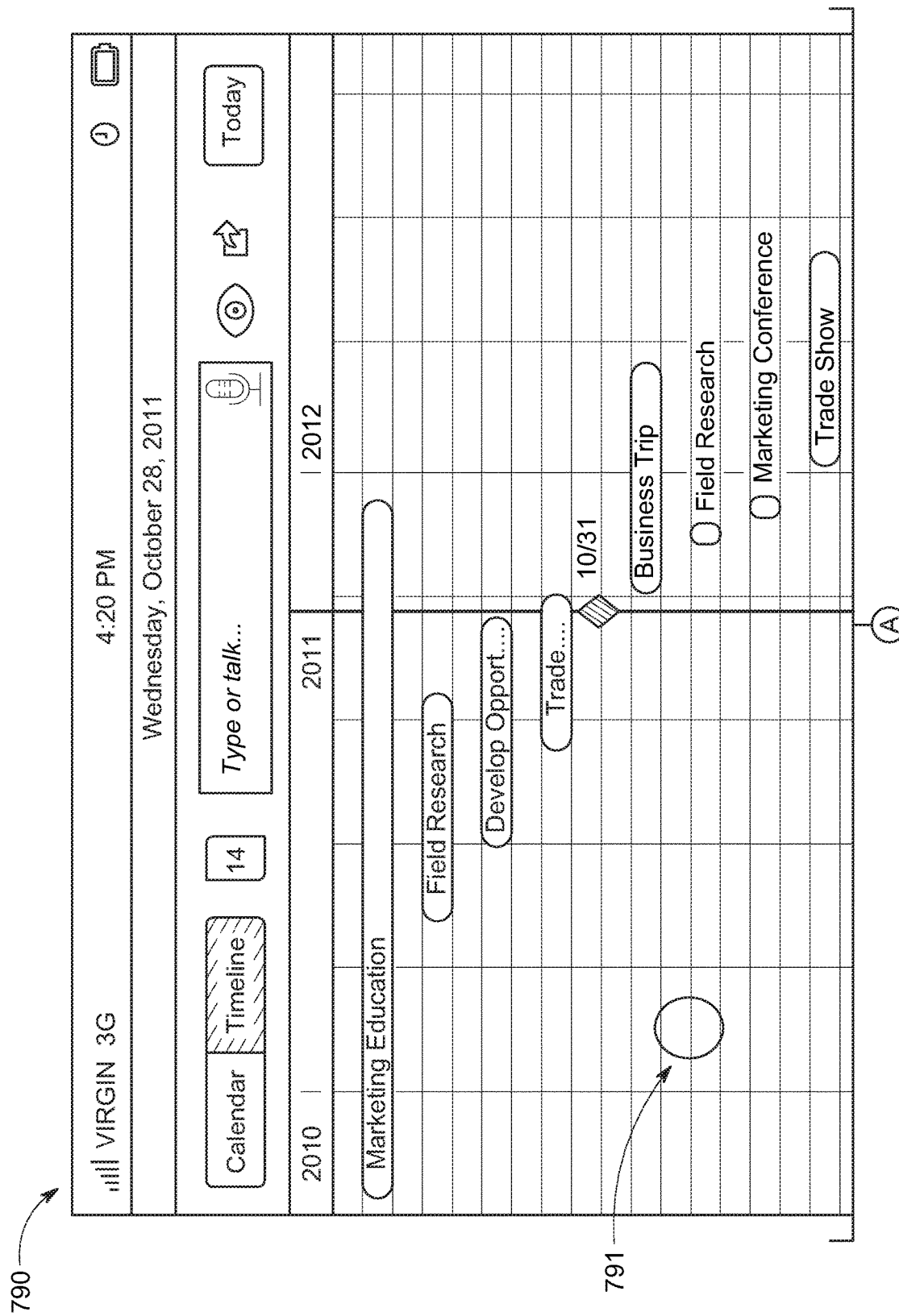
FIG. 7D(Continue)

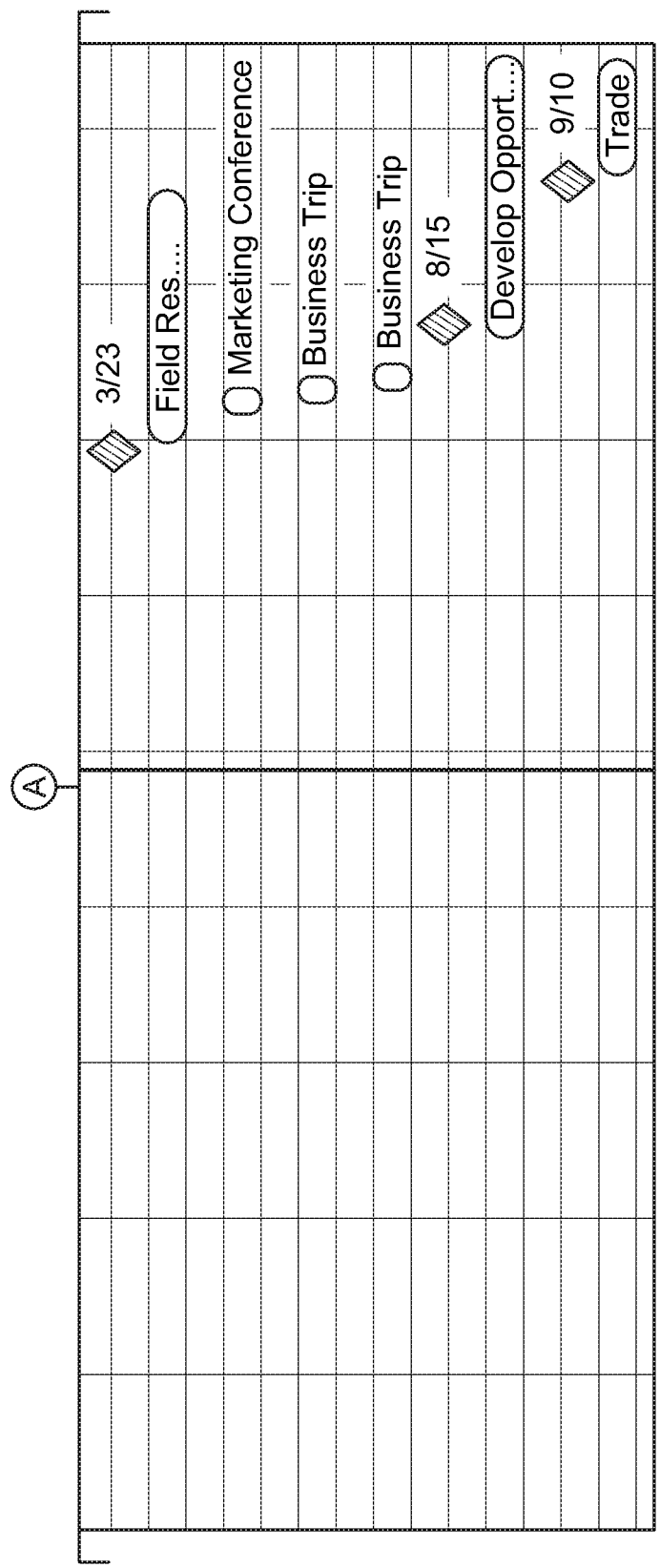
FIG. 7D(Continue)

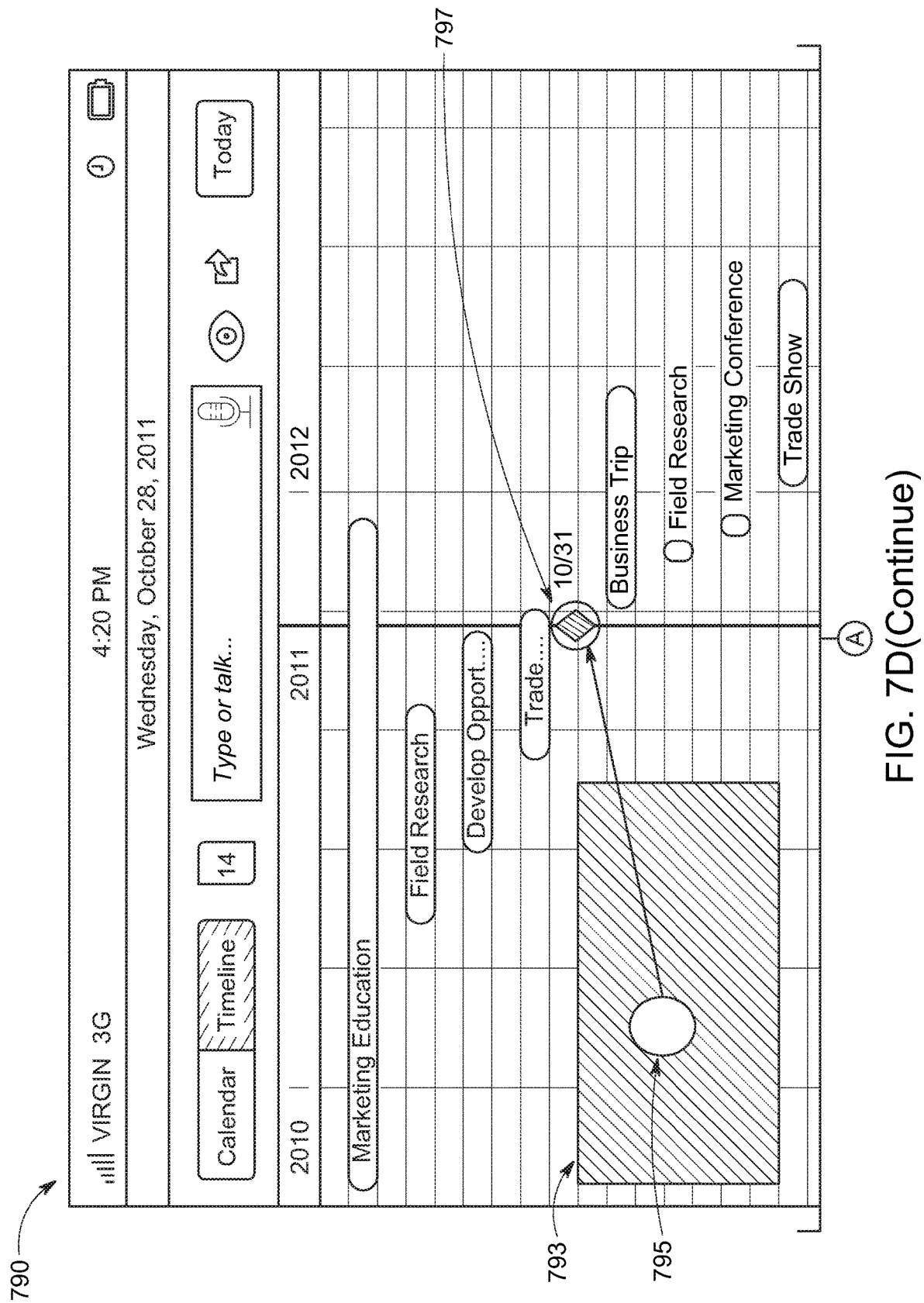
FIG. 7D(Continue)

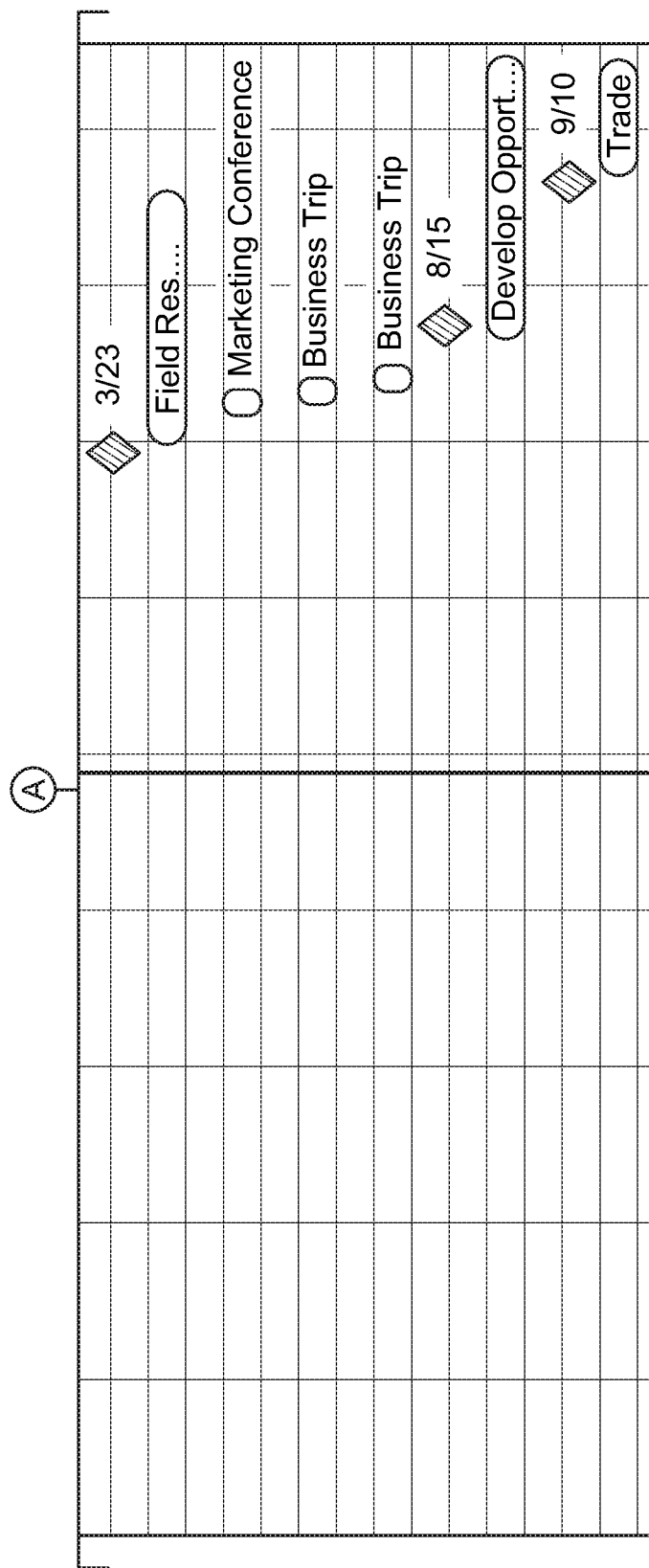
FIG. 7D(Continue)

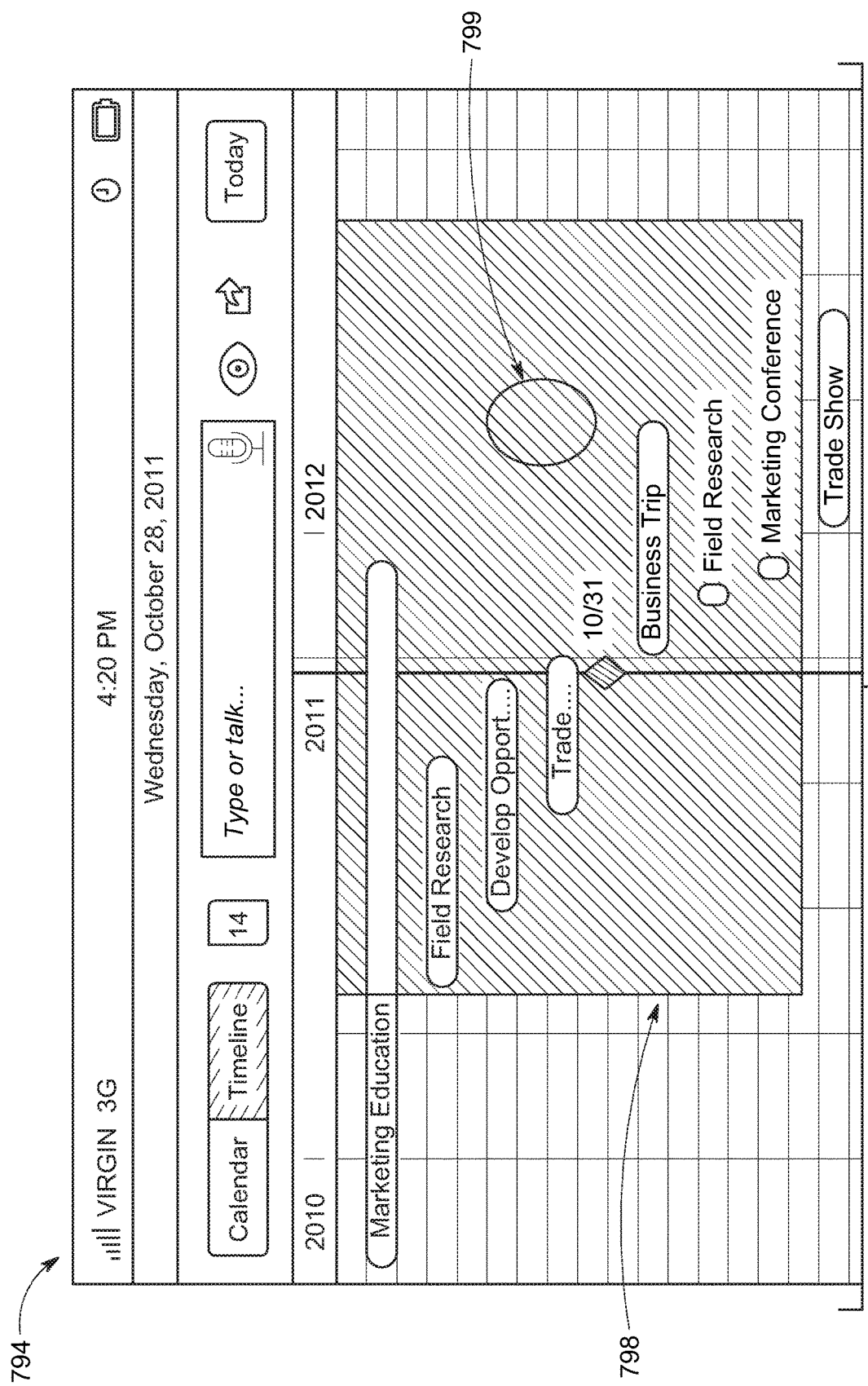
FIG. 7D(Continue)

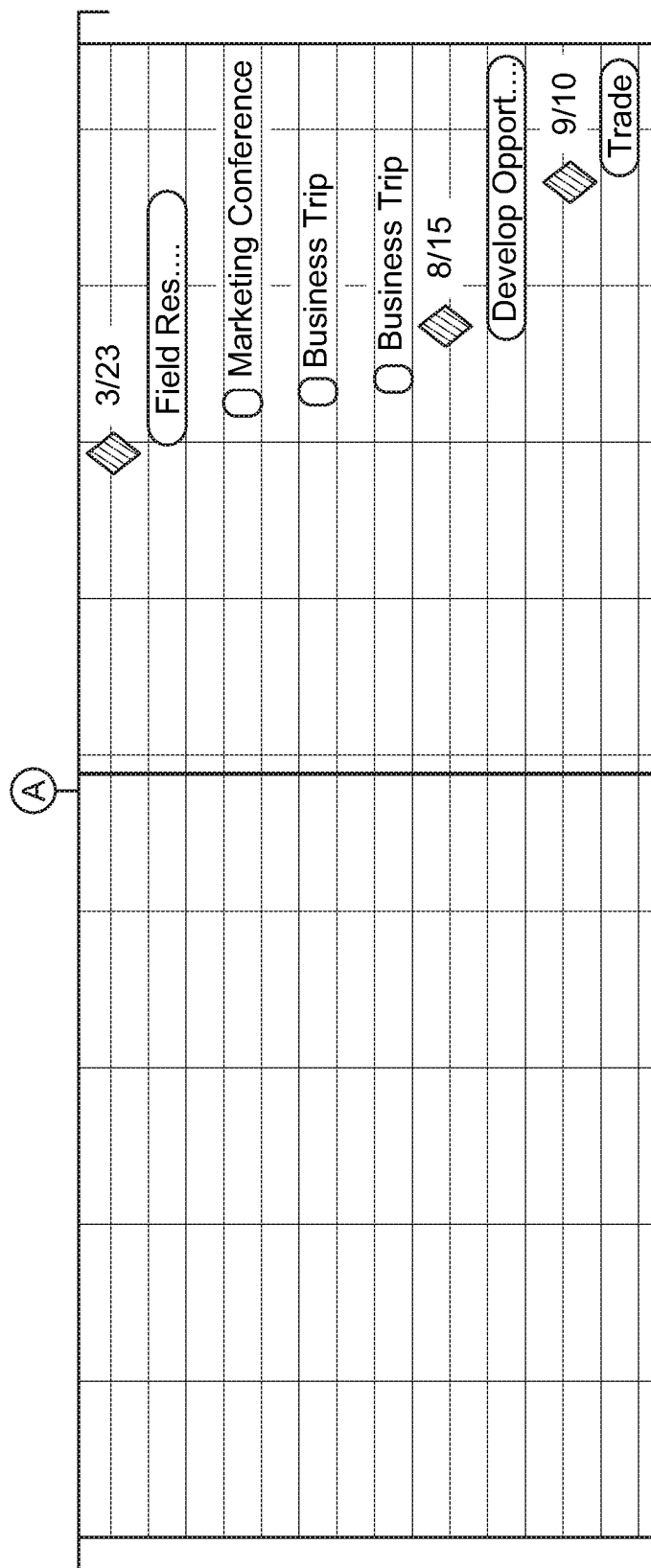
FIG. 7D(Continue)

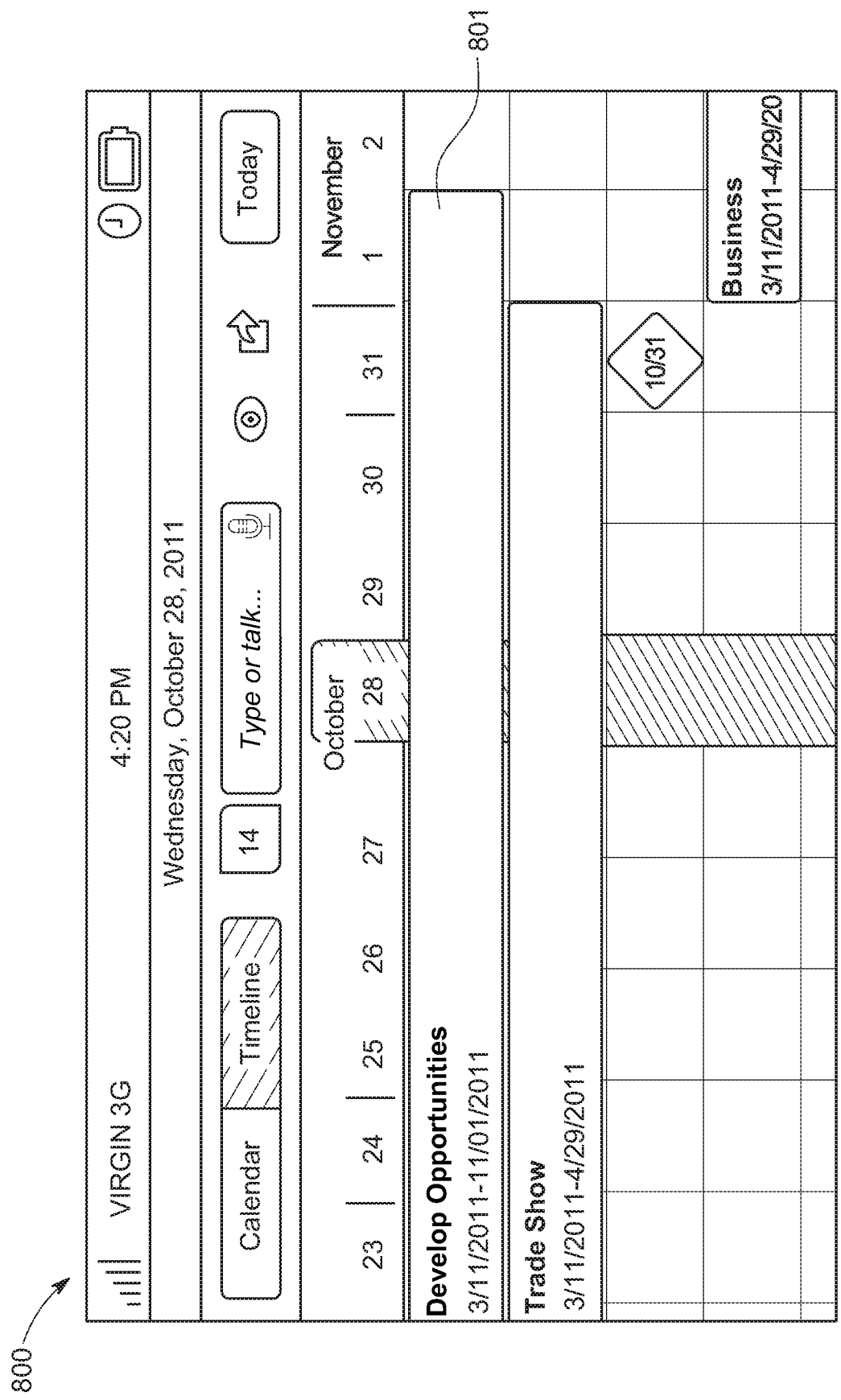
FIG. 8A(Continue)

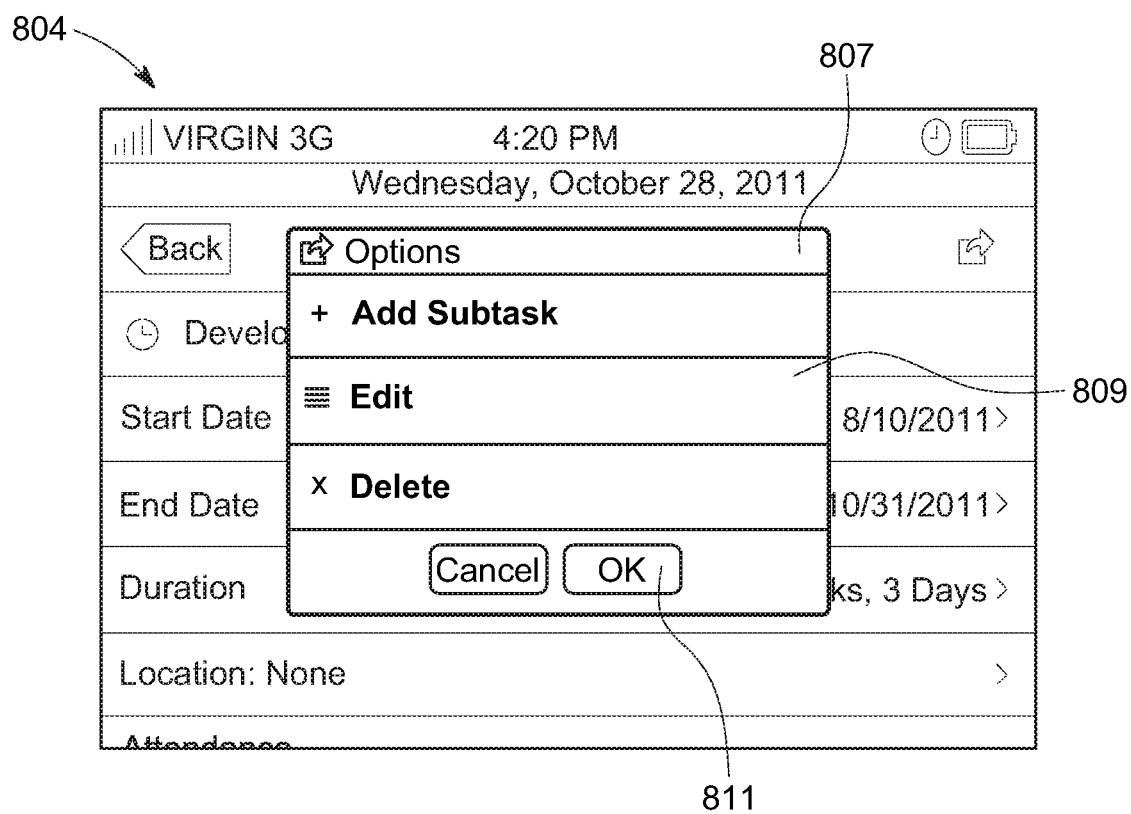
FIG. 8A(Continue)

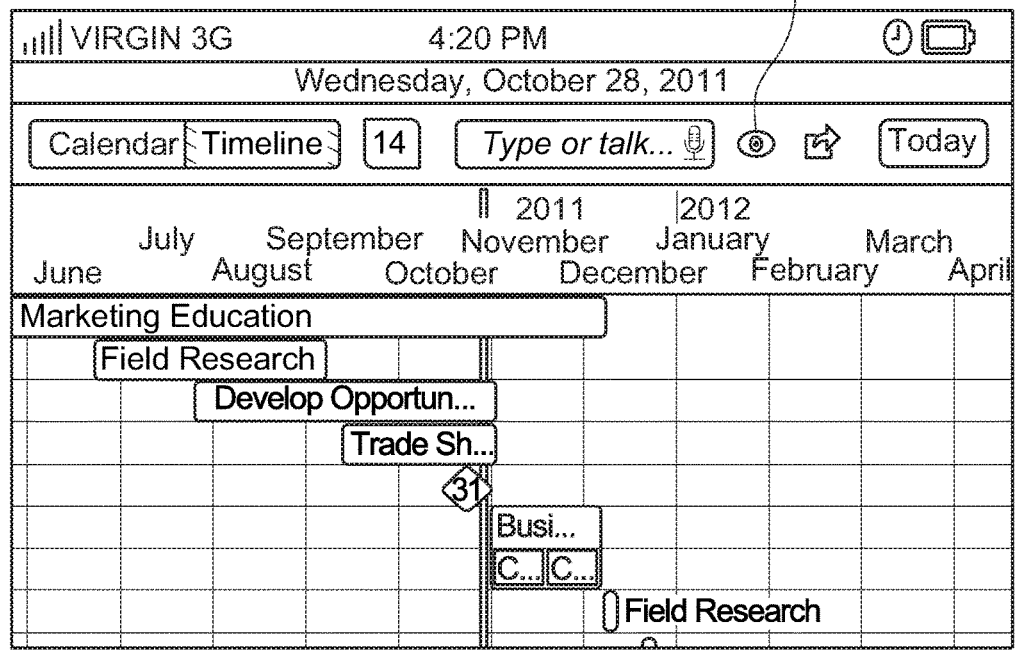
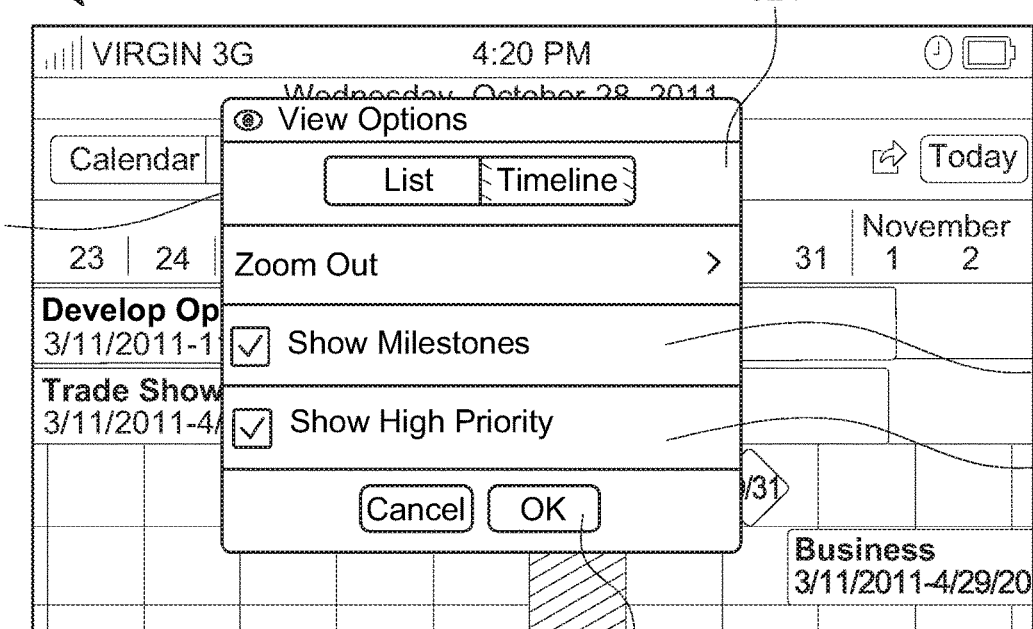
FIG. 8B(Continue)

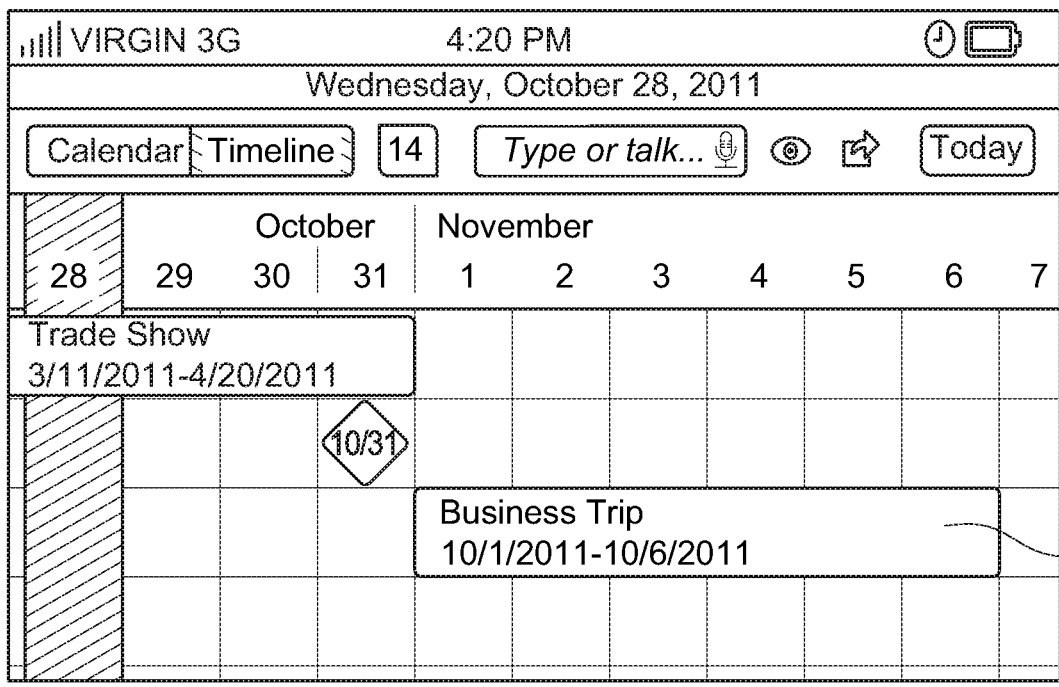
FIG. 8C(Continue)

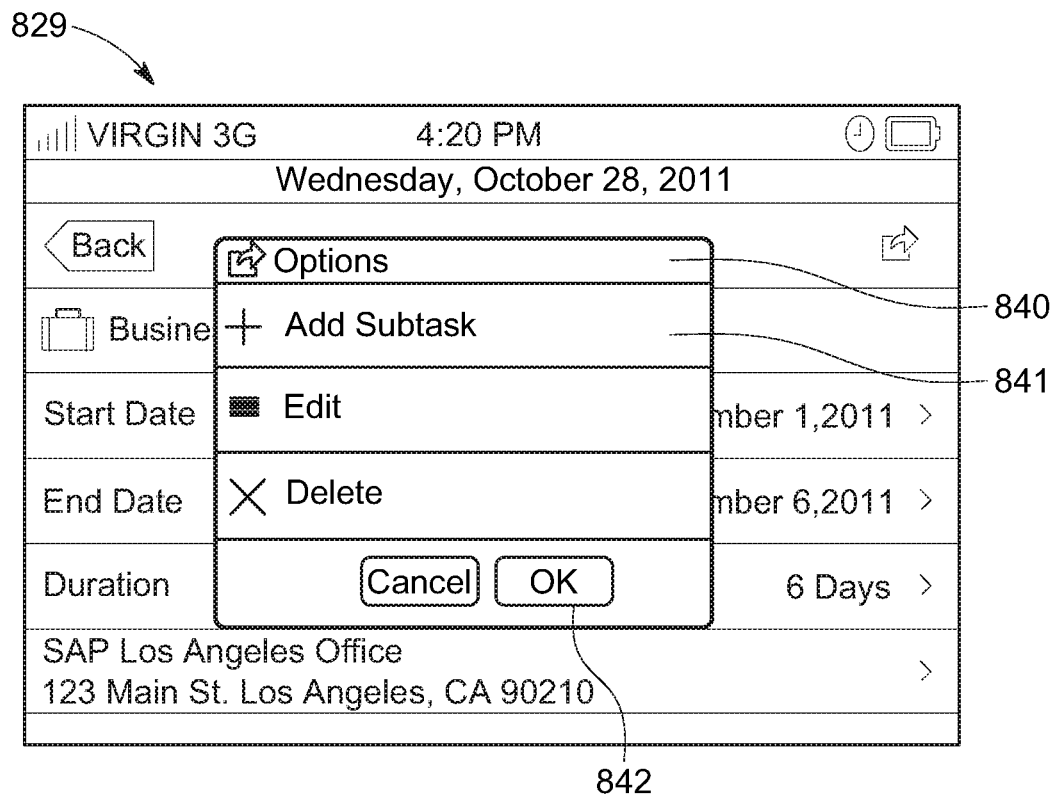
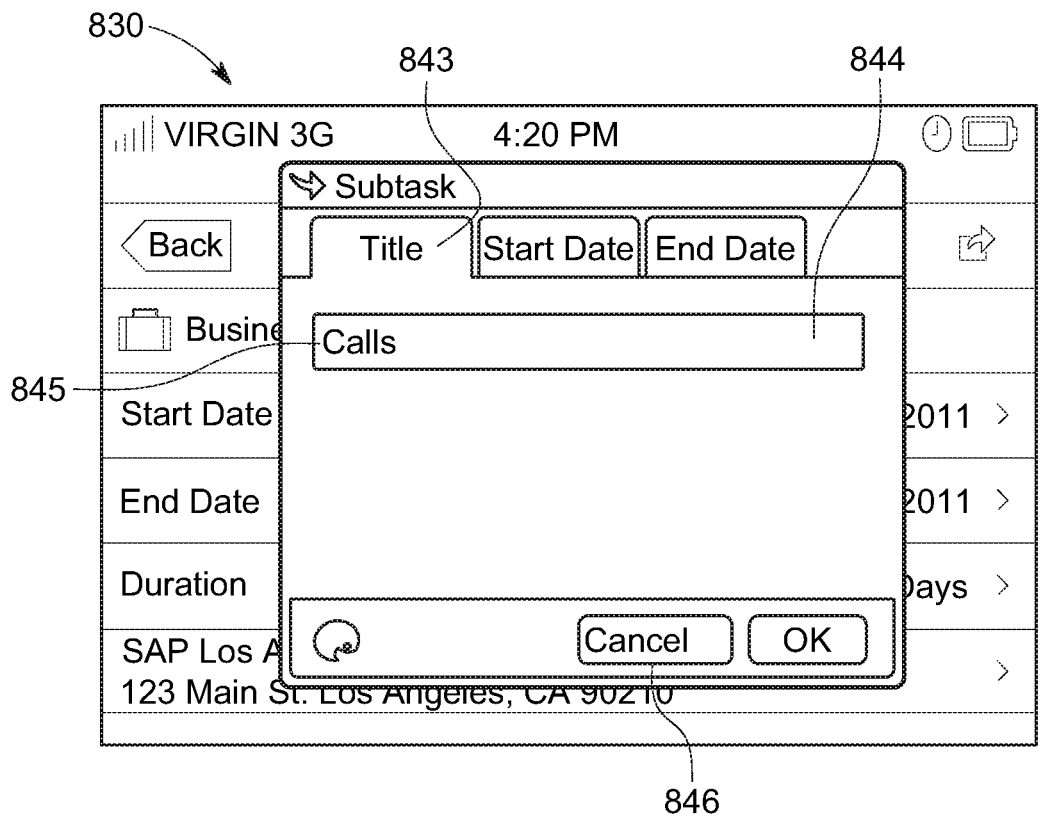
FIG. 8C(Continue)

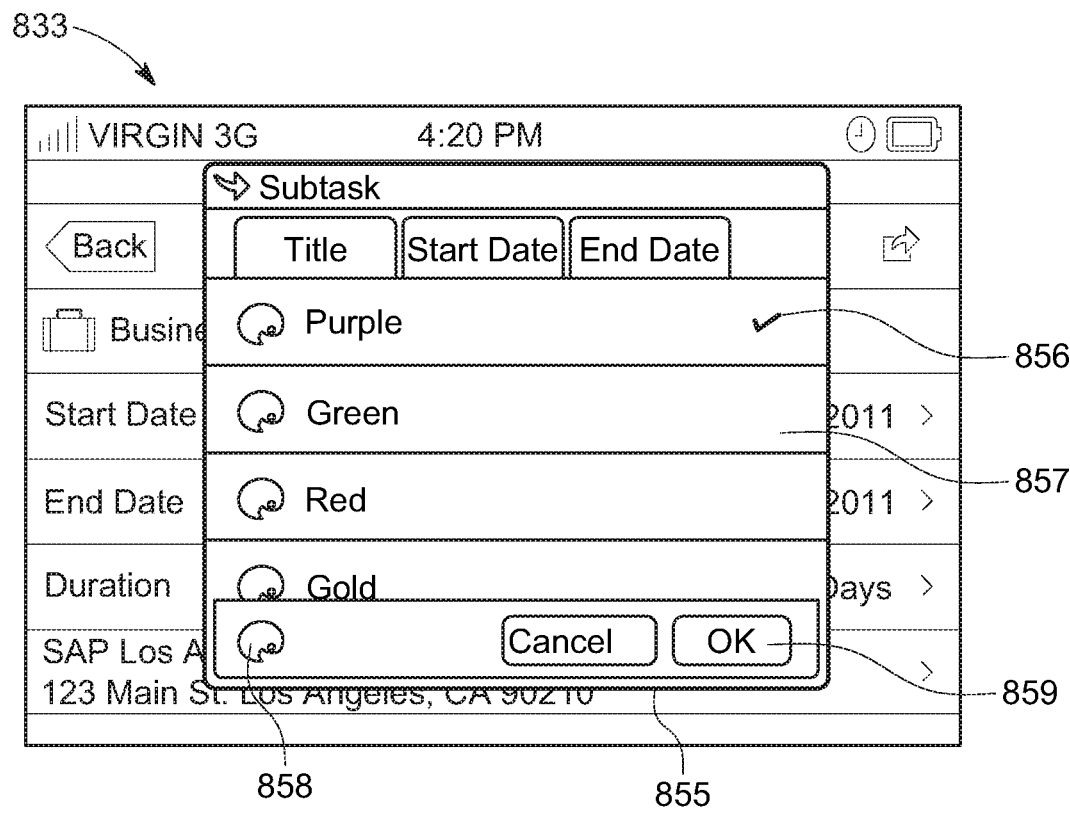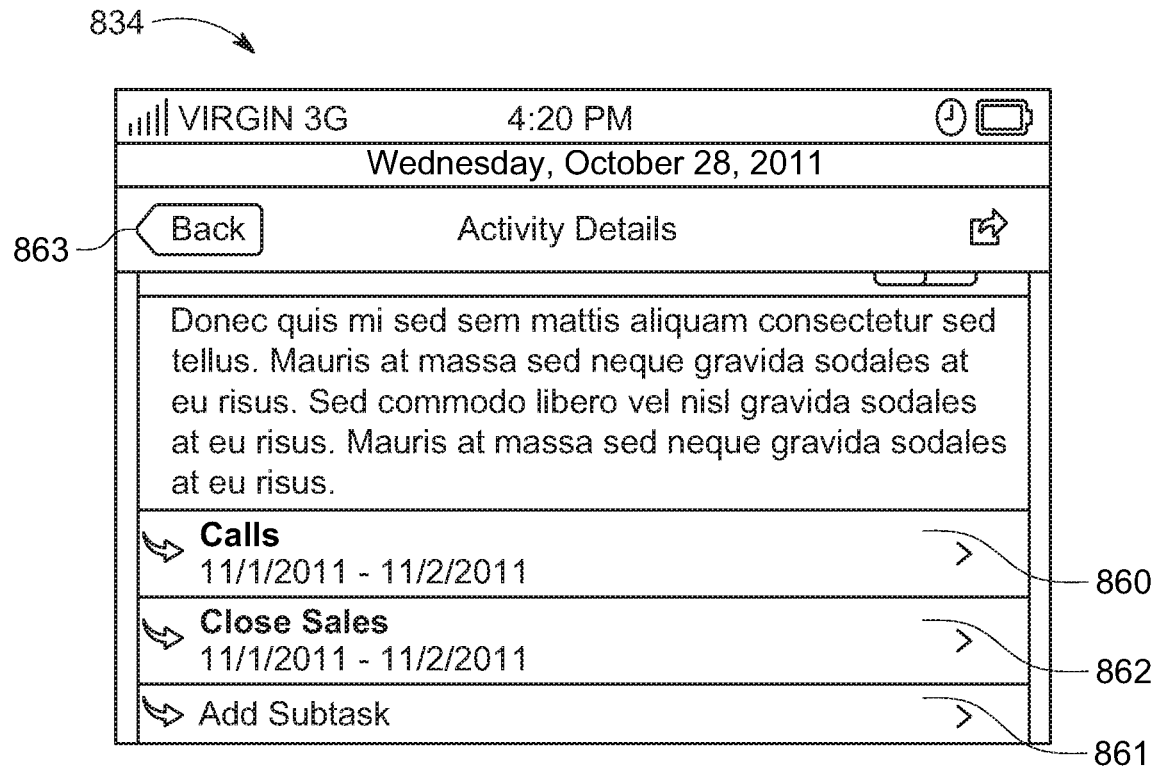
FIG. 8D(Continue)

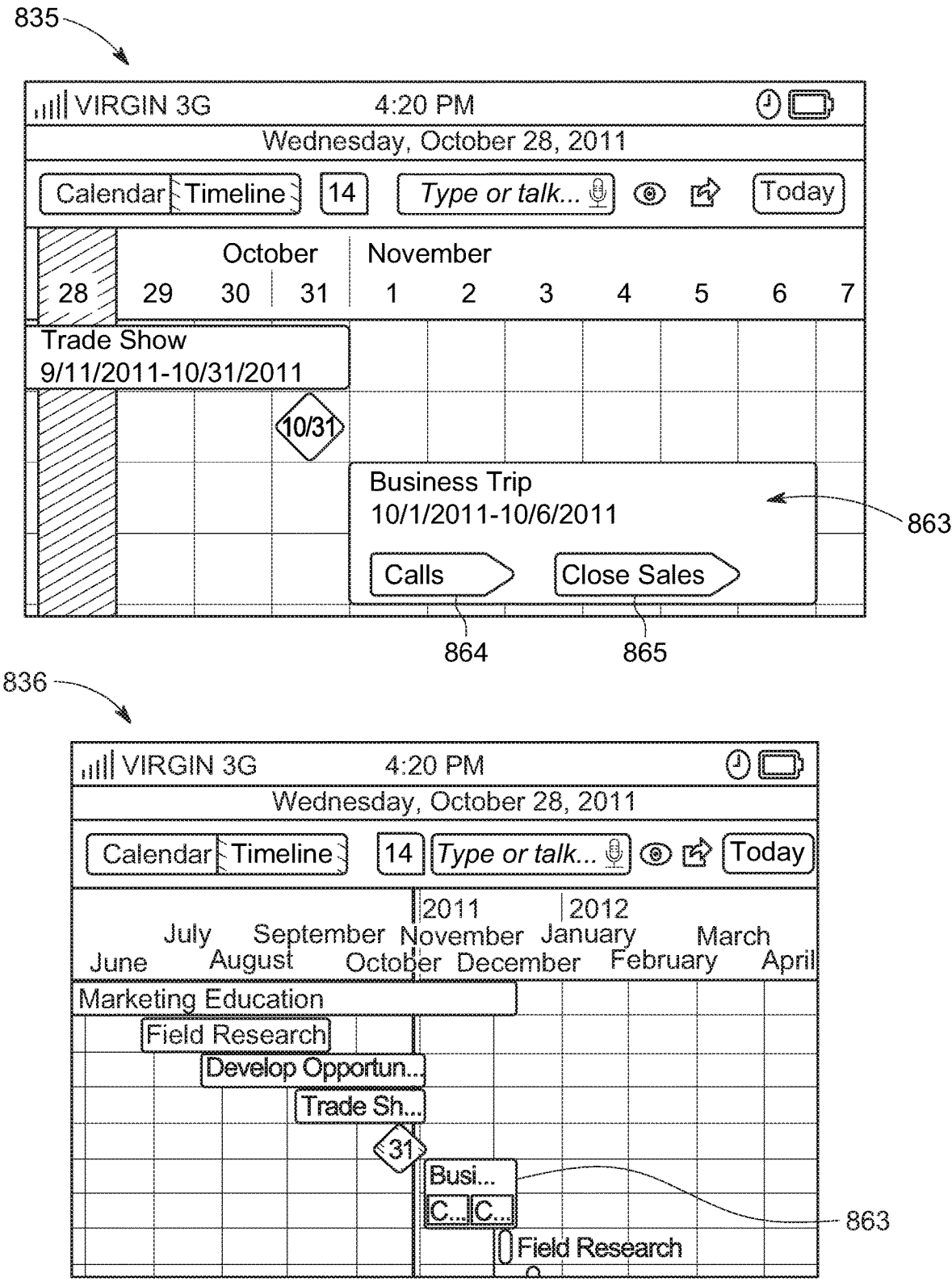
FIG. 8D(Continue)

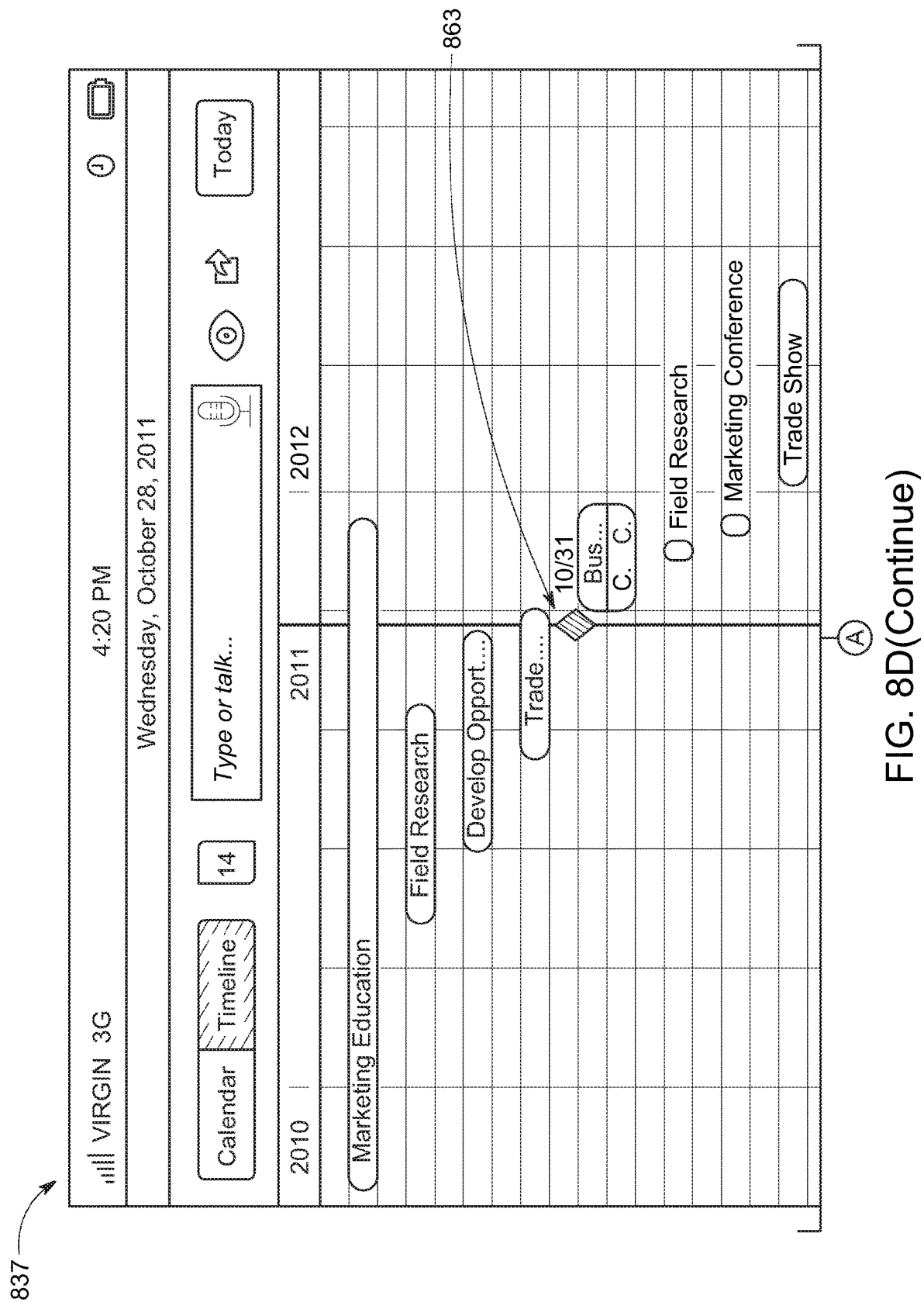
FIG. 8D(Continue)

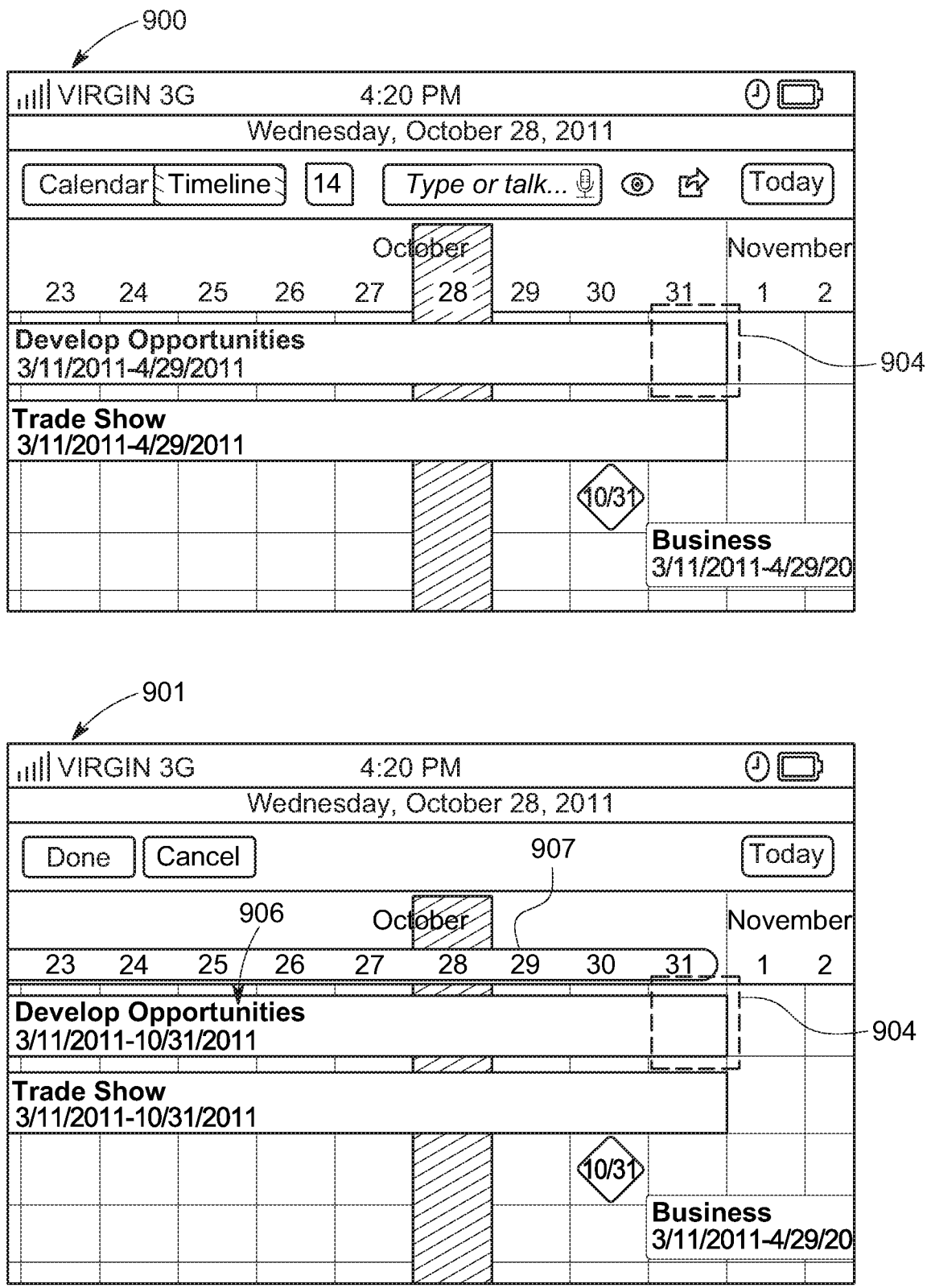
FIG. 9A(Continue)

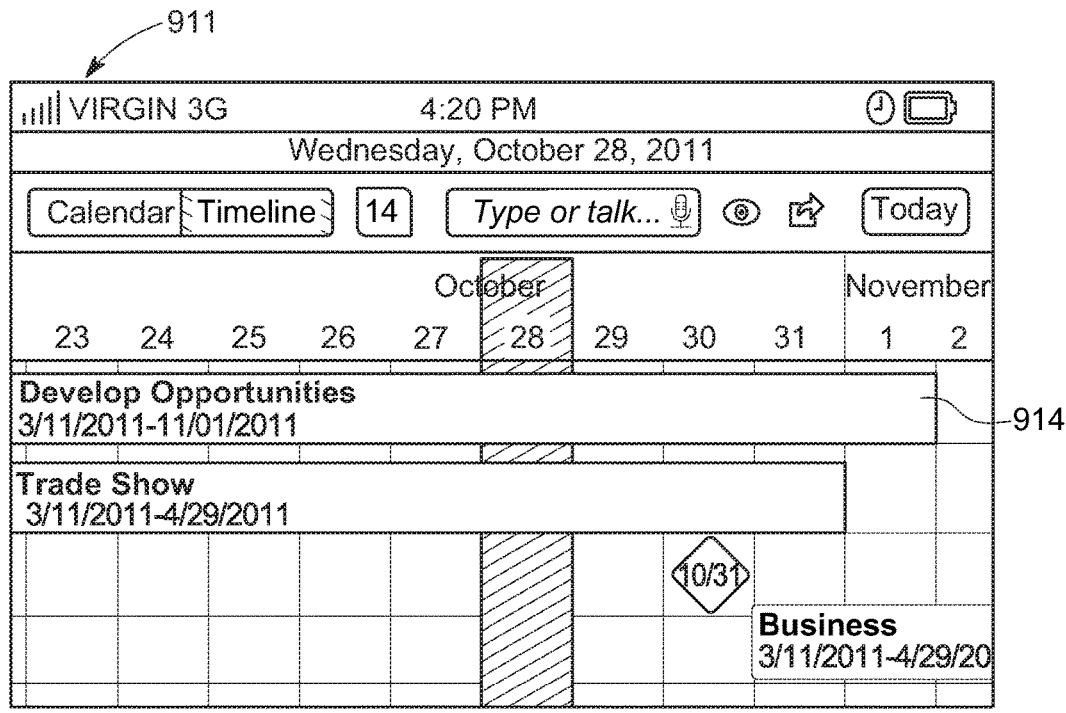
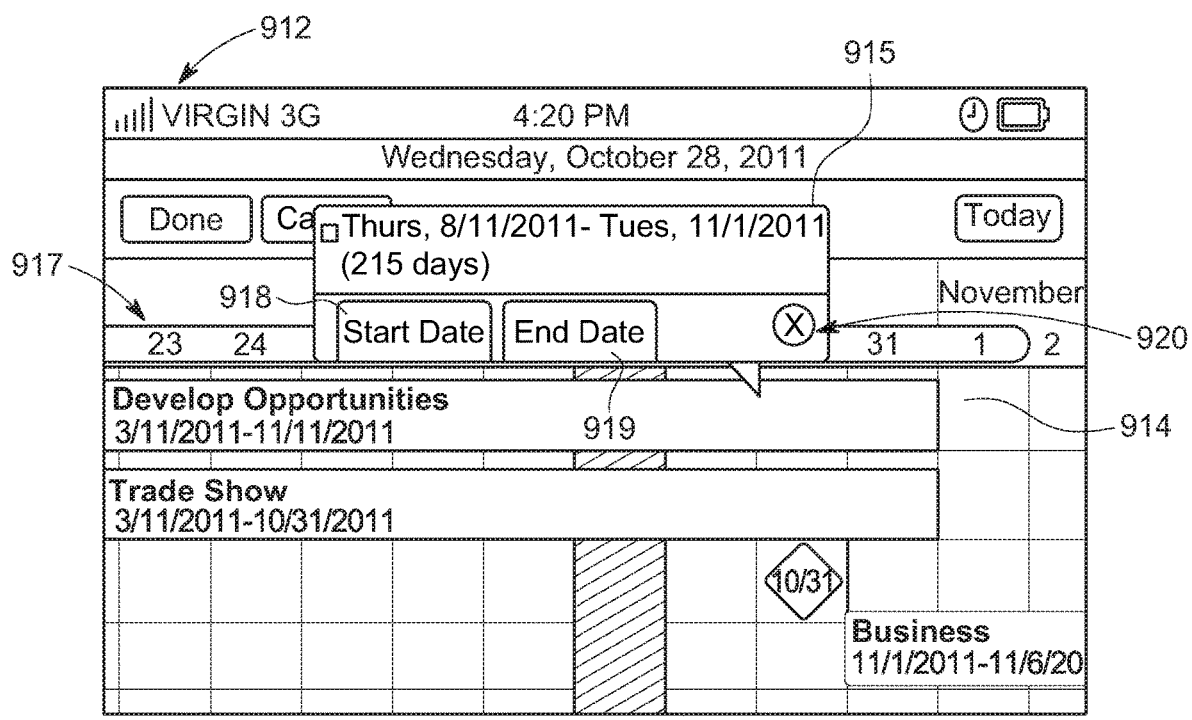
FIG. 9B(Continue)

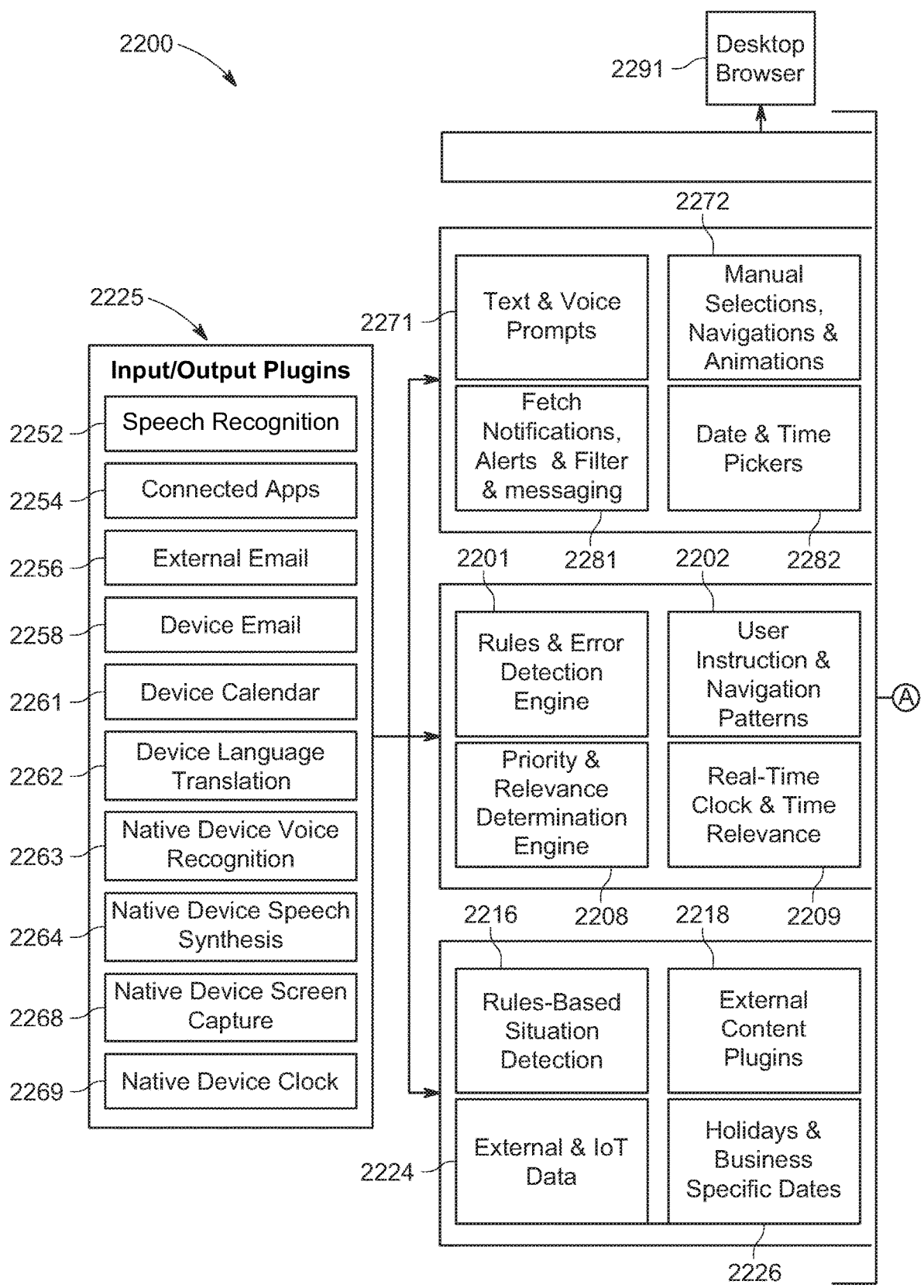
FIG. 22 (Continue)

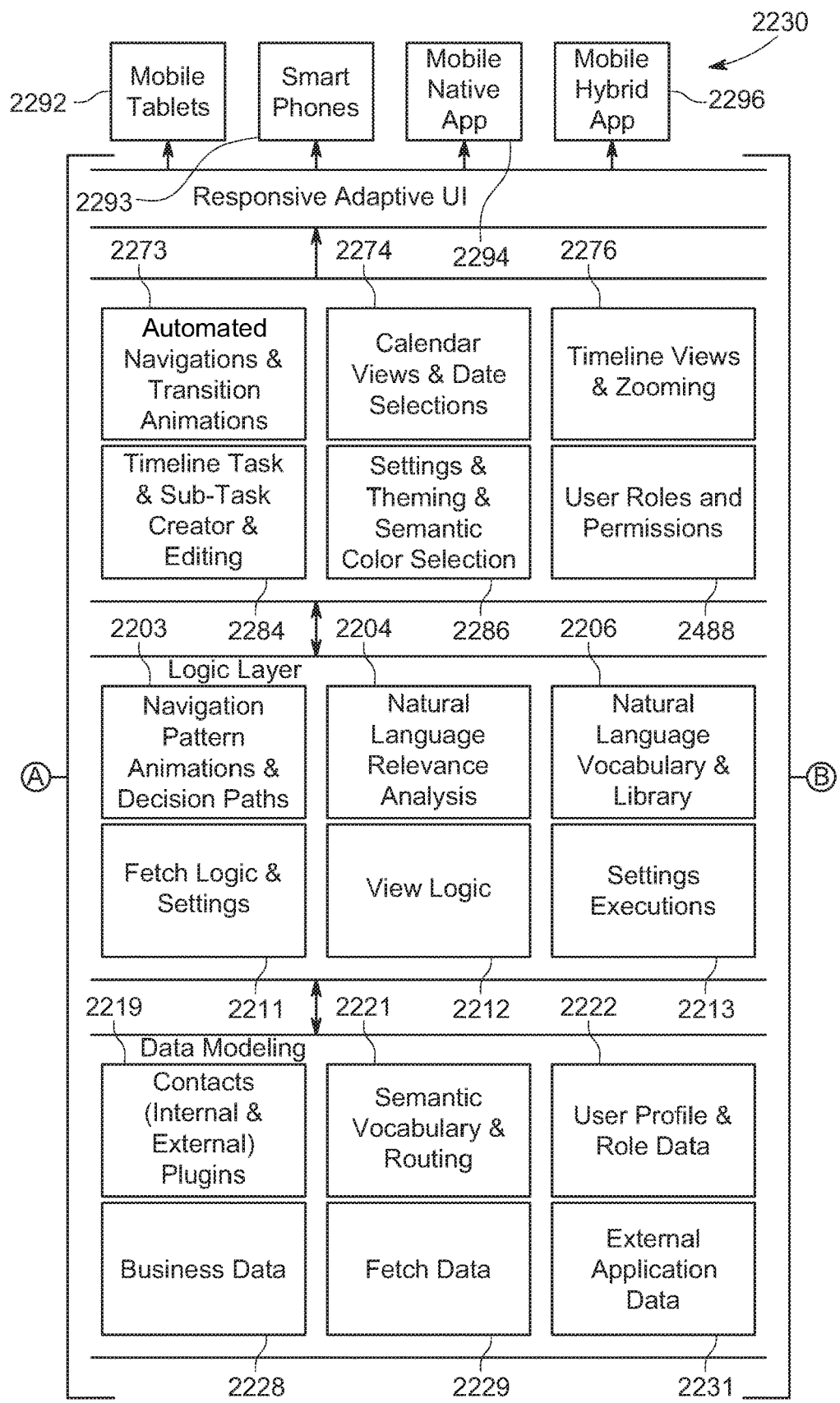
FIG. 22 (Continue)

SYNCHRONIZED CALENDAR AND TIMELINE ADAPTIVE USER INTERFACE

BACKGROUND

Graphical user interfaces provide a mechanism for users to submit input to software applications, as well as a way for the applications to communicate information to the users. In most aspects, individual applications are developed to manage, process, or address a specific one or related issues. For example, an accounting application handles accounting issues and an email client processes and handles email related issues. Some applications may be developed by a common software developer and packed as a suite of applications that work well with each other. Even if these application suites work well with each other, there might remain a disconnect with other applications outside of the suite of applications.

Applications, whether designed for an enterprise environment, a home office, a mobile device, or other contexts and environments tend to exist in isolation or silos. A user of multiple applications may thus find that they have to monitor numerous different applications, devices, and systems to stay abreast of the many different alerts, schedules, meetings, requests, and messages that may be generated by their devices and their work, social, and/or school related applications.

BRIEF DESCRIPTION OF THE DRAWINGS

FIGS. 2A and 2B are illustrative flow diagrams related to aspects of an integrated calendar and timeline application in an example embodiment;

DETAILED DESCRIPTION

The following description is provided to enable any person in the art to make and use the described embodiments. Various modifications, however, will remain readily apparent to those in the art.

Figure 1:
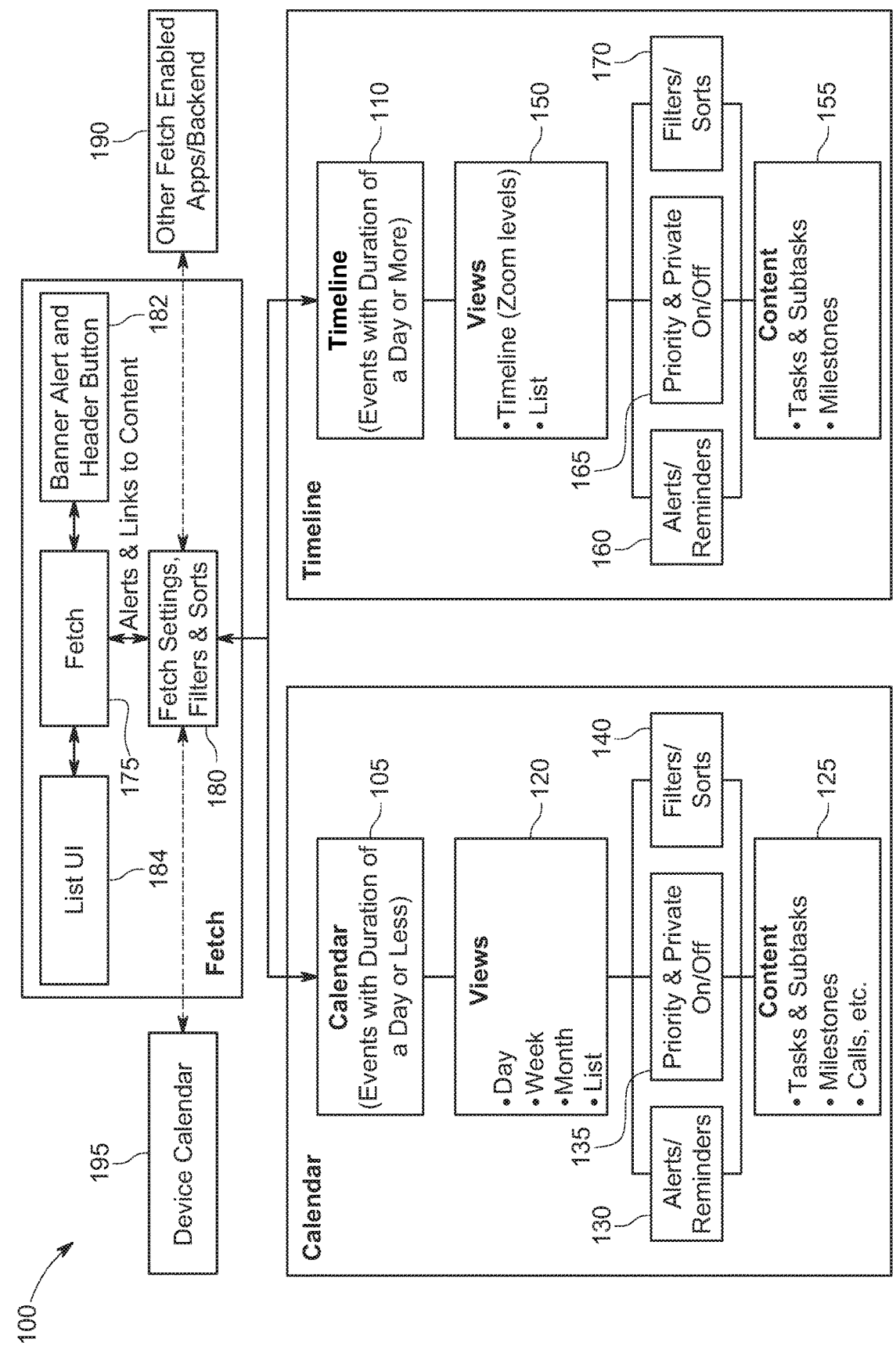
FIG. 1 is an illustrative depiction of a block diagram of a platform architecture in an example embodiment.

FIG. 1 is a block diagram of an architecture 100 for an example embodiment including various design concepts and aspects of the present disclosure. The platform or architecture of FIG. 1 is designed to provide a cross-platform and cross-application solution that can support and work with a plurality of different applications, services, devices, and systems. Architecture 100, in some regards, may provide an alternative to device calendars and personal information managers or organizer applications and functions. In some aspects, the architecture of FIG. 1 may interface and support one or more applications using one or more communication protocols and techniques.

Architecture 100 includes a calendar component 105 that provides calendar and calendar-related functionality and a timeline component 110 that provides event organizational functions. Herein, component 105 may be referred to as calendar 105 and timeline component 110 may be referred to as timeline 110. In general, calendar 105 creates, modifies, and manages events equal to or less than a day in duration, whereas timeline 110 creates, modifies, and otherwise manages events having a duration of greater than one day. These event durations represent a delineation between how some events are handled by architecture 100. In some instances, the durations may be modified by a user, developer or other entity. Of note, the basis for determining whether an event will primarily be managed by calendar 105 or timeline 110 should be consistently maintained so that the temporal integrity between events can be respected. In the examples herein, example calendar embodiments will manage events a day or less in duration and an example timeline will manage events equal to or greater than a day in length, unless otherwise noted.

Regarding calendar 100, events managed thereby can be represented by one or more user interface (UI) elements presented or visualized in a graphical user interface (GUI). A GUI may be referred to as simply a UI herein. Events managed (e.g., created, tracked, saved, modified, deleted, enhance, annotated, exported, imported, etc.) by calendar 105 may be represented in a number of different visualizations or views 120. Views 120 may be generated by a functionality integral to system 100 or by a system or device external to system 100 but operating in a coordinated effort with system 100 to generate and/or process UI's for the benefit of calendar 105. Calendar 105 may be configured to organize calendar events based on timespans of days, weeks, and months. As such, views 120 can provide calendar views organizing calendar events as group(s) of days, weeks, and months. In some instances, a calendar view can include one or more graphical UI elements, a list view including a text listing, and combinations thereof.

Calendar events managed by calendar 105 may receive temporal information relating to events a day or less in duration from a number of content sources 125. A content source 125 may be a calendar application or function of a particular device (i.e., a smartphone or other device of an individual user, an enterprise calendar system where a particular individual is a registered user, etc.), a calendar service by a third party (e.g., a cloud-based calendar), and other systems, devices, services, and entities that might have information relating to meetings, appointments, calls, visits, etc. for a user entity. Calendar content may be represented as any type of data, including structured, semi-structured, and unstructured data embodied as any type of data structure, unless noted otherwise herein. Calendar content from content sources 125 may be optionally prioritized and/or characterized as private by priority functional module 135. Additional or alternative filters and sorting mechanisms may be applied to the calendar content by filter/sort functional module 140. Alerts & reminders functional module 130 might manage alerts and reminders related to calendar 105 and send such information to calendar 105 and view 120 so that it can be presented, as appropriate and deemed relevant by calendar 105, in views 120.

Regarding timeline 110 and the events managed thereby being, in general, greater in length than one day, a views functional module 150 provides a mechanism to represent and present visualizations of timeline events in a manner that can be readily understood by a user as having an extended duration (e.g., 2 days, 2 months, and 2 years). In some example embodiments, a timeline view generated by views module 150 can include various representations of extended lengths of time (e.g., a graphical representation of a timeline having different divisions of time markings/indicators), a list view including a listing or tabular presentation of the timeline events, and combinations thereof. In some aspects, a timeline view can be represented in one or more levels of detail, wherein the different levels of detail for a timeline view can correspond to different "zoom" levels in an example visualization of a timeline view.

Timeline events managed by timeline 110 may receive temporal information relating to events equal to or greater than a day in duration from a number of timeline content sources 155. A timeline content source 155 may be a timeline or organizer application or function of a particular device (i.e., a smartphone or other device, an enterprise-wide organizer system where a particular individual is a registered user, etc.), an event organizer service by a third party (e.g., cloud-based), and other systems, devices, services for a user entity. Timeline content may be represented as any type of data, including structured, semi-structured, and unstructured data embodied as any type of data structure, unless noted otherwise herein. Timeline content from sources 155 may be optionally prioritized and/or characterized as private by priority functional module 165, filtered and/or sorted by filter/sort functional module 170, and have alerts & reminders related thereto managed by functional alerts/reminders module 160.

In some embodiments herein, functions provided by calendar 105 and timeline 110 are integrated or otherwise cooperatively operable to manage events being less than a day (or some other pre-determined duration) and events greater than a day in length (or some other pre-determined duration). In some aspects, as will be demonstrated in greater detail herein below, events of any duration for an individual subject entity (e.g., a user registered to receive services provided by system 100) can be managed and reported to the entity (and others if so configured) using a variety of UI elements and visualizations. In some example embodiments, a view presented to a user may seamlessly switch between a calendar view and a timeline view by an integrated calendar and timeline system herein in synchronization with the tasks being performed and views being presented in response to user interactions with the system.

In some aspects, as further illustrated in the example of FIG. 1, architecture 100 includes an alerts and notification management module 175. As used herein, alerts and notification management module 175 is also referred to as a "fetch" application, service, or system. In some aspects, fetch application 175 (used interchangeably with service and system) is distinct and separate from the integrated calendar and timeline functions of architecture 100. Fetch system 175 may communicate with the integrated calendar and timeline functions 105, 110, but is itself functionally distinct therefrom. Fetch system 175 includes a UI component in some embodiments and can operate to receive and reply to a wide variety of alerts, notifications, events, appointments, milestones, deadlines, reminders, messages, and other triggers related to integrated calendar and timeline functions 105, 110, one or more user device calendars 195, and other fetch enabled applications and backend systems 190.

In some embodiments, fetch system 175 may communicate with fetch enabled applications and backend systems 190 via compatible communication interfaces (e.g., application programming interfaces, etc.) and/or other protocols and techniques to facilitate an exchange of alert and notification information between different devices and systems. In this regard, fetch system 175 may communicate with integrated calendar and timeline functions 105, 110 using similar and/or alternative communication interface techniques.

In some example embodiments, fetch system 175 may receive alerts, notifications, and links (i.e., addresses) to alert and notification content via a fetch settings, filters, and sorting functional module or system 180. The fetch setting of module 180 may include, for example, one or more of the following filter settings where the filters may be used alone and in any logical combination. In some embodiments, the filter settings are specific to one or more particular fetch enabled applications or, alternatively, they may apply to all fetch enabled applications associated with a user. In some embodiments where fetch 175 is deployed as a standalone application not associated with an enabled application, fetch filter settings may be individually set according to a device or deployment platform. For example, a "fetch" functionality disclosed herein may be deployed on a computer or laptop, smartphone or wearable as a native app thereon, whereby alerts and notifications from other applications, and services (e.g., a cloud-based calendar service) can be presented on the device running the fetch functionality as a native app (e.g., alerts regarding KPI's on a financial document, such as "sales are down 50% this quarter"). Filter settings for fetch settings and filters module 180 can include, for example:

Show All (Default)
    Show High Priority
    Show Milestones
    Show Appointments
    Show Conference Calls
    Show Event Reminders
    Show Appointment Reminders
    Show Message Alerts
    Show System Alerts and Notifications
    Show Call Reminders
    Connected Application Notifications
    User Action Confirmations In some embodiments, sort options for fetch module 175 can include, as an example, the options to sort by a date, a priority, and a category, alone or in combinations thereof. In some aspects, an audio alert may be associated with the notifications to be provided by fetch module 175 as configured via fetch settings, filters, and sorting functional module or system 180.

In some embodiments, an alert and notification application herein may include a variety of alerts and notifications. Example notifications and alerts may include:

Calendar Appointments/Meetings Reminders
    Call Reminders (incoming/outgoing/conference)
    Timeline Task Reminders (Task Start/Stop date notifications)
    Alerts (System, Errors, Connection, Missed Deadline, etc.)
    Acknowledgements
    Messages (incoming, pending phone voice msg., etc.)
    Application Updates Available
    Content Downloads Available
    Notification that a backend request (e.g., a search) while offline is available after reconnection is established In some aspects, additional application and/or system specific notifications and reminders can be managed by an alert and notification management system herein. Specifics regarding such alerts may be dictated by the specific features of the applications and systems. However, the alert and notification management system disclosed herein is flexible and expandable to accommodate many different applications and systems.

In some aspects herein, an alert and notification management system manages links to content, as opposed to the content itself. Accordingly, deleting an alert/notification item does not delete or otherwise change the alert/notification being reported by the alert and notification management system. For example, deleting an alert regarding a meeting scheduled in a calendar application does not delete the meeting itself.

Figure 2B:
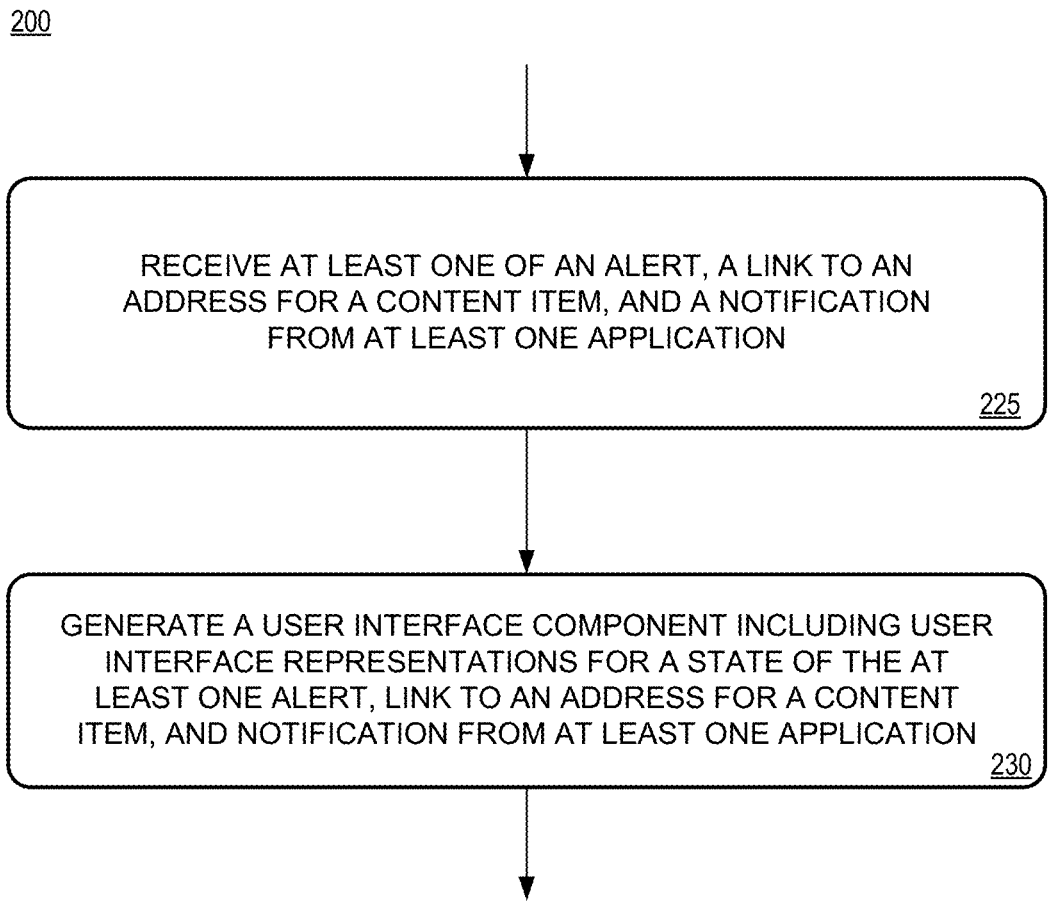

FIGS. 2A and 2B include an example of a simplified yet illustrative flow diagram relating to some aspects of an integrated calendar and timeline system, application, service, and functions (e.g., FIG. 1, 105 and 110) and an alerts and notifications management system, application, service, and function (e.g., FIG. 1, 175). FIG. 2A primarily relates to an integrated calendar and timeline system as disclosed herein and FIG. 2B primarily relates to an alerts and notifications management system. The operations are presented in a same yet divided drawing figure herein to further convey the functions provided by each system, application, service, and function is distinct, even in configurations sharing at least some information and/or resources there between.

FIG. 2A includes some aspects of a process flow, generally referenced by numeral 200. At operation 205, first temporal information relating to one or more calendar events is received. Such calendar related information can be received by an embodiment of an implementation of a calendar functionality (e.g., FIG. 1, 105). The calendar related information may be received from one or more devices, systems, services, and applications related to, registered with, or otherwise associated with a subject entity or user. In some embodiments, the calendar related information may be generated by the user in any one or more devices, systems, services, systems, and applications related to, registered with, or otherwise associated with a subject entity or user. In some embodiments, the received calendar information relates to events being equal to or less than a day in duration. In some embodiments, the one or more devices related to, registered with, or otherwise associated with a subject entity or user may be synchronized to a service, service, system, and application when those devices are online and/or reconnected online.

At operation 210, second temporal information is received. This second temporal information relates to one or more timeline events. The timeline related information can be received by an embodiment of a timeline or event organizer (e.g., FIG. 1, 110). The timeline related information may be received from one or more devices, systems, services, and applications related to, registered with, or otherwise associated with the subject entity or user. In some embodiments, the timeline related information may be generated by the user in any one or more devices, systems, services, systems, and applications relate to, registered with, or otherwise associated with a subject entity or user. In some example embodiments, the received timeline information relates to events being equal to or greater than a day in duration. In some embodiments, the timeline information relates to a day or point-in-time indicating an initiation or conclusion of timeline information, e.g. start event or milestone, deadline or deliverable event, etc.

Operation 215 of FIG. 2A includes generating a user interface including user interface representations for an integrated calendar and timeline visualization. The generated visualization may be used by a user to interactively navigate and control aspects of both the calendar events and the timeline events referenced in the information received in operations 205 and 210. The integrated calendar and timeline visualization includes UI elements relating to both the calendar information and the timeline information in the same UI. As used herein, a visualization may also be referred to as a view.

In some example embodiments, views relating to one or both of the calendar events and the timeline events may be invoked or initiated from most any visualization generated in accordance with operation 215 and logical constraints imposed by the realities of time-based relationships. For example, one reality of time-based relationships is that a meeting cannot have an end time that is before its start time. With this example reality, as with other logical constraints, attempts to violate this constraint may not be accepted (or even enabled) for entry by the system herein.

A process flow according to FIG. 2A proceeds to operation 220 where a record is automatically saved. The record includes, at least, an indication of a current view location and a most recent past view location, where the views (i.e., current and most recent past) are recorded relative to at least one of the calendar and the timeline. In some embodiments, the location of the views is recorded with reference to the context of the view. That is, a calendar view (i.e., visualization of an event in a calendar context) is saved with an indication of the location (i.e., where a user has navigated to) with respect to or within the calendar. Likewise, a timeline view (i.e., visualization of an event in a timeline context) is saved with an indication of the location (i.e., where a user has navigated to) with respect to the timeline events, functions, and actions. In some embodiments, a clock functionality can be used by a system herein to, at least in part, keep track of a user entity's current and most recent past location within the calendar and timeline disclosed herein. In some regards, a system herein may track and record where a user is currently located within a calendar (e.g., in a detailed view of a 3:00 PM meeting with Jon Smith) or timeline (e.g., at a task for a project spanning multiple months) so that the user's current location and the location they came from (i.e., most recent last location) can be visualized or otherwise presented to the user. In some respects, the visualization or presentation of the user's current location and the location they came from can provide the user with a sense of where they are in the context of the calendar and/or timeline. This feature may facilitate a user's context navigating "back" to their previous location within the calendar or timeline.

For example, a user may drill down to a meeting detail in the calendar context herein by selecting a specific day and further selecting a specific meeting on the selected day. In some embodiments, when the user then navigates back to a higher level, the most recent past location (i.e., the meeting detail) remains highlighted (e.g., by color, such as blue) to indicate where the user was last. This and similar tracking aspects may be included in the calendar context and the timeline aspects herein, in some example embodiments to provide, for example, context to a user by indicating from whence the user is navigating.

FIG. 2B, in some aspects relating to operations 205-220 yet independent therefrom, primarily relates to operations performed by an alerts and notification management function or system (e.g., a "fetch" service, application, or system in some aspects herein).

Operation 225 includes receiving at least one of an alert, a link to an address for a content item, and a notification from at least one application. The information received at operation 225 by the alert and notification management system or application can be used as a basis for visualizations related to the alerts and information. The alert, link, and notification information received at operation 225 may be received from one or more other applications, including but not limited to an integrated calendar and timeline application, service, or system herein.

Continuing with flow diagram 200, operation 230 includes generating a UI component including user interface representations for a state of the at least one alert, link to an address for a content item, and notification from at least one application. The UI interface generated at operation 230 may be, in some instances where an integrated calendar and timeline application, service, or system is interfaced with the alert and notification management system or application executing operations 225 and 230, presented (i.e., visualized) with the UI generated at operation 215. In this manner, some embodiments herein include a UI including integrated calendar and timeline visualizations and alert and notification management in a common or same UI.

Various aspects and features of an integrated calendar and timeline application, service, or system (FIG. 1, 105 and 110) and an alert and notification management application, service, or system (FIG. 1, 175) will be illustrated and disclosed with reference to user interfaces (UIs) and aspects thereof. A number of aspects and features of the present disclosure relate to UIs, the information conveyed therein (e.g., UI elements, text content, colors, etc.), and an order and method of navigation between different UIs, wherein the UIs are synchronized to reflect operations and processes executed by the underlying integrated calendar and timeline application and the alert and notification management application.

Figure 3:
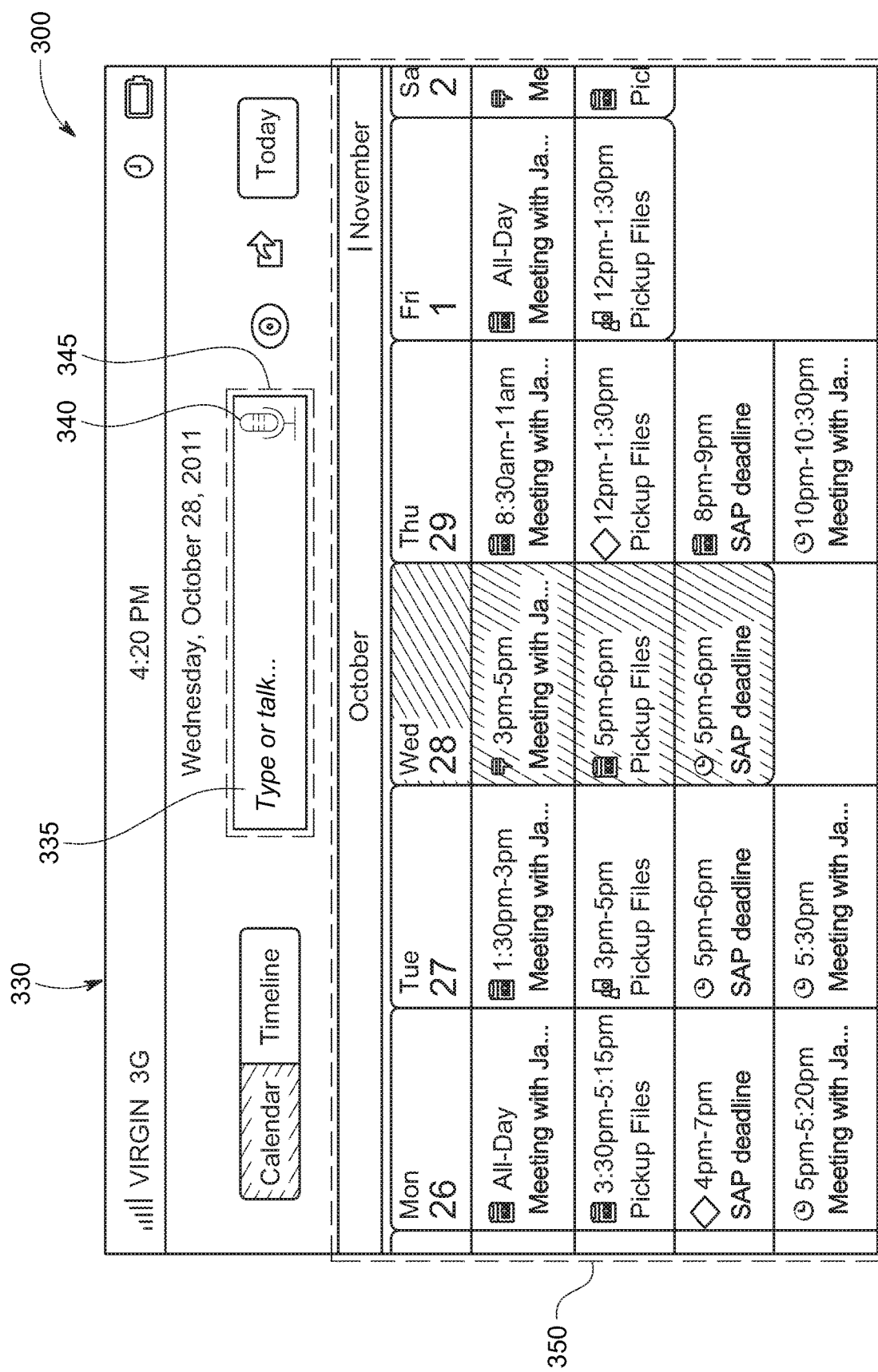
FIG. 3 is an outward view of a displayed calendar day view in a user interface, according to an example embodiment.

FIG. 3 is an illustrative view of at least a portion of a UI for an example embodiment. FIG. 3 is a calendar view, as indicated by the highlighted UI button 305. It is noted that options for both a calendar view and a timeline view are presented in UI 300, as represented by UI buttons 305 and 310, respectively. Furthermore, the current calendar day and location for the user relative to the integrated calendar application is indicated by a gold (or optionally, other colors) coloring of the 28th day in the day view shown in FIG. 3 at 315. The day being selected in FIG. 3 at 320 is visualized with a blue color (optionally, other colors). It is noted that the integrated calendar and timeline application in some embodiments deploys or is connected to a real time clock (e.g. from a network or device) to persistently indicate the current calendar day 315 in a (gold) color and the selected day, (if not the current day) is visualized by a blue color (optionally, other colors), as shown at 320. In some embodiments, the current day indication (e.g., gold colored day UI element) is automatically updated as time advances from a current day to the next current day.

UI 325 is a representation of the subject UI as it may be displayed in a device positioned in a portrait orientation, whereas UI 330 is a representation of the UI displayed by a device positioned or at least displaying items in a landscape mode. In some aspects, UI 300, as well as most other UIs disclosed herein, may dynamically adjust their sizing and/or configurations in response to at least one of an orientation, size, resolution, and other parameters of a display screen or display system, including for example resizing of a browser window. The dynamic adjustment(s) may be accomplished automatically as a function of the integrated calendar and timeline functions herein, as well as for the disclosed alert and notification management function.

In the example of FIG. 3, scrolling through the presented day view 350 can be done by a left/right motion for both UIs since such a motion can be intuitively understood according to some mobile and desktop scrolling methods and to correspond to moving back in time (i.e., viewing date/time content to the left) and moving forward in time (i.e., viewing date/time content to the right).

FIG. 3 includes an example embodiment of a UI element 345 for user entry of, in some use-cases, natural language. The natural language may be in the form of typed text or spoken inputs. Tapping/clicking on or otherwise selecting the text field 335 replaces the hint text "Type or talk . . . " with a cursor indicating to the user that typing text in the text field in a natural language method is possible. On touch screen mobile devices, this selection may also launch a device's virtual keyboard. Tapping/clicking on or otherwise selecting the "microphone" icon 340 may sound an audio tone indicating to the user that speech recognition is activated for inputting spoken words in a natural language method. In an embodiment, selecting the microphone icon may, either alone or in addition to sounding an audio tone, display a text field popup whereby the recognized speech input is shown in text. As illustrated, the natural language input element 345 may be presented in UI 300 whether the device is in a portrait configuration or a landscape/widescreen configuration. It is noted that the particular placement of UI element 345 is not limited to the specific configurations depicted in FIG. 3 (or other depictions herein). That is, in some example embodiments, the arrangement and layout of the natural language input element 335 may be different from the example(s) shown in the accompanying figures.

Figure 4A:
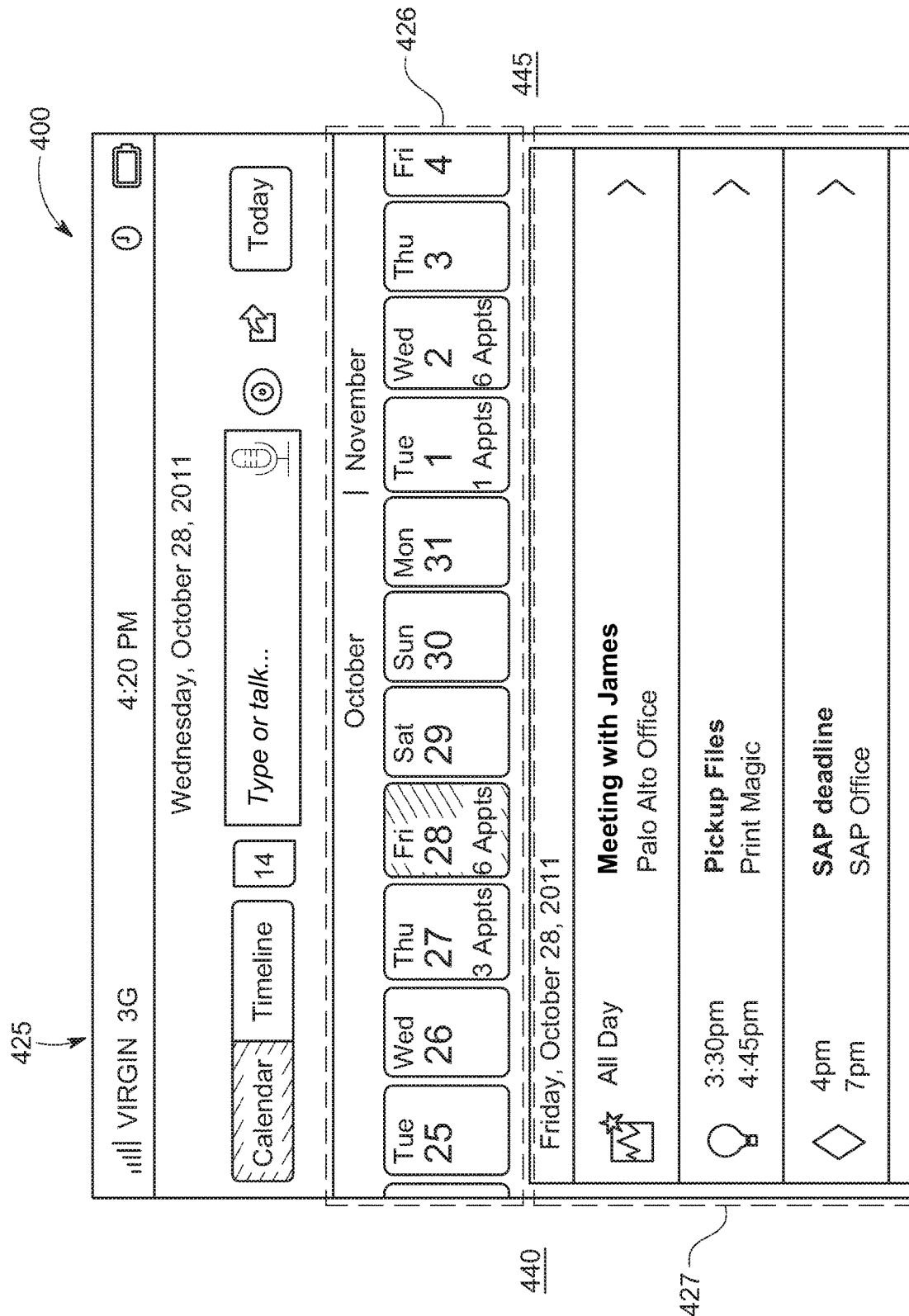
FIG. 4A is an outward view of a displayed user interface of a calendar view according to an example embodiment.
Figure 4B:
FIG. 4B is an outward view of a displayed user interface including a detailed meeting screen according to an example embodiment.

FIG. 4A is a day view in portrait mode of an integrated calendar function herein, as illustrated by the UI depiction 400 at 420, and a day view in landscape mode as depicted at 425. The currently selected day 415 (i.e., the "29th") is shown in blue to convey that it has been selected by the user and the current day, the 28th, is shown in gold to indicate it is the current day. The event (i.e., "meeting with Paul . . . ") 410 is shown in blue to convey that the user has previously selected it to navigate to and display a specific meeting detail screen. An example of a detailed meeting screen corresponding to the selected event 410 is shown in FIG. 4B, generally at 430. As seen, the detailed meeting screen 425 includes the specific particular information regarding the selected event 410. In this manner, a user can easily ascertain "where" they are located within the visualized representation of the integrated calendar and timeline application, and in reference to the current calendar day 405 (Oct. 28, 2011) is shown in gold (similar to referenced item 315 in FIG. 3). UI 420 is a representation of UI 400 as it may be displayed in a portrait orientation, whereas UI 425 is a representation of UI 400 displayed in a landscape mode or a widescreen display. Meeting details UI 435 may be presented to the user in response to the user selecting the meeting at 410. The meeting details screen shown at UI 435 in FIG. 4B may include specific information regarding the selected meeting 410, including the date, time, company, attendees, etc. associated with the meeting. UIs 420 and 425 illustrate how a user might navigate back to an earlier date from a current location/time by scrolling (dragging or swiping with a mouse or touch gesture) the days ribbon UI element 426 right towards 445 (thus exposing earlier days towards the left side of the days UI element ribbon) or forward to a future date by scrolling left towards 440 (thus exposing future days towards the right side of the days UI element ribbon element 426). A user may scroll through days in the days ribbon UI element 426 and select a new day in the scrolling days ribbon UI element. Following that selection, the corresponding meetings/appointments that are displayed within areas 427 in UI 420 and UI 425 in FIG. 4A will automatically scroll horizontally through all day meetings/appointments in an animation from and between the currently selected day to the newly selected day in the direction 440 or 445, according to whether the newly selected day is in the past or in the future. In an example, if a newly selected date in the days ribbon element 426 is in the future of the currently displayed day (i.e., toward the right), then the meetings/appointments area 427 will automatically scroll towards the left (440), thereby displaying meetings/appointments towards the right and finally stopping on the corresponding selected day in the future. Conversely, if, by example, a newly selected date in the days ribbon element is in the past of the currently displayed day (i.e., toward the left), then the meetings/appointments area 427 will automatically scroll towards the right (445), thereby displaying meetings/appointments towards the left and finally stopping on the corresponding newly selected day in the past. This provides the user or other entity with a context of "traveling" forward or backwards through time (time travel experience).

Figure 5A:
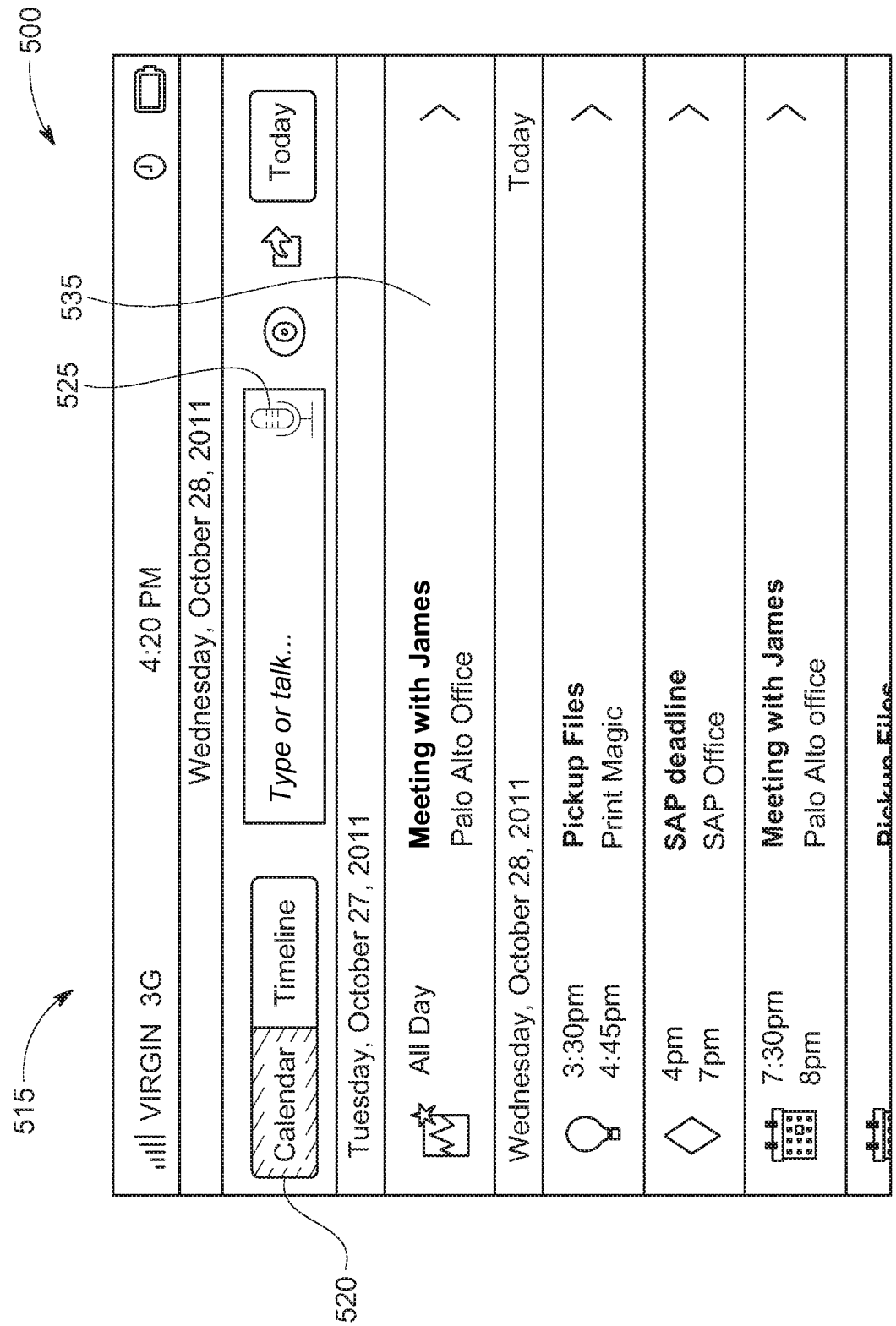
FIG. 5A is an outward view of a displayed user interface including a calendar list view according to some example embodiments.

FIG. 5A is an illustrative depiction of a UI 500 including a calendar list view 505 for a calendar of an integrated calendar and timeline application, in one example. The calendar list view 505 is displayable to include the same relevant information whether rendered on a display device configured for and/or positioned in portrait orientation 510 or landscape mode 515. Hereto, options to select, and thus invoke, either a calendar perspective view or a timeline perspective view is provided in UI 500 at 520. In some embodiments, an options menu (not shown in FIG. 5A) including "Add New" (calendar event), "Add New Recurring" (calendar event), etc. may be triggered from the calendar list screen by selecting an action button element 512. An example embodiment of a natural language input UI element 525 is also shown in the UI's of FIG. 5A at 525. In some aspects, there may be a variety of calendar and timeline events listed in calendar list view 505, including, for example, a "meeting" as indicated by a calendar icon next to the "Meeting with James" event, a timeline milestone event as indicated by a diamond shape next to the "SAP deadline" timeline event, etc.

Figure 5B:
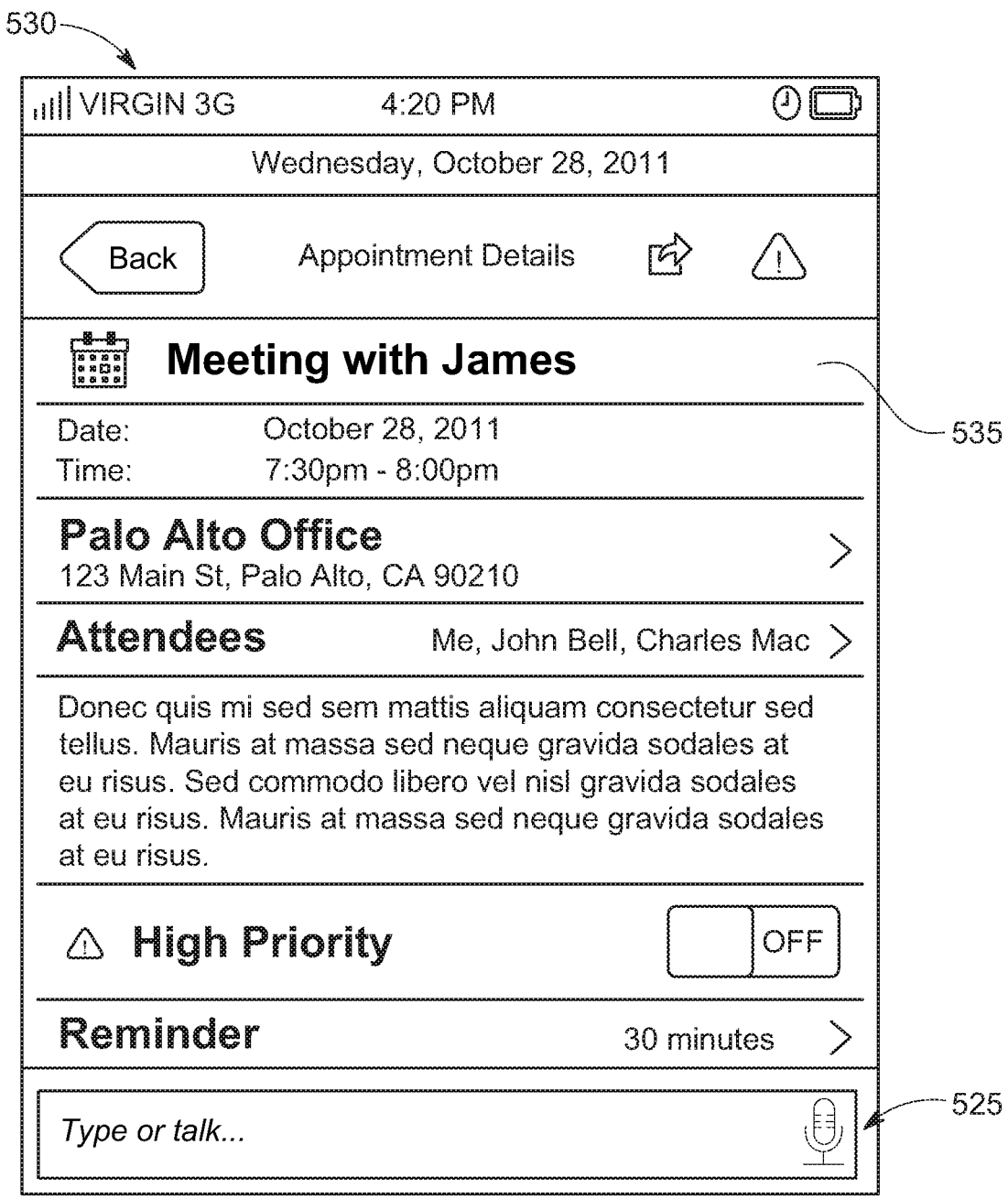
FIG. 5B is an outward view of a displayed user interface of a detailed view of a calendar meeting event in FIG. 5A, according to an example embodiment.

FIG. 5B is an example depiction of a detailed view for a calendar item in UI 500 of FIG. 5A. In particular, the details 530 for calendar item 535 ("Meeting with James") are shown in FIG. 5B in response to a selection of the "Meeting with James" calendar item 535 by a user in FIG. 5A. Both FIGS. 5A and 5B include an example embodiment of a UI element 525 for user entry of, in some use-cases, natural language. In some instances, a user might invoke a selection of another calendar item by first selecting microphone icon and then speaking, for example, the phrase, "show details for my next upcoming meeting with James". The integrated calendar and timeline application would then display the meeting details for a "next" meeting with James. In an embodiment, if a next meeting with James is not scheduled, the system may respond with a system message such as, for example, "You do not have a next meeting with James in the future".

Figure 6:
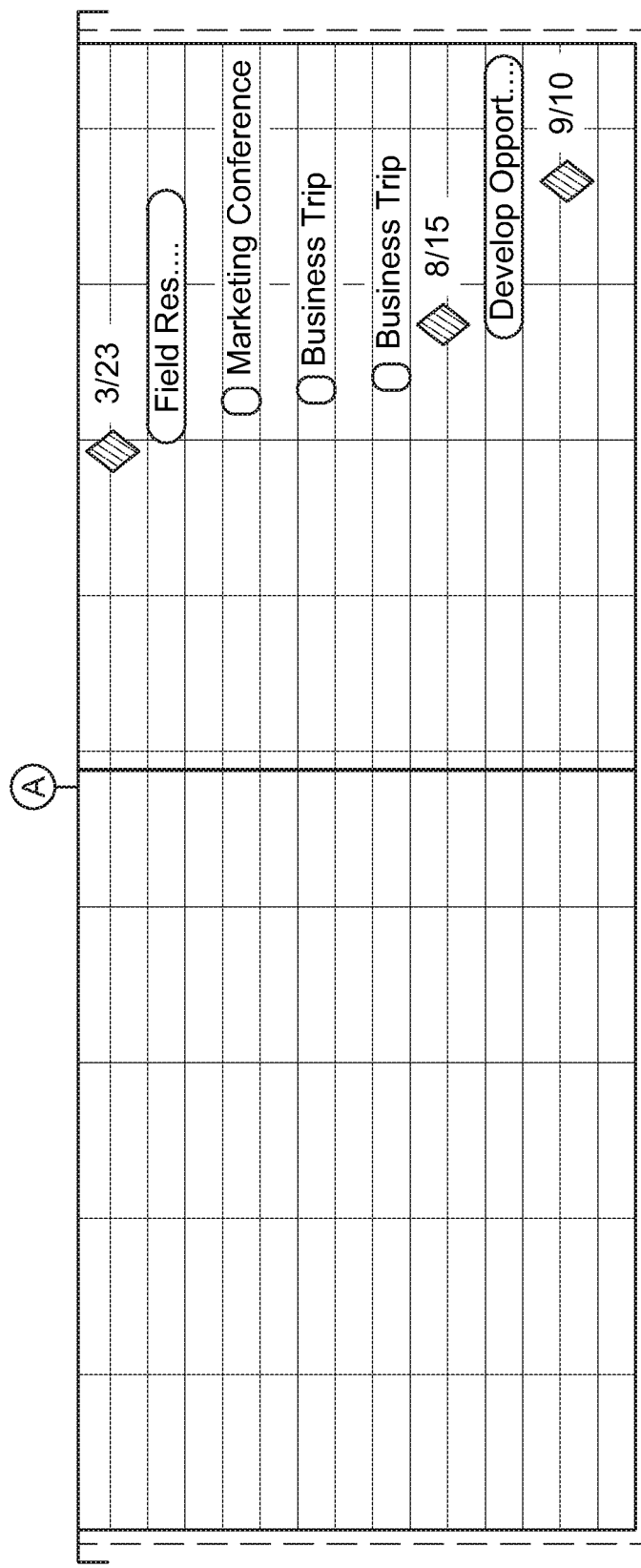
FIG. 6 is an outward view of a displayed user interface including a timeline view, according to some embodiments.

FIG. 6 includes a depiction of an example timeline UI 600. As shown, multiple timeline events 605 are arranged by the application in a cascading fashion from both a vertical and horizontal perspective. Each timeline event 605 is represented by a horizontal bar, the length of which represents the duration of the event (or task) in one or more days, months, or years. Each milestone event, for example milestone 610, has a duration of one day and is shown in a diamond-shaped graphical element to indicate a milestone event. An example embodiment of a natural language input UI element 630 in FIG. 6 (and 725 in FIG. 7A) further illustrates a mechanism by which a user can interact with the integrated calendar and timeline application herein, including using textual and/or speech inputs, in conjunction with conventional manual inputs.

The cascading arrangement from a top-most event 615 to a bottom-most event (which is hidden off screen) is configured according to the start date of each event bar, which is indicated by the left edge of each event bar element in its vertical stacked placement according to a horizontal time scale element 620 on any day in the past, present (current) day, or a date in the future. One day milestone events (e.g., milestone 610 on date October 31 and the milestone on the date March 23) are placed in the cascading event stack screen configuration according to the single date assigned to each milestone. It should be noted that the end date of a timeline event bar (as represented by the right edge of the bar) does not affect its placement within the cascading stack. Also, in some cases when a timeline event has a very long duration (e.g., top-most Marketing Education event 615) where the end date is represented by the length of the event bar, the end date may occur at some day later than timeline events below it in the cascading stack.

Similar in some respects to some aspects of the calendar UI embodiments herein, the current day (today) can be persistently indicated by a today vertical line 625 that extends down from the current day in the time scale 620 and may be a gold (or another) color. Times (e.g., days, months, years) to the left of the today line 625 are in the past, and times (e.g., days, months, years) to the right of the today line 625 are in the future. In all representations of the timeline UI 600 at all levels and views according to zoom and pan features described below, the timeline events 605 and time scale element 620 are persistently anchored together in the timeline UI 600, and in a vertical or horizontal pan view of UI 600, the time scale 620 is "pinned" above the timeline events display area containing events 605 and is in view in accordance with any x, y view manipulations or selections as further described below.

Generally, timeline UI 600 incorporates a visual design, element layout, scale and functional embodiments as described below that collectively provide a completely responsive, easy to use experience across all devices and corresponding display sizes and resolutions including desktop computers, laptops, tablets, and smartphones. In at least one embodiment, the timeline UI may operate in landscape mode on devices with small screens, such as a smartphone, so as not to constrain the timeline view and user operation via the UI.

Figure 7A:
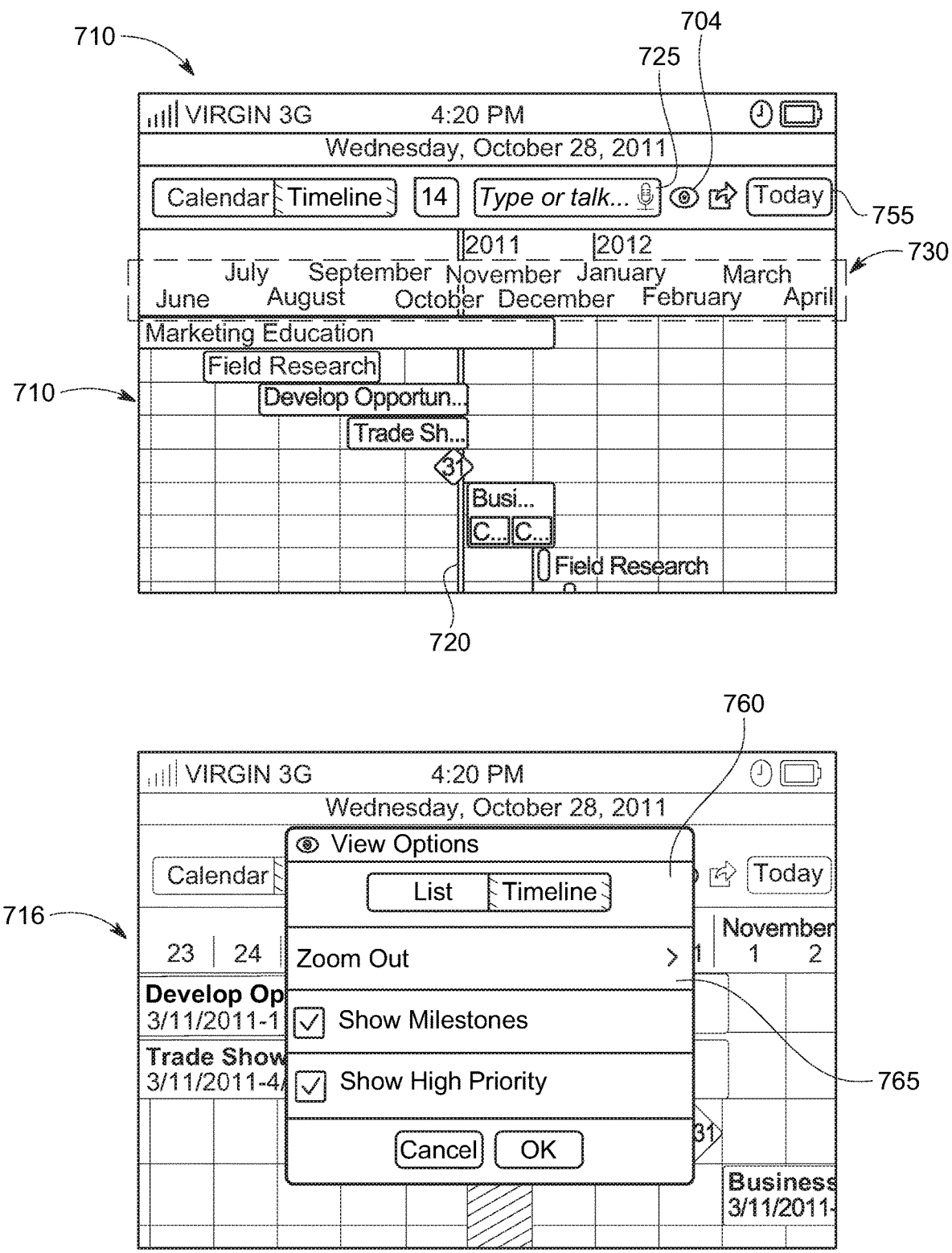
FIGS. 7A and 7B include outward views of a plurality of displayed user interfaces, including a timeline view at various levels of zoom according to some example embodiments.

FIG. 7A includes four representative example UIs to illustrate some aspects herein. UIs 705, 710, 715 and 716 all relate to a timeline of an integrated calendar and time application. UIs 705, 710, and 715 reflect different zoom levels but from a same center focus perspective of the same timeline UI that may be variably adjusted by a user in embodiments as described further below. UI 716 reflects a view options menu as one of many alternate method embodiments for user adjustment of zoom levels. UI 705 is a high level view of the timeline, where parts of at least three years are depicted in the time scale 730. UI 710 corresponds to UI 705 but zoomed in one level. Accordingly, a smaller section of the timeline is presented in UI 710, although more detailed information is shown for each timeline event and the timeline time scale 730 now shows month and year information. UI 715 is a visualization representing a fully zoomed-in view of the timeline UI of the time depicted in UIs 705 and 710. As such, an even smaller section of the timeline is presented in UI 715 as compared to UIs 705 and 710, although even more detailed information is shown for each timeline event in UI 715 and the timeline time scale 730 now shows month and day information in a larger scale for easy viewing in support of timeline editing functions that may not be available in UIs 705 and 710. UIs 705, 710, and 715 all show the current day (today) vertical line 720 (also shown in FIG. 6 at 625) as extending down from the current day in the time scale, but the width of the today indication line 720 in UI 715 is depicted as a wider line to accurately indicate a day duration according to the time scale 730 for the fully zoomed-in graphical state of UI 715.

In one example, navigation within a timeline context of the integrated calendar and timeline application herein (as indicated by the highlighted "Timeline" button 702) may be represented by sequentially presenting UIs 705, 710, and 715 to a user via continuous selections of the today button 755, as described below. As seen in UI's 705, 710, and 715 the current day line 720 in each UI indicates the current day (today) as being located in the center of each UI. As such, "today" may be the user's center point of interest (i.e., focus) as determined by, for example, the current day having been previously selected in the calendar UI context before the user navigated to timeline UI 710 via the UI button 310 in FIG. 3. In this manner, the user's point of interest of "today" is seen as being synchronized between the calendar and timeline contexts in an integrated calendar and timeline application herein. In a similar manner, if a user selects another day in the calendar context, for example they select October 29 in FIG. 3 at 320 as shown, then subsequently selects the timeline button 310, the timeline view would place a second "selected date" line in a blue (or another color) at that selected date (i.e., October 29) and position in the time scale element 730, in addition to locating the selected date line in the center of the screen to make October 29 the center of focus in the timeline view.

Referring again to the example where "today" is the user's center point focus of interest as presented in FIG. 7A in UIs 705, 710 and 715, selecting the today button 755 in UI 705 will zoom-in one level to UI 710. Similarly, 710 selecting the today button 755 in UI 710 will zoom-in to the fully zoomed-in view of UI 715. In this manner, a user may quickly and sequentially zoom-in on "today" in a simple two click fashion while also maintaining the center point focus of interest on "today".

Additionally, as a user may often focus on a current day ("today") depending on a particular use case (e.g. "What's happening today?") for both timeline and calendar events, it may be advantageous for the user to quickly, accurately, and efficiently toggle between calendar views and timeline views via UI button element 703 (in timeline view) and UI button 310 in FIG. 3 (in calendar view). In an embodiment, the user may also zoom in and zoom out of a timeline view via touch gestures on mobile touch screen enabled devices. For example, when in UI 705 a two finger pinch-out gesture may be used to zoom-in one level to UI 710. Similarly, when in UI 710, pinching-out again will zoom-in to the fully zoomed-in view of UI 715 while maintaining the center point of focus around "today". In some aspects when in UI 715, using a two finger pinch-in gesture will zoom-out one level to UI 710. Similarly, when in UI 710, pinching-in again will zoom-out to the fully zoomed-out view of UI 705, while maintaining the center point of focus around "today". It should be noted that as described herein, zoom levels may include more than three levels as depicted in FIG. 7A at UIs 705, 710, and 715. It may be possible to incorporate variable zoom levels that present many more levels of zoom than those in the specifically disclosed examples, wherein the specifically illustrated zoom levels do not limit the zoom functionality of the present disclosure.

In an embodiment, a user may select the view options button 704 in the UIs of FIG. 7A to open the view options menu 760, as shown in UI 716. As a method in both mouse pointer and touch devices, when in the fully zoomed-in UI 715, selecting option list item element 765 as shown in UI 716 will zoom-out one level to UI 710, and close the view options popup 760 while maintaining the center point of focus. Similarly, when in UI 710, the user may again select the view options button 704 to open the view options menu 760 as shown in UI 716 and select option list item element 765 to zoom-out one level to UI 705 and close the view options popup 760, while maintaining the center point of focus. Now, in the fully zoomed-out view of UI 705, the user may select the view options button 704 to open the view options menu 760 as shown in UI 716 and select option list item element 765, which will now state "Zoom In" (not shown; instead of "Zoom Out") to zoom in one level to UI 710, with similar actions available from UIs 710 and 715.

Figure 7B:
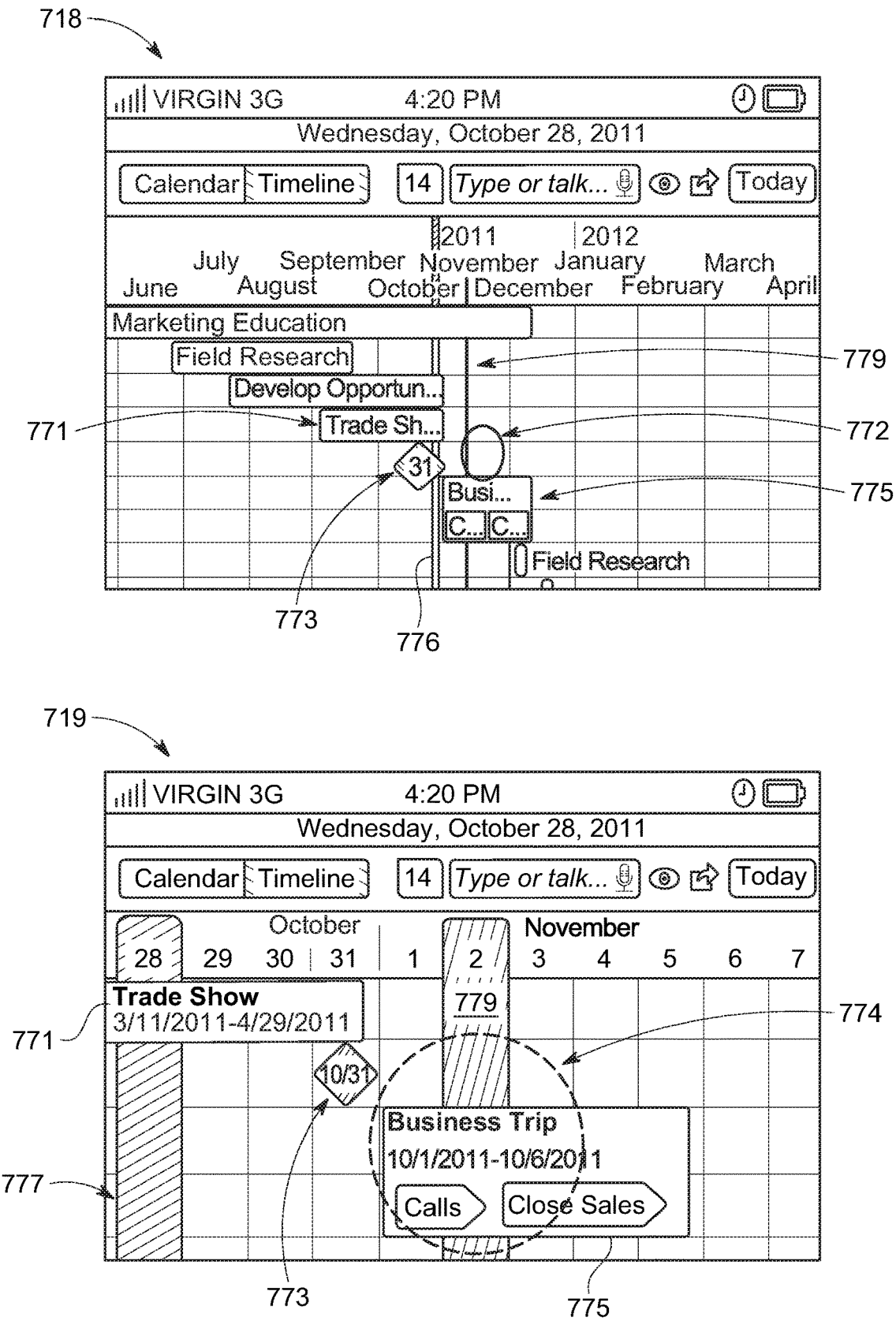

FIG. 7B includes three representative example UIs to illustrate some aspects herein. UIs 717, 718, and 719 all relate to a timeline of an integrated calendar and timeline application, each at a different level of zoom and each with a different center point focus, as determined by a user's actions. UI 717 is at a highest level of zoom of the timeline, whereby the center point focus is roughly at a currently selected day represented by the blue line 778 and vertically orientated to visually show a maximum number of timeline events within the screen's view. In some embodiments, this view may be the last viewed timeline view as seen by a user (sticky-view). In another embodiment, this view may have been established by a previous calendar date selection (represented by the blue line) before switching from a calendar context to a timeline context, (i.e., as disclosed by the synchronized behaviors between timeline and calendar contexts herein). In an embodiment, as shown in UI 717, a user clicks or on a touch enabled device, taps on the timeline screen at a point 770 to the right and slightly above the horizontal screen center to designate a new center point of focus and rough estimation of a date that is of interest to the user. After the user clicks or taps the screen at point 770, the timeline UI 717 renders a new day indication line element 779 in blue (or another color) in a wider line format and simultaneously pans and zooms-in one level in an animation to transition to UI 718 that shows a perspective according to the selection at 770. Now at this zoom level, the user recognizes that a point of interest is the milestone 773 and adjacent business trip event 775. In the present example, these events may be of interest because the user is currently at the trade show event 771 today and wants to view the next upcoming events after the current trade show ends in 3 days. The user may then click or tap on point 772, to the right of the displayed selected day line 779 and slightly below the horizontal center of UI 718 to designate a new center point of focus 774 and date 779 that is of interest to the user. After the user clicks or taps the screen at point 772 the timeline UI displays a new day indication line element 779 and simultaneously pans and zooms-in one level in an animation to transition to UI 719, where the fully zoomed-in view that now has an entirely new center point of focus 774 in the timeline UI 719 with the date line element 779 shown in a width to clearly indicate the newly selected day from UI 718 is November $2^{nd}$. Now, the milestone 773 and Business trip 775 are roughly in the center point focus 774 and are easily identifiable. In comparison to UI 717 and UI 718 the current day (today) line indication 777 is located well off towards the left side of the screen view as compared to UI 717 and UI 718, as determined by the user selecting the new center point focus and date 772 in UI 718.

A milestone herein (e.g., the milestone indicated at 773) is a one day event and is denoted in the present example as a diamond-shape UI element representation, as shown in FIG. 7B, UIs 718 and 719. In some aspects, a milestone may be added to a timeline herein in a variety of methods, including for example, via an options menu (not shown), a natural language input mechanism (e.g., 725, FIG. 7A), and other methods described below.

It should be noted that this "tap or click to zoom and change a center point of focus" feature may occur at zoom levels such as those shown in UIs 717 and 718, but not in the fully zoomed-in view UI 719 (as further zooming-in is not possible in that UI in the present example). Also, timeline edit modes and features for timeline events in the timeline UI may be available in the fully zoomed-in view UI 719 which will be described further below.

Figure 7C:
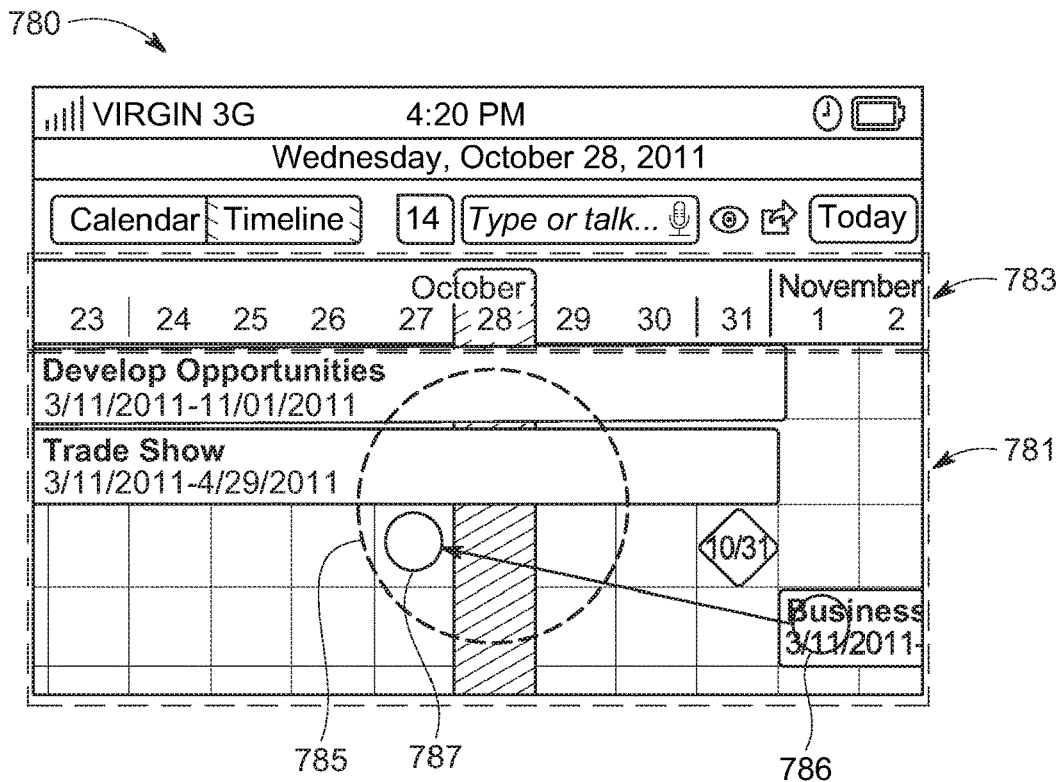
FIG. 7C includes outward views of two displayed user interfaces, including a timeline view at different levels of zoom and a center of focus point according to some example embodiments.
Figure 7C:
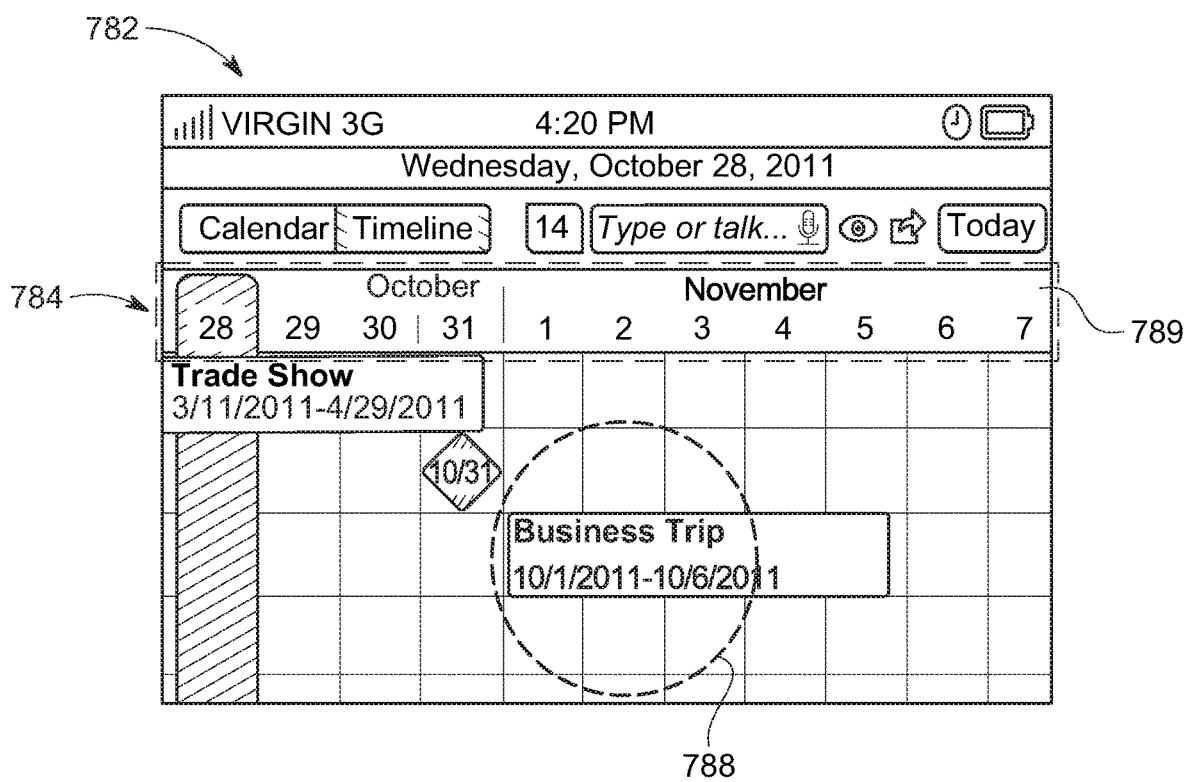

FIG. 7C includes two example representative UIs to illustrate some aspects herein. UIs 780 and 782 relate to a timeline of an integrated calendar and timeline application, each at a different panned view with a respective different center point focus, as may be determined by a user's interaction with a UI herein (e.g., dragging a screen view). In an embodiment, a user clicks and holds, or on a touch screen device presses and holds, on the screen at point 786 in UI 780 and drags the screen diagonally to point 787 and then releases the screen. During this drag action, the timeline events area 781 pans in real time according to the direction and distance of the user's drag action. Simultaneously, according to the horizontal distance of the drag action, the anchored time scale area 783 slides towards the left to a new scale position 784 as shown in UI 782, thereby accurately correlating the time scale to the timeline events below it as generally shown in UI 782. Now, in UI 782, a new center focus point 788 is established. It should be noted that the drag to pan action in this example of FIG. 7C does not establish a new day as does the tap action described in connection with FIG. 7B. However, at any time in the fully zoomed-in level 3 the user has the option to tap or click on a day in the scale bar. For example, a user may click on a day in the time scale bar as shown in UI 782 at point 789 to select a new day and cause the placement of the indication line element (as shown in FIG. 7B in UI 719 at 779). In some embodiments, a dragging action may be used in any zoom view and in any distance and direction, including up, down, left, right and any combinations thereof. In an embodiment, a drag action may be interchangeably substituted by a swiping action using a mouse (or other) pointer device on a desktop or laptop or a touch gesture on other (e.g., mobile) devices.

Figure 7D:
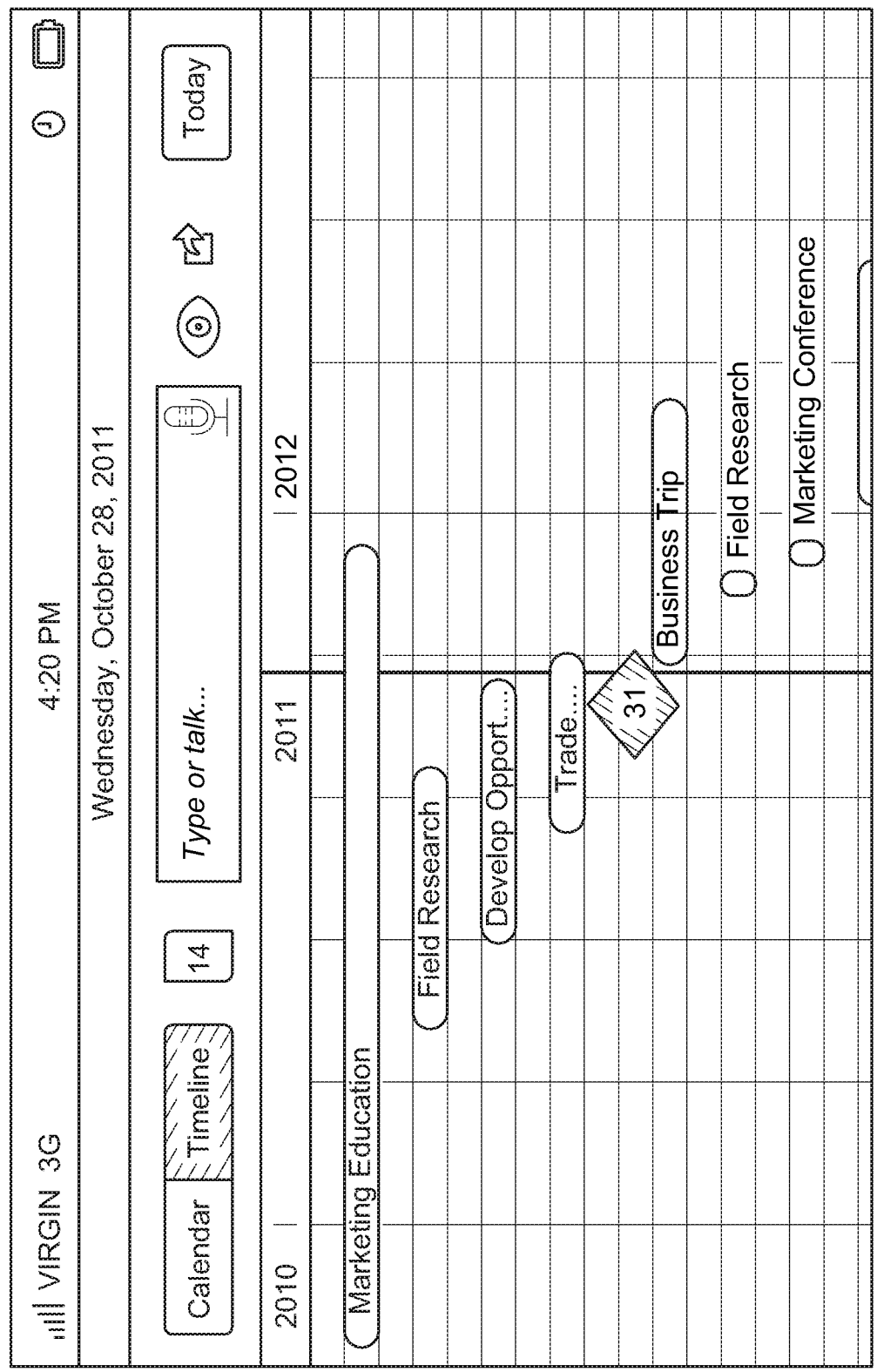
FIG. 7D includes outward views of a plurality of displayed user interfaces including a timeline view at various levels of zoom and a view pane, according to some example embodiments.

FIG. 7D includes four representative UIs, as an example, to illustrate some aspects herein. UIs 790, 792, 794 and 796 all relate to a timeline of an integrated calendar and time application for adjusting both a pan and a zoom view using a "view pane" tool. UI 790 is a representation of a fully zoomed-out timeline view. In this example, a user double clicks via a mouse or on a touch screen device presses and holds on location 791 in the timeline. Upon the double click or press and hold action, a view pane element 793 is displayed, as shown in UI 792. The size and shape of the view pane element may correlate to a screen that is zoomed-in by one level in UI 792. The user then drags the view pane to a new location from point 795 to point 797, then releases the mouse click or press and hold gesture. As shown in UI 794, the view pane 793 is now located at a position that surrounds timeline events of interest to the user. In this manner, the timeline events of interest are clearly indicated within the view pane element 793. The user may then click or tap on any (arbitrary) location within the view pane element 798, for example point 799, which in turn zooms-in one level to yield UI 796, while maintaining the area of focus as defined by the view pane. It should be noted that a view pane herein may be located at any point in the timeline, for example in the lower right corner of the timeline that will establish a new center point of focus for a subsequent zoomed-in view. In the present example, at UI 796, the user may display another view pane element that will be representative of the size and shape (smaller size) for the next fully zoomed-in view. In some embodiments, at any time when a view pane element is displayed, a user may dismiss it by clicking or tapping at a point outside the view pane element. This action will not change the view or center focus point, but instead only dismiss the view pane element from view.

Collectively, aspects of the embodiments as described in FIGS. 7A-7D may be interchangeably available at any time as desired by a user to adjust timeline views responsively and adaptively across all device types (i.e. desktops, laptops, tablets, smartphones, etc.) and device screen sizes, resolutions and orientations to provide an optimized user operation and an intuitive user experience.

Figure 8A:
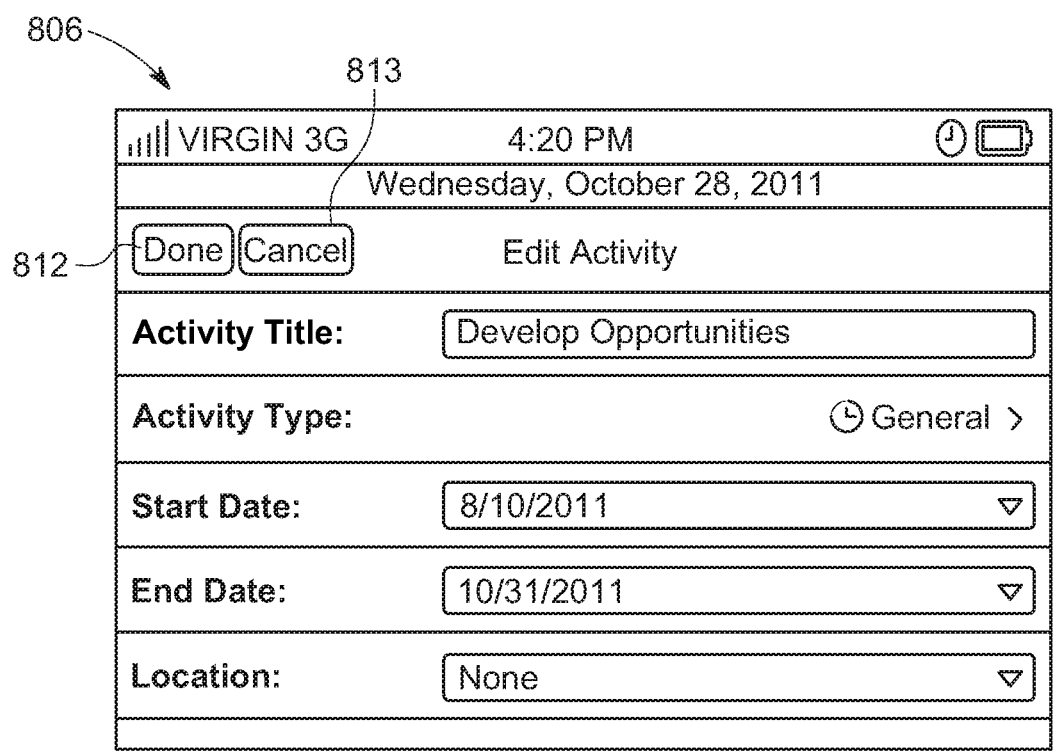
FIG. 8A includes outward views of a plurality of displayed user interfaces, including some aspects to view and edit details of an event in a timeline view according to an example embodiment.

FIG. 8A includes four representative UIs as examples to illustrate some aspects herein. UI's 800, 802, 804, and 806 relate to a timeline context for drilling down into a timeline event to view and edit details related to a specific timeline event. UI 800 depicts a fully zoomed-in view of a timeline. As such, this fully zoomed-in view enables drill-down and editing of a selected timeline event. In an example, a user clicks or taps on the "Develop Opportunities" event element 801 that then presents the details of the event, as shown in UI 802. As shown, the user may view depicted details of the selected timeline event including, for example, a start date, an end date, a location, etc. The user has the option to navigate back to the timeline view UI 800 via "Back" button element 803. In an embodiment, the user may select the action menu button 805 to view options, as shown in UI 804 and options popup menu 807. In responding to a selection of the "Edit" function element 809 and then the OK button element 811, the edit mode UI 806 is presented. The user may edit certain fields and timeline event attributes via UI 806, including, for example, "Activity Title", "Activity Type", "Start Date", "End Date", "Location", etc. in the UI's editable text fields and selection elements. After making edits to the timeline event, the user may select the "Done" button element 812 to save the edits and return to the timeline event detail screen in UI 802. Optionally, the user may select the cancel button element 813 in UI 806 to return to UI 802 without saving any edits performed therein. In UI 802, the user may select the back button element 803 to return to the timeline UI 800. In this manner, easy intuitive selection and editing of timeline event 801 may be performed. As an example, a milestone event (i.e., a key timeline event having a one day duration) may be specified in UI 806 via the "Activity Type" attribute field shown therein. As a milestone event, the start date and end date for the milestone event will be the same date (i.e., one day in duration).

Figure 8B:
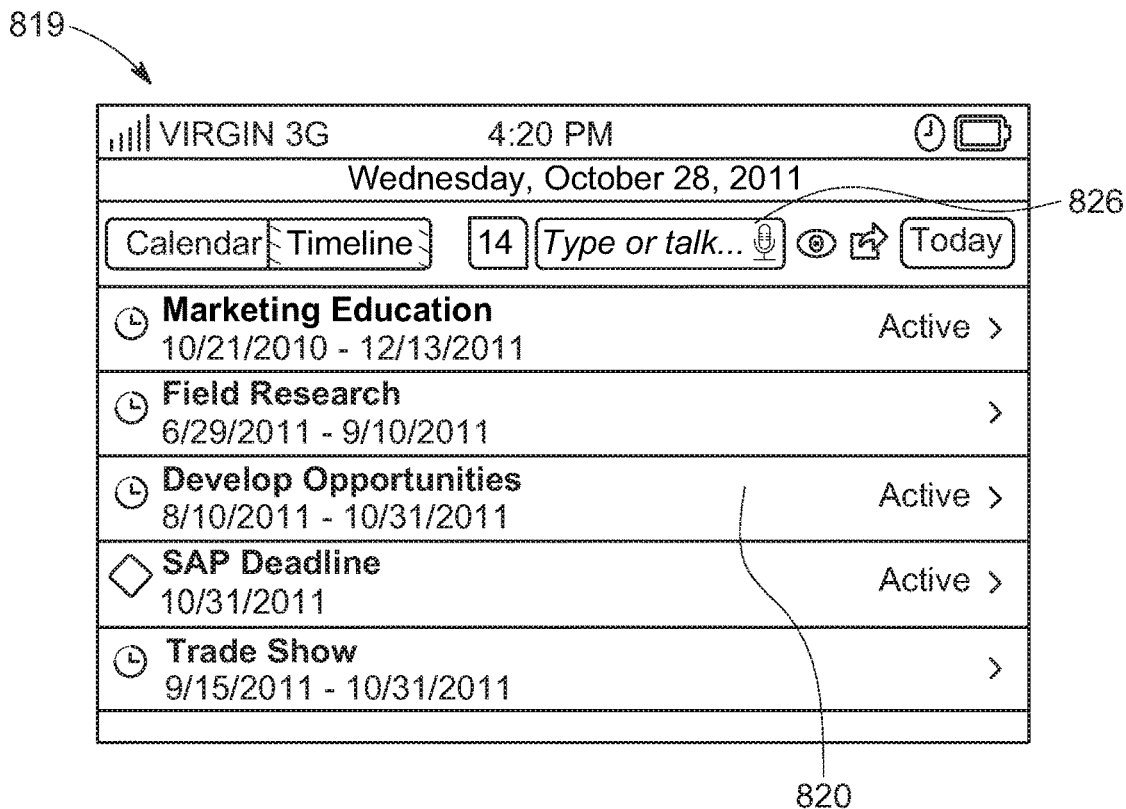
FIG. 8B includes outward views of a plurality of displayed user interfaces, including some aspects to specify options related to a timeline view according to an example embodiment.
Figure 8B:
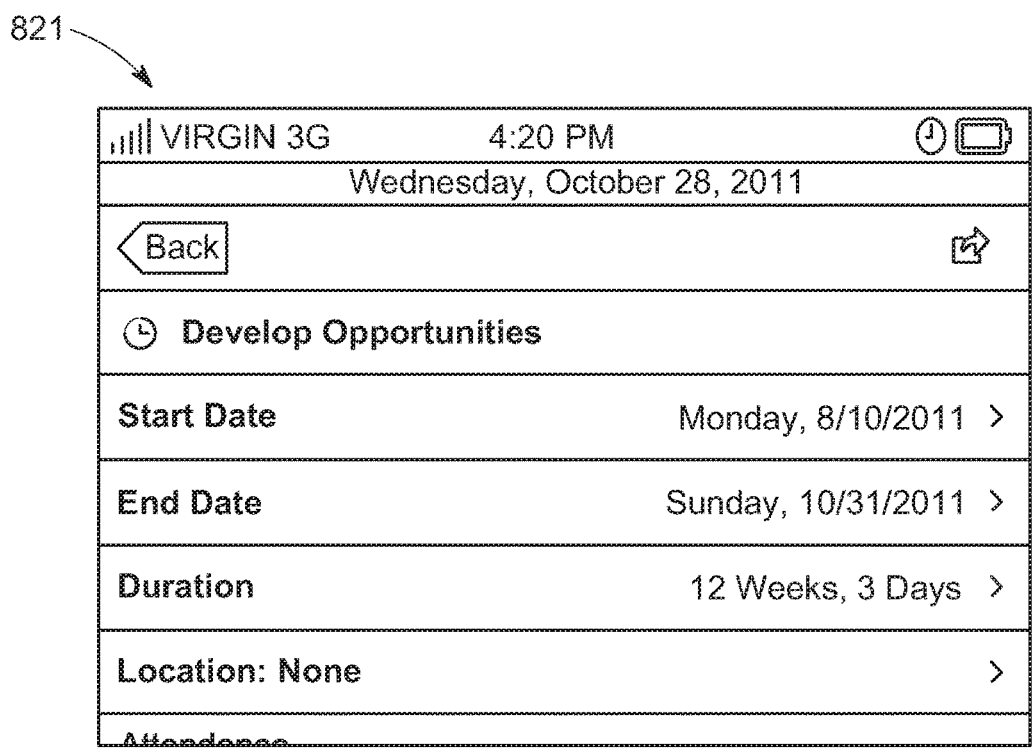

FIG. 8B includes four representative UIs as examples to illustrate some aspects herein. UI's 815, 817, 819, and 821 relate to a timeline context for selecting a timeline list view and related optional filter selections. UI 815 depicts a partially zoomed-in view by one level. In an embodiment, the user may select the view options button element 816 to open the view options menu 824 shown in UI 817, wherein the user can select list view button element 818 to change the timeline view to a timeline list view as shown in UI 819. In an embodiment, the view options popup menu 824 also presents the user with the option to select or deselect certain filter options (e.g., show or hide milestones or high priority timeline events in the list view as indicated at 822 and 823, respectively). In this manner, a user may customize the list of timeline events to their liking. Upon selecting the "OK" button element 825, the list view is presented in UI 819 to show timeline events in a listed format arrangement. As in the timeline view, the list view is arranged in descending order from the earliest event start date (at the top of the list) to the latest event start date (at the bottom of the list). It should be noted that the list view in UI 819 may be scrollable to view event list items that may be hidden due to device screen size constraints. The list view in UI 819 may also be searchable via an action menu (not shown) or using the natural language input element 826 for searching by a user to find specific event(s). Similar to the embodiments in FIG. 8A, a user may select an event, for example event 820, to view a specific event's details as shown in UI 821.

Figure 8C:
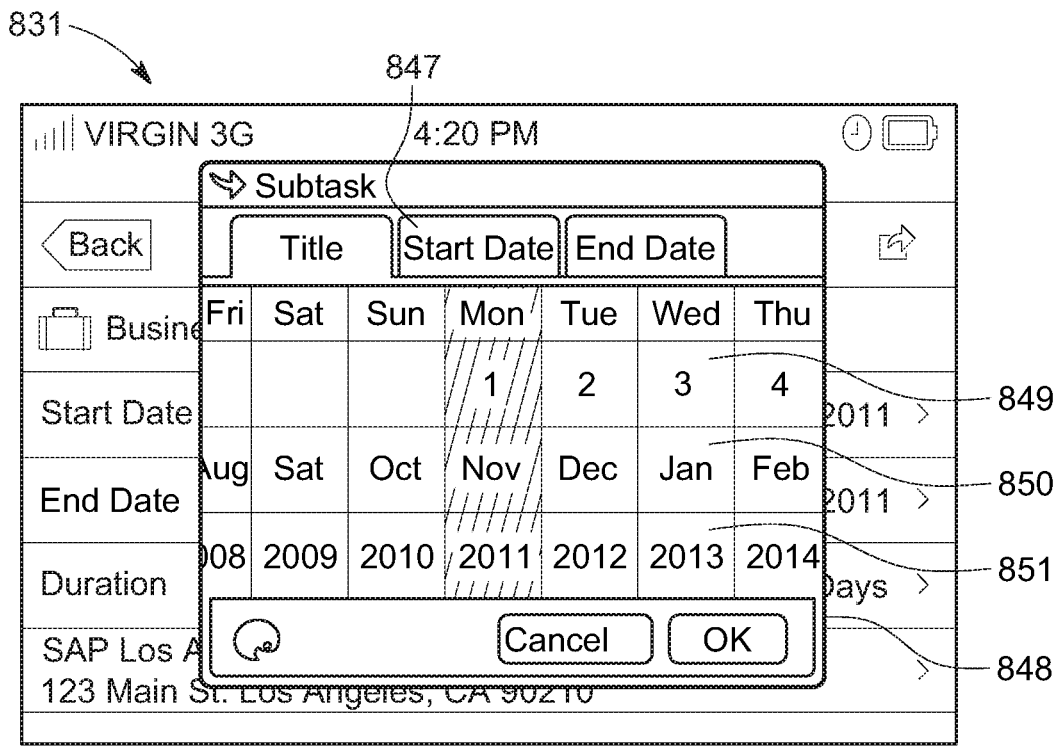
FIGS. 8C and 8D include outward views of a plurality of displayed user interfaces, including some aspects to add and edit details of a subtask for an event in a timeline view according to an example embodiment.
Figure 8C:
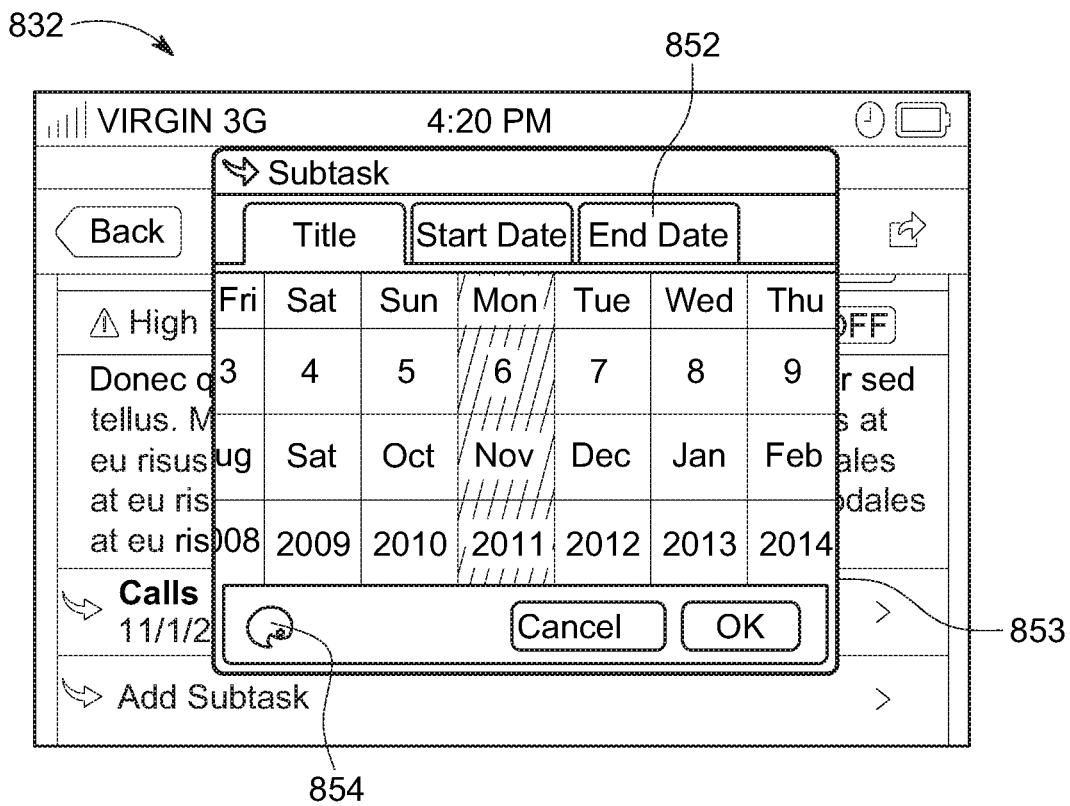
Figure 8D:
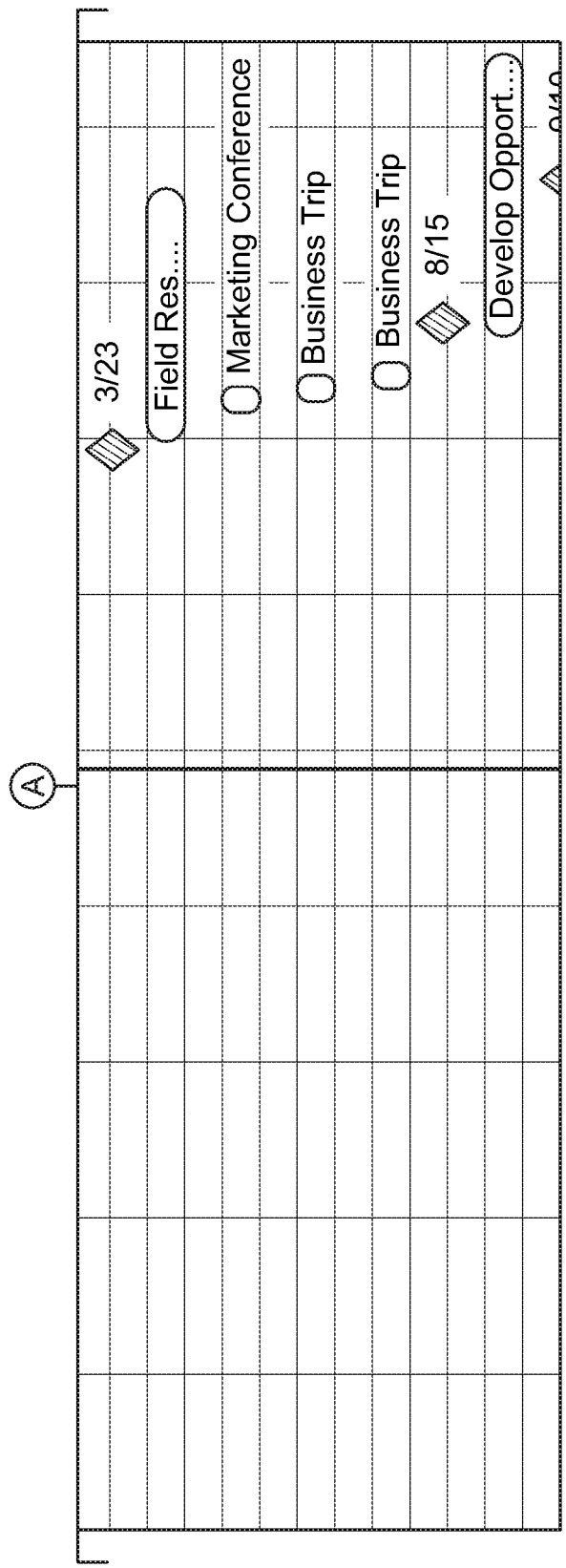

FIGS. 8C and 8D include eleven example representative UIs to illustrate some aspects herein. UI's 827-837 relate to aspects for adding subtasks to events of a timeline including zoom views herein. UI 827 depicts a fully zoomed-in timeline allowing drill-down and editing of a selected timeline event. As seen in FIG. 8A, a user clicks or taps on a timeline event 838 in UI 827 (i.e., "Business Trip"). This action presents the details of the event as shown in UI 828. In an embodiment, the user may select the action menu button 839 to view options as shown in UI 829 in options menu popup 840. In an embodiment, upon selecting the Add Subtask element 841 and then the OK button element 842, the add subtask popup UI 830 is presented with the title tab element 843 selected as a defaulted action. In the text field element 844, the user may enter a text title element 845 (i.e., "Calls") via a device keyboard. In an embodiment, adding a title may be required before allowing the user to make any other tab or OK button selections except for canceling the operation via UI button element 846.

Moving to UI 831, the user has selected the Start Date tab element 847 that causes the presentation of a date picker control 848. In an embodiment, date picker slider elements 849, 850, and 851 may be partially constrained (e.g., not selectable) to limit the duration of the subtask to a timespan within the duration of timeline event 838, which in this example represents the overall duration of the timeline event and governs the maximum duration and the related start dates and end dates of its subtasks. Moving on to UI 832, the user has selected the End Date tab element 852 that causes the presenting of a date picker control 853 whereby the user can select a date representing the end date for the subtask entitled "Calls" within the timeline event 838 (i.e., Business Trip) The user can then select an optional color palette button element 854 (indicated in a default color of, for example, purple (or another color) which then causes the presentation of a color picker popup 855 as shown in UI 833 of FIG. 8D. As indicated by the checkmark element 856, the default color is purple (or another color). In an example, the user selects the green color element 857, which would remove the purple checkmark element 856 and re-locate it within the green list element 857 while simultaneously changing the selected color display element 858 from purple to green to indicate the color change. Now, having completed entering all subtask parameters, the user may select the OK button element 859 in UI 833 to return to the timeline event detail UI 834. However, now the newly entered and saved subtask of "Calls", element 860, is presented in green colored text as specified by the user.

In an embodiment, referencing detail UI 834, the user has an option to select Add Subtask element 861 to add an additional subtask using the same method as described in UIs 830, 831, 832, and 833 and illustrated by element 862, "Close Sales".

In an embodiment, subtasks may incorporate overlapping dates and durations within the overall duration, start date, and end date of a timeline event. In this manner, a user may enter any number of subtasks, stacked and/or cascading. In another embodiment, subtasks might not be permitted to incorporate overlapping durations and/or start and end dates, thereby causing such subtasks to be sequential as illustrated in UI 835. It should be noted that selecting color variants for different subtasks provides a readily apparent visual means for identifying and differentiating between subtasks at all levels of zoom and adaptive reductions of visible content (e.g., titles of subtasks) of the timeline and timeline event 863, as shown in UI's 835, 836, and 837. Now, referring back to UI 834, a user may select the back button element 863 to return to the timeline view UI 835. In a fully zoomed-in view, timeline event 863 includes two subtasks occurring in a sequential manner as described above. In an example timeline, event 863 (Business Trip) now includes subtask 864 ("Calls") and subtask 865 ("Close Sales"), as indicated in colors green and purple, respectfully.

Figure 9A:
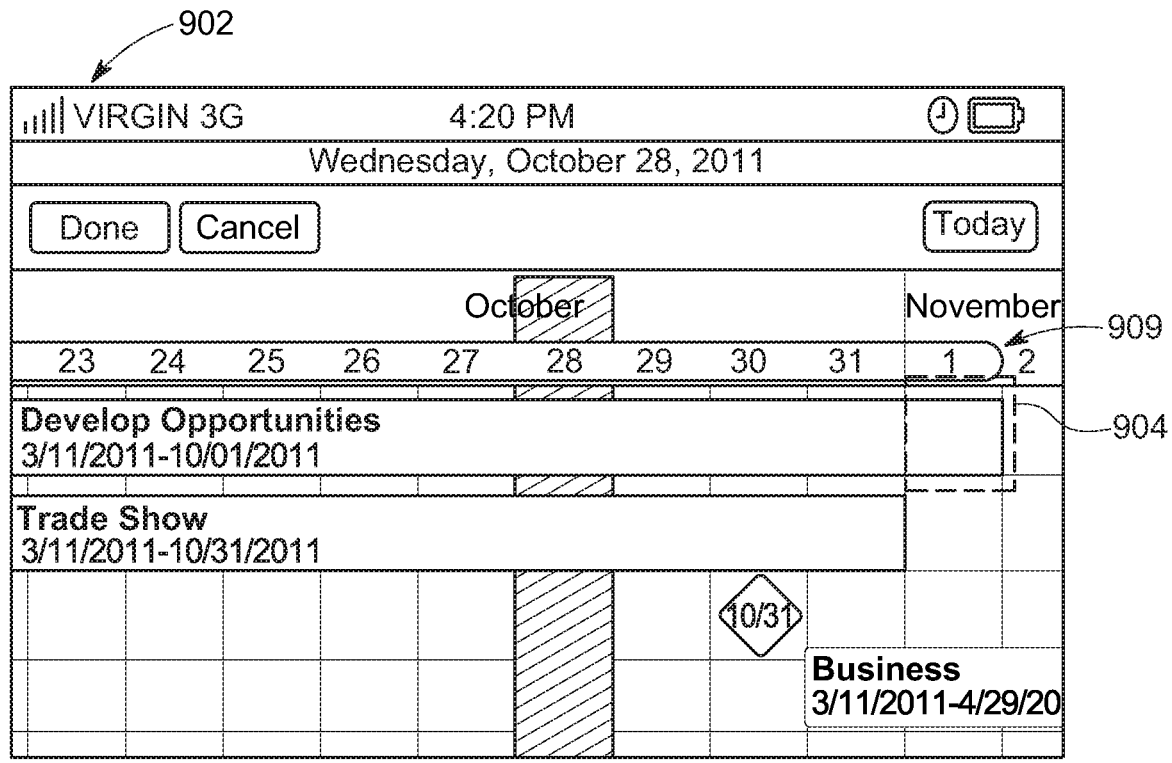
FIGS. 9A and 9B include outward views of a plurality of displayed user interfaces, including some aspects to perform quick edits to a selected event in a timeline view according to an example embodiment.
Figure 9A:
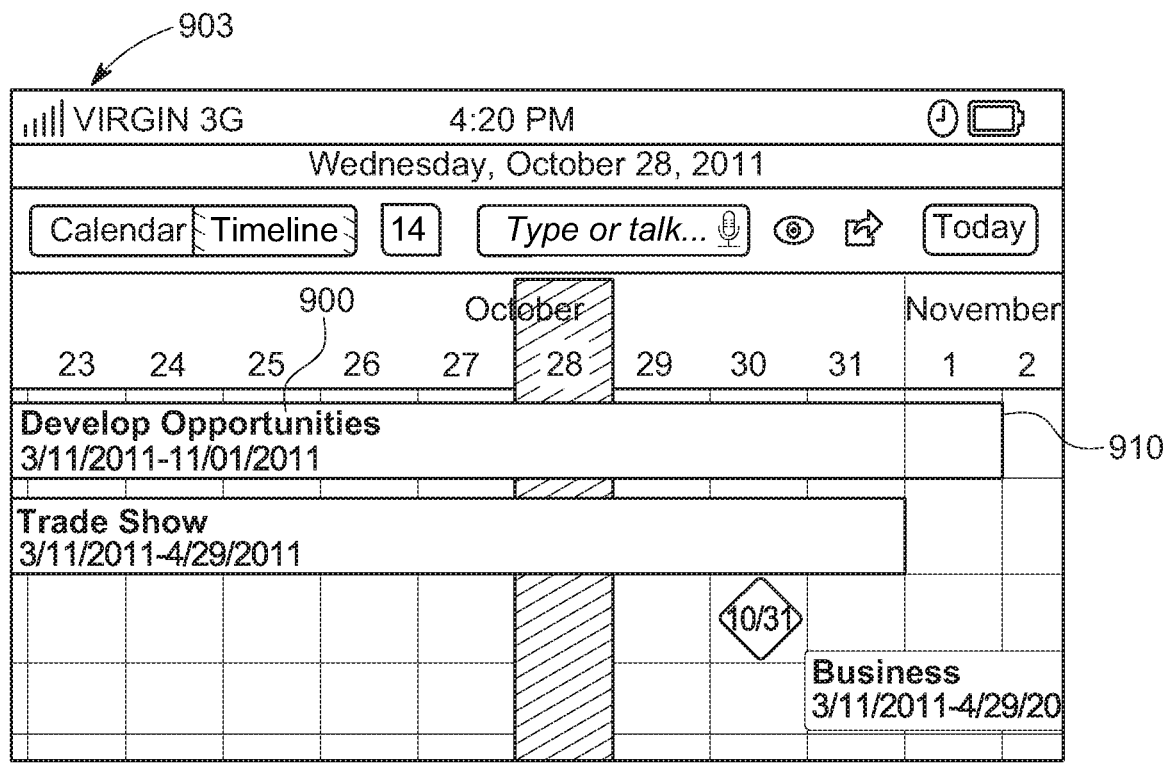

FIG. 9A includes four representative example UIs to illustrate some aspects herein. UI's 900-903 relate to a timeline for a user to perform quick edits to a selected timeline event without the need to drill down to event details, select an action button to present an options popup menu, and select edit as disclosed in FIG. 8A above. In some timeline applications, adjusting the end date or start date of a timeline event may be one of the most used edits in the course of managing a timeline project. As described below, a "quick edit" functionality may be used as an alternative to using an options popup menu method. Referencing UI 900 in an embodiment, a user clicks down or presses and holds (on touch devices) on the right end (e.g., 904) portion of the Develop Opportunities timeline event bar then immediately drags the right end portion of the timeline event bar 904 towards the right as shown in UI 901 and UI 902 at 904. In an embodiment, in response to the click and hold or press and hold action (just before the dragging action), the timeline view immediately changes to an edit mode as shown in UI 901 and UI 902 wherein the time scale 907 and timeline event bar element 906 are displayed in a blue color (or another color). In this example, the user desires to extend the timeline event 906 by one day as is illustrated by the distance of the drag action being equal to one day in the time scale element 909 in UI 902. Upon reaching the one day scale position as desired, the user releases the down click or press and hold action, thereby exiting the edit mode and returning to the normal state as shown in UI 903 where the Develop Opportunities timeline event end date 910 is extended one day from October $31^{st}$ to November 1st. In an embodiment and in a similar drag action, a user may adjust the end date to an earlier date by dragging the right (i.e., end date) portion of the timeline event bar towards the left. In an embodiment, the user may use a similar method on the left (i.e., start date) portion of a timeline event bar element to adjust and edit the start date. It should be noted that changing the start date of a timeline event may cause changing the vertical placement within the cascading stack of timeline events, as described in FIG. 6 above.

Figure 9B:
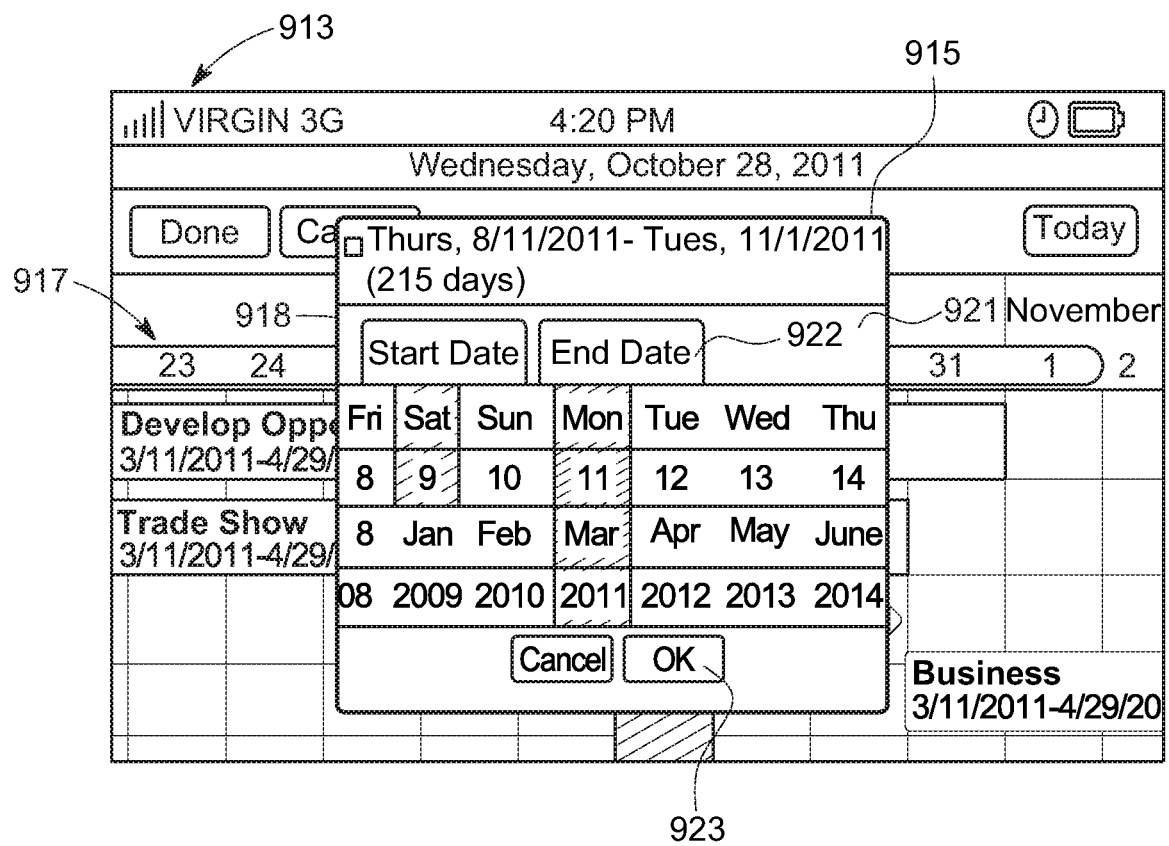

FIG. 9B includes three representative example UIs to illustrate some aspects herein. UI's 911-913 relate to a timeline for a user to perform quick edits to a selected timeline event without the need to drill down to event details, select an action button to present the options popup menu, and select edit as described in FIG. 8A above. In an embodiment, a user either double clicks or presses and holds (on touch enabled devices) on timeline event bar 914 in UI 911, entitled "Develop Opportunities". The integrated calendar and timeline system herein recognizes either of these actions (depending on the device being used) and presents a quick edit popup 915 as shown in UI 912, while at the same time enabling a timeline edit mode as illustrated by timeline event 914 and the time scale element 917 changing to a blue (or another) color. The quick edit popup 915 includes two user selectable tab elements 918 (start date) and 919 (end date) and a cancel quick edit button element 920. In an example, selecting the cancel quick edit button element 920 that will remove the quick edit popup, not save any submitted edit entries, and exit edit mode. In another example, selecting the start date tab 918 displays the date picker popup 921 shown in UI 913, thereby providing a mechanism for a user to adjust the start date as previously described in FIG. 8C at UI 831. Similarly, if desired, a user may select the end date tab 919 in UI 912 or the end date tab 922 in UI 913 to adjust the end date of the timeline event 914. When the user is satisfied with the edits to the timeline event 914, their selecting of the OK button element 923 saves the changes and closes the date picker popup 921.

Figure 9C:
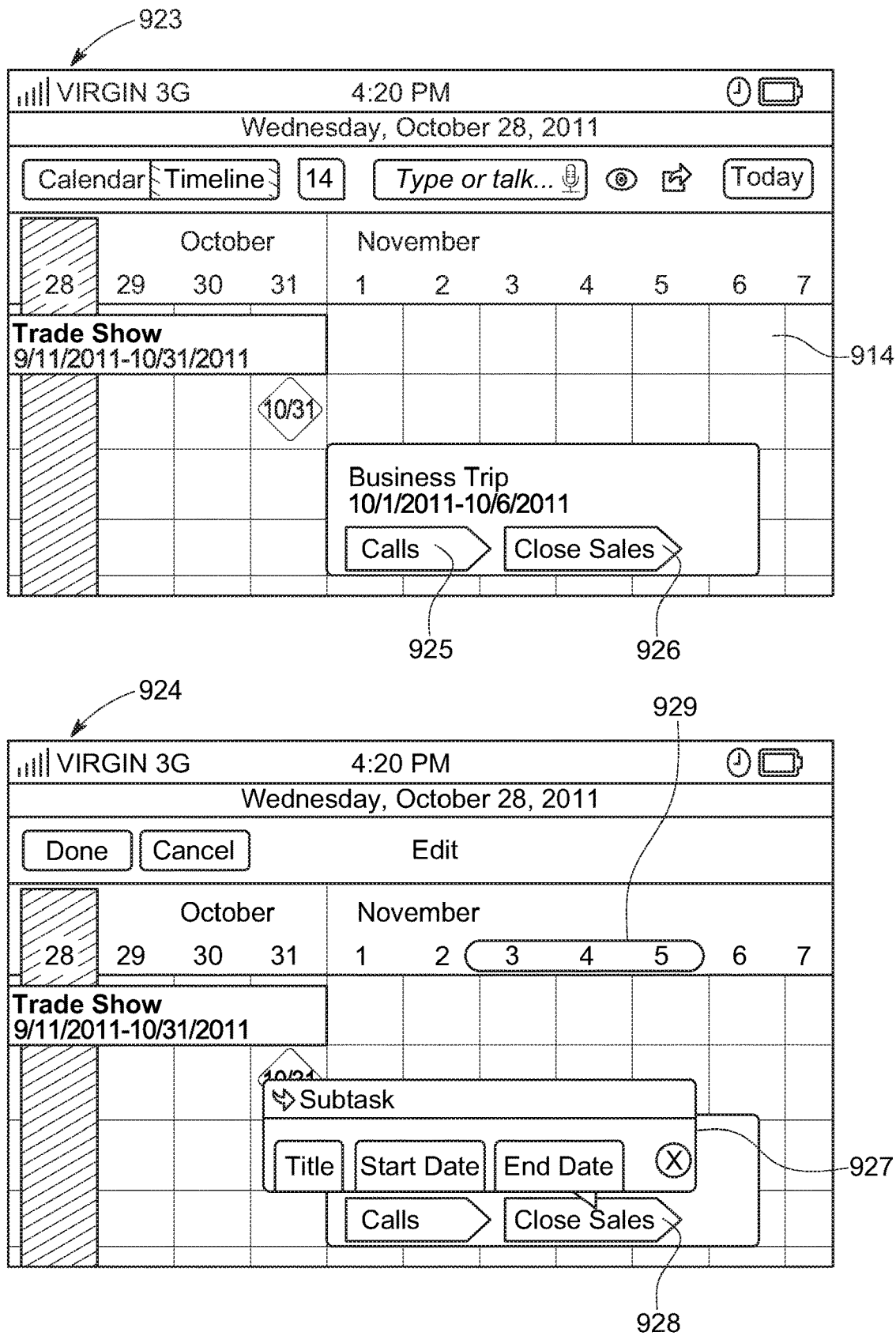
FIG. 9C includes outward views of a two displayed user interfaces, including some aspects to perform quick edits of a subtask event in a timeline view according to an example embodiment.

FIG. 9C includes two representative UI examples to illustrate some aspects herein. UI's 923 and 924 relate to a timeline for a user to perform quick edits to a selected timeline subtask event without the need to drill down to the overall event details in which subtasks are contained, select a subtask event from a timeline event details page, and edit the subtasks in a fashion similar to that described in FIG. 8A above. In an embodiment, similar to some actions described with regards to FIG. 9B above, a user either double clicks or presses and holds (touch enabled devices) on a timeline event subtask element 925 ("Calls") or subtask 926 ("Close Sales"), as shown in UI 923. The integrated calendar and timeline system herein can recognize either of these actions on a respective timeline subtask and presents a quick edit popup 927 as shown in UI 924, while at the same time enabling a timeline edit mode as illustrated by timeline subtask 928 and the time scale element 929 changing to a blue (or another) color. Subsequently, user actions, navigations, and selections may be made in a manner similar to those described in FIG. 9B above, thereby keeping the GUIs herein consistent and intuitive.

Collectively, quick edit embodiments as described in FIGS. 9A, 9B and 9C may be interchangeably available at any time as desired by a user to adjust timeline and timeline subtask start and end dates, responsively and adaptively across all device types (i.e. desktops, laptops, tablets, and smartphones), device screen sizes, resolutions and orientations to provide an optimized user operation and an intuitive user experience for a synchronized calendar and timeline application.

Figure 10A:
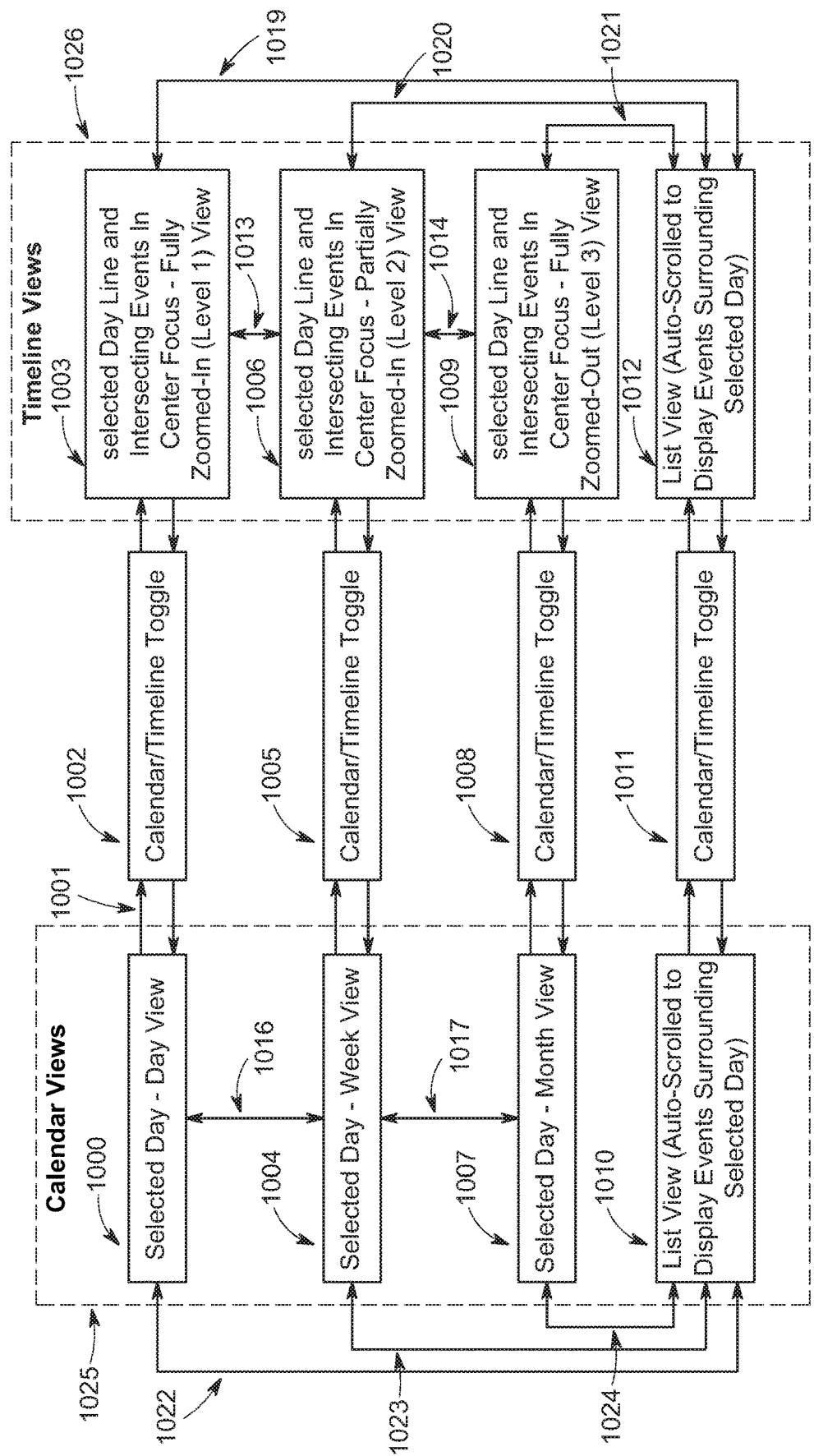
FIG. 10A is an illustrative flow diagram related to synchronizing calendar views and timeline views, according to some example embodiments.

FIG. 10A includes an example of a simplified, yet illustrative, flow diagram relating to some aspects of an integrated calendar and timeline system application, including aspects relating to synchronizing calendar and timeline views according to user actions, selections and navigations.

Referring to FIG. 10A, calendar view 1000 represents a day view wherein a current day (today) context is displayed (similar to the view shown in FIG. 4A, UI 425 where the current day is shown as Oct. 28, 2011). Referring to FIG. 10A, a selected day may be either the current calendar day (today) or another day selected by a user. All calendar views UIs 1025 persistently contain a day context no matter what view (e.g., day, week, month, or list) is selected. If a user has not selected a particular day, the day context defaults to the current calendar day (today) as indicated by a gold highlight (or another color) or in the timeline by a vertical day line in gold (or another color), as shown in FIG. 6 at 625. Both calendar and timeline current day (today) indications are always (persistently) displayed in all views. In a calendar view, if the user selects another day in the past or future, that selected day is shown in a blue highlight (or another color) in addition to the current day indication as shown in the week view FIG. 3 UI 325 at 320 (user selected day) and 315 (current day). In the timeline context, a user selected day is shown by a vertical day line in a blue (or another color) as shown in FIG. 7B at 778 and 779 and the current day (today) is shown as a gold (or another color) vertical line, as depicted in FIG. 7B in UI 718 and UI 719 at 776 and 777, respectfully. In some aspects, a user may select or change a day selection in either the calendar or timeline contexts in all calendar views (day, week, month), and in a timeline at any zoom level as described in connection with FIG. 7B and FIG. 7C at 779. As related to calendar and timeline synchronized views in diagram 10A, all references to a "selected day" may be to any of a current day (today), or another user selected day from either a calendar view context or timeline view context.

Still referring to the FIG. 10A, calendar view 1000 indicates a calendar day view of a selected day. A user may then navigate to a toggle button 1002 via logical connection 1001 and select the timeline view button which then displays the timeline view 1003 in the fully zoomed-in state (level 1). Timeline view 1003 displays the selected day from the calendar view 1000 as a vertical line indication with the view panned to show events that intersect with the selected day indication line in the center focus of the screen, as can be seen in the example disclosed in FIG. 7B at UI 719. In timeline view 1003, the user may not change the selected day determined in view 1000 or alternatively may select a new (different) day. In an embodiment wherein the user does not change the selected day, the user may navigate to the toggle button 1002, select calendar view, and return to the calendar day view and the selected day that as was originally indicated in view 1000. In this manner, the calendar and timeline views are contextually synchronized to show relevant screen information in both the calendar view and the timeline view with a minimum need, if at all, for the user to adjust either view to review relevant event information, wherein the calendar and timeline toggle button 1002 operates as a mechanism to switch between synchronized calendar view 1000 and timeline view 1003.

In an embodiment wherein the user selects a new day, for example in the timeline view 1003 and navigates back to the calendar day view 1000 via the toggle button 1002, the calendar day view 1000 will now indicate the newly selected day as changed in timeline view 1003. In this case, the calendar day view 1000 is synchronized with the timeline view 1003 selected day change, which will be shown in the calendar day view 1000 as the selected day (highlighted). In an embodiment, the reverse synchronization may be performed. For example, if a user changes the selected day in the calendar day view 1000 and navigates to the timeline view 1003 via toggle button 1002, then that new (or changed) selected day will be represented in the timeline view 1003.

In an embodiment, a user may change the calendar view to any of a day, week, or month view as indicated in day view 1000, week view 1004, and month view 1007 via logical connections 1016 and 1017, respectfully. In an embodiment, a user may change the timeline view to any of a zoom level 1, 2 or 3 as indicated in timeline view 1003, timeline view 1006, and timeline view 1009 via logical connections 1013 and 1014, respectfully, including by any of the multiple interchangeable methods as described in FIGS. 7A, and 7B.

In an embodiment as shown in diagram 10A, toggling between calendar views 1025 and timeline views 1026 are also hierarchically synchronized. As an example, toggling between calendar view 1000 and timeline view 1003 consistently maintains a hierarchical relationship between the calendar day view 1000 and the timeline zoom level 1 view 1003. In an embodiment, toggling between calendar view 1004 and timeline view 1006 maintains a hierarchical relationship between the calendar week view 1004 and the timeline zoom level 2 view 1006. In an embodiment, toggling between calendar view 1007 and timeline view 1009 maintains a hierarchical relationship between the calendar month view 1007 and timeline zoom level 3 view 1009.

In the synchronized toggle and hierarchical embodiments described above, a selected day as defined above can be persistently indicated in all calendar views (by highlight), in all timeline views (indicated by day line and pan to center focus), and in a list view by live auto-scrolling (in an animated fashion) to show a selected day to facilitate maintaining a user's temporal focus and a contextual relevance between calendar views 1025 and timeline views 1026.

In an embodiment, a user may select a calendar list view 1010 from any one of a calendar day, week or month views 1000, 1004, and 1007 via logical connections 1022, 1023, and 1024, respectfully. In an embodiment, the user may navigate from the list view 1010 back to any of the calendar day, week, or month views 1000, 1004, and 1007 via logical connections 1022, 1023, and 1024, respectfully. Similarly, in some embodiments the user may select a timeline list view 1012 from any of a timeline zoom level 1, 2, and 3 views 1003, 1006, and 1009 via logical connections 1019, 1020, and 1021, respectfully. In an embodiment, the user may navigate from the list view 1012 back to any of timeline zoom level 1, 2 or 3 views 1003, 1006, and 1009 via logical connections 1019, 1020, and 1021, respectfully.

In an embodiment, an example method for toggling between calendar or timeline views to a corresponding list view as depicted in FIG. 10A may be accomplished as shown in FIG. 8B at UI 815, UI 817, and UI 819. In an embodiment, a user may also interchangeably use the natural language input mechanism(s) to change/toggle between calendar or timeline views and corresponding list views.

Figure 10B:
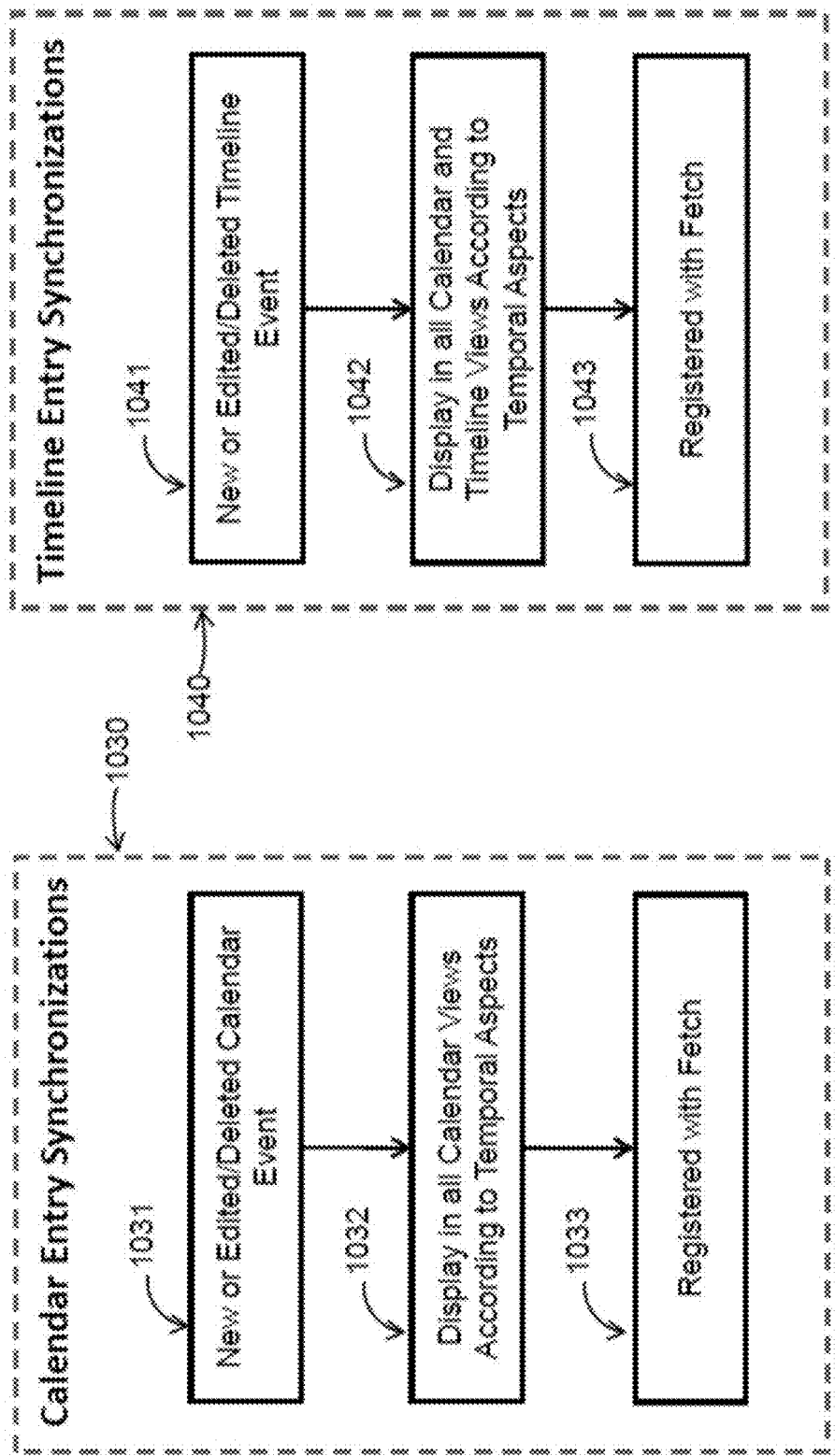
FIG. 10B is an illustrative flow diagram including a flow for calendar entry synchronizations and a flow for timeline entry synchronizations, according to an example embodiment.

FIG. 10B includes an example of a simplified yet illustrative flow diagram relating to some aspects of an integrated calendar and timeline system application, including aspects relating to synchronizing calendar and timeline event entries, edits, and deletions according to user actions, system imposed actions, and temporal aspects.

In FIG. 10B, flow diagram 1030 represents a calendar entry synchronization flow and flow diagram 1040 represents a timeline entry synchronization flow. In flow diagram 1030, operation 1031 represents a user inputting new calendar event entries (e.g., appointments, meetings, calls, etc.) of one day or less in duration, according to a date, time, topic (title) and duration, etc. In an embodiment, a user may make edits (or deletions) to existing calendar events in an integrated calendar and timeline application or an event imported from another application registered with the integrated calendar and timeline application. In an embodiment, upon completion or user acceptance, these events may be saved to the system and subsequently made available to be viewed in all calendar views in operation 1032, according to temporal aspects (time, duration, date, etc.). Subsequent to saving the calendar events, edits or deletions to calendar events within the integrated calendar and timeline system application, these saved events or changes to events are registered with a fetch functionality in operation 1033 to provide multiple alerts, notifications, reminders, calls to action, other fetch enabled push messages, etc. to relevant users of the fetch system, according to a context of the event, edit or deletion to the user, and in many other contexts as described herein. In this manner, the user inputted event (and/or other external event inputs) can be synchronized with many aspects of the system, including multiple external users of the system to coordinate temporal calendar and timeline events, communications, calls to action, and collaborations herein.

In flow diagram 1040, operation 1041 represents a user inputting new timeline event entries (e.g., tasks, milestones, projects, etc.) of one day or greater in duration according to a start date, an end date, a topic (title), a sub-task, etc. In an embodiment, the user may make edits (or deletions) to existing timeline events in an integrated calendar and timeline application or a timeline event imported from another application registered with the integrated calendar and timeline application. In an embodiment, in response to completion or user acceptance, these timeline events may be saved to the system and then subsequently made available to be viewed in all calendar and timeline views in operation 1042, according to temporal aspects (time, duration, date, etc.). Subsequent to saving the timeline events, edits or deletions to events within the integrated calendar and timeline system application, these saved events or changes to events are registered with the fetch functionality in operation 1043 to provide multiple alerts, notifications, reminders, calls to action, other fetch enabled push messages, etc. to relevant users of the fetch system, according to a context of the event, edit or deletion including the user, and in many other contexts as described herein. In this manner, a user inputted event (and/or other external event inputs) can be synchronized with many aspects of the present system, application, and service, including multiple external users of the system to coordinate temporal calendar and timeline events, communications, calls to action, and collaborations herein.

Figure 11:
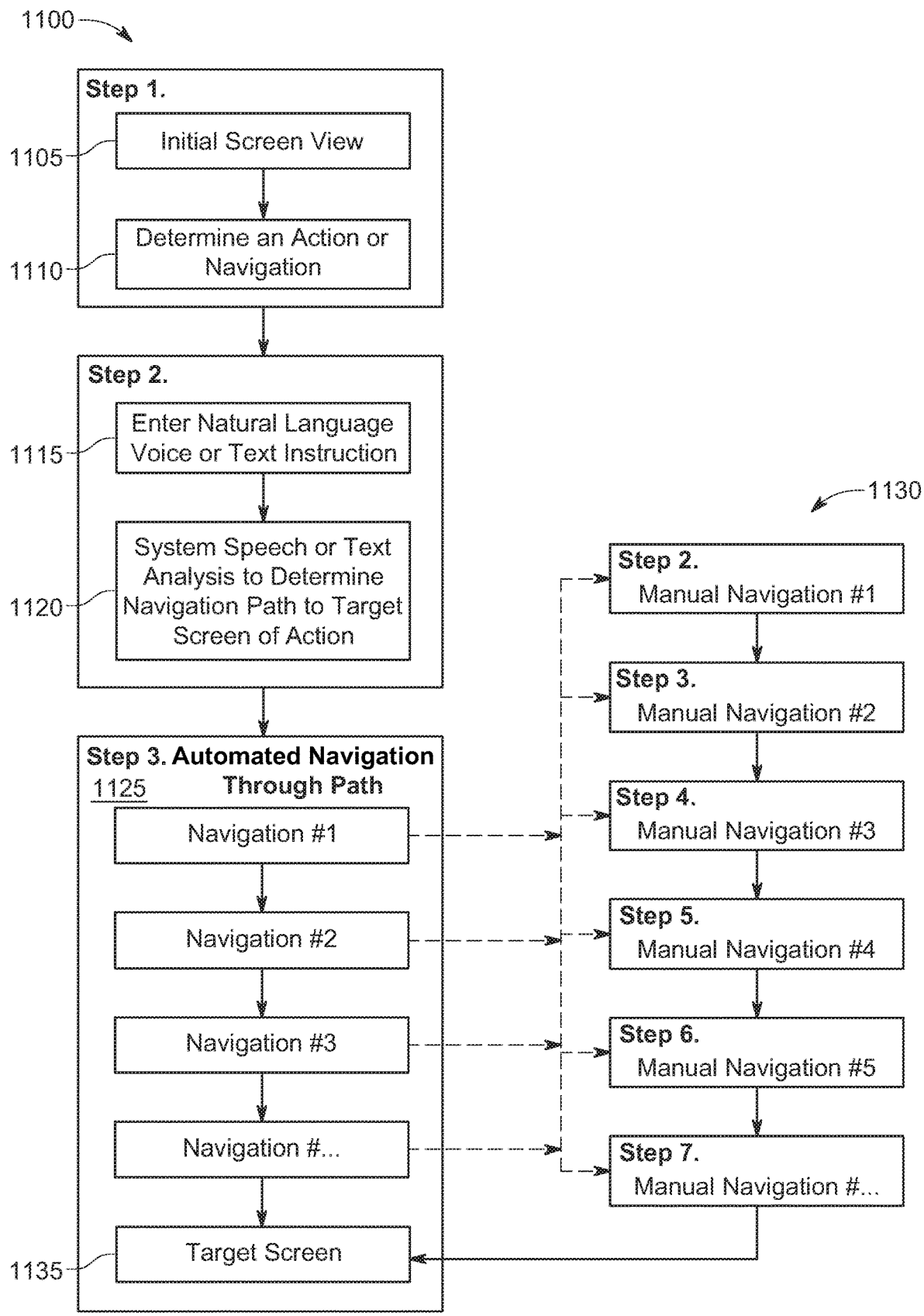
FIG. 11 is an illustrative process flow in an example embodiment.

FIG. 11 illustrates an example embodiment relating to natural language inputs in the context of the present disclosure. Natural language can be used to enter user inputs herein in some embodiments, either via spoken user entries or text entries. A number of the UI's discussed above include a UI element for entering natural language inputs. For example, UI 325 in FIG. 3 includes a natural language input control 345, wherein text input (as indicated at 335) and spoken input (as indicated by the microphone icon 340) can be entered. The natural language submitted by a user, whether spoken or text, may be compared to a knowledge base associated with the user. The knowledge base may be consulted to determine a meaning for the user's input based on, at least in part, the user's previous entries. To facilitate this feature, the systems and applications herein may operate, via machine learning functionalities and processes, to "learn" what a user means as the user interacts and interfaces with the systems and applications disclosed herein. The machine learning components may, in some instances, learn the meaning of words and phrases from a user's most-used, recent, or certain voice prompts and syntax to build a user-specific set of rules and a key-word library. The machine learning aspects and features may be especially useful for executing compound-action navigations and other action requests. This aspect of machine learning may include, but need not be limited to, speech recognition aspects, pattern learning, and user preferences. Systems and applications herein may use speech recognition functions to, for example, identify contextual key words within a prompt to interpret the desired action, incorporate, and consult speech recognition libraries, databases, and metadata associated with databases. In some aspects, the natural language inputs may be analyzed with respect to time-based contexts including calendar, timeline, date and time contexts, to the exclusion of other contexts and words. In this manner, the focus and relevance of the systems herein may be maintained and the disclosed system(s) may operate efficiently.

When using natural language inputs a user may, for example, be automatically navigated from a current view location to a target view location in response to one natural language input from a user, even where multiple steps are needed to navigate from the starting location to the target location. In contrast to a typical manual input where the user must manually navigate through each step, embodiments herein automatically navigate from the start location to the target location and include animations and/or transition visualizations for each step in the journey. In some regards, this feature may provide a level of context for a user by visually conveying to the user where they are starting from, where they end (i.e., the target location) and how they got to the target location—automatically.

According to FIG. 11, a user starts at an initial view at 1105. The user then determines (1110) that they would like to go to a different view. For example, the user may want to navigate from a first day to another day in an effort to schedule a meeting on the second date. At 1115, the user enters their desired action ("go to May 4, 2017) using natural language. In response thereto, the system or application automatically determines the meaning of the user's natural language input. Such analysis may consult and compare the input(s) to past inputs from the user, metadata associated with a database of acceptable entries, and other mechanisms in an effort to ascertain a logical and correct meaning for the user's input. In some example embodiments, compound actions may be entered via natural language herein. A compound action may include multiple operations or steps to complete an action, as opposed to actions including a single task. For example, a natural language entry of "schedule a meeting with Bob Vance in the main conference room next Tuesday and notify my assistant of the meeting" might trigger a series of events, including but not limited to, for example, determining what day is "next Tuesday", determining an open time slot (if any) in the user's schedule and the main conference room, obtaining Bob Vance's contact information to invite him to the meeting and informing the user's assistant of the meeting (e.g., including accessing the user's contacts). In this manner, a user may enter the compound action in a single natural language input entry, as opposed to as multiple simple or single job tasks. Upon determining the meaning of the user's natural language input, the system and application may automatically navigate to the location or action determined to be a target location or action based on the analysis of the user's natural language input. In some embodiments, the system automatically generates and presents UI visualizations for each step 1125 of the navigational path from the user's current location to the target location 1135 corresponding to the action specified in the user's natural language input. The visualizations may be presented in the form of animations, transitions between one view and a next view, and otherwise sequencing from one view to a next view as one might see in a manual navigation through each of the corresponding manual navigation steps at 1130. In some embodiments, the system may automatically enter content (auto-fill) into text fields and other UI contexts, including but not limited, to a meeting or timeline task subject title, meeting attendee names, task start or end dates, geographical location information, etc. as anticipated and determined via the system's machine learning and other system aspects. For example, a natural language input could be recognized and automatically determined by the system to be calendar-recognized content. As an example, the spoken input of "Sara . . . create a new appointment with Jack from XYZ Corp. for Tuesday during the June conference in Iowa" could be recognized by the system as being a calendar context input. As the system is able to recognize the referenced time (i.e., "next Tuesday") in its timeline, and has access to the XYZ company information and associated contacts, a new (at least partially) pre-populated meeting detail could be generated and presented to the user. In response, the user could then view his calendar for open times (in some embodiments, some suggested times could be proactively presented to the user) and complete the meeting form with additional details.

FIG. 11 also includes manual steps for navigating from the start location to the target location. As shown at 1130, the manual navigation steps are individual user selection steps, whereas the steps 1125 are grouped together since they are executed automatically and presented as one continuous flow, even though multiple steps may be required to reach the desired target location in executing the actions entered via the natural language input, including single and compound actions.

In some aspects, a user may interrupt the execution of an automatic flow (e.g., operations in the automated navigation 1125) at any point in the presentation thereof to stop the flow and/or navigate manually. The option to switch to a manual process may be presented to a user in most UIs herein via a user selectable UI control (not shown), for example a translucent stop/resume toggle button. In an embodiment, the user may simply click or tap on the screen to stop the automatic flow and perform overriding manual inputs or navigations, etc.

Figure 12A:
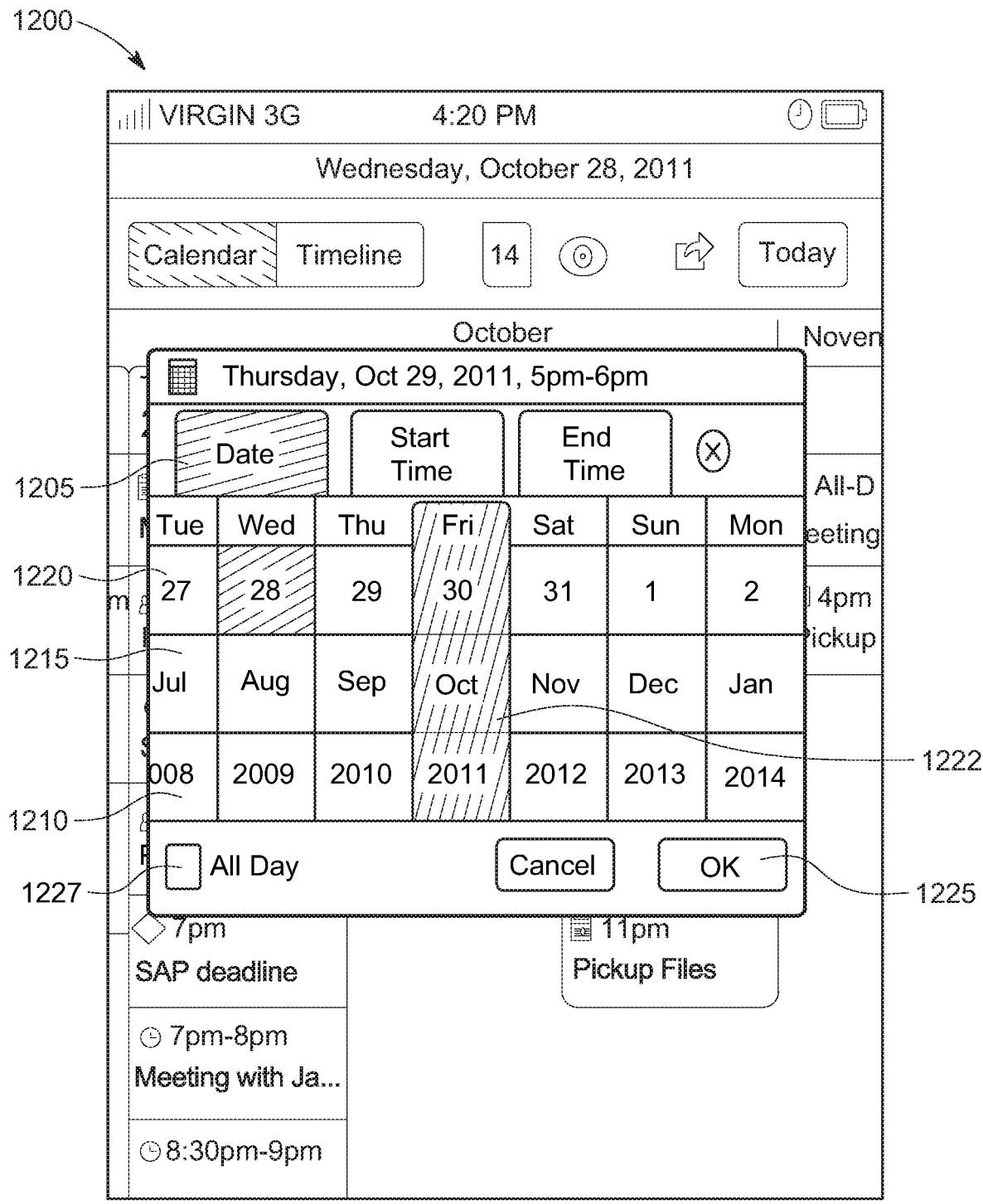
FIGS. 12A-12C include outward views of a displayed user interface, including UI controls to select a date and time of a calendar event according to an example embodiment.
Figure 12B:
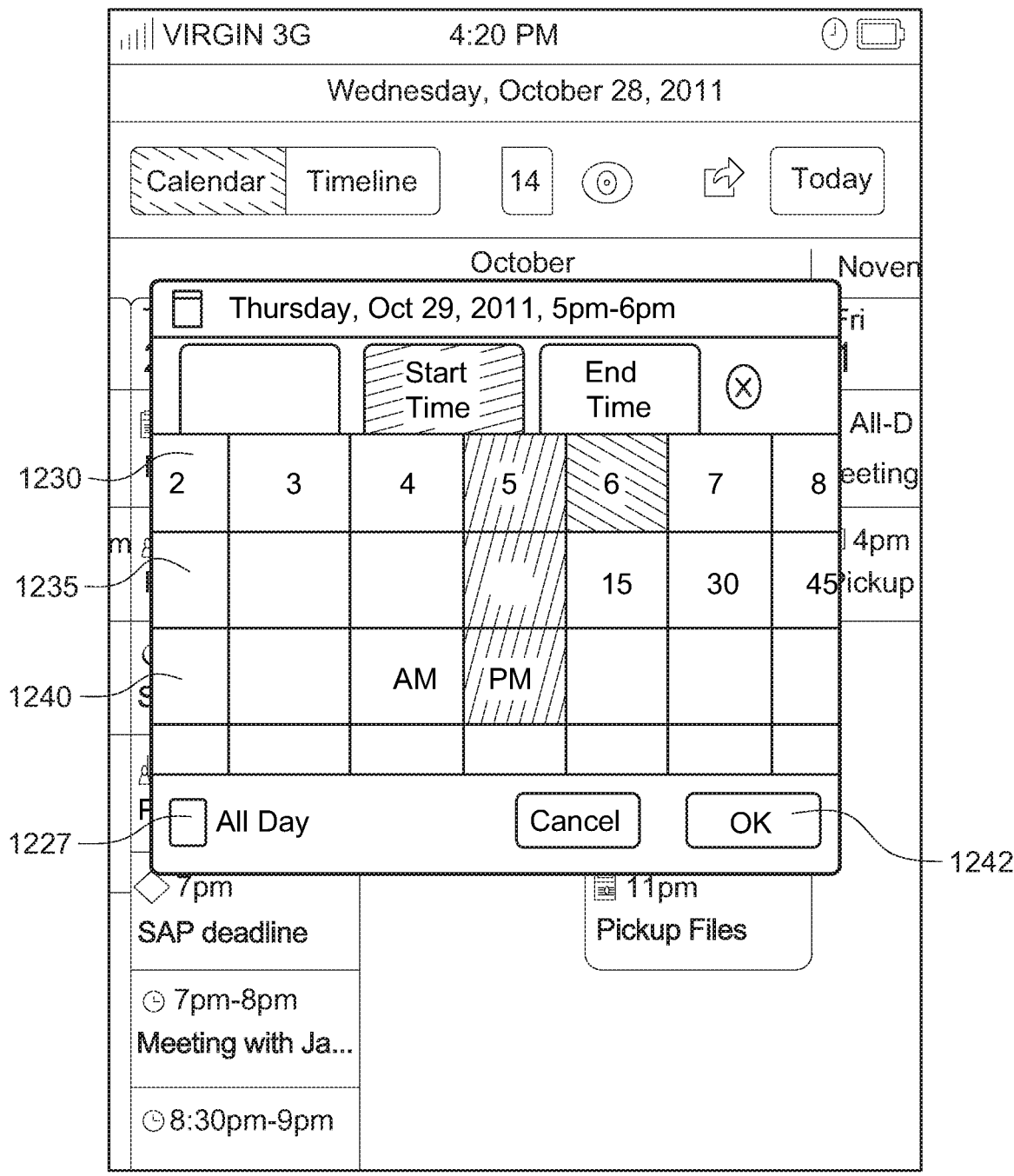
Figure 12C:
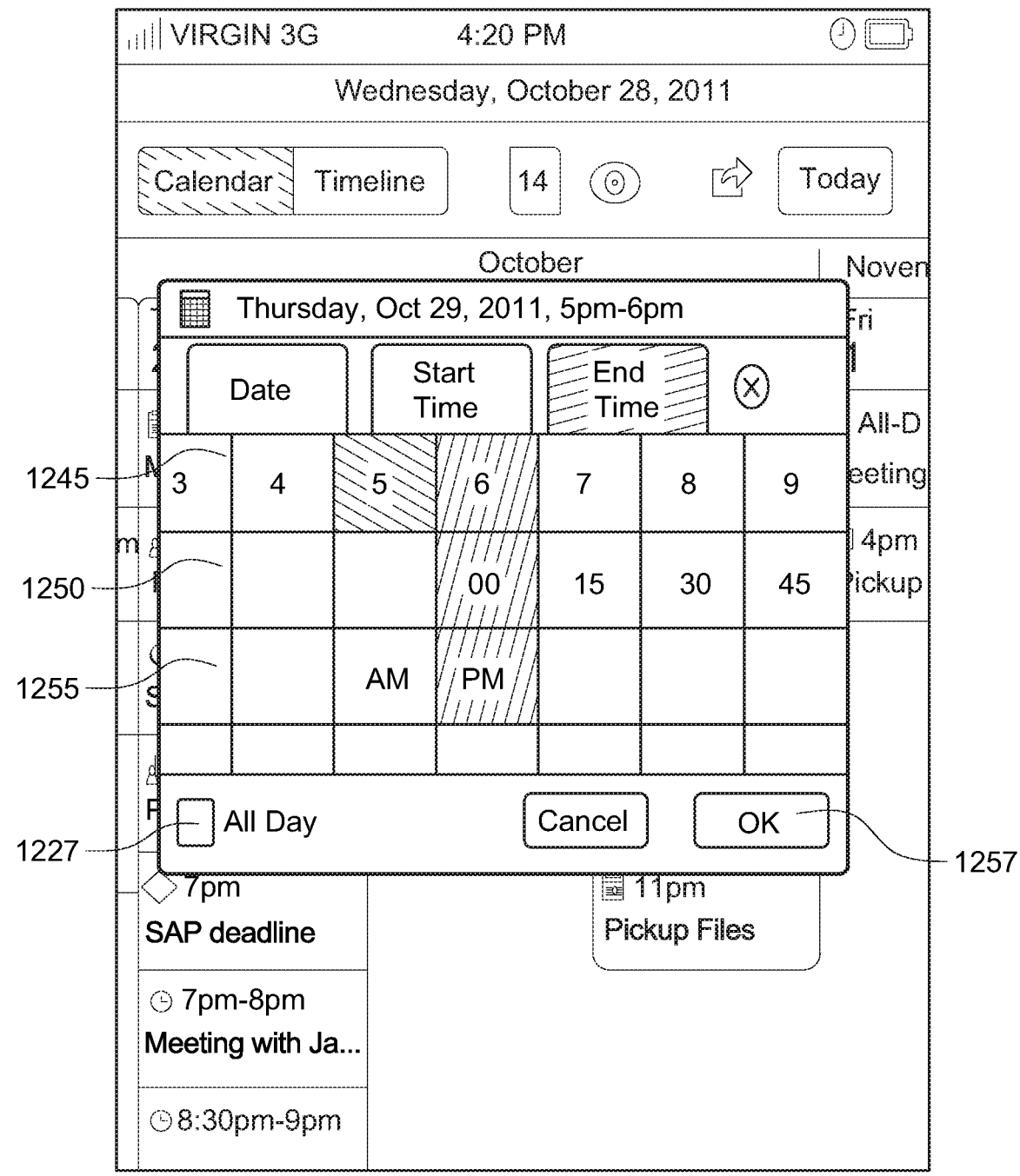

In some aspects, natural language input may be incorporated in one or more device platforms (desktop, mobile tablet, smartphone, a wearable device, etc.). FIGS. 12A-12C include illustrative depictions of a set of UI controls that may be included in an example embodiment of a UI herein. UI 1200 relates to a calendar and specifically to time and date "picker" controls of an interface for the calendar to specify a date for a calendar event (e.g., appointment, call, or meeting, etc.). In the example of FIG. 12A, a date tab 1205 is selected for entering a date for a calendar event, "slider" UI control elements can be used to select a specific year 1210, a month 1215, and a day 1220. As shown, the horizontal slider UI controls operate by dragging/sliding/scrolling right (exposing values back in time) or left (exposing values forward in time) for each of the year, month, and day corresponding time parameter indications within center lens area 1222. Each slider control operates independent of the others and they collectively operate to indicate a specific date, including the day, month, and year for a calendar event. The slider controls may be manipulated in response to a mouse or other input device (e.g., a keyboard, etc.), a touchscreen, voice prompts, and combinations thereof. Upon aligning the desired year, month, and day as shown in FIG. 12A in the center lens 1222, the user can select the "OK" button at 1225 to enter the selected date (i.e., "Oct. 30, 2011").

FIG. 12B illustrates a mechanism for setting a start time for the calendar event being set in the present example, including using the horizontal slider UI controls to select a time comprising the parameters of an hour (1230), minutes (1235), and period of day (1240). The user selects the "OK" button at 1242 to enter the selected start time (i.e., "5:00 PM").

FIG. 12C illustrates a process for setting the end time for the calendar event in the present example, including using the horizontal slider UI controls to select a time comprising the parameters of an hour (1245), minutes (1250), and period of day (1255). The user selects the "OK" button at 1257 to enter the selected end time of 6:00 PM.

Still referring to FIGS. 12A-12C, UI 1200 includes a user-selectable "All Day" UI element control 1227 that may be selected by a user to indicate a calendar event should be scheduled for the entire day of a selected date.

Figure 12D:
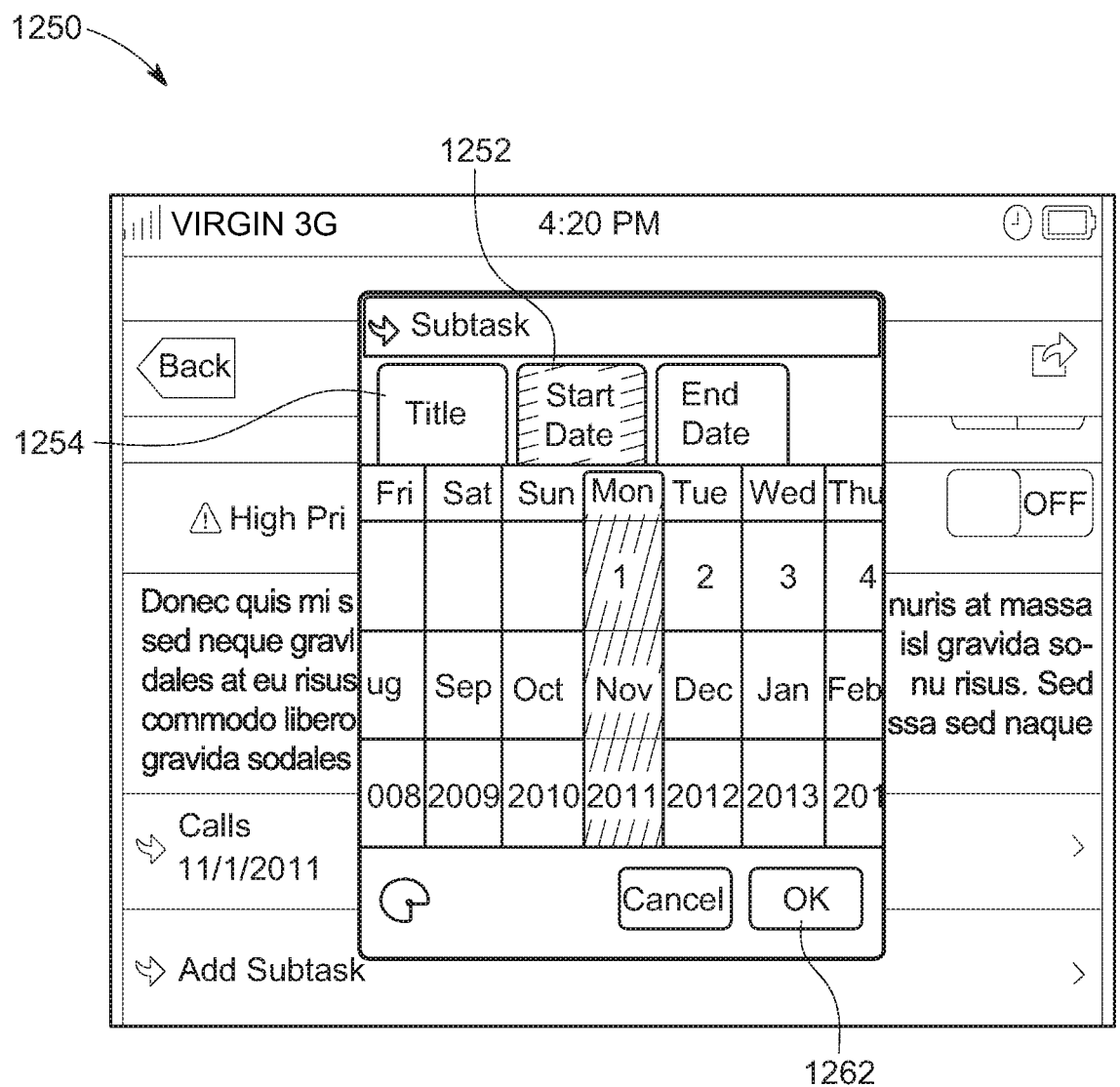
FIGS. 12D and 12E include outward views of a displayed user interface, including UI controls to select a date and time of a subtask for a timeline event, according to an example embodiment.
Figure 12E:
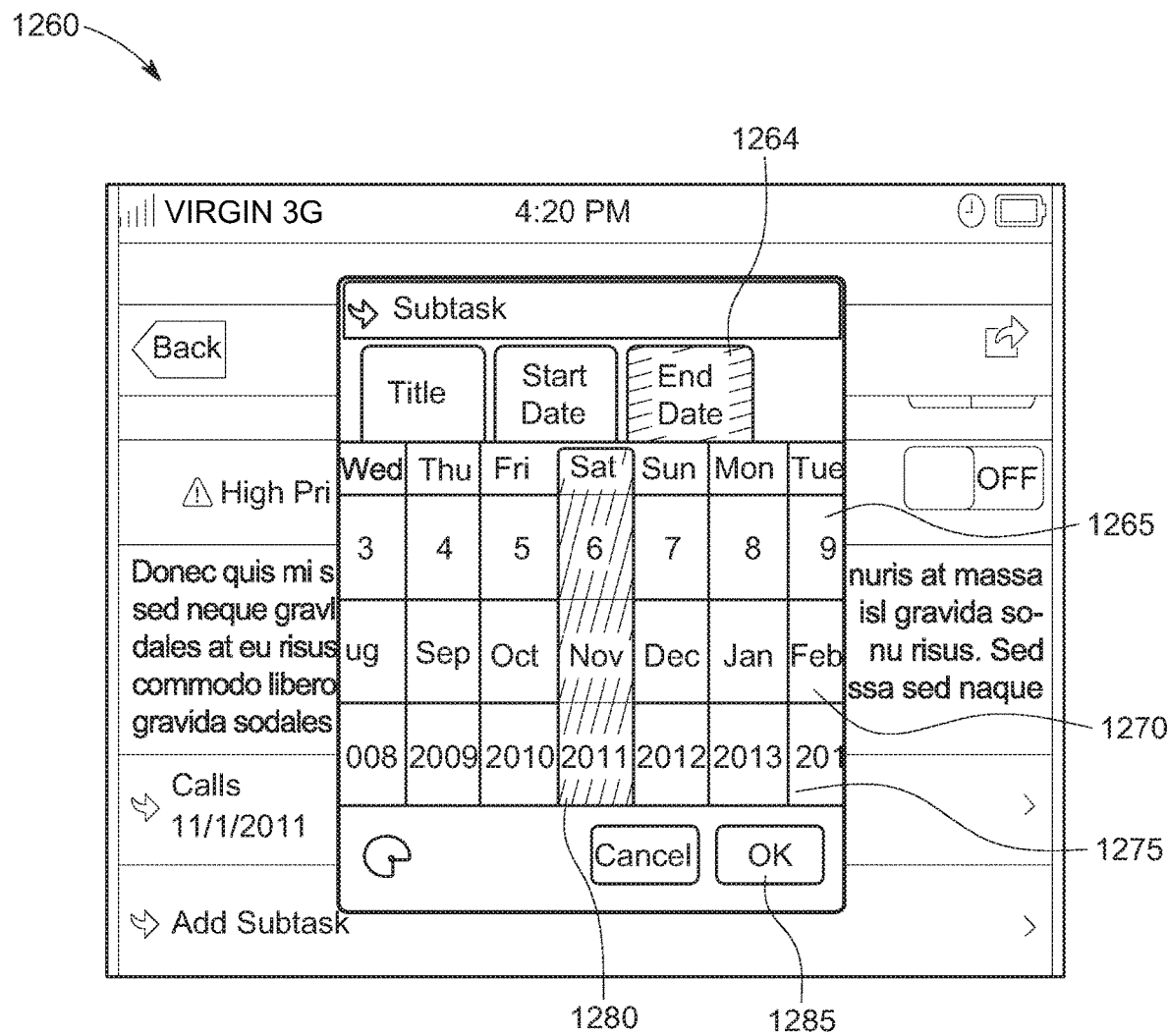

While FIGS. 12A-12C specifically relate to a calendar functionality, similar controls to specify a period of time of one or more days in duration can be implemented for user entry of times in the context of a timeline functionality herein. FIG. 12D includes an illustrative depiction of a set of UI controls that may be included in an example embodiment of a UI herein. UI 1250 (FIG. 12D) and 1260 (FIG. 12E) relate to a date "picker" control of an interface for a timeline to specify a start date, end date, and a text title for a timeline event. In the example of FIG. 12D, UI 1250 includes a title tab 1254 that can be used to display an editable text field (not shown) that a user may use to enter the text for the title of the timeline event. In the example of FIG. 12D, UI 1250 also includes a start date tab 1252 that can be used to select a start date similar to the UI 1200 in FIG. 12A, including the selection of a specific year, a month, and a day. FIG. 12D further shows the slider controls that may be manipulated in response to a mouse or other input device (e.g., a keyboard, etc.), a touchscreen, voice prompts, and combinations thereof for selecting a start date and end date. In FIG. 12E, UI 1260 includes an end date tab 1264 that illustrates UI elements for the setting of an end date for a subtask, including a day (1265), month (1270), and year (1275) using horizontal "slider" controls that can be manipulated left or right to select different values as indicated in the center lens area 1280. In some aspects, a user can be prevented from entering illogical and realty-restricted entries such as, for example, an end date that is before a start date, wherein such restricted entries are not presented as an option for the user.). In an embodiment, a timeline milestone event may be specified by selecting the same day for the start date and the end date, which can be automatically interpreted by the system to indicate the specified event is a milestone type of event.

In some embodiments herein, there may be a feature of a user settings menu that includes, for example, one or more user settings or parameters that can be configured to a user's particular preference(s).

One example embodiment may include the settings or parameters of Auto Navigation, All Day Durations, User Profile & System Permissions, a Clock Source, Theming Selections, and Priority Rules. In this example, the settings and their meaning are set forth below.

Auto Navigation: Turn On/Off Auto Navigation Sequence Animations and Transitions—In Voice or Text prompt mode, disables displaying the automated navigation sequence and immediately presents the Target Screen from the initial screen where the prompt was entered.

All Day Durations—Select the "All Day" Time Duration (Uses the Time Picker control); Default is 24 hours (e.g., FIG. 12B where the "All Day" UI element 1227 may be selected to specify a calendar event is one day in duration).

User Profile & System Permissions—User selection or corporate/organization provisioned role names, ID and definitions.

Clock Source—Internal clock or network clock selection.

Theming Selections—User selection of pre-set color themes and semantic color pallet options.

Priority Rules—User selection of priorities rules in e.g., a list format by which top priority rules are indicated at the top of the list in a descending order as indicated by moving items Up/Down in the list. Examples include, (a) Nearest Time to current date, (b) Priority (I) selection, (c) Event or Appointment Type (per User Role), User entered Event or Calendar Topic/Title, (d) Participant/contact name or keyword associated with a Calendar or Timeline item, (e) Other . . . etc. In some aspects, the priority list may be constantly updated according to time and user entries and edits, and priority lists can be saved as user selectable presets to immediately display corresponding priorities (e.g., my "Trade Show Event" priority list, my "Customer" priority list, etc.).

In some example embodiments, such as a use-case including an enterprise solution, the integrated calendar and timeline application disclosed herein may be automatically provisioned according to a user's role in the organization. This feature may provide a user with the ability to efficiently and easily import/export relevant date and event data from external role-specific software environments and applications, attach external objects to calendar appointments, timeline events, fetch messages, and combinations thereof. For example, a Software Development Engineering role in some example embodiments herein may be pre-provisioned with pre-defined task & appointment types, such as the following:

Sprint Reviews
Quality Gate (Q-Gate) Milestone
User Testing
UI Code Release
Proof of Concept Prototype (POC) development Task
Emergency Code Correction (ECC) Task or Deadline
Development Close (DC) Task or Deadline/Milestone
Release to Customer (RTC) Milestone
Product Research Task
Etc.

This Software Development Engineering role may also cause, for such a user, links and integrations with Development Software Data and environments, such as:

JIRA Portal (development issues Tracker or project tasks & Dates, etc.)
EXCEL documents
Project Management software e.g. MICROSOFT PROJECT, etc.
Internal corporate, development, or collaboration software or portals, etc.
Corporate wiki.

Figure 13A:
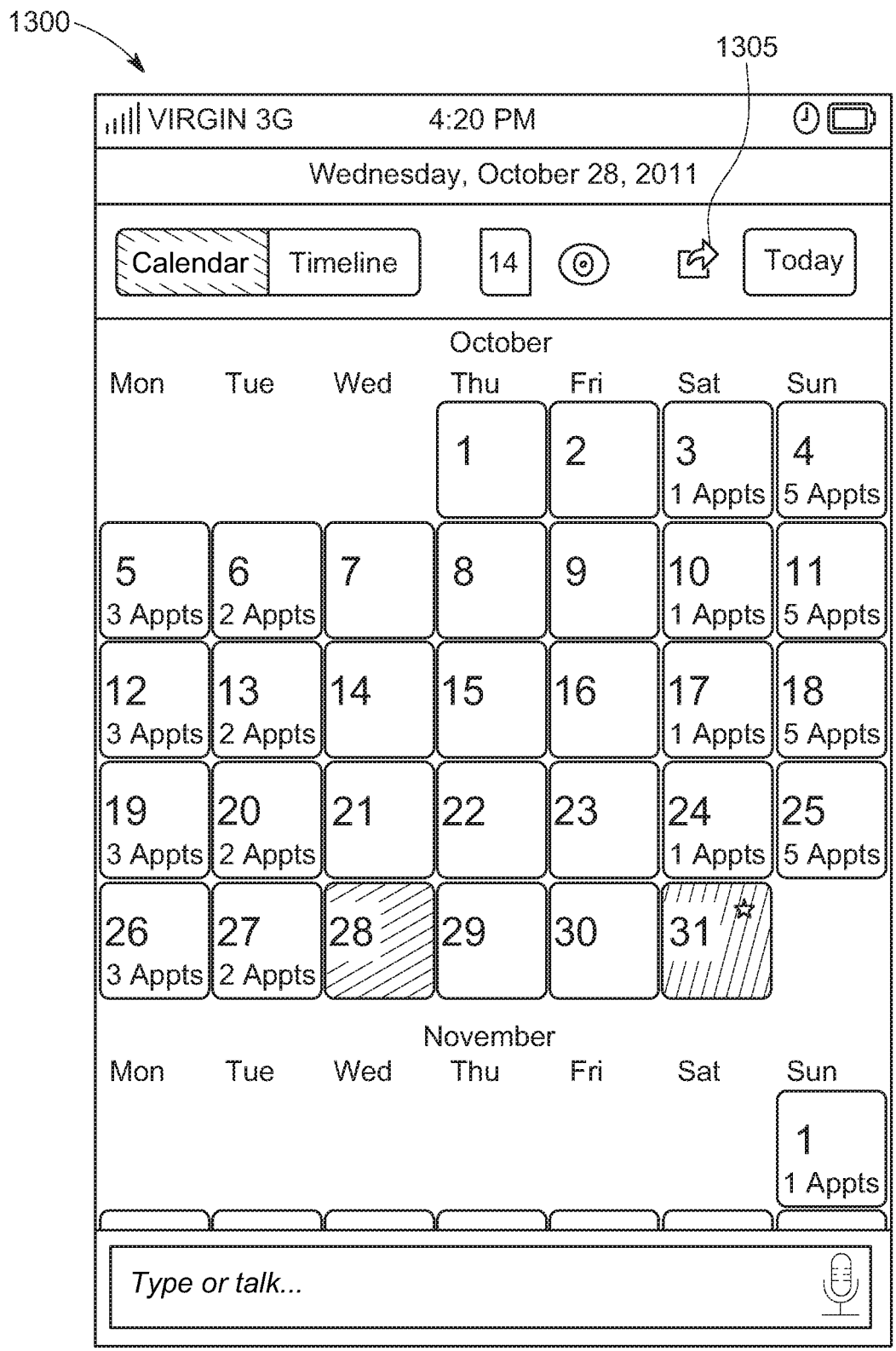
FIGS. 13A-13C include outward views of a displayed user interface, including some aspects to specify user roles, according to an example embodiment.
Figure 13B:
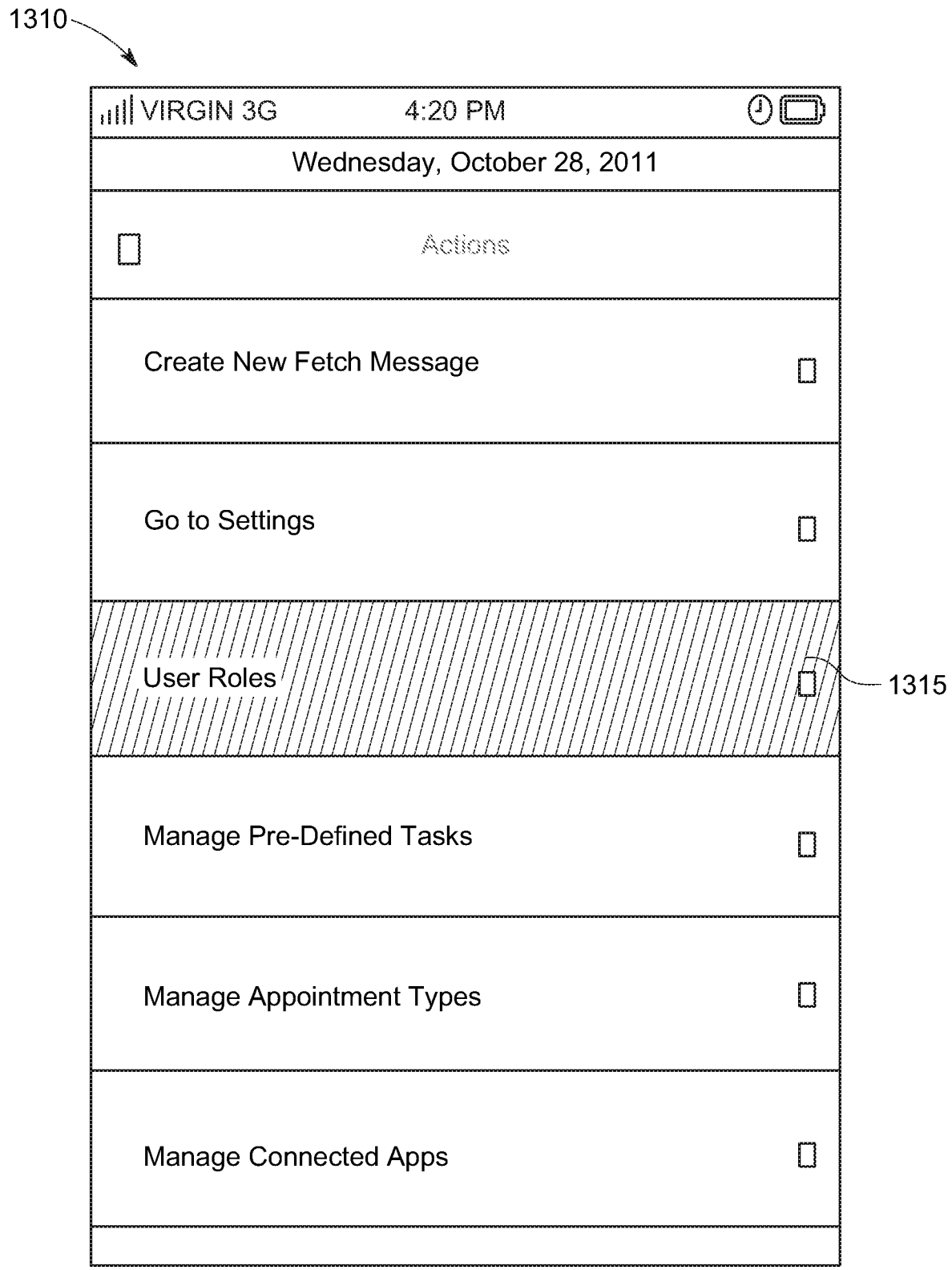
Figure 13C:
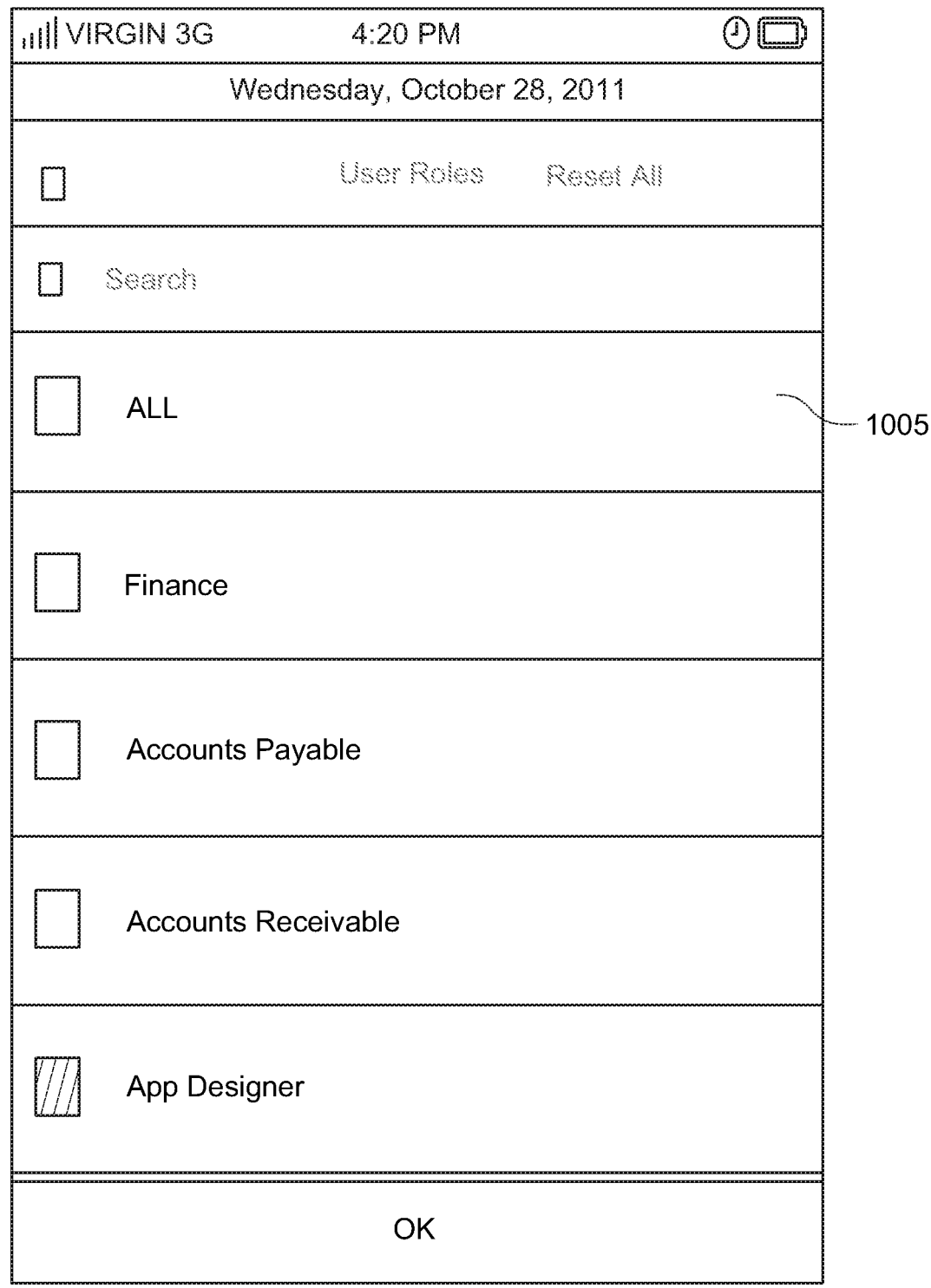

FIGS. 13A, 13B, and 13C illustrate example user interfaces for an embodiment to set user roles. FIG. 13A includes a UI 1300 that includes an action button at 1305. Action button 1305 may be selected to cause a presentation of Actions UI 1310. The User Roles 1315 action item can be selected in FIG. 13B in UI 1310 to display the different user role options shown in UI 1320. In an embodiment, an "All" selection 1325 may be selected to select all user role options simultaneously without the need for the user to individually select each item one at a time. After the appropriate role(s) are selected in UI 1320, the "OK" button is selected and the UI can be closed to return to the calendar view of FIG. 13A.

Figure 14A:
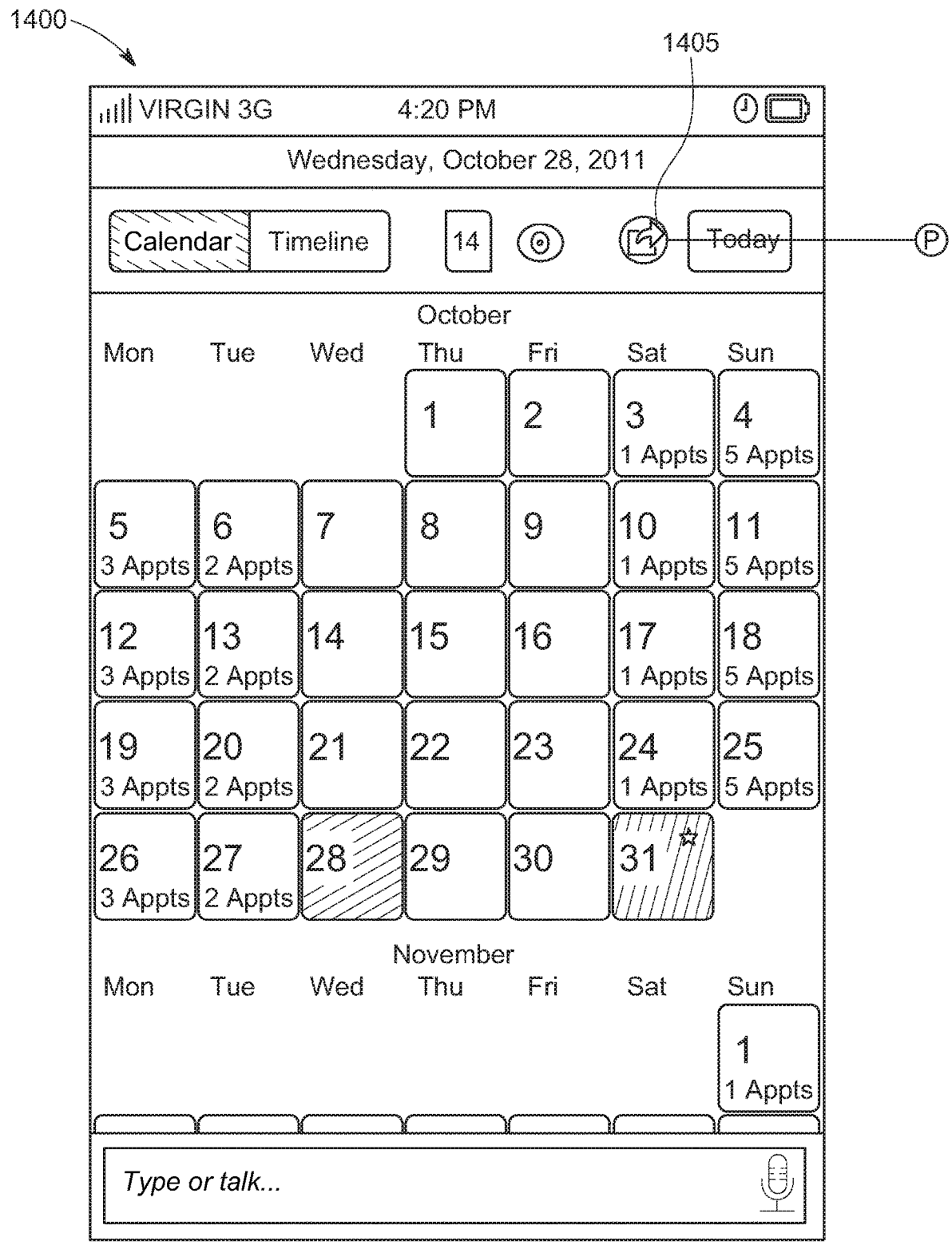
FIGS. 14A-14C include outward views of a displayed user interface, including some aspects to manage pre-defined tasks, according to an example embodiment.
Figure 14B:
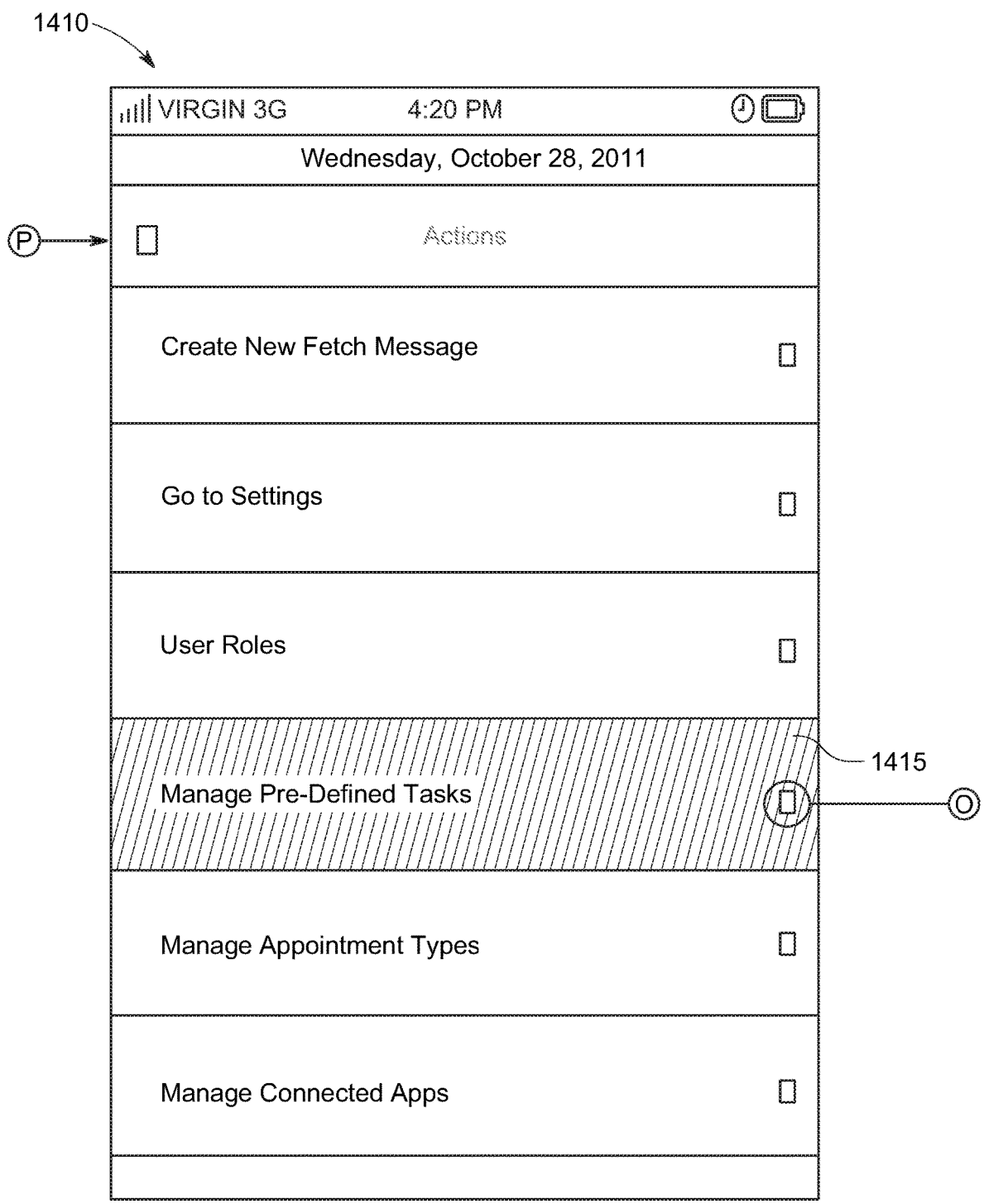
Figure 14C:
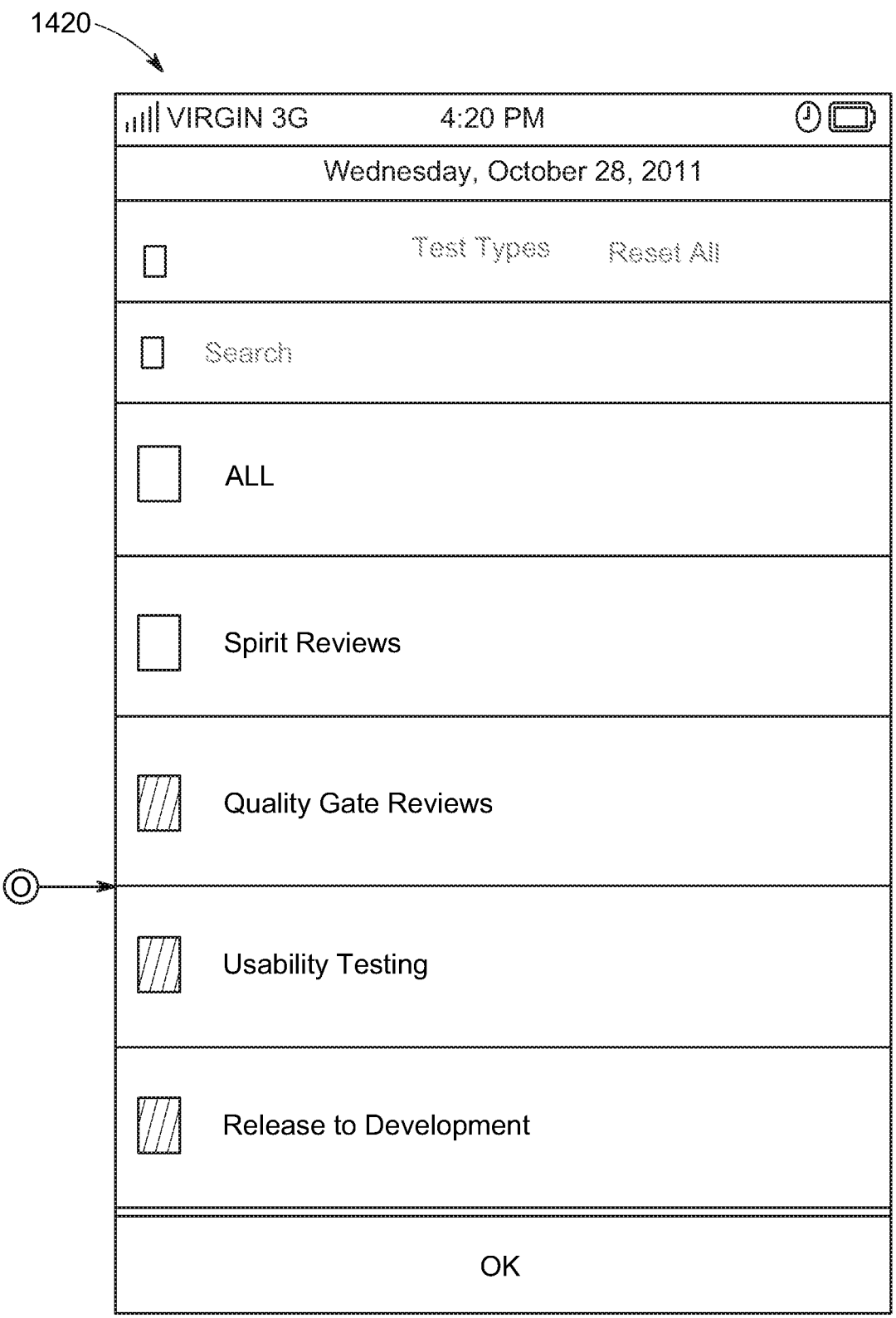

FIGS. 14A, 14B, and 14C illustrate example user interfaces for setting one or more pre-defined tasks. FIG. 14A includes a UI 1400 having an action button at 1405. Action button 1405 may be selected to cause a presentation of Actions UI 1410. The Manage Pre-Defined Tasks 1415 action item can be selected in FIG. 14B at UI 1410 to display the different types of tasks illustrated in UI 1420 that correspond to selected User Roles. Upon selection of one or more types of tasks in UI 1420, the "OK" button in UI 1420 can be selected and the UI can be closed to return to the calendar view of FIG. 14A.

Figure 15A:
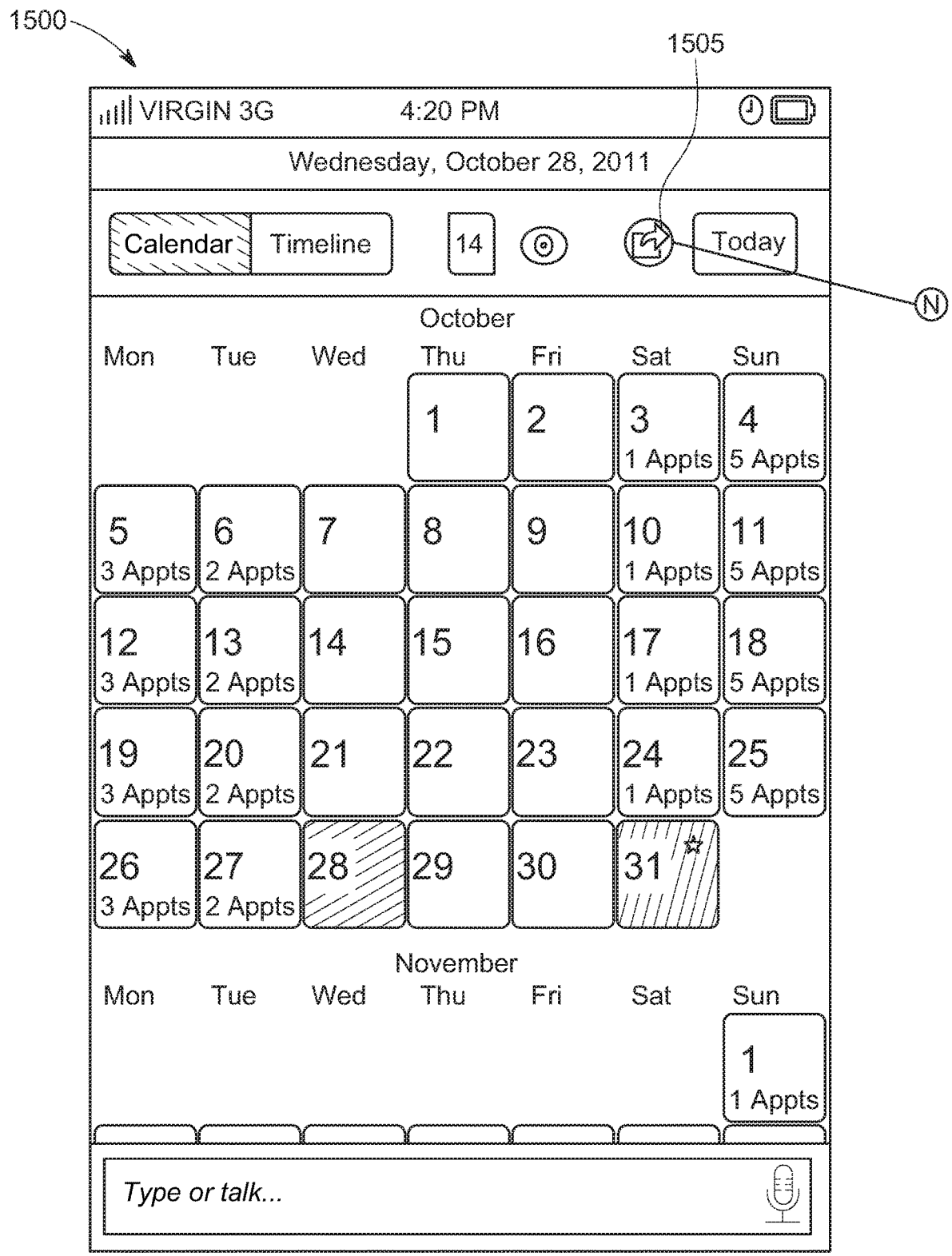
FIGS. 15A-15C include outward views of a displayed user interface, including some aspects to manage appointment types, according to an example embodiment.
Figure 15B:
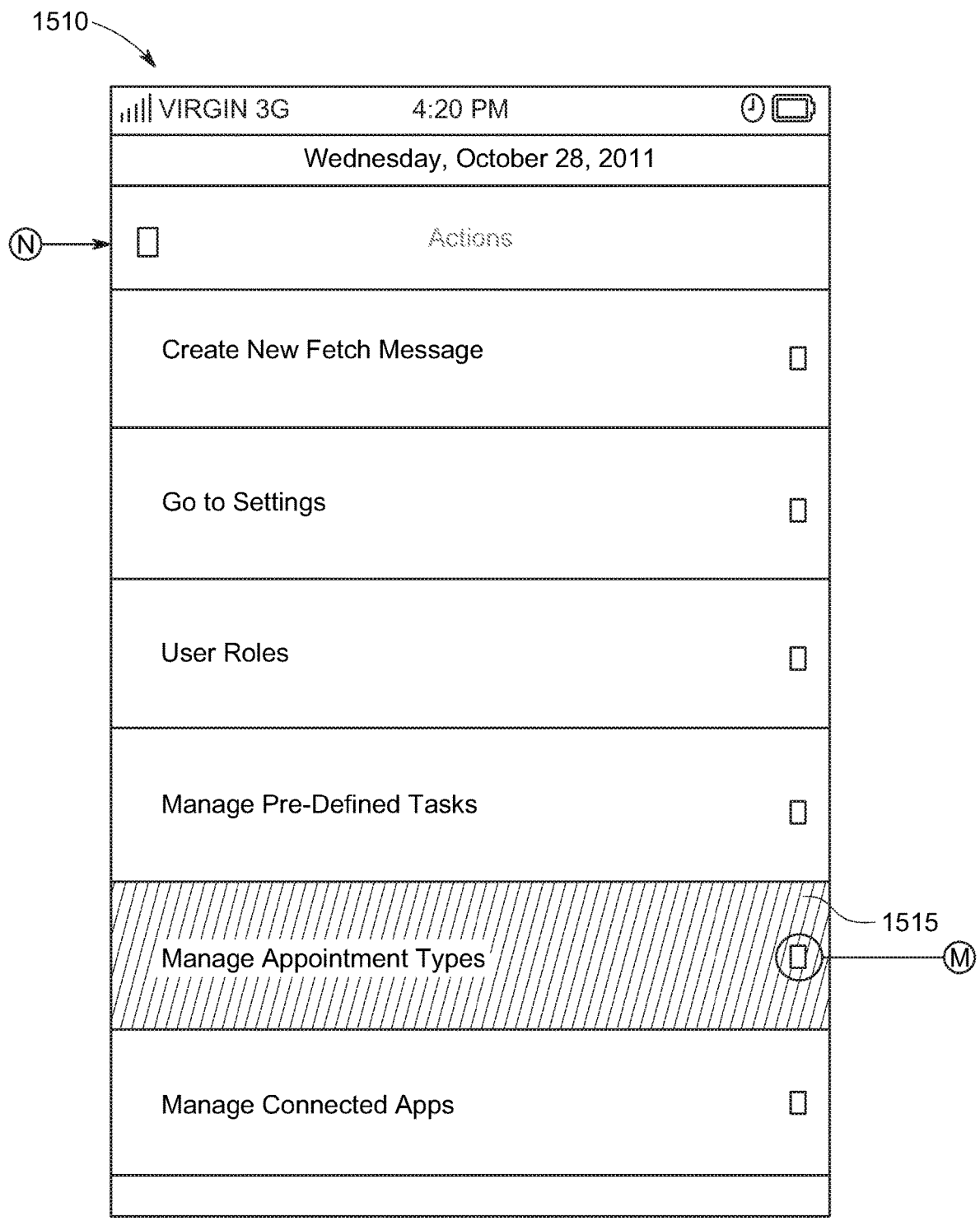
Figure 15C:
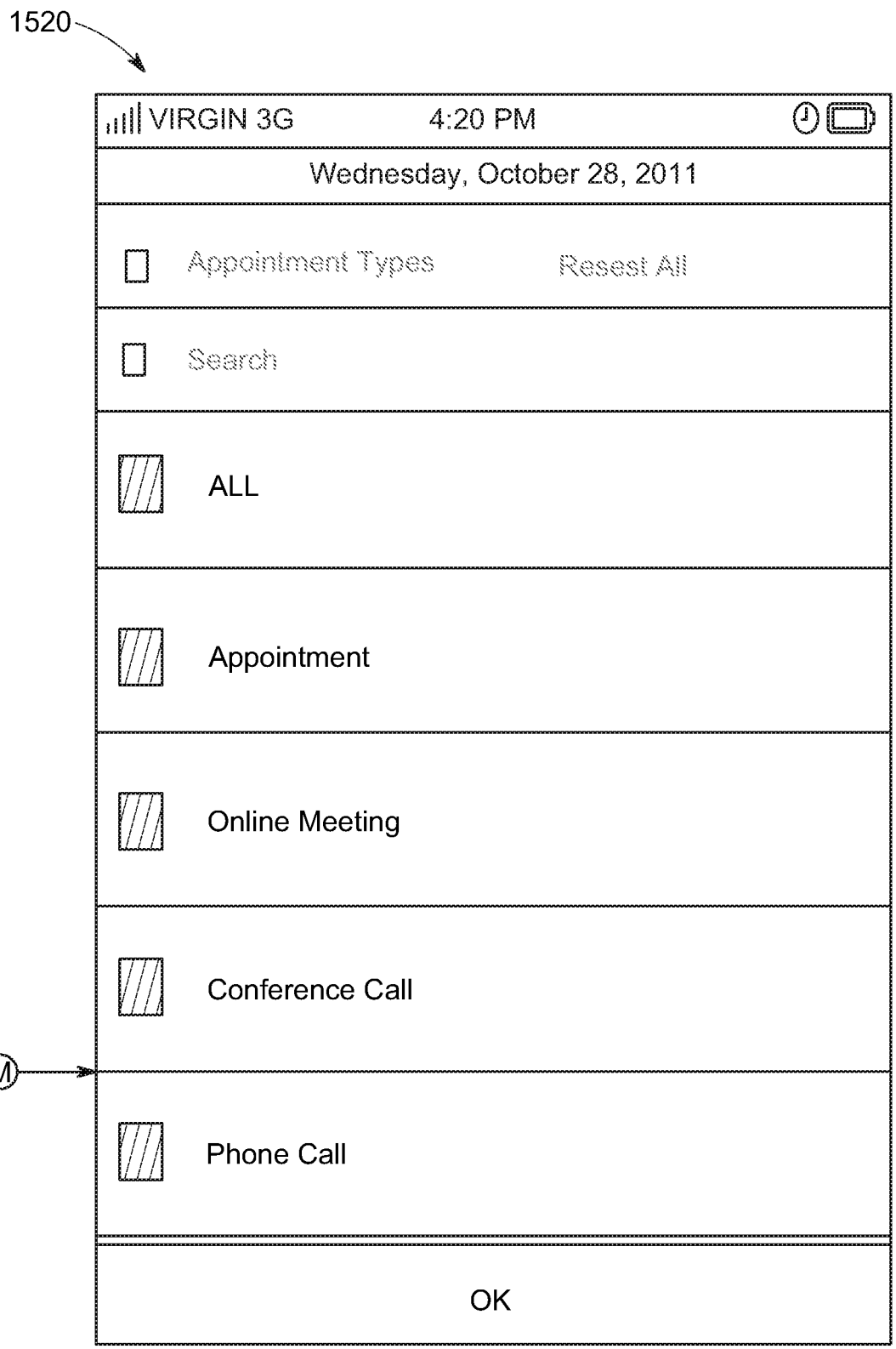

FIGS. 15A, 15B, and 15C illustrate example user interfaces for setting one or more pre-defined appointment types. In this example embodiment, FIG. 15A includes a UI 1500 having an action button at 1505. Action button 1505 can be selected to invoke a presentation of Actions UI 1510 shown in FIG. 15B. The Manage Appointment Types action item 1515 can be selected in UI 1510 of FIG. 15B to display the different types of appointments depicted in UI 1520 of FIG. 15C. Upon selection of one or more types of appointments in 1520, the "OK" button can be selected in UI 1520 to set the available appointment types, close the UI, and return to the calendar view of FIG. 15A.

Figure 16A:
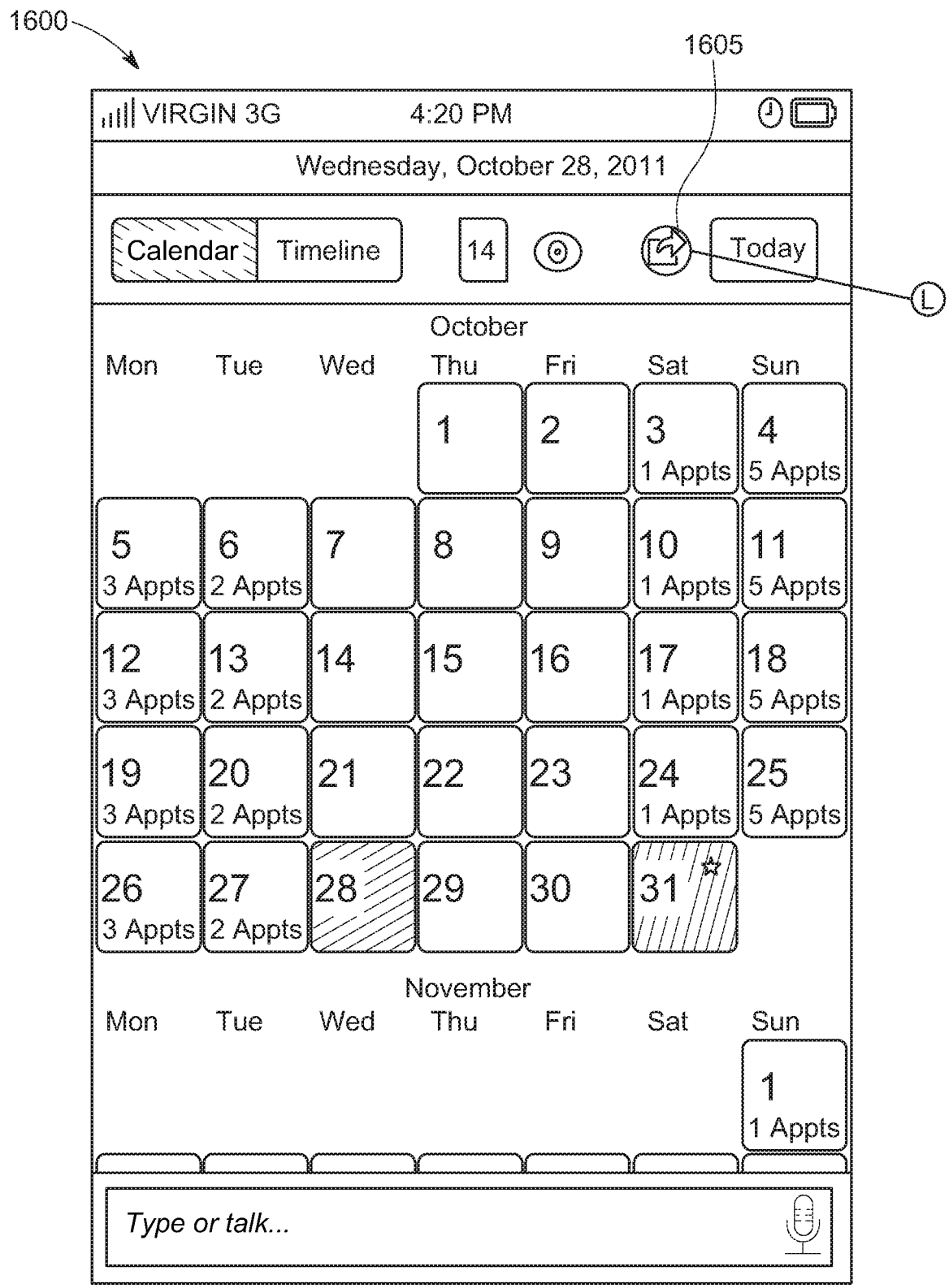
FIGS. 16A-16C include outward views of a displayed user interface, including some aspects to manage connected applications, according to an example embodiment.
Figure 16B:
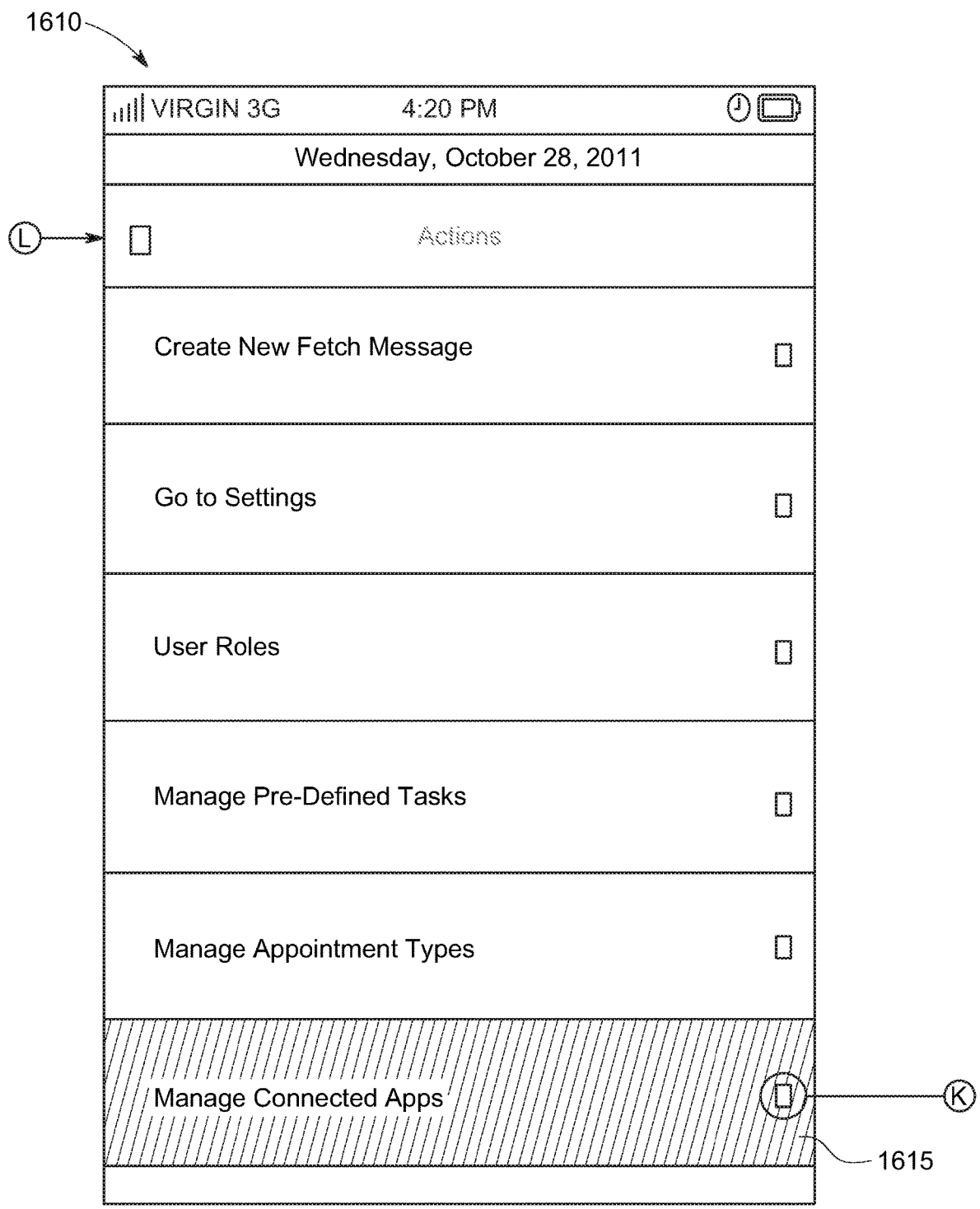
Figure 16C:
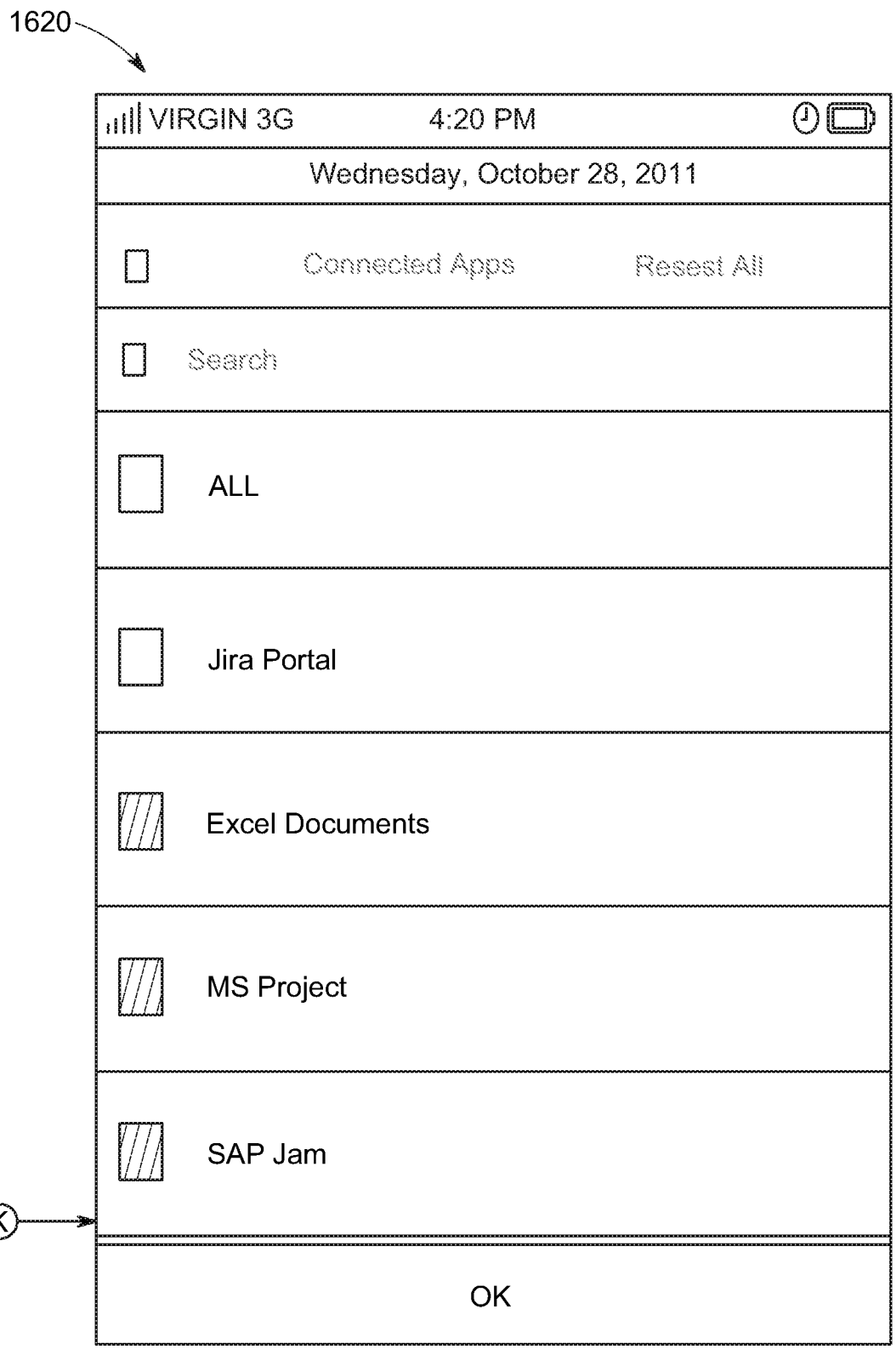

FIGS. 16A, 16B, and 16C illustrate example user interfaces for setting one or more parameters related to managing connected applications. In this example embodiment, FIG.

16A includes a UI 1600 having an action button at 1605. Action button 1605 can be selected to invoke a presentation of Actions UI 1610 where the Manage Connected Applications action item 1615 can be selected in FIG. 16B at 1615 to cause a display of the different types of applications that can be managed via the Fetch functionality herein, as depicted in UI 1620 of FIG. 16C. Upon selection of one or more applications in 1620, the "OK" button in UI 1620 can be selected to set the indicated link connections, close UI 1620, and return to the calendar view of FIG. 16A. In some embodiments, the selected applications may need to be compatible with the Fetch functionality herein by, for example, having an appropriate plug-in, API, etc.

Figure 17A:
FIGS. 17A-17D include outward views of a displayed user interface, including some aspects related to recognizing schedule conflicts and options for a resolution, according to an example embodiment.
Figure 17B:
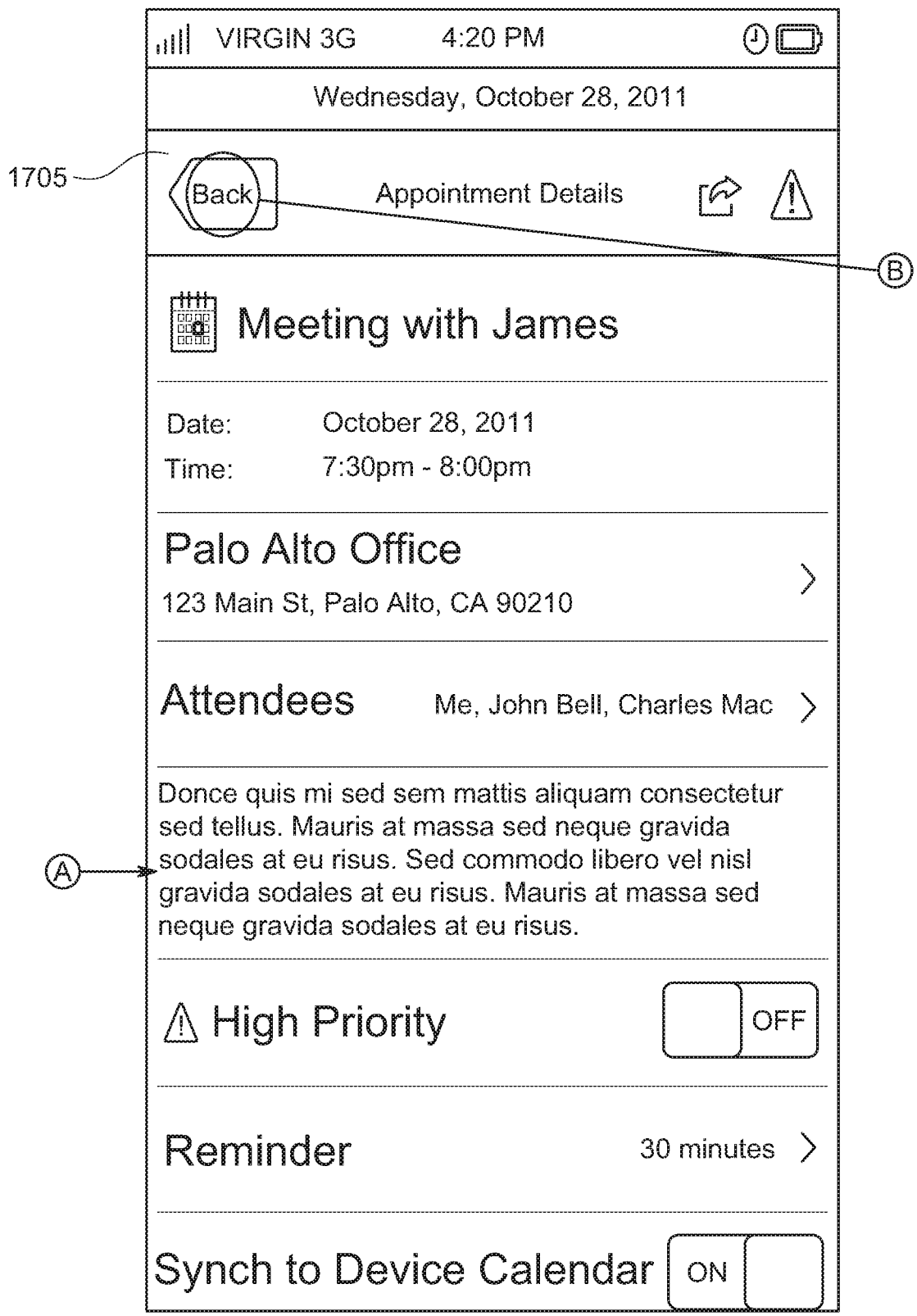
Figure 17C:
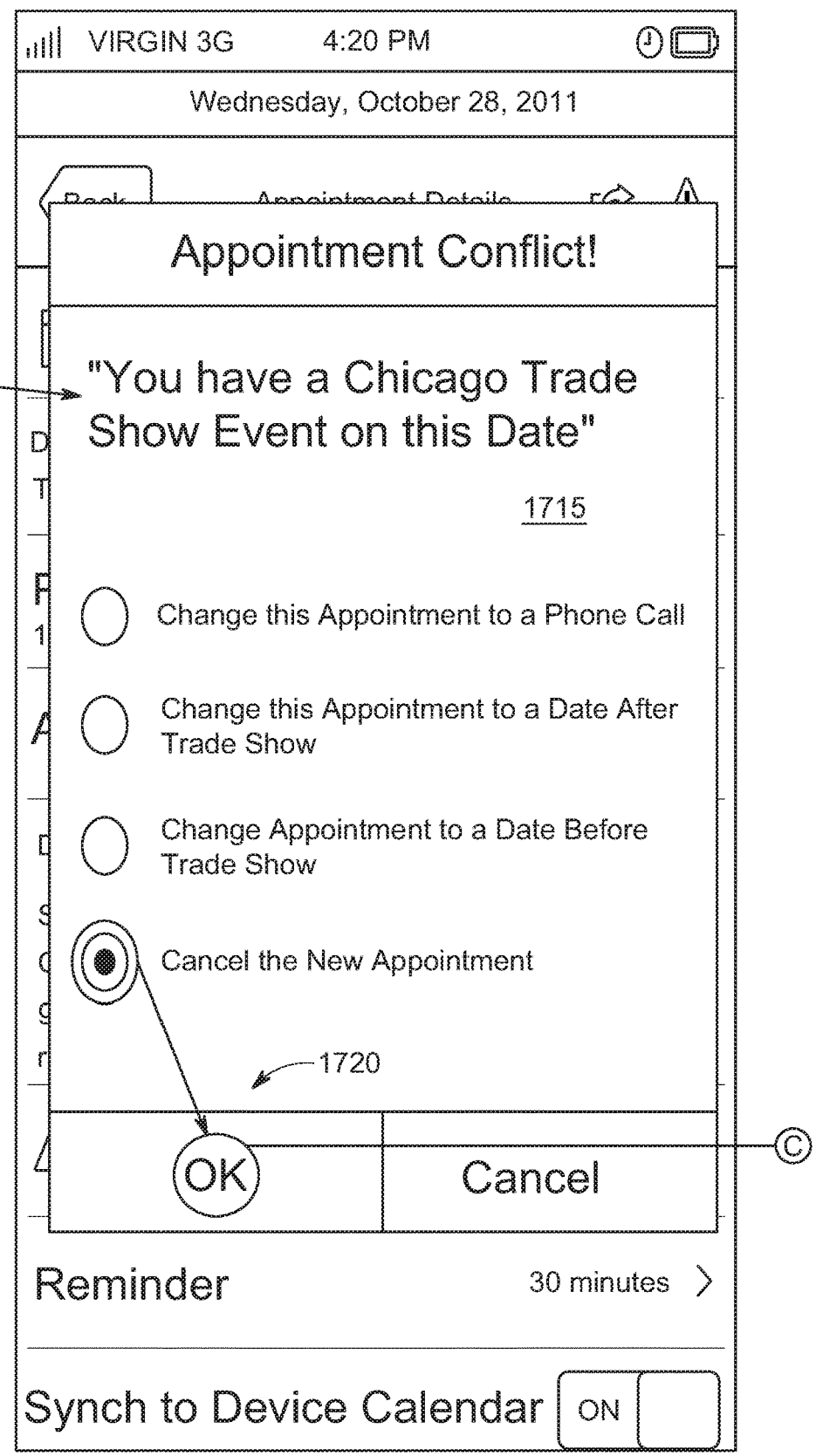

Some example embodiments herein may use rules-based situation detection to recognize schedule conflicts and push/propose options for a resolution. Referring to FIGS. 17A-17D, in the case of scheduling a calendar appointment that conflicts with a timeline event, a user attempts to schedule an appointment 1705 as shown in FIG. 17B (that may be navigated to from UI 1710 in FIG. 17A) in San Francisco during a trade show event that is taking place in Chicago at the same time. The calendar and timeline scheduler herein may display a dialog 1715 stating the conflict in the form of, for example, "You have a Chicago Trade Show Event on this Date" and provide user-selectable resolution recommendations such as:

Change this appointment to a phone call;
Change the date of the San Francisco appointment after the Chicago Trade Show;
Change the date of the San Francisco appointment before the Chicago Trade Show; and
Cancel the appointment.

Figure 17D:

In the present example, the user selects "Cancel the New Appointment" and further invokes the "OK" button 1720 to cause the dialog box 1715 to close, thereby deleting the newly proposed appointment and presenting the UI of FIG. 17D. In some embodiments, the pop-up including the resolution recommendations may, as an addition to the pop-up or as an alternative thereto, inform a user of the recommended resolutions via a text-to-speech functionality.

Figure 18A:
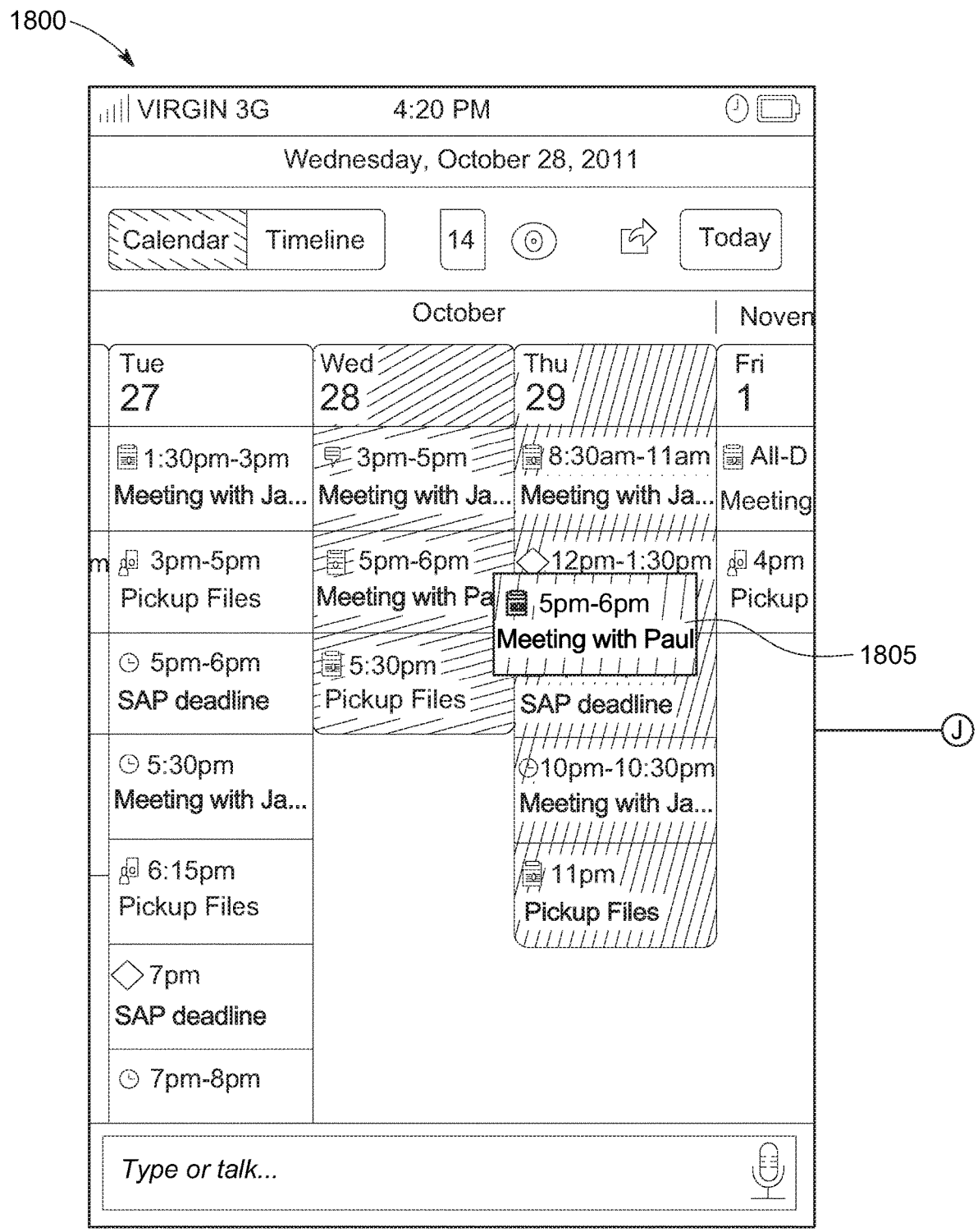
FIGS. 18A-18E include outward views of a displayed user interface, including some aspects related to scheduling conflicts for a calendar event, according to an example embodiment.
Figure 18B:
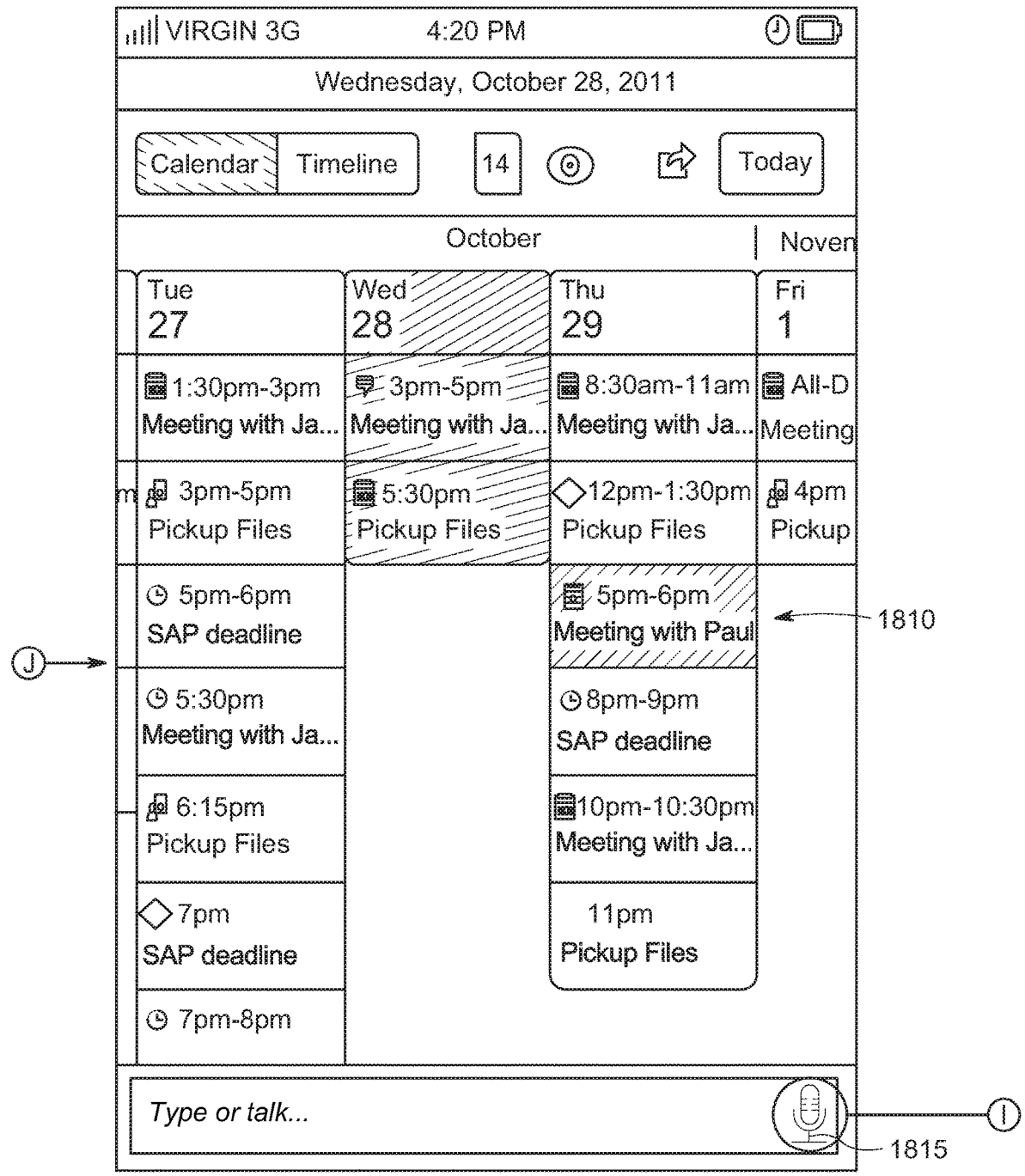
Figure 18C:
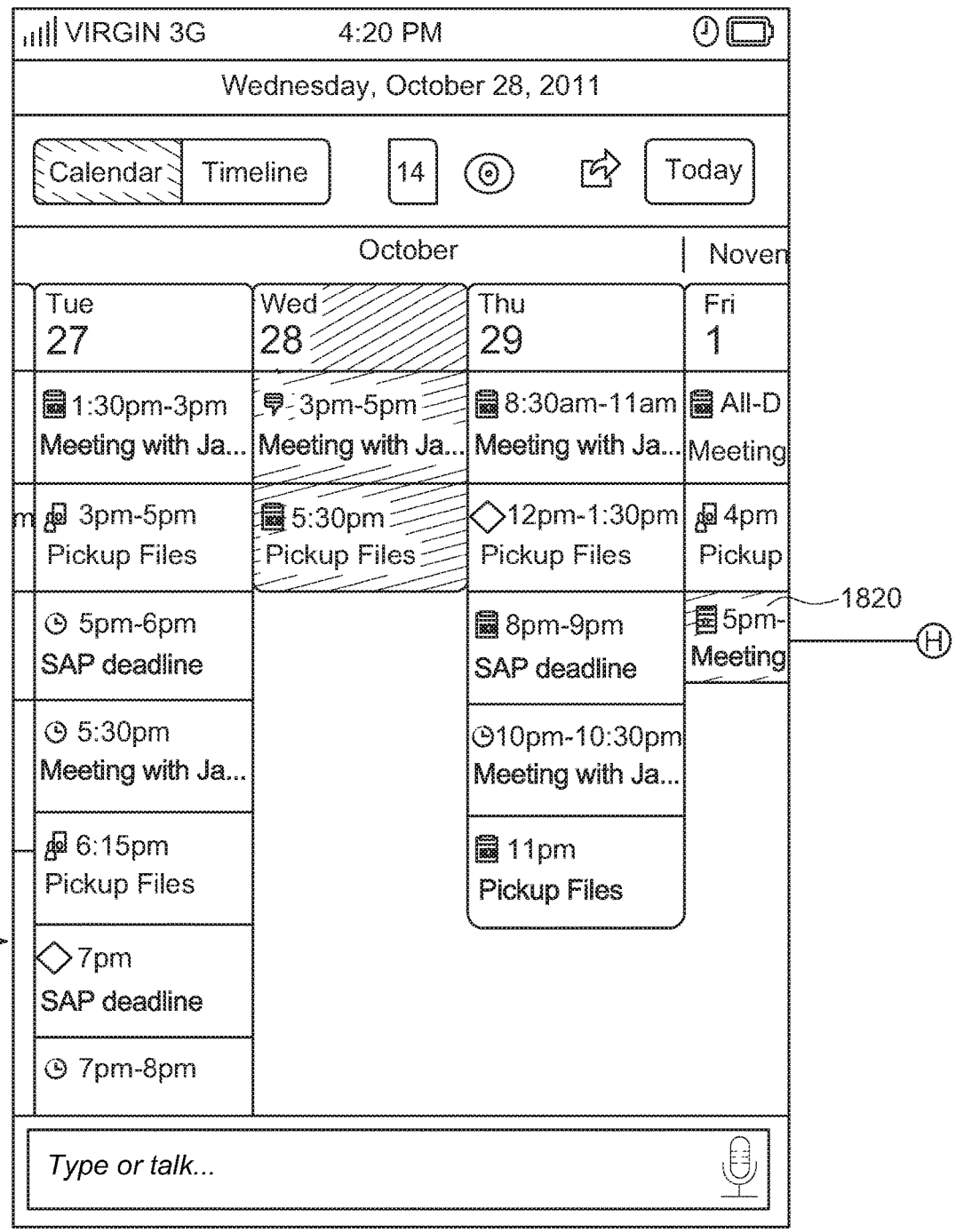
Figure 18D:
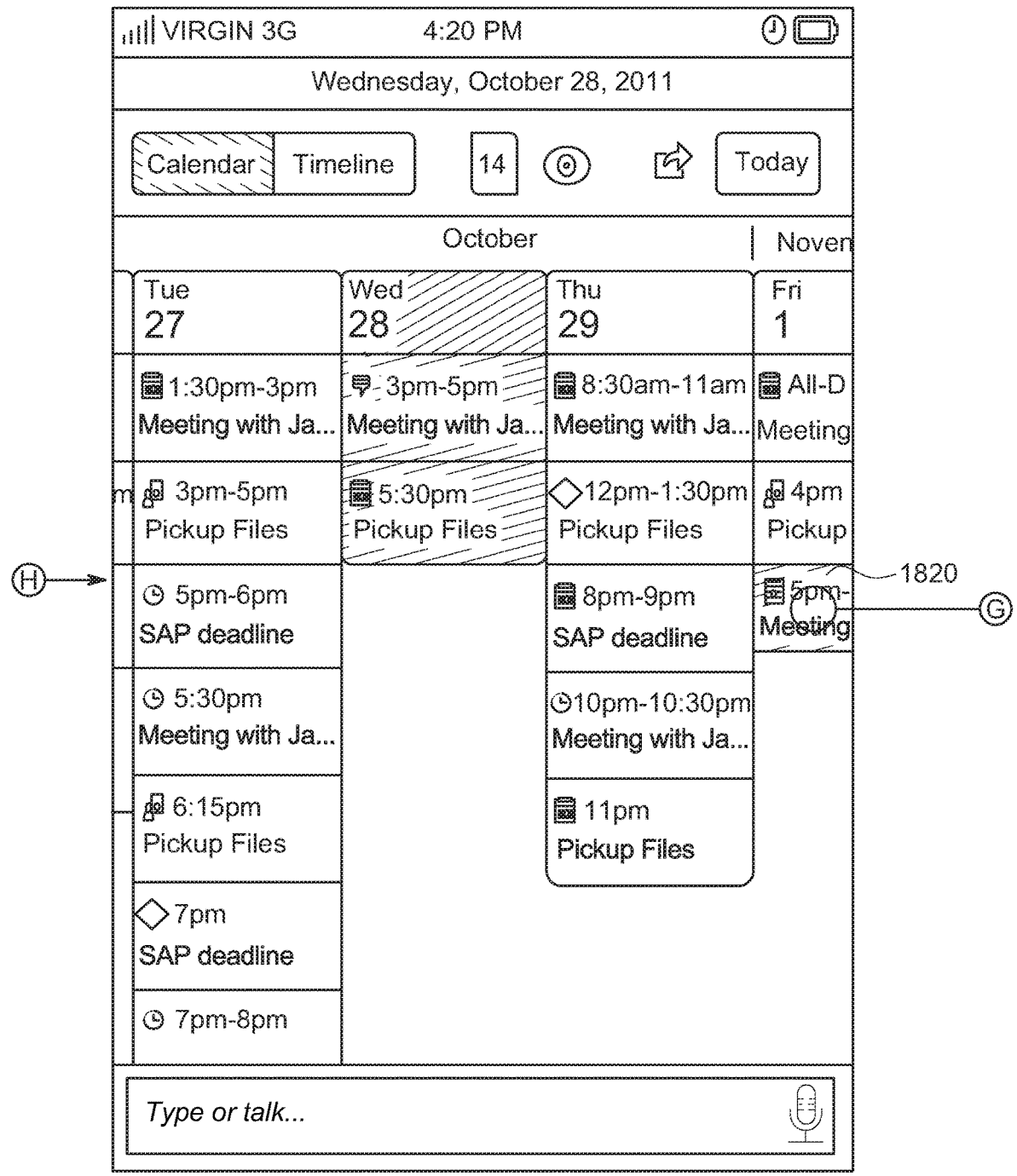
Figure 18E:
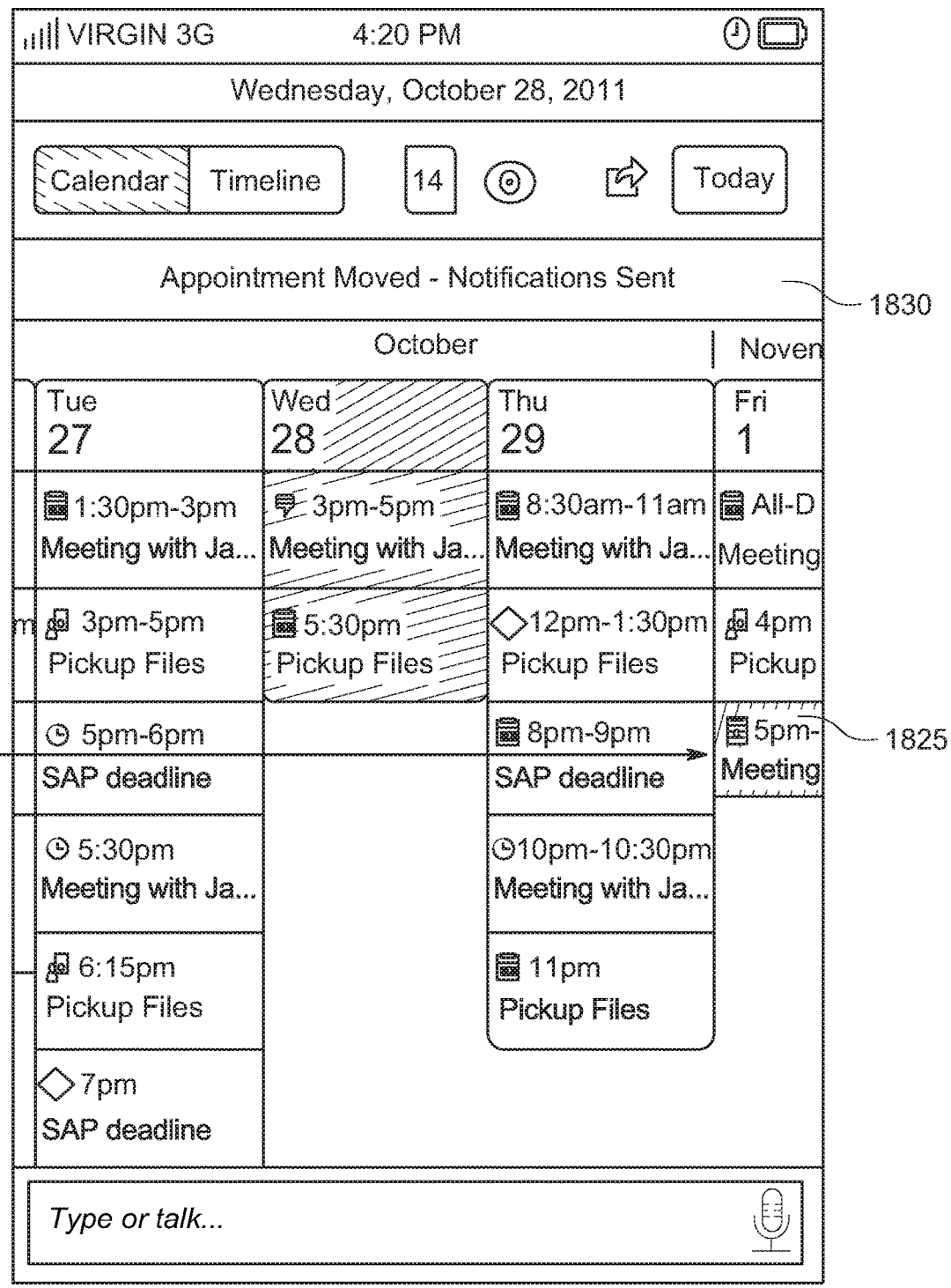

Another scenario relating to scheduling conflicts might include moving an appointment to another day that has a conflicting calendar appointment already scheduled. In this case and referring to FIGS. 18A-18E, a user, via UI 1800, moves a previously scheduled appointment 1805 to the next day (i.e., from Wednesday, $28^{th}$ to Thursday, $29^{th}$ in FIG. 18A) where another appointment is already scheduled for the next day in the appointed time (FIG. 18B). The system detects this conflict and displays the moved appointment 1810 in a RED semantic color. Here, the user inputs a voice prompt, "Sara . . . move this appointment to nearest available day" via natural language input mechanism 1815. In reply, the system moves the appointment to Friday, where it is displayed in a GREEN semantic color (FIG. 18C, 1820) that indicates no conflicts exist with this appointment. In this example, the user has the option to drag appointment 1820 to other days (FIG. 18D), but decides to accept the system's recommendation by selecting the GREEN indicated appointment 1820 that is then displayed in BLUE (FIG. 18E). The BLUE color indicates that the selected appointment is successfully scheduled, as illustrated at 1825. The system may further automatically send the appointment date change notification to the meeting participant(s) and at the same time adds the newly scheduled appointment request to its fetch notifications, which may also cause a display of a fetch banner confirmation 1830.

Figure 19A:
FIGS. 19A-19C include outward views of a displayed user interface, including some aspects to move an appointment to an alternative available day in a calendar view, according to an example embodiment.
Figure 19B:
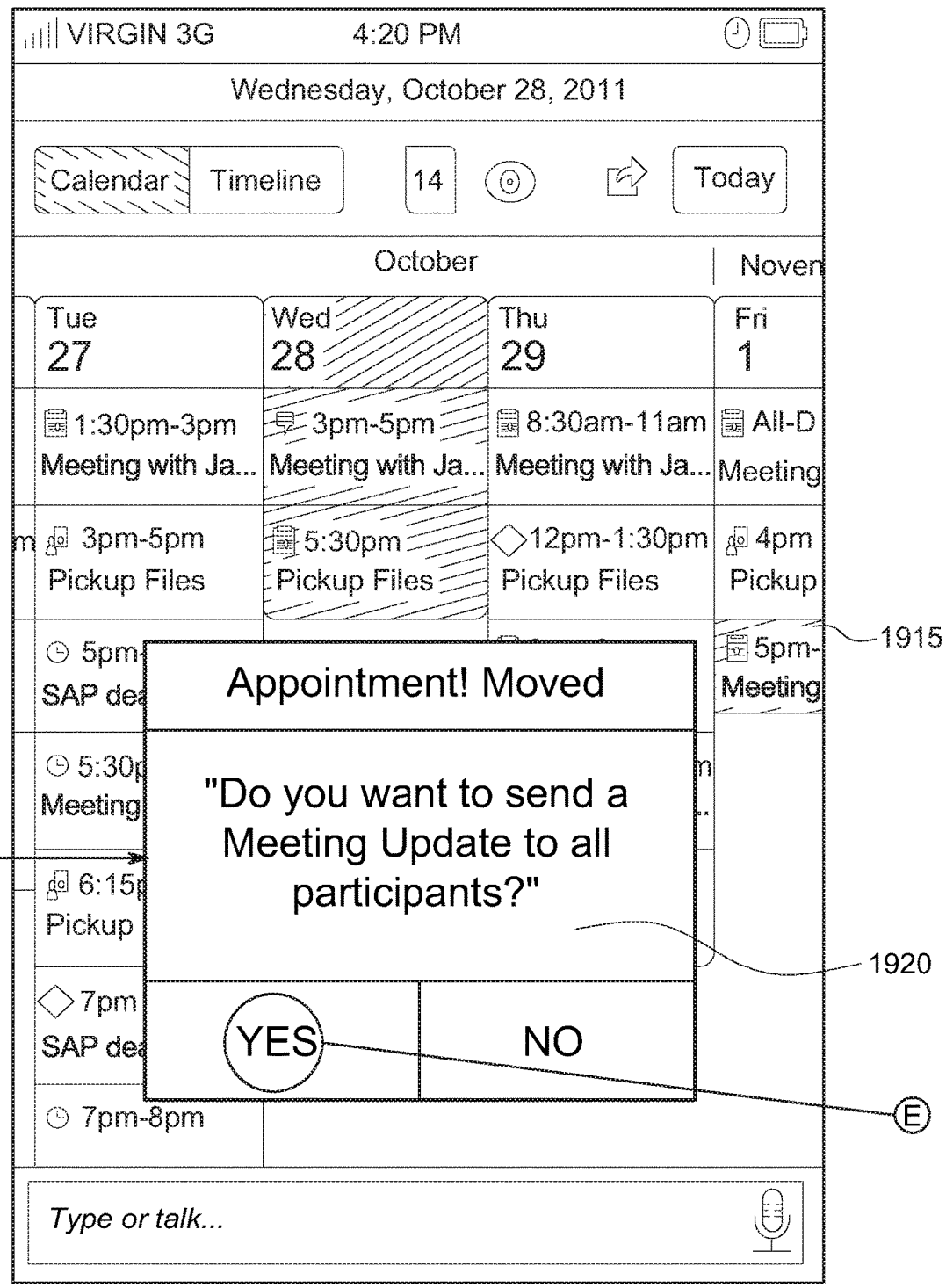
Figure 19C:
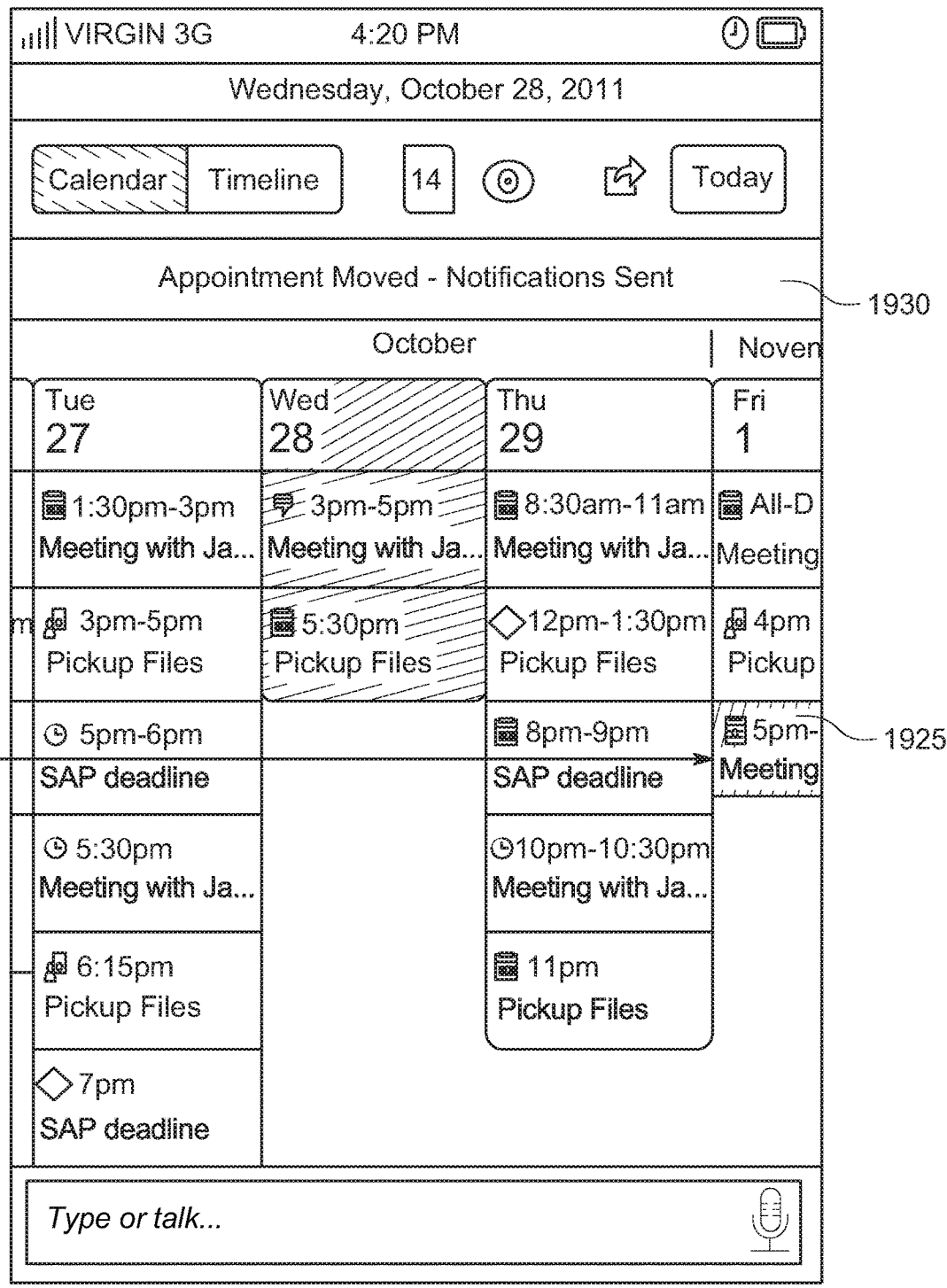

In one example embodiment, voice prompts may be used to move an appointment to an alternative available day. A first example use-case of this type is illustrated in some aspects in FIGS. 19A-19C. Referring to FIG. 19A, a user selects an appointment 1910, taps or clicks on the microphone icon, and then prompts the system to "Move this appointment to the nearest available day" via a natural language input mechanism 1905 in UI 1900. The system understands the user to be referencing the selected appointment as shown at 1910. The calendar and timeline scheduler herein then moves the selected appointment to Friday, November $1^{st}$ with the same scheduled time and a GREEN color. The system also displays a dialog box 1920 that includes the wording, "Do you want to send a Meeting Update to all participants?" and includes user input YES/NO buttons. In response to the user selecting the YES user interface button, the appointment's color is changed to BLUE to indicate the appointed has been scheduled, as shown in FIG. 19C at 1925. Also, an update notification may be entered into the fetch functionality herein, as indicated at 1930, and a notification is sent to the meeting's participants that includes a mechanism for the invited participants to accept, tentatively accept, or decline the meeting. Such participant responses are then communicated to the user and the system via the fetch notification functionality herein.

In some aspects and embodiments herein, the system may recognize the word "Sara" as the name identifier for the calendar/timeline scheduler application. In an embodiment, a user saying the name "Sara" invokes the speech recognition function without the need to click or tap on the microphone icon within the natural language input mechanism (e.g., 1815, 1905). In some embodiments, the particular name identifier may be defined by a user, system administrator, or other entity having the appropriate credentials and/or role relative to the disclosed system.

Figure 20A:
FIGS. 20A-20C include outward views of a displayed user interface, including some aspects to move an appointment to an alternative available day via a natural language input in a calendar view, according to an example embodiment.
Figure 20B:
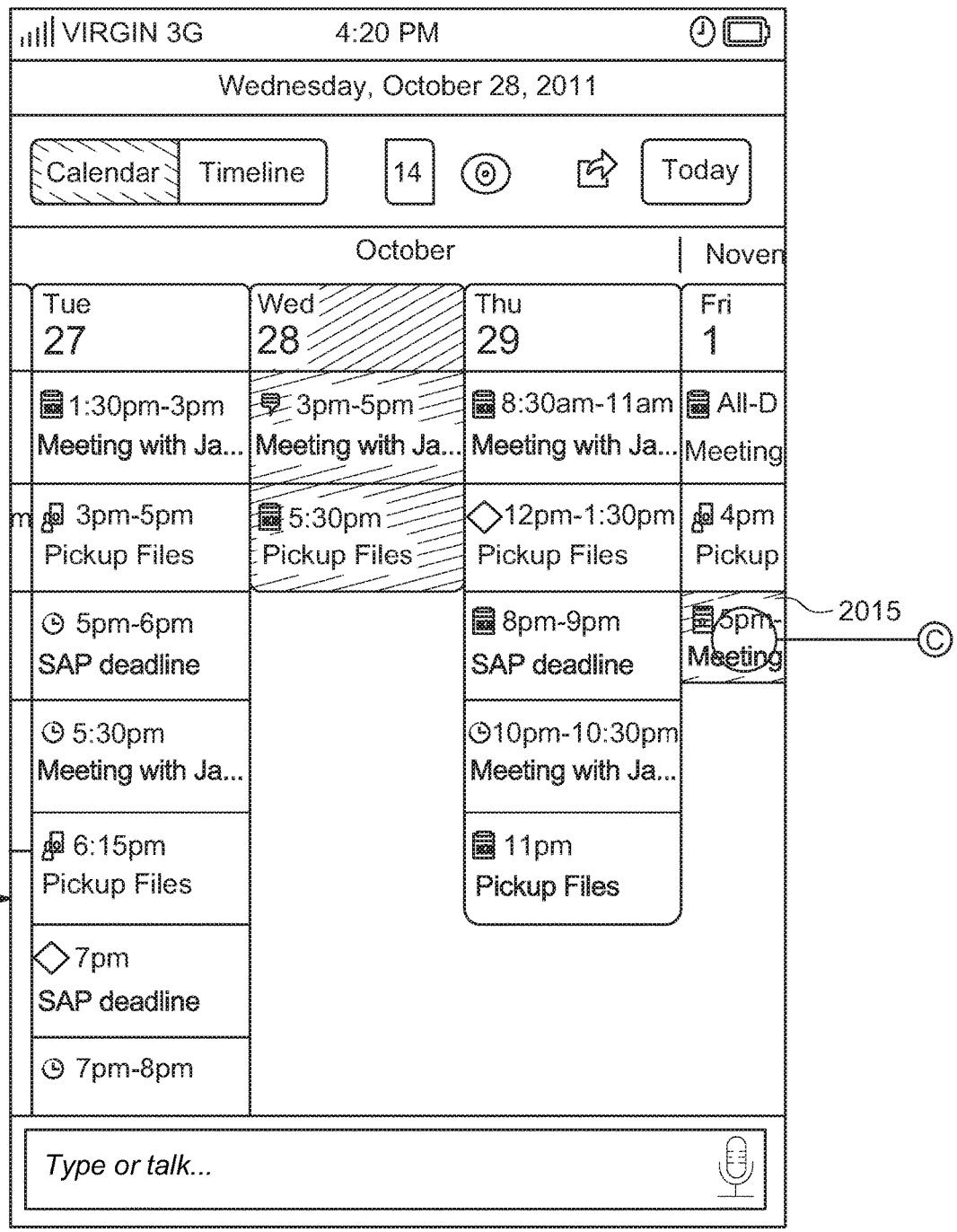
Figure 20C:
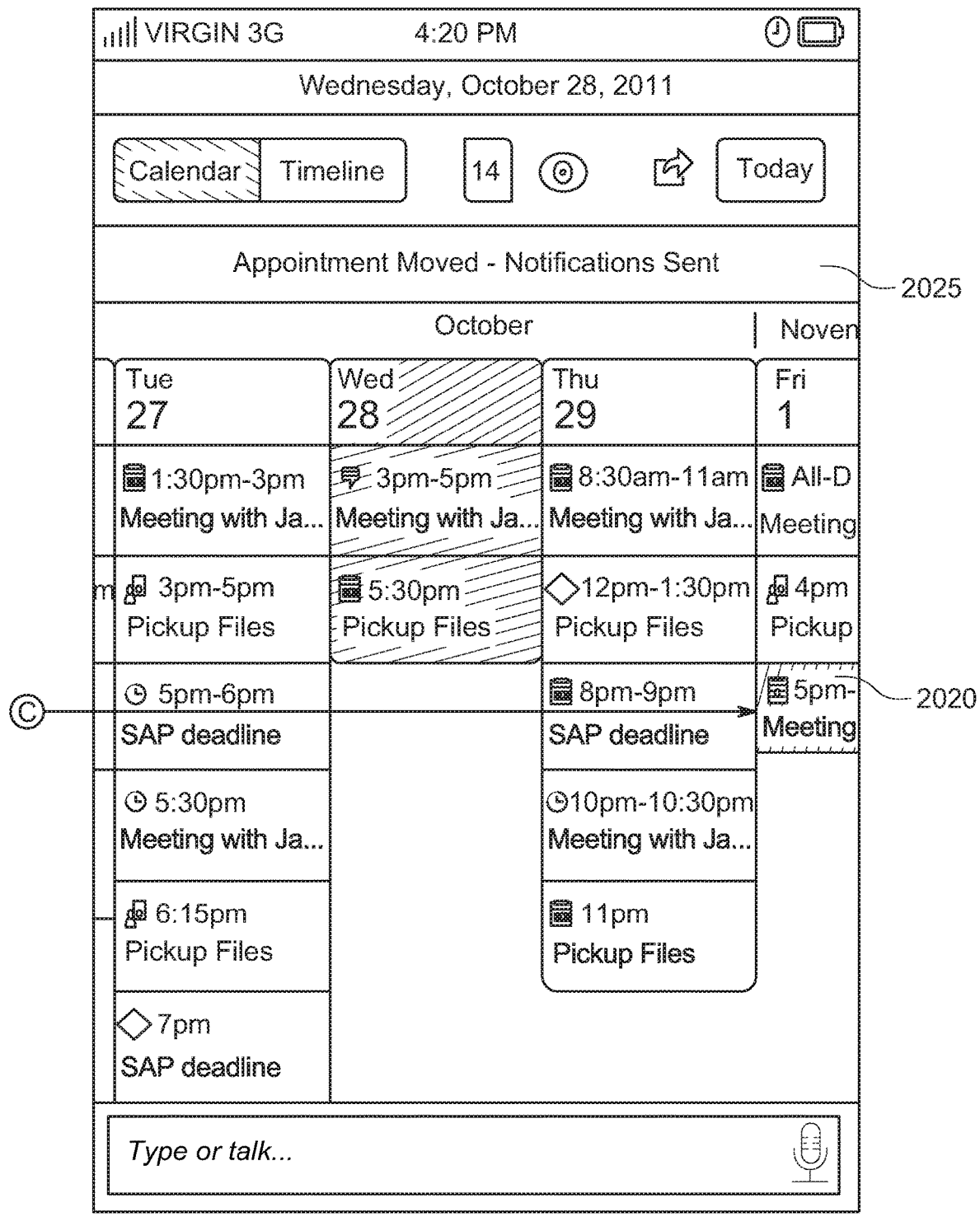

In another example embodiment including voice prompts being used to move an appointment to an alternative available day, FIGS. 20A-20C illustrate a number of aspects of the system disclosed herein. With reference to FIG. 20A, a user inputs a prompt of, "Sara . . . move this appointment to the nearest available day" via a natural language input mechanism 2005 in UI 2000. The system then moves the selected appointment 2010 to Friday, November $1^{st}$ with the same scheduled time but displays it in a GREEN color since it is recommended/available but not yet scheduled. The user accepts this recommendation 2015 by selecting (e.g., clicking on, pressing on, and other UI entry methods) the recommended appointment and the appointment's color is changed to BLUE to indicate the appointed has been scheduled, as shown in FIG. 20C at 2020. Hereto, an updated notification may be entered into the fetch functionality (as indicated in the notification banner at 2025) and a notification is sent to the meeting's participants that includes a mechanism for the invited participants to accept, tentatively accept, or decline the meeting.

Figure 21A:
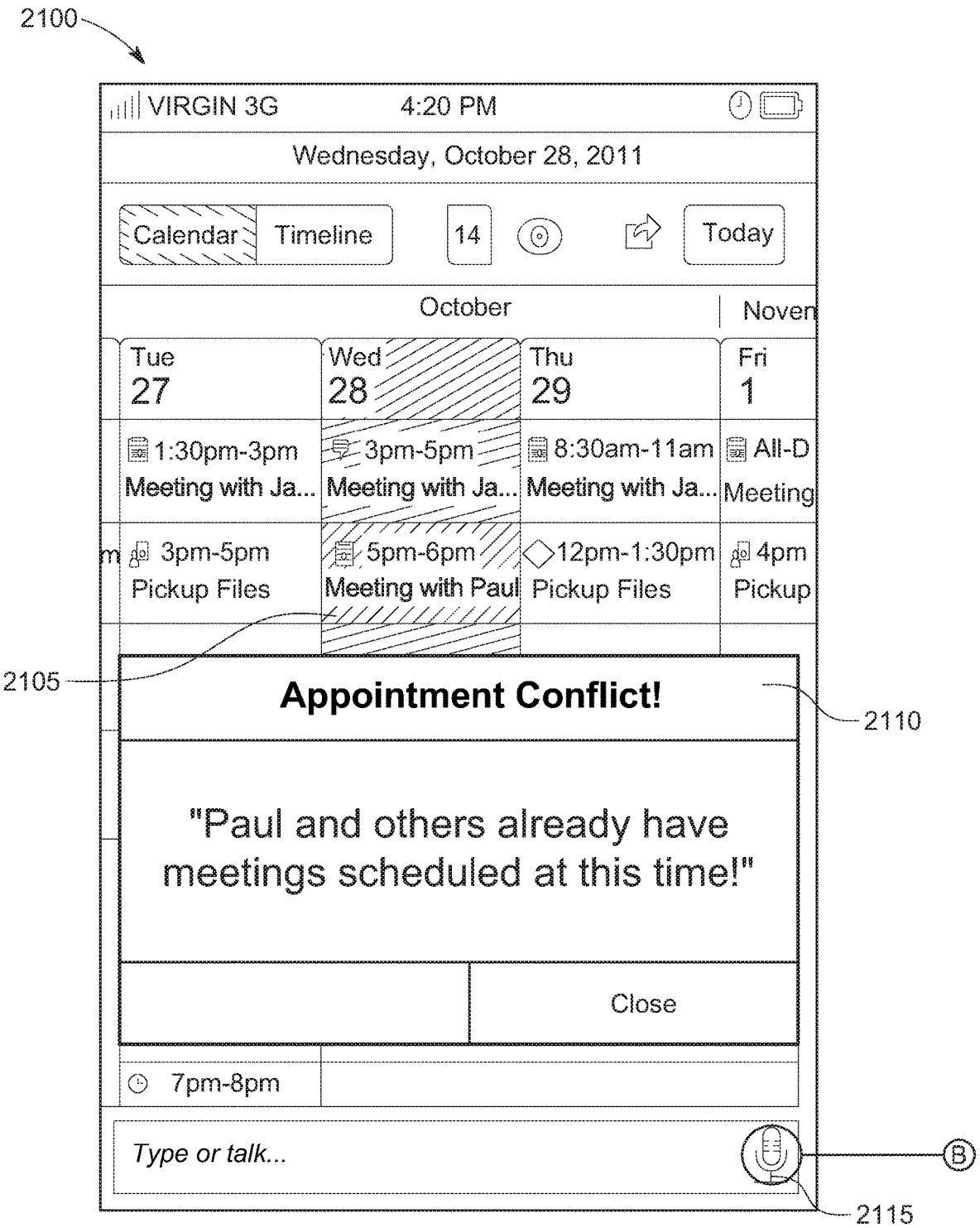
FIGS. 21A-21C include outward views of a displayed user interface, including some aspects related to conflicts in the scheduling of an appointment according to an example embodiment.
Figure 21B:
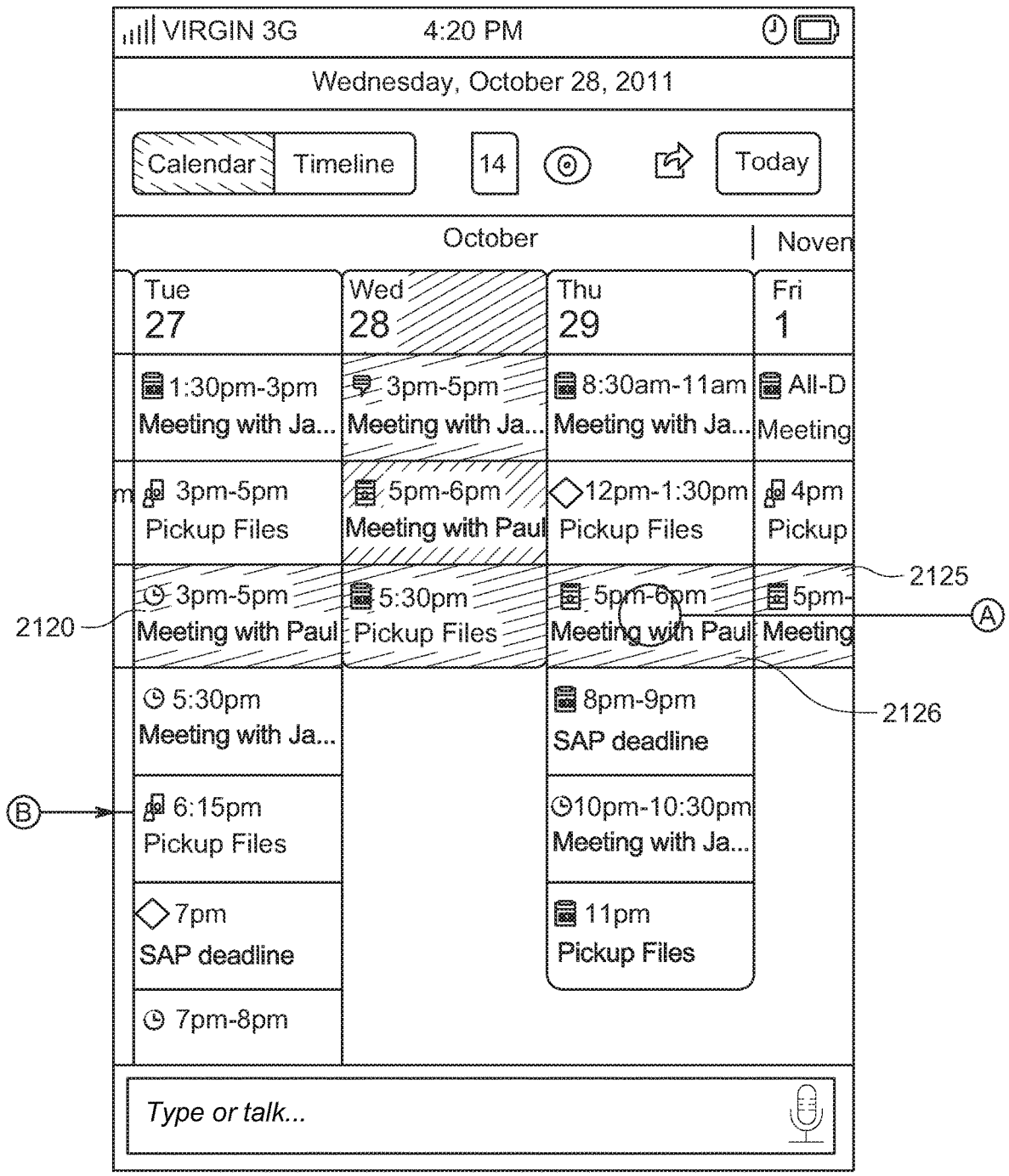
Figure 21C:
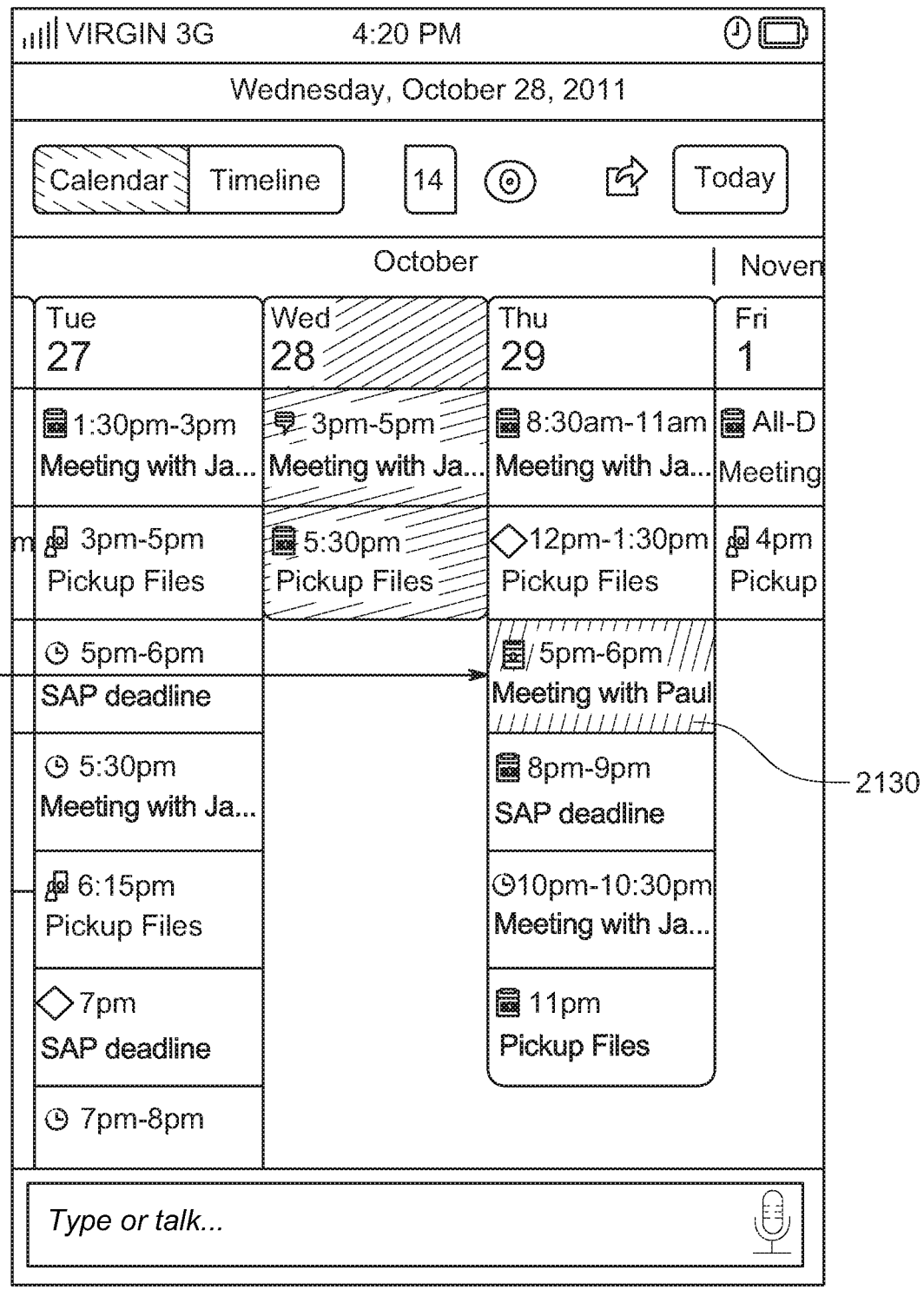

FIGS. 21A-21C relate to scheduling an appointment with one or more participants that have conflicting appointments. In this example, a user creates new appointment with participants that already have a scheduled meeting at the same time as the new appointment, thereby creating conflicts. As the system has insight into both the user's and the participant's calendars, the conflicts are detected and the new appointment is displayed in a RED Semantic color at 2105. Additionally, a UI pop-up is displayed including a conflict dialog 2110 describing the conflict. In reply to the reported conflict, the user may engage the system intelligence via the natural language input mechanism 2115 by providing spoken interactions with the system. In this case, the user states, "Sara . . . show me the nearest optional days for this new appointment that would work". The system then displays optional days 2120, 2126, and 2125 that do not have conflicts with either the participant's or user's calendars in a GREEN semantic color. In this example, the user selects the option of 2126. The system removes the non-selected options (i.e., 2120 and 2125) and displays the selected appointment in the BLUE as shown at 2130 of FIG. 21C to indicate that the appointment is now successfully scheduled. In some embodiments, appointment request(s) are automatically sent to the participant and the fetch functionality herein is updated with the newly scheduled appointment.

Some aspects herein may provide, support, or at least facilitate a responsive and adaptive solution across different types of device platforms (e.g., a desktop computer, a mobile tablet, a smartphone, a wearable device, and other devices and systems), wherein a user's operational actions and views can be both sticky (i.e., persistent) and fully synchronized. In this manner, operations of a user on one platform device can immediately be moved to and resumed on another device (i.e., synchronized) so that the user can resume their interactions with the system at the location where they previously stopped. The user's last location within the system and applications herein can include last used calendar or timeline screen views, actions, etc. In some embodiments, all data is persistently kept intact without a threat of losing entries or their place in a workflow, or even a need for a user to actively execute a "Save" function (i.e., performed automatically as a background job). In some embodiments, the fetch related content can also be persistently maintained and pushed or otherwise distributed to all relevant devices without a need to actively execute refreshes or other actions in order to acquire up-to-date fetch notifications and messages.

Figure 22:
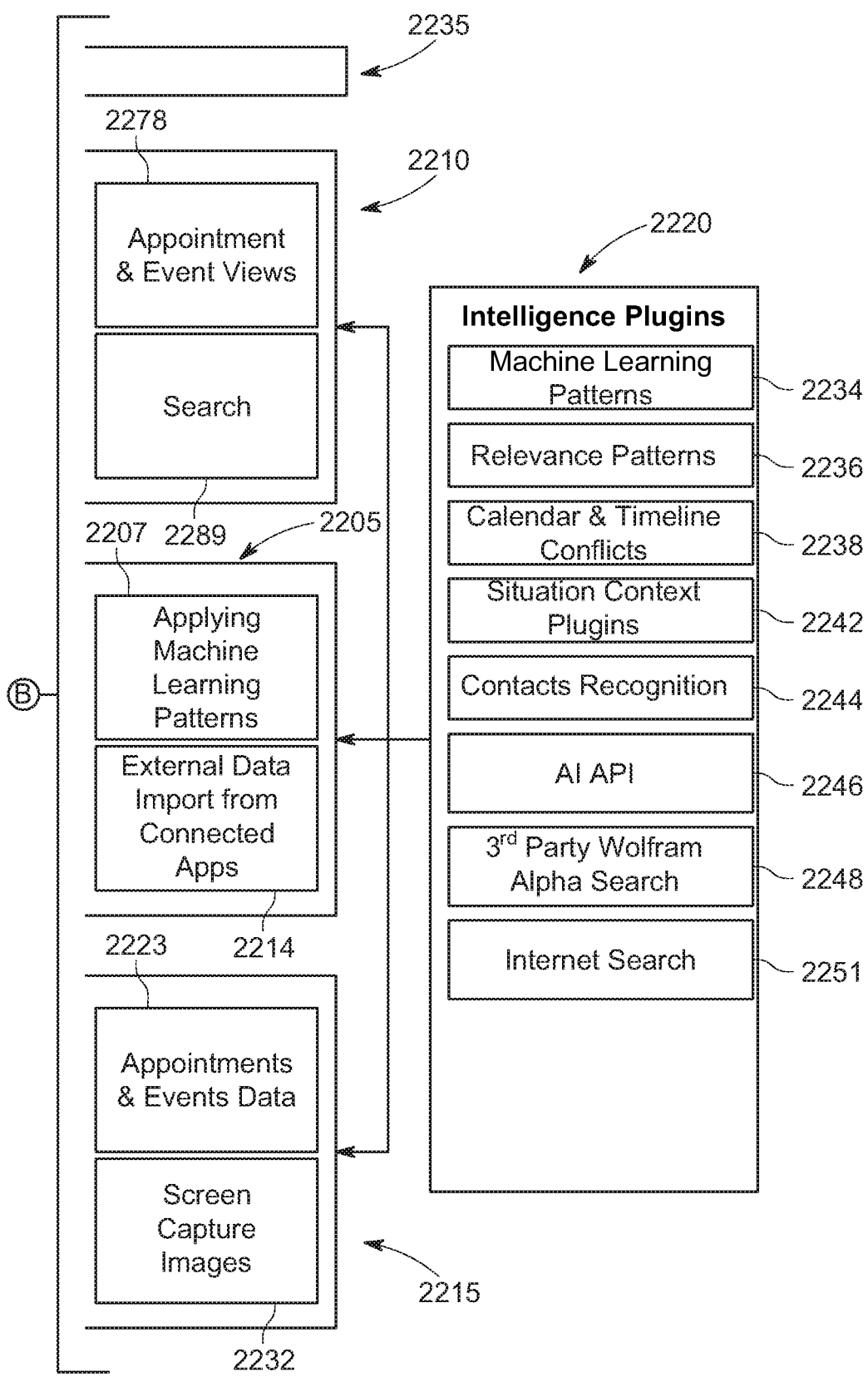
FIG. 22 is an illustrative example of a functional system block diagram, according to an example embodiment.

FIG. 22 is an illustrative depiction of an example functional system diagram 2200 for some embodiments herein. As a representation of a functional diagram, the functions depicted in FIG. 22 may be implemented in one or more devices, systems, and components where the various devices, systems, and components may include one or more hardware and software configurations to perform the particularly illustrated functions discretely or as a combination of functions, depending on a particular implementation. FIG. 22 may encompass the calendar, timeline, and fetch functions (i.e., a "scheduler") disclosed herein that can enable enterprise systems and role-based users with a common, user optimized calendar and timeline solution, in accordance with other aspects herein. In an embodiment, the calendar, timeline, and fetch functions (i.e., a "scheduler") disclosed herein can enable consumer role-based users and application software with a common, user optimized calendar and timeline solution. The calendar and timeline solution, in some embodiments, is operable across different applications and devices (e.g., desktop computer, mobile computing tablet, smartphone, smartwatch, etc.). In accordance with some aspects of the present disclosure, the scheduler may deploy a notification and messaging (i.e., "fetch") framework that logically resides on top of the scheduler to provide a unified, easy-to-use UI for system push and pull notifications, alerts, reminders, messages, content delivery, various calendar and timeline user-relevant time/date contexts, and artifacts, all in an intuitive and highly personalized manner. In some embodiments, aspects and features of the scheduler can be deployed within social networks or network groups of a consumer or an enterprise.

In some aspects, enterprise and consumer users might be constantly manipulating various calendar and timeline views to perform time-related operations, activities, and entries, where a number of those activities may be performed on small-screen devices such as, for example, mobile smartphones and tablets. The scheduler herein includes UIs having corresponding interaction and navigation design features that provide numerous variations for carrying-out the various calendar and timeline workflows disclosed herein. Some of those workflows might include calendar and timeline view changes, parameter and user date/time entries, etc. As highlighted in other portions herein, the scheduler may provide mechanisms for natural voice or text inputs, including but not limited to "instructional" commands or directives that rely on system intelligence to, in some instances, minimize user actions and UI selections, and permit the system to intelligently and automatically carry-out system operations and/or immediately display relevant screen views to users.

Functional system diagram 2200 may support the various features disclosed herein related to a time relevant experience, including enabling a user to experience "time-travel" as the user navigates backwards and forwards through time in the context of the calendar and timeline functions of the present disclosure. As disclosed herein, selecting a time in the future or past may cause a display of transition and animation effects that actually impart a sense of moving through time. In some embodiments for example, instead of simply snapping to a new screen view, the scheduler herein (interchangeably) uses one or more of horizontal and/or vertical screen animations (depending, for example, on device orientations, configurations, capabilities, and displayed views) to provide users with an actual context-awareness of time. This feature delivers an additional dimension to the user's experience with the system, while maintaining the user's contextual "time-focus" as they and the system herein operate, navigate, and execute the disclosed calendar and timeline processes.

Functional system diagram 2200 may generally include a logic layer 2205; a UI interactions, composite views, user prompts, and actions (i.e., UI interactions) layer 2210; a data modeling layer 2215; intelligence plugins 2220; and input/output (I/O) plugins layer 2225 that are coupled to logic layer 2205, UI interactions layer 2210, and data modeling layer 2215; and a responsive adaptive UI layer 2235 that facilitates communication between UI interaction layer 2210 and external user devices 2230.

In the example embodiment of FIG. 22, logic layer 2205 includes a plurality of functional modules or features, including a Rules & Error Detection Engine 2201, a User Instruction & Navigation Patterns function 2202, a Navigation Pattern Animations & Decision Paths function 2203, a Natural Language Relevance Analysis feature 2204, a Natural Language Vocabulary & Library feature 2206, an Applying Machine Learning Patterns feature 2207, a Priority & Relevance Determination Engine feature 2208, a Real-Time Clock & Time Relevance feature 2209, a Fetch Logic & Settings feature 2211, a View Logic feature 2213, and a Settings Executions feature 2214. The functionality provided by each of these functional features may be generated, executed, or facilitated by one or more devices, systems, and apparatuses.

Regarding the UI interactions layer 2210, this logic layer includes, in the example of FIG. 22, functional features or components for Text & Voice Prompts 2271, Manual Selections, Navigations & Animations 2272, Automated Navigations & Transition Animations 2273, Calendar Views & Date Selections 2274, Timeline Views & Zooming 2276, Appointment & Event Views 2278, Fetch Notifications, Alerts & Filter & Messaging 2281, Date & Time Pickers 2282, Timeline Task & Sub-Task Creator & Editing 2284, Settings & Theming & Semantic Color Selection 2286, User Roles and Permissions 2288, and Search functionality as shown at 2289.

Data modeling layer 2215 includes the following functions of Rules-Based Situation Detection 2216, External Content Plugins 2218, Contacts (Internal & External) Plugins 2219, Semantic Vocabulary & Routing 2221, User Profile & Role Data 2222, Appointments & Events Data 2223, External & IoT (Internet of Things) Data 2224, Holidays & Business Specific Dates 2226, Business Data 2228, Fetch Data 2229, External Application Data 2231, and function Screen Capture Images 2232.

Intelligence plugins 2220 are coupled to and used by the logic layer 2205, UI interactions layer 2210, and data modeling layer 2215 to perform the functions thereof. In the example of FIG. 22, intelligence plugins 2220 include Machine Learning Patterns plugin 2234, Relevance Patterns plugin 2236, Calendar & Timeline Conflicts plugin 2238, Situation Context Plugins plugin 2242, Contacts Recognition plugin 2244, AI (Artificial Intelligence) API plugin 2246, Third-Party search engine (e.g. Wolfram Alpha) Search plugin 2248, and Internet Search plugin 2251.

I/O plugins 2225 are coupled to and used by the logic layer 2205, UI interactions layer 2210, and data modeling layer 2215 to perform the functions thereof. In FIG. 22, I/O plugins 2225 include Speech Recognition plugin 2252, Connected Apps plugin 2254, External Email plugin 2256, Device Email plugin 2258, Device Calendar plugin 2261, Device Language Translation plugin 2262, Native Device Voice Recognition plugin 2263, Native Device Speech Synthesis plugin 2264, Native Device Screen Capture plugin 2268, and Native Device Clock plugin 2269.

The external user devices 2230 may include, as shown in the example of FIG. 22, a Desktop Browser 2291, Mobile Tablets 2292, Smartphones 2293, Mobile Native Apps 2294, and Mobile Hybrid Apps 2296. The external user devices 2230 are not limited to the devices specifically shown in FIG. 22 and may include additional, fewer, and alternative devices.

Certain embodiments are described herein as including logic or a number of components, modules, or mechanisms. Modules may constitute either software modules (e.g., code embodied on a tangible machine-readable medium) or hardware modules. A "hardware module" herein refers to a tangible unit capable of performing certain operations and may be configured or arranged in a certain physical manner. In various example embodiments, one or more computer systems (e.g., a standalone computer system, a client computer system, or a server computer system, etc.) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combinations thereof. Examples of a hardware module may include dedicated circuitry or logic that is permanently configured to perform certain operations. For example, a hardware module of a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) technically improved and uniquely tailored to perform the configured functions and, as such, are no longer general-purpose processors. It will be appreciated that the decision to implement a hardware module mechanically, in dedicated and permanently configured circuitry, or in temporarily configured circuitry (e.g., configured by software) may be driven by cost and time considerations.

The phrase "hardware module" should be understood to encompass a tangible entity, whether that entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules herein may be regarded as being communicatively coupled. Where multiple hardware modules exist contemporaneously, communications may be achieved through signal transmissions (e.g., over appropriate circuits and buses) between or among two or more of the hardware modules. In embodiments in which multiple hardware modules may be configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example processes disclosed herein may be performed, at least partially, by one or more processors that are temporarily (e.g., by software) or permanently configured to perform the relevant operations. Whether temporarily or permanently configured, such processors may constitute processor-implemented modules that operate to perform one or more operations or functions described herein. As used herein, a "processor-implemented module" refers to a hardware module implemented using one or more processors.

The processes described herein may be at least partially processor-implemented, with a particular processor or processors being an example of hardware. For example, at least some of the operations of a process may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations herein may be distributed among the multiple processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, processes, applications, services, and the like described in conjunction with other descriptions and diagrams herein may be implemented, in some embodiments, in the context of a machine and an associated software architecture. The following descriptive disclosure describes representative software architecture(s) and machine (e.g., hardware) architecture(s) that are suitable for use with the disclosed example embodiments.

Software architectures are used in conjunction with hardware architectures to create devices and machines tailored to particular purposes. For example, a particular hardware architecture coupled with a particular software architecture can create a mobile device, such as a mobile phone, tablet device, or so forth. Different combinations and variations of hardware and software architecture may yield a smart device for use in, for example, the "internet of things" (IoT), while yet another combination produces a server computer for use within a cloud computing architecture. Not all combinations of such software and hardware architectures are presented here, as those of skill in the art can readily understand how to implement the inventive subject matter in different contexts from the disclosure contained herein, without undue experimentation.

Figure 23:
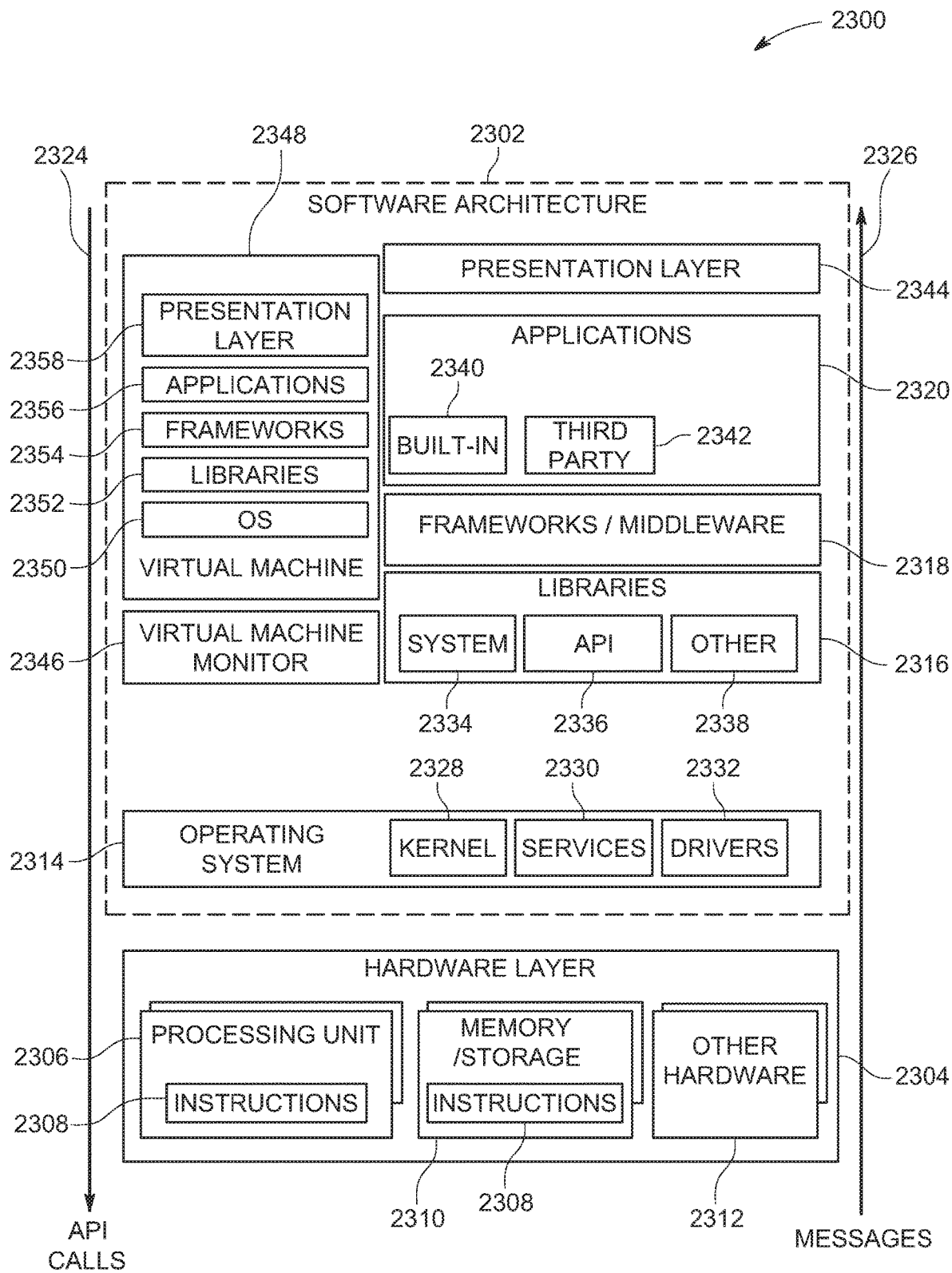
FIG. 23 is an illustrative example of a block diagram of a software architecture, according to an embodiment.

FIG. 23 is a block diagram 2300 illustrating a representative software architecture 2302 that may be used in conjunction with various hardware architectures described herein. FIG. 23 is presented as a non-limiting example of a software architecture, and it will be appreciated that many other architectures may be implemented to facilitate the functionalities disclosed herein. Software architecture 2302 may execute hardware such as a machine 2400 of FIG. 24 that includes, inter alia, processors 2410, memory/storage 2430, and I/O components 2450. A representative hardware layer 2304 is illustrated and can represent, for example, machine 2400 of FIG. 24. Representative hardware layer 2304 includes one or more processing units 2306 having associated executable instructions 2308. Executable instructions 2308 represent the executable instructions of the software architecture 2302, including implementation of the processes, modules, and functionalities disclosed herein and the accompanying drawings. Hardware layer 2304 includes memory and/or storage modules 2310 that also includes executable instructions 2308. Hardware layer 2304 may also include other hardware 2312 that represents any other hardware of the hardware layer 2304, such as, for example, the other hardware aspects illustrated as part of machine 2400.

In the example architecture of FIG. 23, software architecture 2302 may be conceptualized as a stack of layers where each layer provides particular functionality. For example, software architecture 2302 may include layers such as an operating system 2314, libraries 2316, frameworks/middleware 2318, applications 2320, and a presentation layer 2344. Operationally, applications 2320 and/or other components within the layers may invoke API calls 2324 through the software stack and receive responses, returned values, and so forth, illustrated as messages 2326, in response to the API calls 2324. The layers illustrated are representative in nature and not all software architectures have all layers. For example, some mobile or special purpose operating systems may not provide a layer of frameworks/middleware 2318, while others may provide such a layer. Other software architectures may include additional or different layers.

The operating system 2314 may manage hardware resources and provide common services. The operating system 2314 may include, for example, a kernel 2328, services 2330, and drivers 2332. The kernel 2328 may act as an abstraction layer between the hardware and the other software layers. For example, the kernel 2328 may be responsible for memory management, processor management (e.g., scheduling), component management, networking, security settings, and so on. Services 2330 may provide other common services for the other software layers. Drivers 2332 may be responsible for controlling or interfacing with the underlying hardware. For instance, drivers 2332 may include display drivers, camera drivers, BLUETOOTH® drivers, flash memory drivers, serial communication drivers (e.g., Universal Serial Bus (USB) drivers), WI-FI® drivers, audio drivers, power management drivers, and so forth depending on the hardware configuration.

Libraries 2316 may provide a common infrastructure that may be utilized by applications 2320 and/or other components and/or layers. Libraries 2316 typically provide functionality that allows other software modules to perform tasks in an easier fashion than by interfacing directly with the underlying operating system 2314 functionality (e.g., kernel 2328, services 2330, and/or drivers 2332). Libraries 2316 may include system libraries 2334 (e.g., C standard library) that may provide functions such as memory allocation functions, string manipulation functions, mathematic functions, and the like. Libraries 2316 may include API libraries 2336 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLITE that may provide various relational database functions), web libraries (e.g., WEBKIT that may provide web browsing functionality), and the like. Libraries 2316 may also include a wide variety of other libraries 2338 to provide many other APIs to applications 2320 and other software components/modules.

Frameworks 2318 (also sometimes referred to as middleware) may provide a higher-level common infrastructure that may be utilized by applications 2320 and/or other software components/modules. For example, frameworks 2318 may provide various graphic user interface (GUI) functions, high-level resource management, high-level location services, and so forth. Frameworks 2318 may provide a broad spectrum of other APIs that may be utilized by applications 2320 and/or other software components/modules, some of which may be specific to a particular operating system or platform.

Applications 2320 include built-in applications 2340 and/or third party applications 2342. Examples of representative built-in applications 2340 may include, but are not limited to, a contacts application, a browser application, a book reader application, a location application, a media application, a messaging application, and/or a game application. Third party applications 2342 may include any of the built-in applications 2340 as well as a broad assortment of other applications. In a specific example, third party application 2342 (e.g., an application developed using the ANDROID™ or IOS™ software development kit (SDK) by an entity other than the vendor of the particular platform) may be mobile software running on a mobile operating system such as IOS™, ANDROID™' WINDOWS® PHONE, or other mobile operating systems. In this example, third party application 2342 may invoke the API calls 2324 provided by the mobile operating system such as operating system 2314 to facilitate functionality described herein.

Applications 2320 may utilize built-in operating system 2314 functions (e.g., kernel 2328, services 2330, and/or drivers 2332), libraries 2316 (e.g., system libraries 2334, API libraries 2336, and other libraries 2338), and frameworks/middleware 2318 to create user interfaces to interact with users of the system. Alternatively, or additionally, in some systems, interactions with a user may occur through a presentation layer, such as the presentation layer 2344. In these systems, the application/module "logic" can be separated from the aspects of the application/module that interact with a user.

Some software architectures utilize virtual machines. In the example of FIG. 23, this is illustrated by a virtual machine 2348. A virtual machine creates a software environment where applications/modules can execute as if they were executing on a hardware machine (such as the machine 2400 of FIG. 24, for example). A virtual machine is hosted by a host operating system (e.g., operating system 2314 in FIG. 23) and typically, although not always, has a virtual machine monitor 2346 that manages the operation of virtual machine 2348, as well as the interface with the host operating system (e.g., operating system 2314). A software architecture executes within virtual machine 2348, such as an operating system 2350, libraries 2352, frameworks/middleware 2354, applications 2356, and/or a presentation layer 2358. These layers of software architecture executing within virtual machine 2348 may be the same as corresponding layers previously described or may be different.

Figure 24:
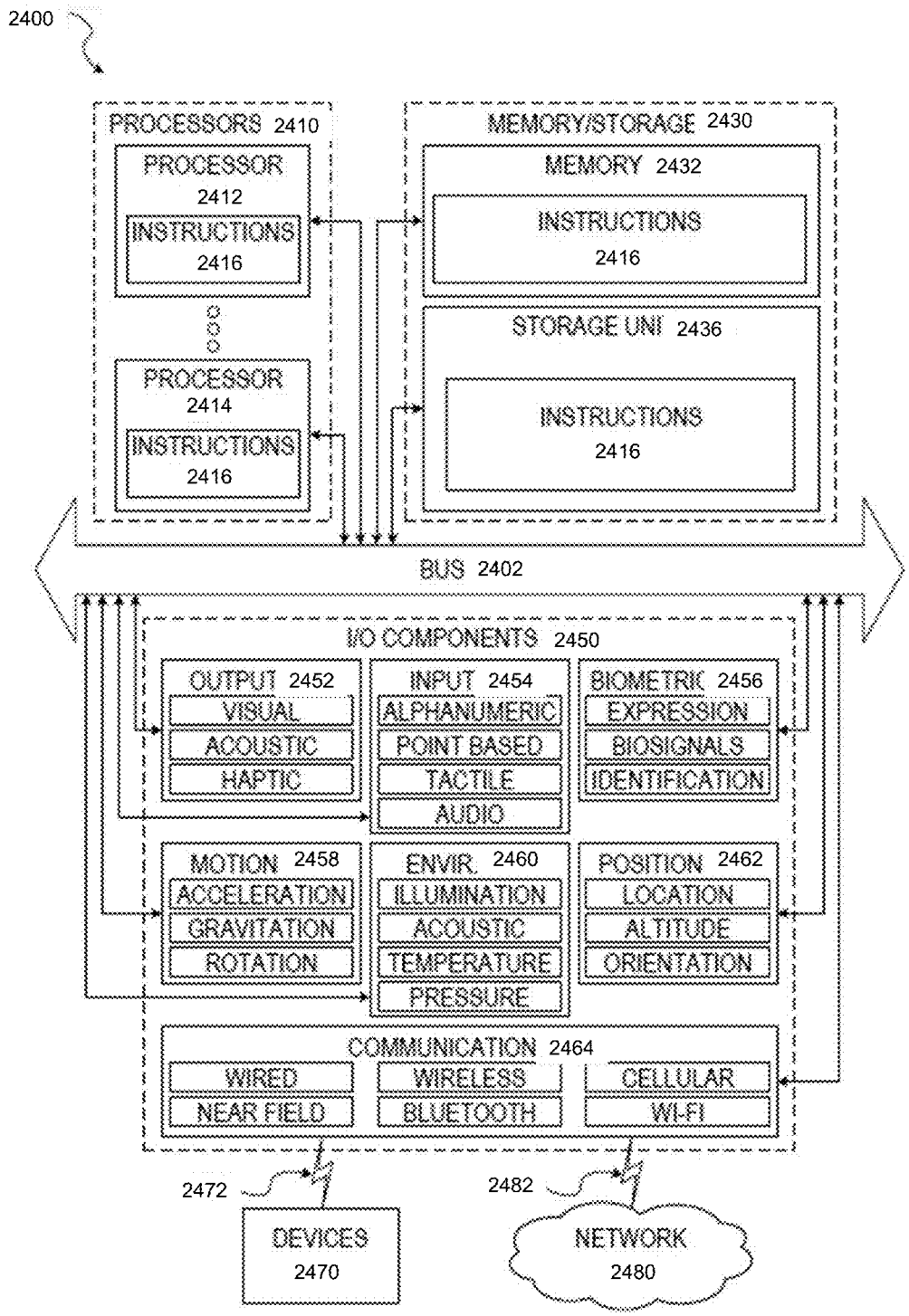
FIG. 24 is an illustrative example of a system, according to an example embodiment.

FIG. 24 is a block diagram illustrating components of a machine 2400, according to some example embodiments, that is able to read instructions from a machine-readable medium (e.g., a machine-readable storage medium) and perform any one or more of the processes discussed herein. Specifically, FIG. 24 shows an illustrative diagrammatic representation of machine 2400 in the example form of a computer system, within which instructions 2416 (e.g., software, a program, an application, an applet, an app, or other executable code) for causing the machine 2400 to perform any one or more of the processes disclosed herein may be executed. Instructions 2416 transform the general, non-programmed machine into a particular machine that is technically improved and programmed to carry out the described and illustrated functions in the manner described. In alternative embodiments, machine 2400 operates as a standalone device or may be coupled (e.g., networked) to other machines. In a networked deployment, machine 2400 may operate in the capacity of a server machine or a client machine in a server-client network environment, or as a peer machine in a peer-to-peer (or distributed) network environment. Machine 2400 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smartwatch), a smart home device (e.g., a smart appliance), other smart devices, a web appliance, a network router, a network switch, a network bridge, or any machine capable of executing instructions 2416, sequentially or otherwise, that specify actions to be taken by the machine 2400. Further, while only a single machine 2400 is illustrated in FIG. 24, the term "machine" herein shall be taken to include a collection of machines 2400 that individually or jointly execute instructions 2416 to perform any one or more of the processes discussed herein.

Machine 2400 may include processors 2410, memory/storage 2430, and I/O components 2450 that may be configured to communicate with each other such as via a bus 2402. In an example embodiment, processors 2410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2412 and a processor 2414 that may execute the instructions 2416. The term "processor" is includes multi-core processors that may comprise two or more independent processors (sometimes referred to as "cores") that may execute instructions contemporaneously. Although FIG. 24 shows multiple processors 2410, machine 2400 may include a single processor with a single core, a single processor with multiple cores (e.g., a multi-core processor), multiple processors with a single core, multiple processors with multiples cores, or any combination thereof.

Memory/storage 2430 may include a memory 2432, such as a main memory, or other memory storage, and a storage unit 2436, both accessible to the processors 2410 such as via the bus 2402. Storage unit 2436 and memory 2432 store the instructions 2416 embodying any one or more of the methodologies or functions described herein. Instructions 2416 may also reside, completely or partially, within memory 2432, within storage unit 2436, within at least one of processors 2410 (e.g., within the processor's cache memory), or any suitable combination thereof, during execution thereof by the machine 2400. Accordingly, memory 2432, storage unit 2436, and the memory of the processors 2410 are examples of machine-readable media.

As used herein, "machine-readable medium" refers to a tangible device capable of storing instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions 2416. The term "machine-readable medium" shall also be taken to include any tangible medium, or combination of multiple media, that is capable of storing instructions (e.g., instructions 2416) for execution by a machine (e.g., machine 2400), such that the instructions, when executed by one or more processors of the machine (e.g., processors 2410), cause the machine to perform any one or more of the methodologies described herein. Accordingly, a "machine-readable medium" refers to a single tangible storage apparatus or device, as well as "cloud-based" storage systems or storage networks that include multiple storage apparatus or devices. The term "machine-readable medium" excludes signals per se.

I/O components 2450 may include a wide variety of components to receive input, provide output, produce output, transmit information, exchange information, capture measurements, and so on. The specific I/O components 2450 that are included in a particular machine will depend on the type of machine. For example, portable machines such as mobile phones will likely include a touch input device or other such input mechanisms, while a headless server machine will likely not include such a touch input device. It will be appreciated that I/O components 2450 may include many other components that are not shown in FIG. 24. I/O components 2450 are grouped according to functionality merely for simplifying the following discussion and the grouping is in no way limiting. In various example embodiments, I/O components 2450 may include output components 2452 and input components 2454. Output components 2452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. Input components 2454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

I/O components 2450 may include, in some embodiments, biometric components 2456, motion components 2458, environmental components 2460, or position components 2462, among a wide array of other components. For example, biometric components 2456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. Motion components 2458 may include acceleration sensor components (e.g., accelerometer), gravitation sensor components, rotation sensor components (e.g., gyroscope), and so forth. Environmental components 2460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. Position components 2462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication to and from machine 2400 may be implemented using a wide variety of technologies. I/O components 2450 may include communication components 2464 operable to couple the machine 2400 to a network 2480 or devices 2470 via a coupling 2482 and a coupling 2472, respectively. For example, communication components 2464 may include a network interface component or other suitable device to interface with network 2480. In further examples, communication components 2464 may include wired communication components, wireless communication components, cellular communication components, Near Field Communication (NFC) components, BLUETOOTH® components (e.g., BLUETOOTH® Low Energy), WI-FI® components, and other communication components to provide communication via other modalities. Devices 2470 may be another machine or any of a wide variety of peripheral devices (e.g., a peripheral device coupled via a USB).

Communication components 2464 may detect identifiers or include components operable to detect identifiers. For example, communication components 2464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as QUICK RESPONSE (QR) code, AZTEC code, DATA MATRIX, DATAGLYPH, MAXICODE, PDF417, Ultra Code, UCC RSS-2D bar code, and other optical codes), or acoustic detection components (e.g., microphones to identify tagged audio signals). In addition, a variety of information may be derived via communication components 2464, such as location via Internet Protocol (IP) geolocation, location via Wi-Fi® signal triangulation, location via detecting an NFC beacon signal that may indicate a particular location, and the like.

In various example embodiments, one or more portions of network 2480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, network 2480 or a portion of network 2480 may include a wireless or cellular network and the coupling 2482 may be a Code Division Multiple Access (CDMA) connection, a Global System for Mobile communications (GSM) connection, or another type of cellular or wireless coupling. In this example, the coupling 2482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

Instructions 2416 may be transmitted or received over network 2480 using a transmission medium via a network interface device (e.g., a network interface component included in communication components 2464) and utilizing any one of a number of well-known transfer protocols (e.g., HTTP). Instructions 2416 may be transmitted or received using a transmission medium via the coupling 2472 (e.g., a peer-to-peer coupling) to devices 2470. The term "transmission medium" shall be taken to include any intangible medium that is capable of storing, encoding, or carrying instructions 2416 for execution by machine 2400, and includes digital or analog communications signals or other intangible media to facilitate communication of such software. The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein. All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Figure 25:
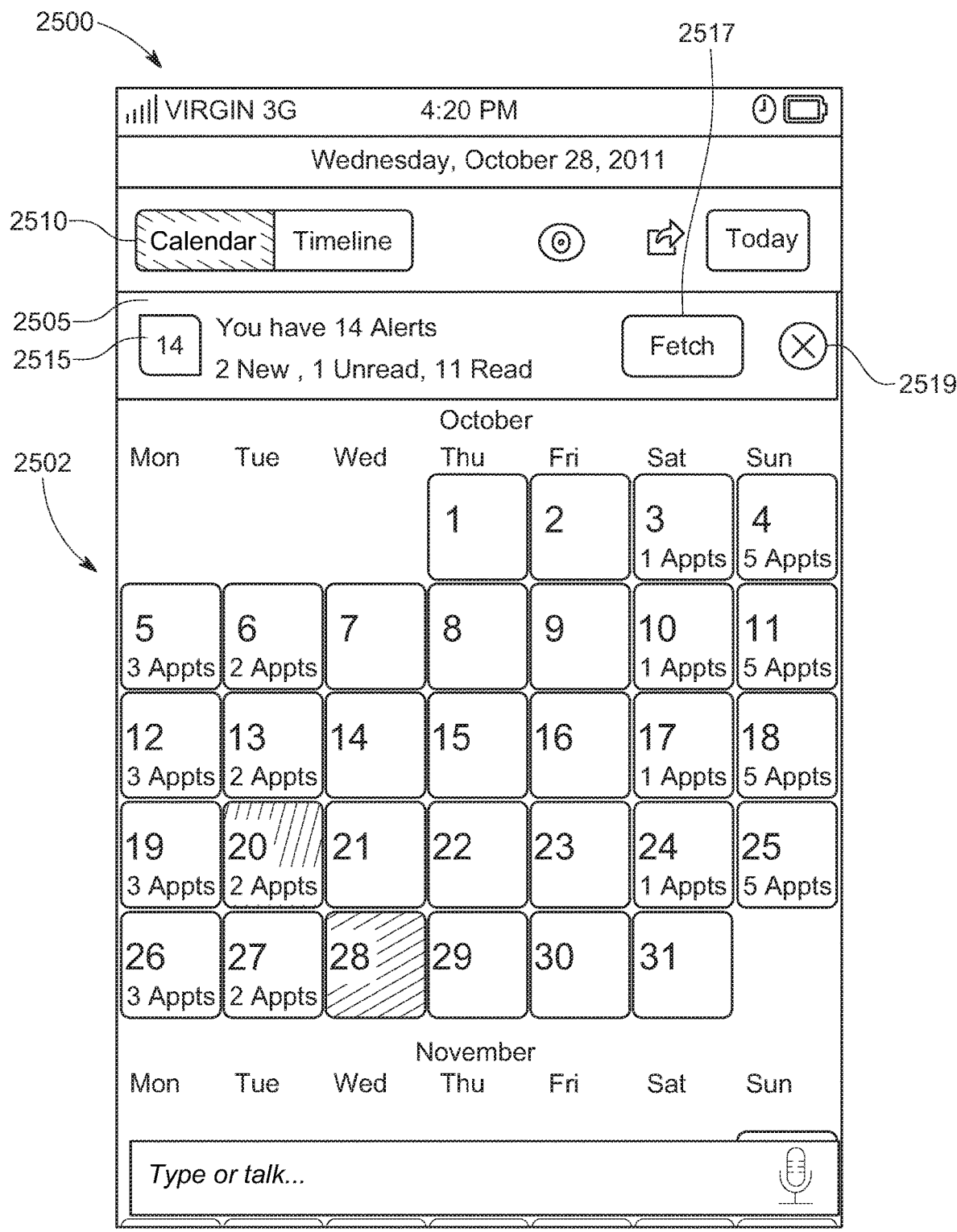
FIG. 25 is an outward view of a displayed user interface, including some aspects relating to an alert and notification functionality herein.
Figure 26A:
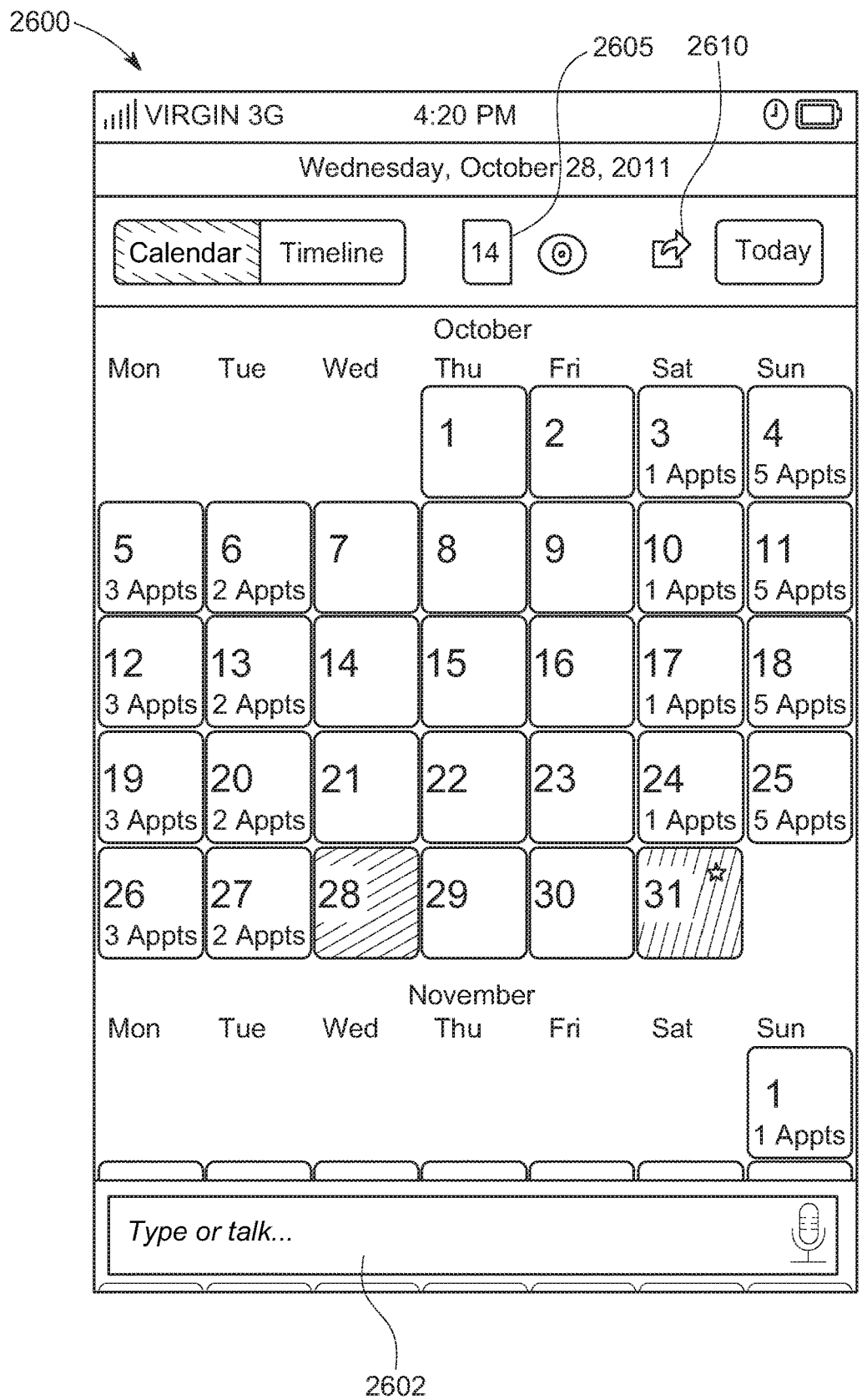
FIGS. 26A-26C include outward views of displayed user interfaces, including some aspects relating to settings and filters for an alert and notification functionality herein.
Figure 26B:
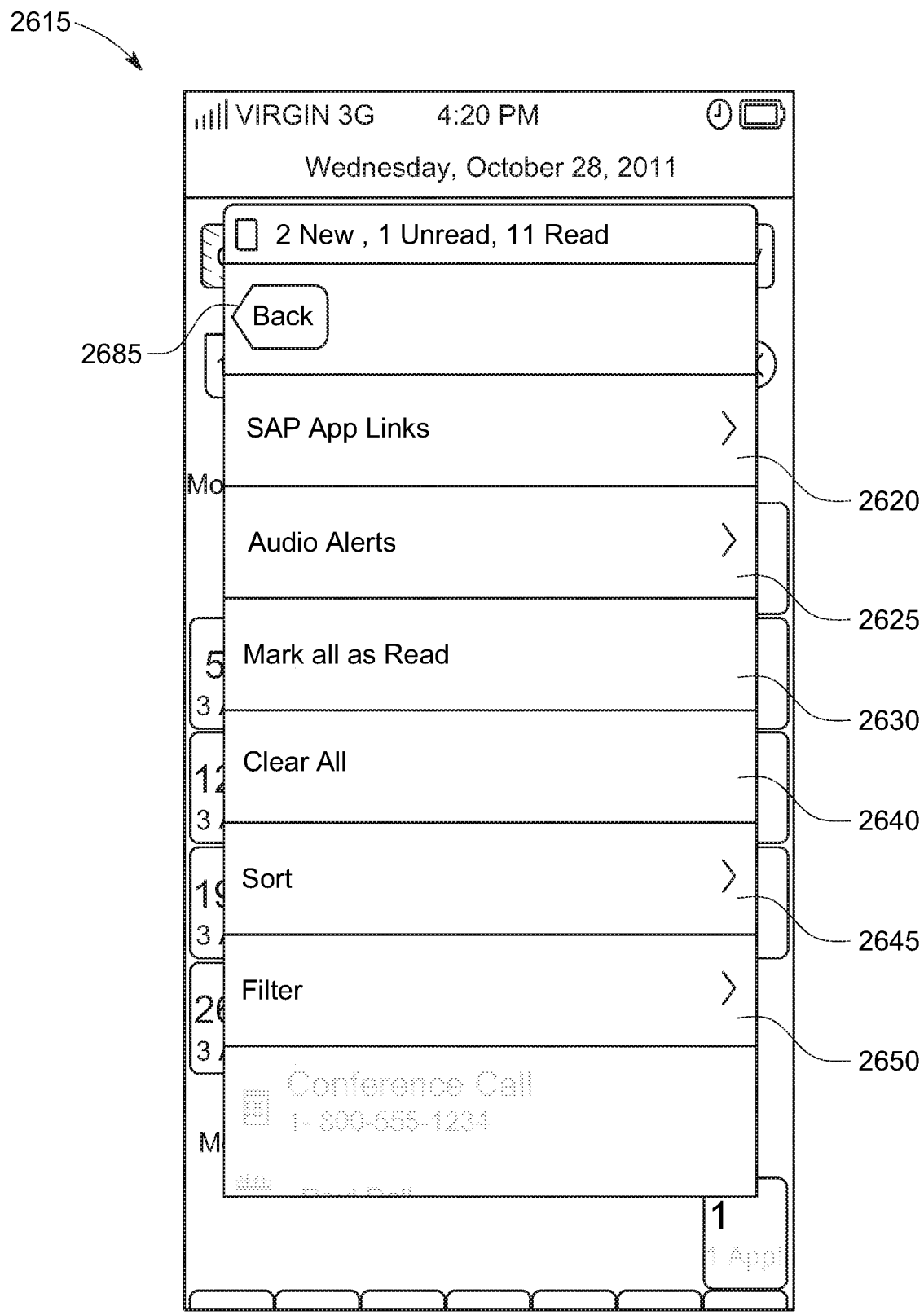
Figure 26C:
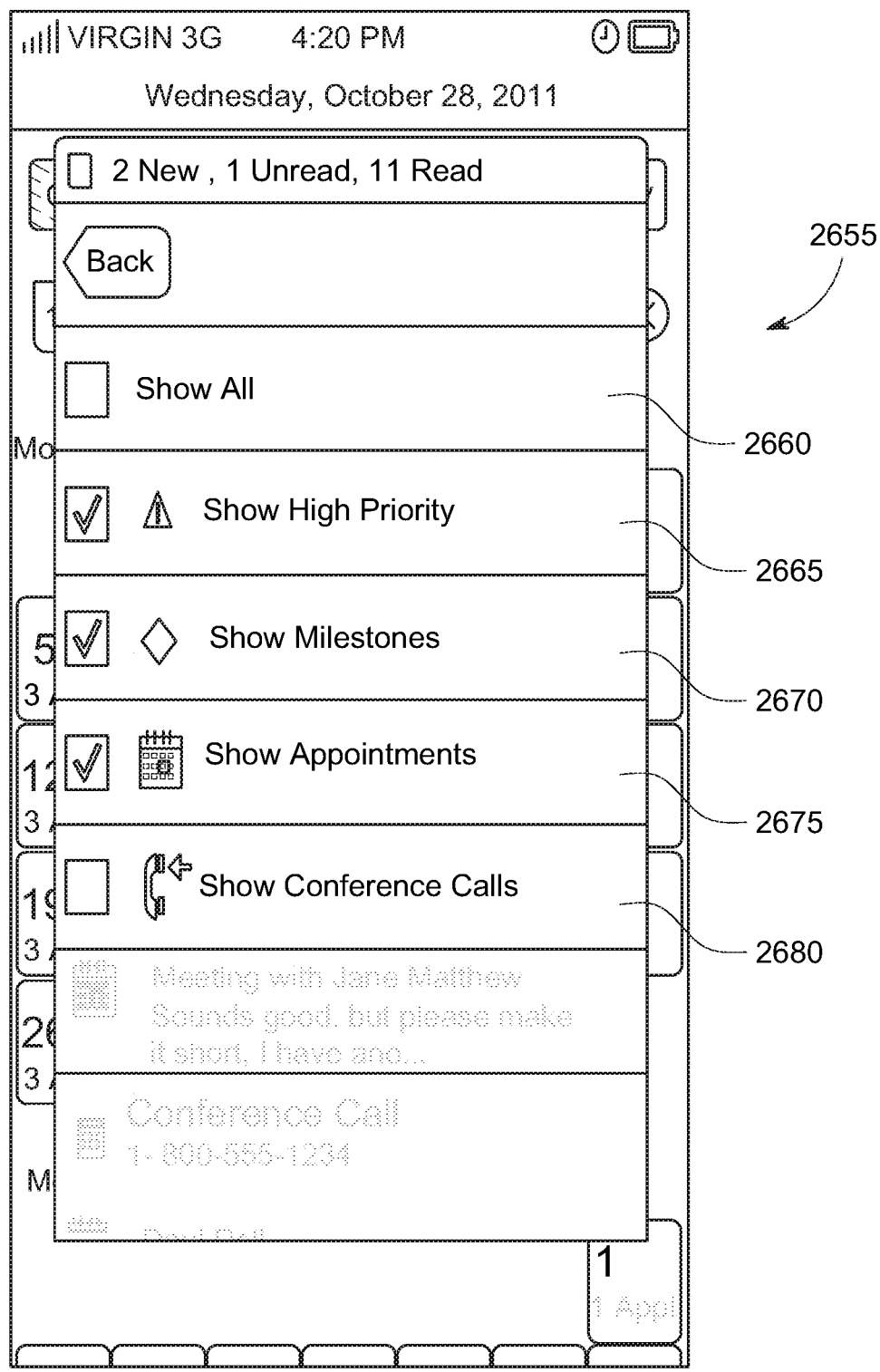
Figure 27:
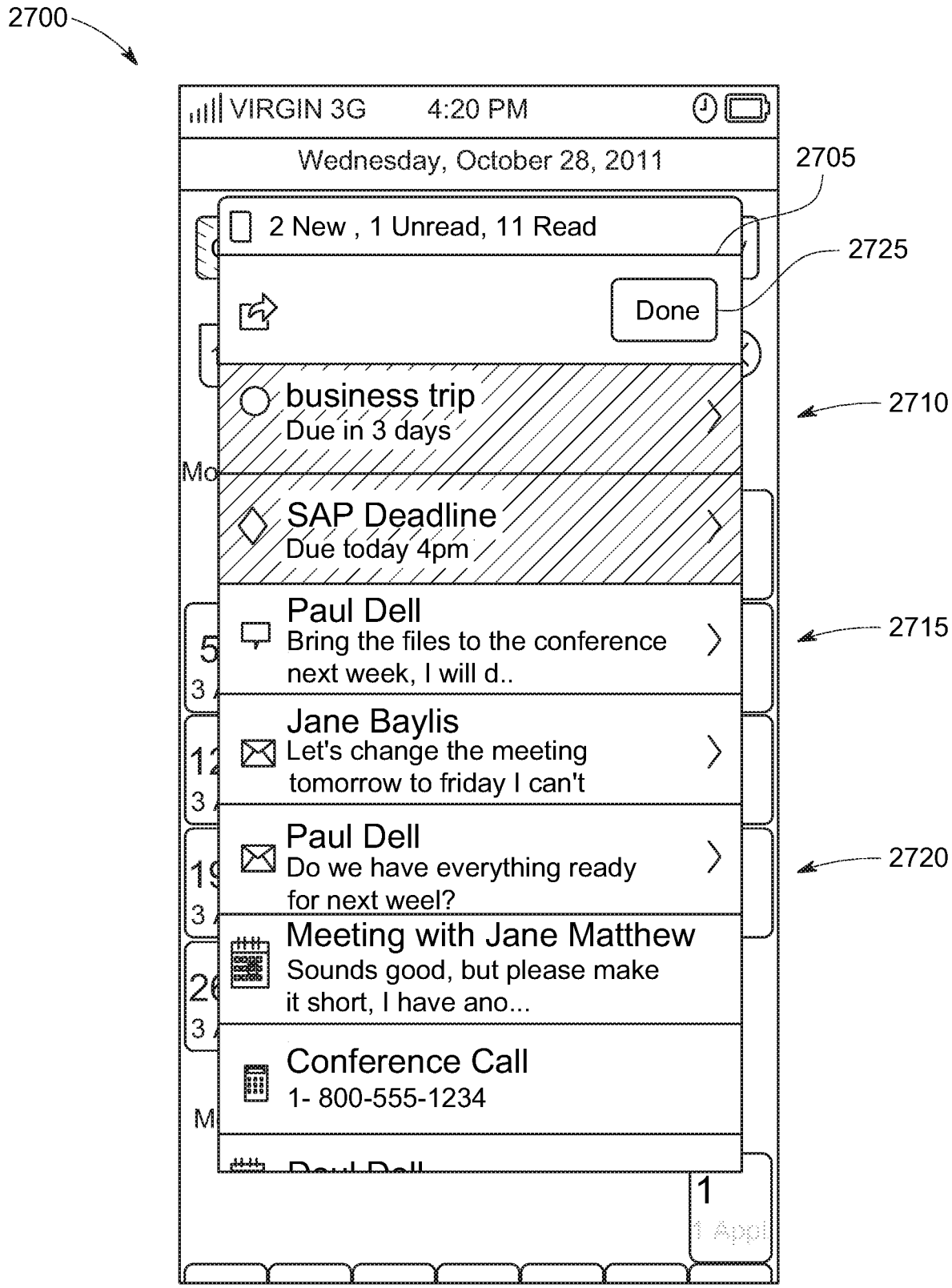
FIG. 27 is an outward view of a displayed user interface, including some aspects relating to an example list view UI visualization for an alert and notification functionality herein.

Referring again to an alert and notification "fetch" application, service, system, or other functionality herein, FIGS. 25-27 illustrate some aspects thereof for some example embodiments. FIGS. 25-27 illustrate example embodiments for presenting or visualizing representations of the alert and notification (i.e., "fetch") application, service, system, or functionality. FIG. 25 shows a depiction of a dynamic alert and notification banner 2505 in UI 2500, in combination with a calendar view (as indicated by calendar 2502 and highlighted UI button 2510). In some example embodiments, the dynamic alert and notification banner 2505 is automatically and dynamically presented via a sliding down animation in response to a new alert/notification being received from the system. For example, as new alerts/notifications are received, an alert and notification banner is dynamically updated and presented in UI 2500, via an animation, to provide a current status indicator of the alerts/notifications relevant to the user. In the example of FIG. 25, banner 2505 provides text notifying a user of the total number of alerts ("14" as indicated in UI button 2515) and text (i.e., "You have 14 Alerts 2 New 1 Unread 11 Read") describing the status and number corresponding to each alert/notification status, as either "new", "unread", and "read", where a "new" notification banner 2505 will always be presented in a red (or other specific) color. As shown in banner 2505, the UI button 2515 is shown in a red color to indicate and alert the user that at least one new alert/notification has been received in the alert/notification application UI. In the instance the status of the alert/notification changes from "new" to another state (e.g., to "unread" or "read), then the color of UI button 2515 can automatically change from the red (or other specific) color to another color to visually indicate that there are no more "new" alerts/notifications. In an embodiment, banner 2505 remains displayed until the user has either selected the "Fetch" button 2517 or, similarly, UI button 2515 to view the alert/notifications referenced in the alert/notification UI, which in turn dismisses (removes from view) banner 2505 and presents the alert/notification list UI 2700 in FIG. 27. In an embodiment, the user may simply dismiss (remove from view) banner 2505 without viewing the alerts/notifications by selecting the banner dismiss button element 2519.

In an embodiment, if no "new" alert/notifications have been received by the alert/notification UI, then the notification banner 2505 is not presented. In this manner, the absence of an alert/notification banner operates as an efficient mechanism to convey that there are currently no new alerts or notifications (i.e., new fetch items) for a user. In some embodiments, a "new" alert/notification means the alert/notification was received and reported after the user last viewed their alerts/notifications via the alert/notification UI 2700 in FIG. 27. An "unread" alert/notification means the user has not yet opened and viewed the alert/notification detail via selecting a specific alert/notification item, and a "read" status for an alert/notification means that the user has viewed (or accessed) a visualization or presentation of the alert/notification detail by selecting the specific item in the alert/notification UI list 2700.

An example embodiment of a natural language input UI element 2602 is shown in the UI 2600 in FIG. 26A that illustrates a mechanism a user can use to interact with the "fetch" functionality, as well as the integrated calendar and timeline application, herein using textual and/or speech inputs, in conjunction with conventional manual inputs.

In some aspects and embodiments herein, the system herein dynamically and intelligently notifies a user of the current, updated status of the alerts and notifications (i.e., fetch items) relevant to them based on, for example, the user's role as specified or otherwise known by the system. The system disclosed herein including the integrated calendar and timeline knows the events, both short-term and long-term, relevant to a user and further includes or relates to a real-time clock functionality for such alerts/notifications. Using these aspects and processing capabilities (at least), a system herein may generate and present alerts, reminders and notifications to a user without direct/explicit directions and/or interactions from a user for each triggering event. For example, a user may enter a deadline with an associated priority, wherein in response to that entry a system herein may automatically generate and provide reminder alerts to a user as the deadline approaches based on the time until the deadline and the deadline's indicated priority (e.g., the frequency of the reminder alerts generated for the entered deadline may increase as the due date approaches, with more alerts being generated for high(er) priority tasks/actions). Additionally, (or alternatively), a system herein may stop sending reminder alerts once a task/action associated with the deadline is completed.

In general, FIG. 26A is an illustrative depiction of an alert and notification UI 2600 comprising a notification header button 2605. Such a UI may be reserved for relatively small displays and/or devices with a relatively small display screen (e.g., some phones, a smartwatch, a wearable device, etc.), in an effort to, for example, conserve screen space and provide efficient GUI usability characteristics. In some embodiments, if no alerts/notifications are contained in the alert/notification UI 2700, then UI button 2605 is not shown. In the present example embodiment of FIG. 26A, the number of alerts/notifications indicated by UI button 2605 ("14") corresponds to the total number of "new" (2), "read" (1), and "unread" (11) alert/notifications referenced in the alert/notification banner 2505 shown in UI 2500 of FIG. 25. The alerts/notifications referenced in UI 2600 may be accessed by selecting header button 2605 FIG. 26A. In some embodiments, if no "new" alert/notifications are contained in the alert/notification UI, (although there is some combination of "unread" and "read" alert/notifications) the UI button 2605 may be shown in a grey (or another) color to visually communicate this condition to the user. Header button 2605 may, in some instances, be displayed on larger display devices, such as, for example, a laptop screen, a desktop monitor, a tablet, and a mobile phone with a screen of a minimum size. Rules and/or preference settings may control which type of notification UI elements are presented to a user on any given device, such as, for example, the UI banner 2505 shown in FIG. 25 or the notification button 2605 shown in FIG. 26A. In some embodiments, the rules and/or preference settings regarding alerts and notifications may be specific to a certain one or more fetch enabled applications or alternatively may be common across all fetch enabled applications and device platforms associated with a user. In some embodiments where the "fetch" functionality disclosed herein is deployed as a standalone application and not deployed in a specific enabled application, fetch preference settings may be individually set according to a specific device or deployment platform.

FIGS. 26B and 26C relate to preference and filter settings for a fetch function in some example embodiments herein. In the present example, selecting action button 2610 in UI 2600 shown in FIG. 26A causes the display of fetch preference settings UI 2615, as seen in FIG. 26B. As shown, one or more categories of settings are shown in UI 2615. In particular, there are settings for "App Links" 2620, "Audio Alerts" 2625, "Mark as all Read" 2630, "Clear All" 2640, "Sort" 2645, and "Filter" 2650 that can be further selected to enter a setting value or specific preference.

The "App Links" setting 2620 may be selected by a user and provides a mechanism for the user to specify one or more applications, systems, and services that can be linked, associated, communicated, or interfaced with via the "fetch" functionality herein to send and receive alerts and notifications relating to a role of the user. In an embodiment, the one or more linked applications (e.g., a suite of applications from a particular vendor) may be interfaced with the system herein via an application programming interface (API) or other technical communication techniques, tools, and protocols.

The "Audio Alerts" setting category 2625 may be selected by a user and provides a mechanism for the user to set preferences for audio alerts related to the alerts and notifications that may be processed by the "fetch" functionality herein. In an embodiment, a user may be presented with a mechanism (e.g., a UI including controls to select and specify values) to select, for example, a sound mode (e.g., sound, mute, vibrate), a volume, a ringtone, and (optionally) other audio settings for particular linked applications. In an embodiment, the audio alerts may be specifically set for individual linked applications.

The "Sort" category of fetch preference and filter settings shown in UI 2615 at 2645 may be selected by a user and provides a mechanism for the user to specify an order of presentation for the alerts and notifications reported by the fetch functionality herein. In an embodiment, the user may reorder the listing of alerts and notifications to their liking, whereas a default setting may list the alerts and notifications in, for example, an alphabetical or prioritized ordered listing.

The settings categories of "Mark all as Read" and "Clear All" may be selected to invoke those actions with respect to all fetch alerts and notifications contained in the alerts/notifications system UI. For example, selecting the "Mark all as Read" setting 2630 will operate to classify all outstanding alerts and notifications as "read". Selecting the "Clear All" setting will remove (i.e., clear) all of the outstanding alerts and notification so that, for example, notification banner 2505 in FIG. 25 and notification button 2605 in FIG. 26A are cleared of all notifications and thus is no longer presented. A user may navigate from UI 2615 back to UI 2600 (FIG. 26A) by selecting UI "Back" button 2685.

Referring to FIG. 26C, UI 2655 is an example of a UI that may be presented in response to selecting the "Filter" setting 2650 in UI 2615 of FIG. 26B. As seen, a number of different filter settings for alerts and notifications can be selected for limiting the type of alerts and notifications to be displayed, including for example, a "Show All" designation 2660 that can enable the displaying of all alerts and notifications, including but not limited to all of the different types of alerts and notifications shown in UI 2655; a "Show High Priority" setting 2665 that specifically enables the displaying of high priority alerts and notifications; a "Show Milestones" filter setting 2670 that enables the displaying of milestones (e.g., timeline context associated event milestones); a "Show Appointments" filter setting 2675 to enable the displaying of appointments (e.g., a calendar context associated appointment event); and a "Show Conference Calls" filter setting 2680 that enables the displaying of scheduled conference calls for a user. A user may navigate from UI 2655 back to UI 2615 (FIG. 26B) by selecting UI "Back" button 2690.

FIG. 27 is an example list view UI visualization for an alert and notification application in some embodiments herein. The list view UI visualization configuration of the alert and notification application may be presented in UI 2700, as shown in FIG. 27. UI 2700 includes a header element 2705 that includes a status of the outstanding alerts/notifications being reported therein. In the example of FIG. 27, there are 2 "new" alerts, 1 "unread" alert, and 11 "read" alerts being reported. In addition to the text in header element 2705 conveying the status of the alerts, the alerts each have a color corresponding to their status. For example, the 2 "new" (or updated) alerts are shown colored with the dark highlight color at 2710, the 1 "unread" (or unopened) alert is presented colored with the light highlight color at 2715, and the 11 "read" (or previously opened) alerts are shown with no coloring (i.e., white) at 2720. In some aspects, a fetch banner (2505, FIG. 25) may be replaced with a header button (2605, FIG. 26A) after a user views the contents of a fetch pop-up list view 2700 and closes the list view by selecting UI "Done" button 2725 in the alert/notification UI. In some aspects, when the header button 2605 of UI 2600 in FIG. 26A is displayed, selecting the button 2605 launches (opens) the fetch pop-up list view UI 2700 shown in FIG. 27. In an embodiment, the pop-up list view UI 2700 allows a user to select, read, reply, edit, delete and otherwise navigate the fetch alerts/notifications.

Embodiments described herein are solely for the purpose of illustration. Those in the art will recognize other embodiments may be practiced with modifications and alterations to that described above.

What is claimed is:

1. A computer-implemented method for an integrated calendar and timeline, the method comprising:
receiving within a user interface (UI) of an integrated calendar and timeline application, by a processor, a selection of one of a calendar of the integrated calendar and timeline application and a timeline of the integrated calendar and timeline application;
presenting, by the processor, a visualization of a first UI context of the integrated calendar and timeline application corresponding to the received selection, the first UI context being a calendar context in an instance the received selection is of the calendar of the integrated calendar and timeline application and the first UI context being a timeline context in an instance the received selection is of the timeline of the integrated calendar and timeline application;
receiving, by the processor, a selection of an indication of a first point of focus within the presented visualization of the first UI context;
presenting, by the processor, the selected first point of focus within the presented visualization of the first UI context, the selected first point of focus overlapping a center of the presented visualization of the first UI context of the integrated calendar and timeline application;
receiving within the presented visualization of the first UI context, by the processor, a selection of the non-selected one of the calendar of the integrated calendar and timeline application and the timeline of the integrated calendar and timeline application; and
presenting, by the processor, a visualization of a second UI context of the integrated calendar and timeline application, the second UI context being a calendar context in an instance the first UI context is a timeline context of the integrated calendar and timeline application and the second UI context being a timeline context in an instance the first UI context is a calendar context of the integrated calendar and timeline application, the selected first point of focus from the presented visualization of the first UI context being synchronized to the presented visualization of the second UI context and presented at a location overlapping a center of the presented visualization of the second UI context of the integrated calendar and timeline application.

2. The method of claim 1, wherein the first point of focus selected within the presented visualization of the first UI context is one of a current day and a specific date other than the current day.

3. The method of claim 2, wherein the first point of focus selected within the presented visualization of the first UI context is the current day and the selection thereof is invoked by an activation of a current day UI element within the presented visualization of the first UI context of the integrated calendar and timeline application.

4. The method of claim 3, further comprising sequentially advancing a zoom level presented in the presented visualization of the first UI context in response to a repetitive activation of the current day UI element within the presented visualization of the first UI context of the integrated calendar and timeline application.

5. The method of claim 1, wherein the presentation of the selected first point of focus within each of the presented visualization of the first UI context and the presented visualization of the second UI context is represented by a predetermined color, a predetermined graphic, and a combination thereof.

6. The method of claim 5, further comprising:
receiving within the presented visualization of the first UI context, by the processor, a selection of an indication of a second point of focus;
presenting, by the processor, the selected second point of focus within the presented visualization of the first UI context, the selected second point of focus being located overlapping a center of the presented visualization of the first UI context of the integrated calendar and timeline application, the presentation of the selected second point of focus including a removal of the first point of focus;
receiving within the presented visualization of the first UI context, by the processor, a second selection of the non-selected one of the calendar of the integrated calendar and timeline application and the timeline of the integrated calendar and timeline application; and
presenting, by the processor, an updated visualization of the second UI context of the integrated calendar and timeline application, the second UI context being a calendar context in the instance the first UI context is a timeline context of the integrated calendar and timeline application and the second UI context being a timeline context in the instance the first UI context is a calendar context of the integrated calendar and timeline application, the selected second point of focus from the presented visualization of the first UI context being synchronized to the presented updated visualization of the second UI context and presented at a location overlapping a center of the presented updated visualization of the second UI context of the integrated calendar and timeline application.

7. The method of claim 1, wherein the first UI context of the integrated calendar and timeline application comprises at least two hierarchical zoom levels, wherein each zoom level comprises a different extent of detail and wherein the second UI context of the integrated calendar and timeline application comprises at least two hierarchical zoom levels corresponding to the at least two hierarchical zoom levels of the first UI context of the integrated calendar and timeline application.

8. A system comprising:
a memory storing processor-executable instructions; and
a processor to execute the processor-executable instructions to cause the system to:
receive, within a user interface (UI) of an integrated calendar and timeline application, a selection of one of a calendar of the integrated calendar and timeline application and a timeline of the integrated calendar and timeline application;
present a visualization of a first UI context of the integrated calendar and timeline application corresponding to the received selection, the first UI context being a calendar context in an instance the received selection is of the calendar of the integrated calendar and timeline application and the first UI context being a timeline context in an instance the received selection is of the timeline of the integrated calendar and timeline application;
receive a selection of an indication of a first point of focus within the presented visualization of the first UI context;
present the selected first point of focus within the presented visualization of the first UI context, the selected first point of focus overlapping a center of the presented visualization of the first UI context of the integrated calendar and timeline application;

receive, within the presented visualization of the first UI context, a selection of the non-selected one of the calendar of the integrated calendar and timeline application and the timeline of the integrated calendar and timeline application; and present a visualization of a second UI context of the integrated calendar and timeline application, the second UI context being a calendar context in an instance the first UI context is a timeline context of the integrated calendar and timeline application and the second UI context being a timeline context in an instance the first UI context is a calendar context of the integrated calendar and timeline application, the selected first point of focus from the presented visualization of the first UI context being synchronized to the presented visualization of the second UI context and presented at a location overlapping a center of the presented visualization of the second UI context of the integrated calendar and timeline application.

9. The system of claim 8, wherein the first point of focus selected within the presented visualization of the first UI context is one of a current day and a specific date other than the current day.

10. The system of claim 9, wherein the first point of focus selected within the presented visualization of the first UI context is the current day and the selection thereof is invoked by an activation of a current day UI element within the presented visualization of the first UI context of the integrated calendar and timeline application.

11. The system of claim 10, further comprising sequentially advancing a zoom level presented in the presented visualization of the first UI context in response to a repetitive activation of the current day UI element within the presented visualization of the first UI context of the integrated calendar and timeline application.

12. The system of claim 8, wherein the presentation of the selected first point of focus within each of the presented visualization of the first UI context and the presented visualization of the second UI context is represented by a predetermined color, a predetermined graphic, and a combination thereof.

13. The system of claim 12, wherein the processor further executes the processor-executable instructions to cause the system to:

receive, within the presented visualization of the first UI context, a selection of an indication of a second point of focus;

present the selected second point of focus within the presented visualization of the first UI context, the selected second point of focus being located overlapping a center of the presented visualization of the first UI context of the integrated calendar and timeline application, the presentation of the selected second point of focus including a removal of the first point of focus;

receive, within the presented visualization of the first UI context, a second selection of the non-selected one of the calendar of the integrated calendar and timeline application and the timeline of the integrated calendar and timeline application; and present an updated visualization of the second UI context of the integrated calendar and timeline application, the second UI context being a calendar context in the instance the first UI context is a timeline context of the integrated calendar and timeline application and the second UI context being a timeline context in the instance the first UI context is a calendar context of the integrated calendar and timeline application, the selected second point of focus from the presented visualization of first UI context being synchronized to the presented visualization of the second UI context and presented at a location overlapping a center of the presented visualization of the second UI context of the integrated calendar and timeline application.

14. The system of claim 8, wherein the first UI context of the integrated calendar and timeline application comprises at least two hierarchical zoom levels, wherein each zoom level comprises a different extent of detail and wherein the second UI context of the integrated calendar and timeline application comprises at least two hierarchical zoom levels corresponding to the at least two hierarchical zoom levels of the first UI context of the integrated calendar and timeline application.

15. A non-transitory computer readable medium having processor-executable instructions stored therein, the medium comprising:

instructions to receive, within a user interface (UI) of an integrated calendar and timeline application, a selection of one of a calendar of the integrated calendar and timeline application and a timeline of the integrated calendar and timeline application;

instructions to present a visualization of a first UI context of the integrated calendar and timeline application corresponding to the received selection, the first UI context being a calendar context in an instance the received selection is of the calendar of the integrated calendar and timeline application and the first UI context being a timeline context in an instance the received selection is of the timeline of the integrated calendar and timeline application;

instructions to receive a selection of an indication of a first point of focus within the presented visualization of the first UI context;

instructions to present the selected first point of focus within the presented visualization of the first UI context, the selected first point of focus overlapping a center of the presented visualization of the first UI context of the integrated calendar and timeline application;

instructions to receive, within the presented visualization of the first UI context, a selection of the non-selected one of the calendar of the integrated calendar and timeline application and the timeline of the integrated calendar and timeline application; and instructions to present a visualization of a second UI context of the integrated calendar and timeline application, the second UI context being a calendar context in an instance the first UI context is a timeline context of the integrated calendar and timeline application and the second UI context being a timeline context in an instance the first UI context is a calendar context of the integrated calendar and timeline application, the selected first point of focus from the presented visualization of the first UI context being synchronized to the presented visualization of the second UI context and presented at a location overlapping a center of the presented visualization of the second UI context of the integrated calendar and timeline application.

16. The medium of claim 15, wherein the first point of focus selected within the presented visualization of the first UI context is one of a current day and a specific date other than the current day.

17. The medium of claim 16, wherein the first point of focus selected within the presented visualization of the first UI context is the current day and the selection thereof is invoked by an activation of a current day UI element within the presented visualization of the first UI context of the integrated calendar and timeline application.

18. The medium of claim 17, further comprising instructions to sequentially advance a zoom level presented in the presented visualization of the first UI context in response to a repetitive activation of the current day UI element within the presented visualization of the first UI context of the integrated calendar and timeline application.

19. The medium of claim 15, wherein the presentation of the selected first point of focus within each of the presented visualization of the first UI context and the presented visualization of the second UI context is represented by a predetermined color, a predetermined graphic, and a combination thereof.

20. The medium of claim 19, further comprising:
  instructions to receive, within the presented visualization of the first UI context, a selection of an indication of a second point of focus;
  instructions to present the selected second point of focus within the presented visualization of the first UI context, the selected second point of focus being located overlapping a center of the presented visualization of the first UI context of the integrated calendar and timeline application, the presentation of the selected second point of focus including a removal of the first point of focus;
  instructions to receive, within the presented visualization of the first UI context, a second selection of the non-selected one of the calendar of the integrated calendar and timeline application and the timeline of the integrated calendar and timeline application; and
  instructions to present an updated visualization of the second UI context of the integrated calendar and timeline application, the second UI context being a calendar context in the instance the first UI context is a timeline context of the integrated calendar and timeline application and the second UI context being a timeline context in the instance the first UI context is a calendar context of the integrated calendar and timeline application, the selected second point of focus from the presented visualization of the first UI context being synchronized to the presented updated visualization of the second UI context and presented at a location overlapping a center of the presented updated visualization of the second UI context of the integrated calendar and timeline application.

* * * * *